United States Patent [19]

Anderson et al.

[11] 4,284,849

[45] Aug. 18, 1981

[54] MONITORING AND SIGNALLING SYSTEM

[75] Inventors: Richard W. Anderson, Reading; Robert J. Fahey, Framingham; William R. McClellan, Westford; J. Edward Schlener, Winchester, all of Mass.

[73] Assignee: GTE Products Corporation, Stamford, Conn.

[21] Appl. No.: 94,016

[22] Filed: Nov. 14, 1979

[51] Int. Cl.³ .......................................... H04M 11/04
[52] U.S. Cl. ..................................... 179/5 R; 340/151
[58] Field of Search ................. 179/2 R, 2 A, 2 AM, 179/5 R, 5 P; 340/502, 504, 506, 514, 526, 516, 151

[56] References Cited

U.S. PATENT DOCUMENTS

| | | | |
|---|---|---|---|
| 3,662,111 | 5/1972 | Rubinstein | 179/5 R |
| 3,885,235 | 5/1975 | Bergstrom et al. | 340/526 |
| 3,989,900 | 11/1976 | Dibner | 179/5 P |
| 4,086,434 | 4/1978 | Bocchi | 179/5 R |

Primary Examiner—Joseph A. Popek
Attorney, Agent, or Firm—Peter Xiarhos

[57] ABSTRACT

A monitoring and signalling system including a remote control unit in the residence of an individual and a centralized communication center interconnected with the remote control unit by a telephone network. A plurality of sensors are located within the residence and operate to monitor the occurrence of particular activities performed by the individual and to produce signals in response to monitoring the occurrence of the activities. A microprocessor in the remote control unit receives and processes signals produced by the sensors and accumulates sensor activity data representing a running tally of the number of times each sensor has monitored its associated activity. The microprocessor is also able to detect a prolonged lack of activity and to initiate an alarm sequence during which steady audible and visual alarm indications are provided in a pre-alarm period and followed by intermittent audible and visual alarm indications while an alarm communication is established and completed with the centralized communications center.

The microprocessor is also able on a daily basis to initiate a self-check communication during which the sensor activity data corresponding to the various sensors is transmitted to the centralized communications center and processed to identify any sensor which failed to monitor an associated activity since the last self-check operation.

26 Claims, 67 Drawing Figures

```
ID # 5
NAME              J. EDWARD SCHLENER                        INSTALLED 1-OCT-79
ADDRESS           6485 MARIANA DRIVE                        NEXT SELF CHECK
CITY STATE        ST. PETERSBURG, FL  33702                 7-DEC-79 AT 0:05
PHONE             577-2167                                  PRE-ALARM YES
COMMENT 1         HEART CONDITION AND HIGH BLOOD PRES.      TIME 1 MIN.
COMMENT 2         BAD BACK   SPEAKS GERMAN
NORMAL ACTIVITY TIME  480 MIN  BATHROOM ACTIVITY TIME 60 MIN  SELF-CHECK TIME 1440 MIN
EMERGENCY PHONE       COMMENT
 1. 577-2167          HOME
 2. 477-3141          MR. & MRS. RICHARD ANDERSON (NEIGHBORS)
 3. 477-6835          MRS. LYN STURTEVANT (NEIGHBOR)
 4. 911               ST. PETERSBURG FIRE DEPT.
 5. 911               ST. PETERSBURG POLICE DEPT.
 6. 576-4961          ROBERT J. FAHEY, M.D.
 7. 477-1617          BAYFRONT HOSPITAL
 8. 477-1616          BAYFRONT MEDICAL CTR
 9. 111               EMS (EMERGENCY MED'L SERVICE)
10. 345-3982          NANCY J. HOUGH (SISTER)
11. 1-812-926-2459    FRANK SCHLENER (BROTHER)

SENSORS INSTALLED   0 YES   1 NO   2 YES   3 NO   4 YES   5 YES   6 YES
-------------------------------------------------------------------------
                    MAINTENANCE YES                       6-DEC-79
                                                          11:56
```

```
SENSOR
CODE    0 = RF SIGNALLING DEVICE #1
        1 = RF SIGNALLING DEVICE #2
        2 = BATHROOM SENSOR #1
        3 = BATHROOM SENSOR #2
        4 = AC LINE SENSOR #1
        5 = AC LINE SENSOR #2
        6 = SWITCH SENSOR #1
```

*Fig. 4.*

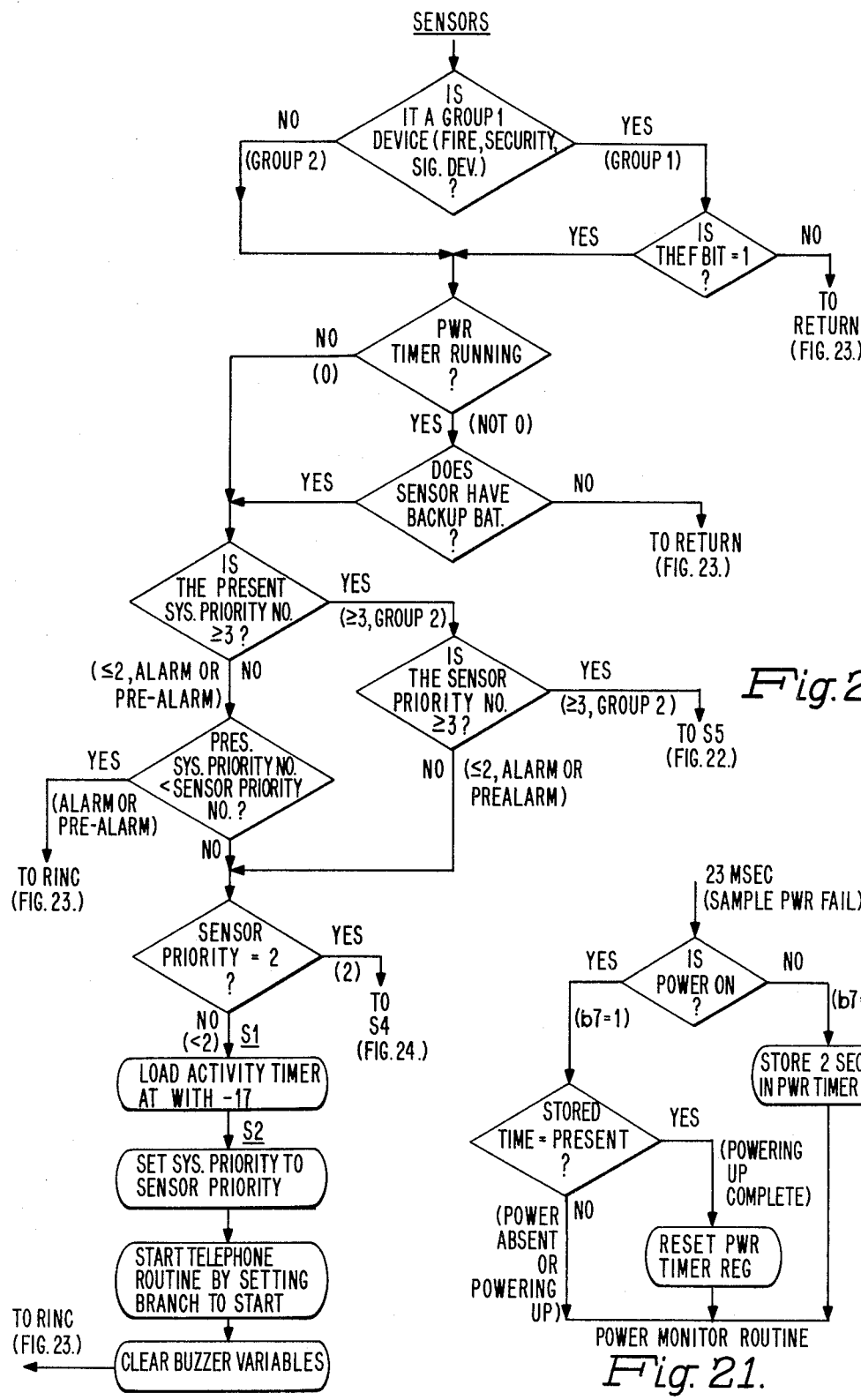

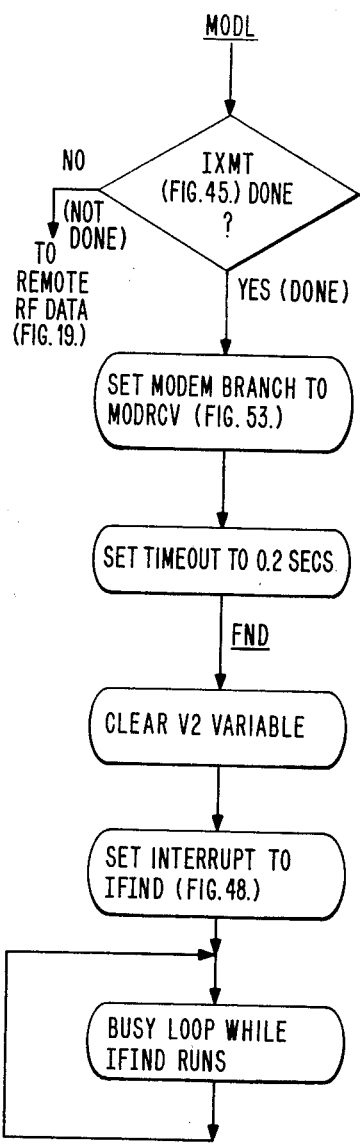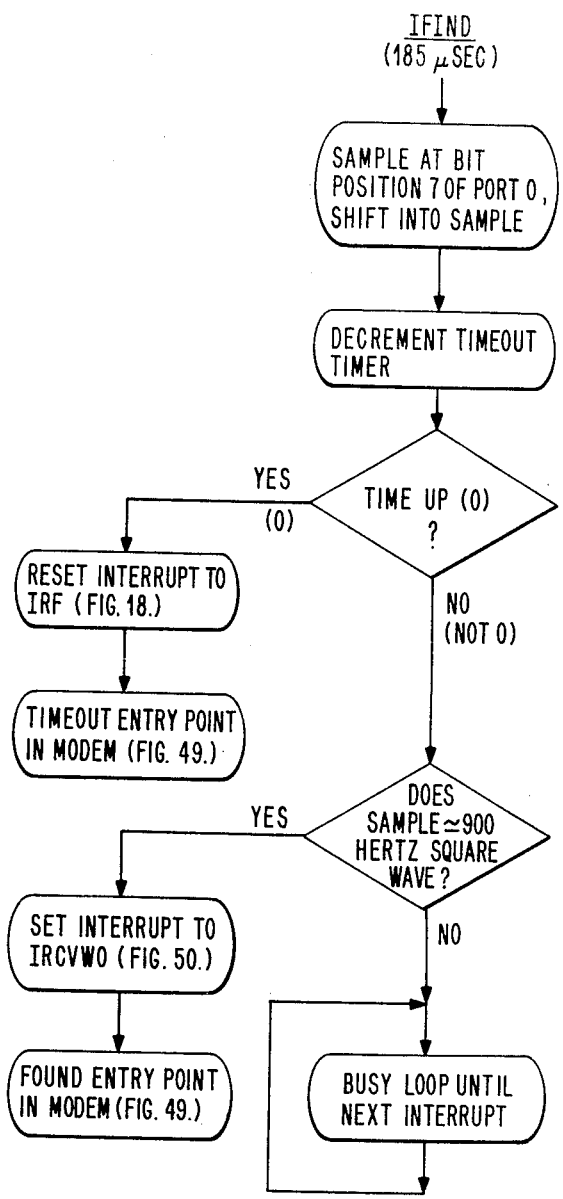
Fig. 47.
Fig. 48.

MONITORING AND SIGNALLING SYSTEM

CROSS-REFERENCE TO RELATED APPLICATIONS

The present application discloses subject matter which is disclosed, and claimed, in the following co-pending applications:

Ser. No. 965,808, filed Dec. 4, 1978, now U.S. Pat. No. 4,224,478, in the names of Robert J. Fahey and Martin L. Resnick, entitled "DATA TRANSMISSION CIRCUIT", and assigned to GTE Sylvania Incorporated and GTE Laboratories Incorporated;

Ser. No. 965,809, filed Dec. 4, 1978, now U.S. Pat. No. 4,220,825, in the name of Robert J. Fahey, entitled "TELEPHONE STATUS MONITOR CIRCUIT", and assigned to GTE Sylvania Incorporated;

Ser. No. 965,756, filed Dec. 4, 1978, now U.S. Pat. No. 4,224,602, in the names of Richard W. Anderson and Alfred I. Bottner, entitled "SIGNALLING DEVICE", and assigned to GTE Sylvania Incorporated;

Ser. No. 965,757, filed Dec. 4, 1978, in the name of Alfred I. Bottner, entitled "Design for SIGNALLING DEVICE", and assigned to GTE Sylvania Incorporated;

Ser. No. 973,201, filed Dec. 26, 1978, now U.S. Pat. No. 4,220,872, in the name of Robert J. Fahey, entitled "D.C. POWER SUPPLY CIRCUIT", and assigned to GTE Sylvania Incorporated;

Ser. No. 973,218, filed Dec. 26, 1978, now U.S. Pat. No. 4,225,792, in the name of Robert J. Fahey, entitled "DETECTOR CIRCUIT", and assigned to GTE Sylvania Incorporated;

Ser. No. 25,298, filed Mar. 30, 1979, in the names of Richard W. Anderson and Alfred I. Bottner, entitled "Design for HOUSING FOR ELECTRONIC CIRCUITRY", and assigned to GTE Sylvania Incorporated;

Ser. No. 75,782, filed Sept. 17, 1979, in the name of Richard L. Naugle, entitled "SENSING APPARATUS", and assigned to GTE Laboratories Incorporated;

Ser. No. 75,769, filed Sept. 17, 1979, in the names of Richard L. Naugle and William L. Geller, entitled "EXIT-ENTRY APPARATUS", and assigned to GTE Laboratories Incorporated;

Ser. No. 094,015, filed concurrently herewith, in the names of Jeffrey R. Fox, Arthur Margolies, Rob Moolenbeek and Martin L. Resnick, entitled "APPARATUS FOR MONITORING AND SIGNALLING SYSTEM", and assigned to GTE Laboratories Incorporated;

Ser. No. 094,018, filed concurrently herewith, in the names of Richard W. Anderson, J. Edward Schlener and Martin L. Resnick, entitled "APPARATUS FOR MONITORING AND SIGNALLING SYSTEM", and assigned to GTE Sylvania Incorporated and GTE Laboratories Incorporated;

Ser. No. 094,013, filed concurrently herewith, in the names of Richard W. Anderson and J. Edward Schlener, entitled "APPARATUS FOR MONITORING AND SIGNALLING SYSTEM", and assigned to GTE Sylvania Incorporated;

Ser. No. 094,012, filed concurrently herewith, in the names or Robert J. Fahey and Martin L. Resnick, entitled "TELEPHONE STATUS MONITOR APPARATUS", and assigned to GTE Sylvania Incorporated and GTE Laboratories Incorporated;

Ser. No. 094,014, filed concurrently herewith, in the names of Robert J. Fahey and Martin L. Resnick, entitled "APPARATUS FOR MONITORING USAGE OF A TELEPHONE", and assigned to GTE Sylvania Incorporated and GTE Laboratories Incorporated;

Ser. No. 094,245, filed concurrently herewith, in the names of Robert A. Norbedo and Martin L. Resnick, entitled "APPARATUS FOR SIGNALLING SYSTEM", and assigned to GTE Laboratories Incorporated;

Ser. No. 094,241, filed concurrently herewith, in the name of Martin L. Resnick, entitled "DATA PROCESSING APPARATUS FOR RECEIVING AND PROCESSING CODED WORDS", and assigned to GTE Laboratories Incorporated;

Ser. No. 094,242, filed concurrently herewith, in the names of Robert J. Fahey and Martin L. Resnick, entitled "APPARATUS FOR MONITORING AND SIGNALLING SYSTEM", and assigned to GTE Sylvania Incorporated and GTE Laboratories Incorporated;

Ser. No. 094,017, filed concurrently herewith, in the names of Hans G. Blank and Martin L. Resnick, entitled "APPARATUS FOR COMMUNICATING WITH PROCESSING APPARATUS OVER A TELEPHONE NETWORK", and assigned to GTE Laboratories Incorporated;

Ser. No. 094,243, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated;

Ser. No. 094,019, filed concurrently herewith, in the names of Robert J. Fahey, Robert A. Norbedo and J. Edward Schlener, entitled "APPARATUS FOR MONITORING AND SIGNALLING SYSTEM", and assigned to GTE Sylvania Incorporated and GTE Laboratories Incorporated;

Ser. No. 094,244, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated; and Ser. No. 094,246, filed concurrently herewith, in the names of Robert J. Fahey, Robert A. Norbedo and Martin L. Resnick, entitled "VARIABLE TIMING SYSTEM", and assigned to GTE Sylvania Incorporated and GTE Laboratories Incorporated.

The following co-pending applications are directed to apparatus which may be employed in the signalling and monitoring system of the present invention:

Ser. No. 75,783, filed Sept. 17, 1979, in the names of Jeffrey R. Fox, Arthur Margolies, and Rob Moolenbeek, entitled "ELECTRICAL POWER SUPPLY APPARATUS", and assigned to GTE Laboratories Incorporated; and Ser. No. 084,976, filed Oct. 15, 1979, in the name of William L. Geller, entitled "DIGITAL COMMUNICATIONS RECEIVER", and assigned to GTE Laboratories Incorporated.

BACKGROUND OF THE INVENTION

The present invention relates to a monitoring and signalling system. More particularly, the present invention relates to a monitoring and signalling system such as a home health care system for monitoring the activities of individuals within their own homes, apartments, etc., and for providing bi-directional communication between these locations and a centralized communications center.

In recent years, as the general population has become older and the number of elderly persons in the population has increased, and also as a result of increased social welfare legislation directed to the needs of these persons, there has been an increased reliance and utilization of professional care institutions such as hospitals, nursing homes and retirement centers for providing health care and maintenance for these individuals. A large majority of these individuals are maintained and cared for in such institutions for good and proper reasons, most typically for the treatment of medical problems requiring medical facilities and equipment and the professional services of doctors, nurses and the like. However, there are a number of individuals who are presently maintained in institutions without medical reason. These individuals generally have no family or friends to care for them or who do not wish to impose upon or burden such family or friends and are prepared to sacrifice some measure of independence for the security and freedom from worry, anxiety, and loneliness that institutions can provide. It has therefore been recognized that if alternatives to institutionalization can be provided, especially for those individuals who do not require constant or continuing institutional attention or observation, while providing a substantial degree of security and independence for these individuals, preferably within their own homes, the burdens on the institutional care system can be reduced and result in lower health care costs. Any such alternatives which would also produce the same results for individuals other than the elderly, such as young handicapped, disabled or infirm adults, would also have the effect of improving the quality of life of such individuals and, at the same time, reducing health care costs.

A variety of apparatus and systems have been proposed heretofore directed to solutions to the problems as discussed hereinabove. One such system, developed in Sweden, is described in U.S. Pat. No. 3,885,235 and is adapted to monitor passively normal, routine activities of an individual in his or her own residence and to produce alarm conditions in the event these routine activities are not performed during some specified period of time, for example, a period of up to 24 hours. The system as described in the patent includes a plurality of actuating units which may be variously located in predetermined areas of the residence, such as halls, lavatories, bathrooms and bedrooms, and which may be associated with apparatus likely to be actuated or used routinely by the individual during the normal course of the day. This apparatus may include, by way of example, lighting circuits, radio sets, television sets and household appliances. Actuation or use of any one of the actuating units during the aforesaid specific time period will cause an electromechanical timer set to this time period to be reset and to repeat its timing cycle. In the event no actuating unit is actuated or used during the time period, for example, due to inactivity or incapacity of the individual, the timer times out after the time period and an alarm condition, for example, in the form of an audible or visual alarm, is produced by the system indicative of this situation. If the alarm condition was produced as the result of inactivity rather than incapacity, the user may disable the system by the use of a master switch. The master switch may also be used to disable the system when the individual leaves his or her residence for a prolonged period of time, for example, for a period of time greater than the time period of the timer. Upon return of the individual, the system is arranged so that routine operation of any one of the actuating units will have the effect of resetting the timer and causing the timer to repeat its timing cycle. The system as described above may also include an alarm switch in the residence for use by the individual in producing alarm conditions during emergencies, such as medical emergencies or accidents.

In a later version of the system as described in the aforementioned U.S. Pat. No. 3,885,235, known as the "Automatic Warning Aid (AWA)", additional features are provided, including a direction sensitive photocell optics arrangement in the bathroom; an electronic timer having two time periods, specifically, a short time period associated with the bathroom optics arrangement and a longer time period associated with all other actuating units; a pre-alarm cycle effective prior to an actual alarm cycle and during which an alarm condition can be cancelled or aborted; and remote alarm transmission. In this later system, recognition is given to the fact that the majority of accidents occur in the bathroom. Accordingly, the system is arranged so that when an individual enters the bathroom the direction sensitive photocell arrangement detects this entry and causes the timing cycle of the electronic timer to be reduced to its short time period, for example, about one hour. If the individual does not exit within the one hour period, for example, due to incapacity or inactivity of the individual, a pre-alarm cycle will be initiated and, if the pre-alarm cycle is not terminated or aborted by the individual, an actual alarm cycle will be initiated after passage of a short period of time (e.g., about ½ hour). In the event the individual exits from the bathroom within the one hour period, the direction sensitive photocell arrangement will detect this exit and cause the timing cycle of the electronic timer to be set or returned to its longer time cycle, for example, about 8 hours. During any pre-alarm cycle caused by non-use of any of the actuating units within the individual's residence the individual may, unless incapacitated, abort or cancel the pre-alarm cycle by actuation or use of any actuating unit (which resets the timer) so that no actual alarm condition will be produced. The alarm condition may be generated locally or, if desired, transmitted over a telephone network, for example, in the form of a recorded message, to a central alarm center from which communication with the individual may be attempted and/or help sent or summoned.

Another system which has been proposed heretofore for passively monitoring the activities of individuals within their own residences and for producing appropriate alarm conditions is described in U.S. Pat. No. 3,989,900. In this system, the use of a standard telephone is monitored. Each time the handset of the telephone is lifted off or removed from the cradle of the telephone, for example, during the making and receiving of routine telephone calls, a timer set to cycle through a predetermined time period, for example, up to 24 hours, is caused to be reset and to repeat its timing cycle. So long as the telephone is used during the time period of the timer no alarm condition will be produced. If no use of the telephone is made during the time period of the timer, for example, due to incapacity or inactivity of the individual, a local alarm condition is produced and, simultaneously therewith, a magnetic tape player is actuated to dial continuously a plurality of telephone numbers of locations at which help may be available and to transmit a prerecorded message that help is needed at the address of the individual. If the timing out of the timer was due to inactivity rather than incapacity, the user may, in response to the local alarm condition, abort the alarm condition and data transmission sequence (within a time period of about 90 seconds) by simply lifting and replacing the handset back on the cradle of the telephone thereby resetting the timer. This latter operation may also be used to reset the timer at such time as the individual plans to leave his residence for a period of time less than the predetermined time period of the timer. An activating switch is also provided in the system for activation of the alarm condition in the case of emergencies. The abovementioned patent also contemplates the use of a high speed digital dialer and transmitter in place of the aforementioned magnetic tape player. In this case, the timing out of the timer will produce a local alarm condition and, unless the alarm sequence is aborted (for example, within a 5 minute period), the digital dialer and transmitter will operate to seize a telephone line to establish communication with the central station. The dialing of the central station continues until a receiving signal has been received from the central station whereupon an identification signal can be sent to the central station.

In still other systems which have been proposed heretofore for enabling individuals to be maintained within their own residences while providing appropriate alarm signalling in emergency or accident situations, a transmitter is employed by an individual to communicate under a variety of conditions with control apparatus located on the premises. The transmitter, which may be in the form of a small, portable hand held unit or a unit carried in a pocket or purse or attached to clothing or worn as a pendant (e.g., see U.S. Pat. Nos. 4,121,160 and 4,134,108), may be used by the individual to communicate with the control apparatus in a variety of situations, including emergency or accident situations, to respond to periodic check signals or stimuli from the control apparatus as an indication that "all is well" (e.g., see U.S. Pat. No. 3,662,111), or to respond within predetermined time periods of timer apparatus. The signals from the transmitter are typically coded rf signals employed to control circuitry within the control apparatus. Activation of a transmitter in an emergency or accident situation, or failure to activate a transmitter at required times, for example, due to incapacity or inactivity, will ordinarily cause an alarm cycle to be initiated which, if not aborted or cancelled by the individual, will cause an alarm sequence to be initiated for informing others of the emergency, accident or inactivity situation. The alarm sequence may be variously initiated by digital or tape dialers and include one or more messages, identification data, etc., to be communicated, for example, over a telephone network, to such organizations or individuals as an emergency center, the police or fire department, ambulance service, doctors, paramedics, rescue teams, relatives, friends or neighbors. In many systems, repeated attempts will be made to communicate alarm information to a central location using one or more telephone numbers, and some systems may include hand-shaking operations between a local control unit and central equipment and include test calls for determining proper functioning of the systems.

While the various systems as described above are useful to a degree in alleviating the problems of individuals living alone, they all have serious shortcomings and disadvantages which limit their effectiveness and usefulness. As a group, for example, these systems utilize simple data handling, processing and communication techniques, being limited more or less to tape and digital dialing, the transmission and reception of limited amounts of data, and, in some cases, simple handshaking and parity-checking operations. It is not known, for example, that any of these systems employ computers, microprocessors, or the like capable of performing significant and substantial data processing, either within the residences of individuals or at central locations. As a result, these systems are susceptible to a high false alarm rate and reliability problems, these latter problems being especially exascerbated in those systems employing mechanical tape dialers and electromechanical timers and the like. In these systems, therefore, due to the lack of sophisticated data processing and communications, there is inadequate guarantee, if any, that a successful and satisfactory transmission of data, such as alarm conditions or information, has been achieved so that those persons charged with acting on this information can adequately discharge their duties. The systems as described above, perhaps also as a result of their limited data processing and communications capabilities, have limited capability in detecting or pinpointing, and distinguishing between, the malfunction of various critical components thereof, for example, actuating units, control apparatus or telephone lines. In these systems, the malfunction of a critical component thereof will, assuming that such malfunction is somehow communicated to a responsible person (e.g., as a result of an alarm condition), ordinarily require service personnel to enter a person's home and check out the entire system or a major part thereof to pinpoint the particular source of trouble or malfunction. Further, in those systems employing timers having one or more resettable time periods (e.g., a one-hour bathroom cycle and/or a regular 8-hour cycle), these time periods are alterable only within the residences of individuals, thereby requiring costly service calls by service personnel to effect the alterations. The alteration of timer periods only within the residences of individuals can also have the effect of increasing the chances of tampering by these individuals.

In addition to the abovementioned general shortcomings and disadvantages, the systems as described hereinabove have other and more specific shortcomings and disadvantages which limit their effectiveness and usefulness in a home health care environment. For example, in the Swedish systems the multiple actuating units and the alarm switches are hard-wired to the control units. This hard-wiring operation makes the installations of these systems complex, time-consuming and expensive. In addition, while using several diverse "passive" actuating units, the Swedish systems do not make use of a common passive actuating unit generally available and used frequently in most residences, namely, the telephone. While the systems described in U.S. Pat. No. 3,989,900 employ a telephone as a passive actuating unit, no other passive actuating units are employed, thereby reducing the scope of monitoring of the activities of individuals. In addition, only on/hook to off-/hook transitions of the telephone are used to reset the timer in the control unit. Thus, at the conclusion of a telephone conversation the off/hook to on/hook transition resulting from the individual replacing the handset on the cradle of the telephone will not reset the timer, thereby having the probable effect of increasing the alarm rate of the system. In the case of the systems employing rf transmitters for transmitting alarm conditions or responding to predetermined check signals, these systems similarly do not employ passive actuating units and thereby have a reduced scope of monitoring of the activities of individuals and, therefore, a reduced effectiveness.

SUMMARY OF THE INVENTION

In accordance with the present invention, apparatus is provided for a monitoring and signalling system such as a home health care system as described hereinabove. The apparatus in accordance with the present invention includes a sensor means arranged to monitor the occurrence of an associated activity and operative in response to monitoring the occurrence of the activity to produce a signal indicative of the occurrence of the activity. A sensor activity recording means is also provided in the apparatus for recording sensor activity data representing a count of the number of times the sensor means has monitored its associated activity and produced signals. This data has a first value when the sensor means has not monitored its associated activity and has not produced signals and a different value when the sensor means has monitored its associated activity and produced signals.

A processing means operates when signals are produced by the sensor means to receive and process the signals. The processing means operates in response to processing each signal to change the value of the sensor activity data in the sensor activity recording means to record the occurrence of the activity monitored by the sensor means. As a result, the sensor activity recording means is caused to maintain a continuing tally of the number of times the sensor means has monitored its associated activity and produced signals. A timing means operates on a regular basis (e.g., once a day) to cause the existing sensor activity data recorded by the sensor activity recording means to be read out therefrom. A sensor data processing means receives the sensor activity data read out from the sensor activity recording means and operates whenever the sensor activity data has its first value indicating that the sensor means has not monitored its associated activity and produced signals since the last readout of sensor activity data from the sensor activity recording means to produce an output condition indicative of this fact.

The apparatus as briefly described hereinabove may also be employed in connection with alarm situations. In this case, the processing means as discussed hereinabove may operate if a signal is not received thereby from the sensor means within a predetermined time period representing an activity-monitoring period to produce an alarm condition. Following the alarm condition, an alarm communication can be initiated by means provided for this purpose for transmitting to a suitable location alarm data in an alarm message specifying the occurrence of the alarm condition. An alarm processing means may be provided at that location for receiving and processing the alarm data in the alarm message to provide a response to the alarm message. The aforementioned sensor data processing means may also be provided at that location for processing the sensor activity data read out from the sensor activity recording means. Various sensible (e.g., audible and visual) alarm indications may also be provided selectively in the system upon the occurrence of alarm conditions produced by the processing means and while an alarm communication is in progress.

BRIEF DESCRIPTION OF THE DRAWING

Various objects, features and advantages of a monitoring and signalling system in accordance with the present invention will be had from a detailed discussion taken in conjunction with the accompanying drawing in which:

FIG. 4 illustrates the formatting of data on a display terminal at the centralized communications center in response to the processing of alarm data in an alarm message transmitted between the remote control unit and the centralized communications center;

FIGS. 15, 16, 18–42, 44, 45, 47–55, 57–61 and 63 illustrate flowchart diagrams of operations executed by the central processing unit in accordance with the invention;

DETAILED DESCRIPTION OF THE INVENTION

General Description (FIGS. 1-5)

Figure 1:
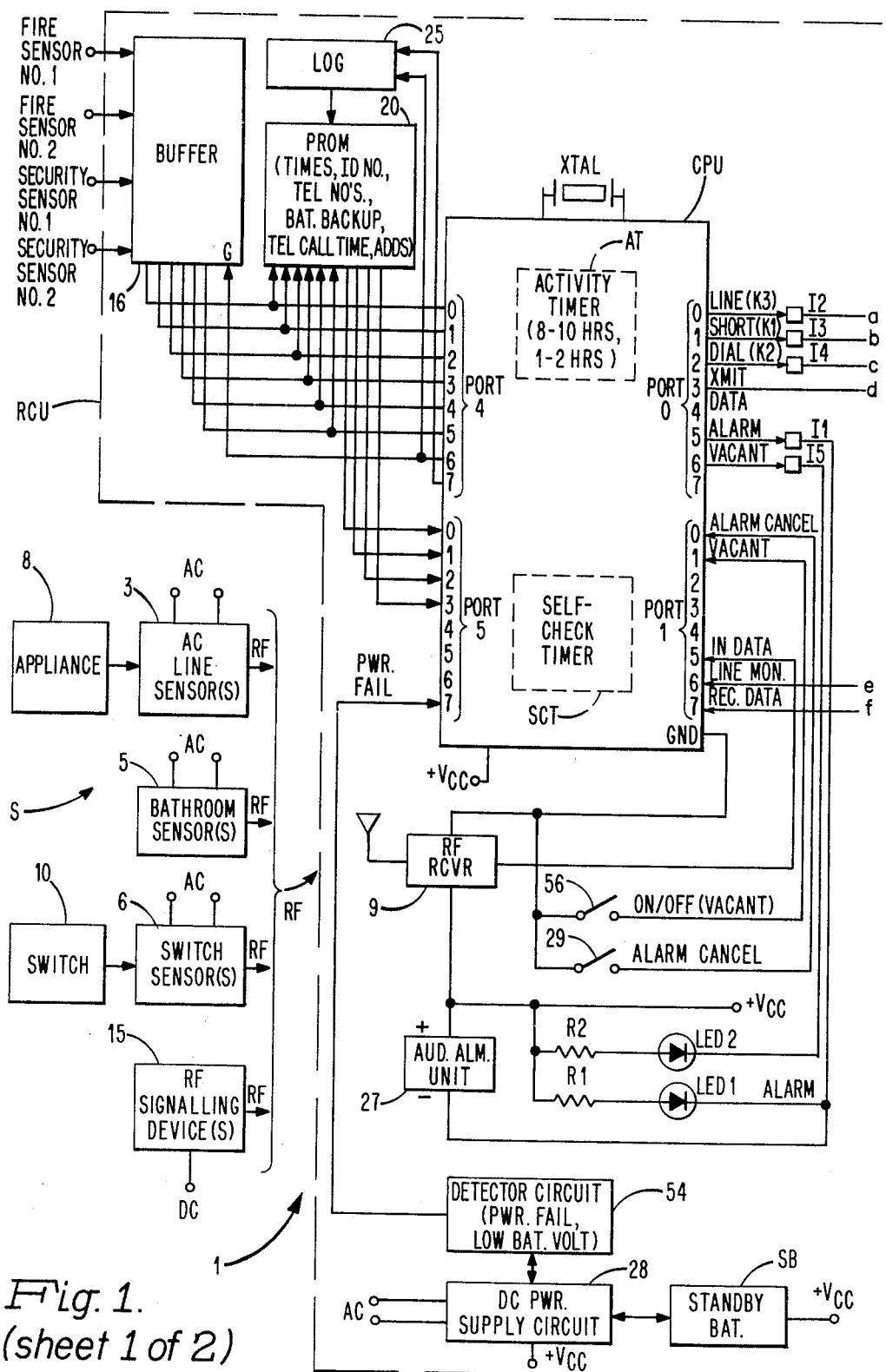
FIG. 1 is a schematic block diagram of a monitoring and signalling system in accordance with the present invention.
Figure 1:
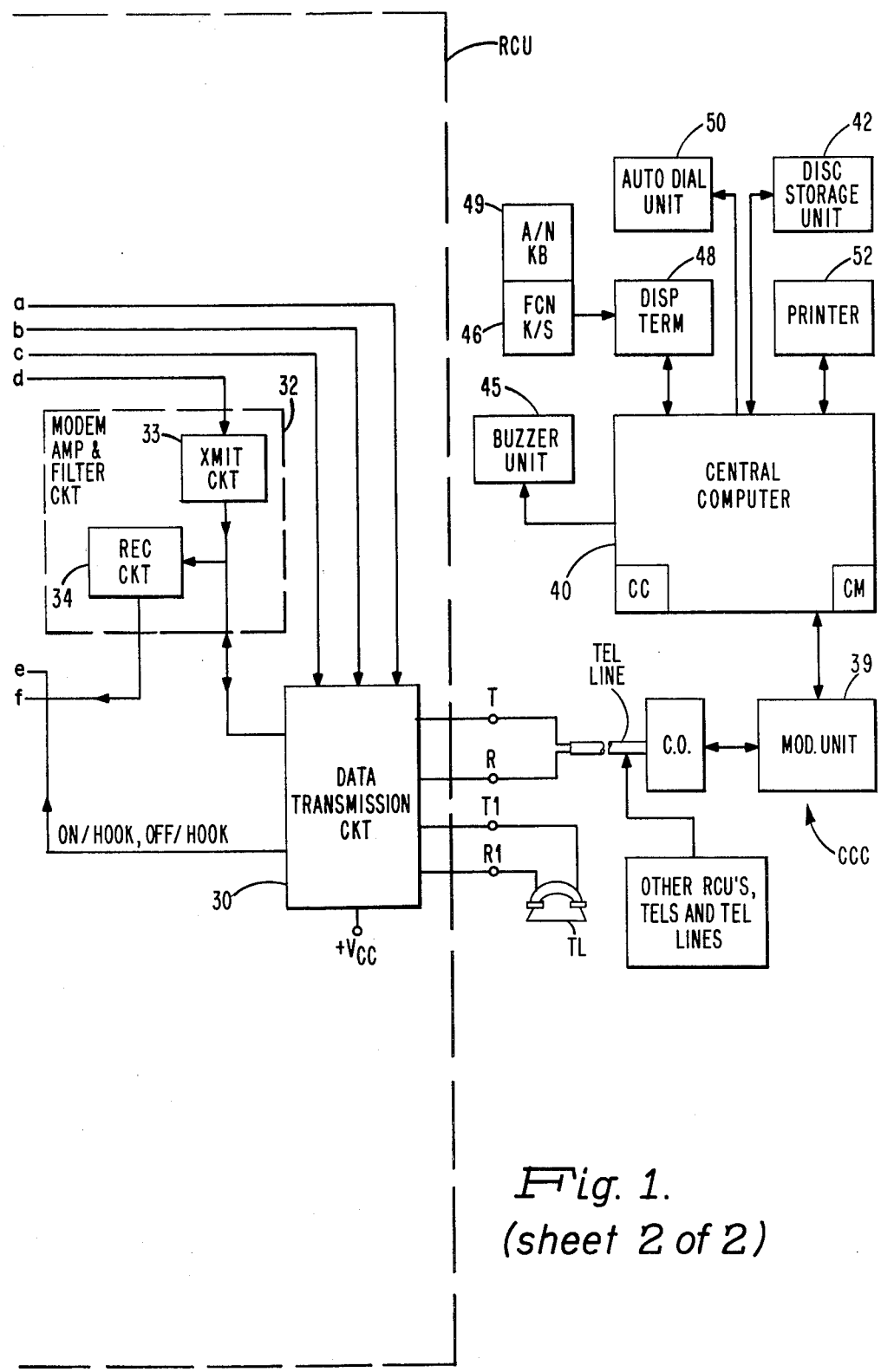

Referring now to FIG. 1, there is shown in schematic block diagram form a monitoring and signalling system 1 in accordance with the present invention. The monitoring and signalling system 1 is adapted in accordance with the invention to monitor activities of an individual such as an elderly, infirm or disabled individual within his or her own home, apartment, etc. and to establish bidirectional communication with a centralized communications center CCC upon the occurrence of accidents or emergencies or prolonged inactivity on the part of such individual. The monitoring of the activities of an individual includes both passive and active monitoring. The passive monitoring of activities involves the monitoring of normal, routine activities as are generally performed by an individual within his or her own residence during the normal course of a day. The active monitoring of activities involves the monitoring of alarm conditions as initiated by an individual during incapacity or accident or emergency situations. The system further has the capability of monitoring other alarm conditions not specifically and directly related to the health care of individuals but nonetheless important from a security standpoint, such as the monitoring of fire and security (e.g., burglar) alarm conditions.

Figure 2:
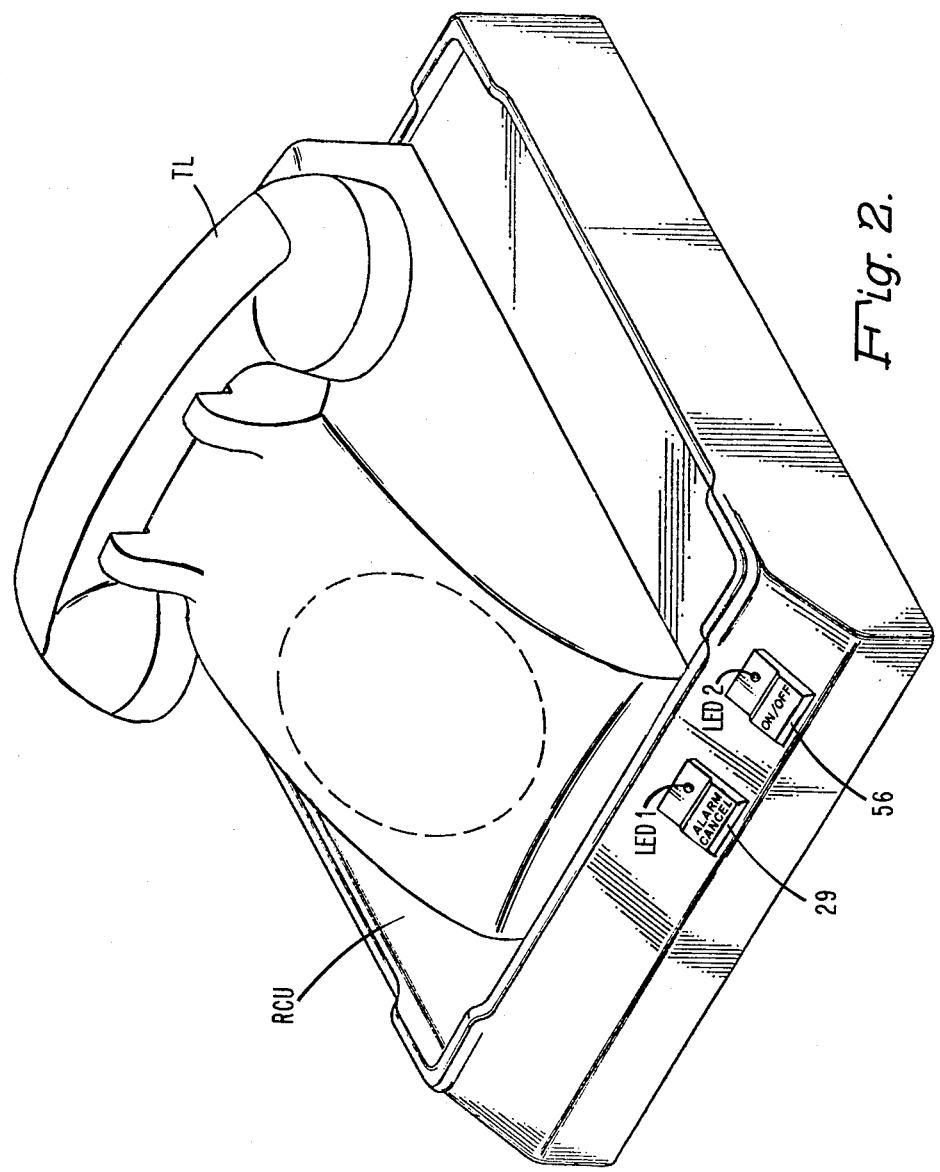
FIG. 2 illustrates an enclosure for housing a remote control unit employed in the invention and supporting a telephone.

The passive monitoring of routine activities of an individual is achieved in accordance with the invention by the utilization of one or more sensors S located at strategic locations within the residence or dwelling unit of the individual and associated with appliances, devices or rooms routinely utilized by the individual during the normal course of a day. These sensors generally include, as indicated in FIG. 1, one or more ac line sensors 3, one or more bathroom sensors 5 (depending on the number of monitored bathrooms within the residence of the individual) and one or more switch sensors 6. A telephone TL as commonly utilized within the residence of an individual, especially an elderly or infirm individual or an individual living alone, is also used as a passive sensor for passively monitoring normal and routine use of the telephone TL, such as the making and receiving of routine telephone calls. As the various activities associated with the abovementioned sensors S and the telephone TL are routinely performed by an individual during the course of a day, these devices are arranged to communicate the occurrence of the activities monitored thereby to a remote control unit RCU located within the residence of the individual. The remote control unit RCU, which is typically housed within an enclosure and physically cooperating with the telephone TL as shown in FIG. 2, is arranged so that the performance of any one of the aforementioned monitored activities within a prescribed time period (e.g., 1-2 hours for bathroom activity and 8-10 hours for all other activities) will be treated by the remote control unit RCU as an "all is well" situation and no alarm sequence will be initiated. The failure of the individual to perform any one of the aforementioned monitored activities within the associated time period will be treated by the remote control unit RCU as an alarm condition and, unless the alarm condition is aborted or cancelled by the individual, an alarm sequence will be initiated for communicating the alarm condition to the centralized communications center CCC so that appropriate action may be taken.

The sensors S as mentioned hereinabove are arranged to monitor a variety of activities of different types and to communicate with the remote control unit RCU over a radio frequency link upon the occurrence of these activities. More particularly, the ac line sensor 3 is arranged to be connected to a commonly-used appliance 8, such as a television receiver or lamp, and to generate and transmit a coded rf signal to an rf receiver 9 within the remote control unit RCU whenever the appliance 8 is turned on or off. The bathroom sensor 5 is arranged to be used in association with a specific room of the individual's residence, namely, the bathroom, and to generate and transmit a coded rf signal to the receiver 9 whenever the bathroom is entered and exited. The bathroom sensor 5 is typically located in the entrance or portal of the bathroom. The switch sensor 6 is arranged to be connected to a switch 10, such as a mechanical or magnetic switch unit on the door of a refrigerator, and to generate and transmit a coded rf signal to the rf receiver 9 whenever the refrigerator door is opened or closed. The telephone TL, which, as mentioned above, is also used as a passive sensor, is arranged to generate electrical signals for direct utilization by the remote control unit RCU, in a manner to be described in detail hereinafter, in response to both on/hook to off/hook and off/hook to on/hook transitions produced by the removal and replacement of the handset of the telephone TL during the making and reception of normal telephone calls. The telephone TL therefore differs as a sensor from the other sensors S in that it is hard-wired into the system rather than generating and transmitting coded rf signals to the rf receiver 9. Although the sensors 3, 5 and 6 as described hereinabove may be implemented in several possible ways, suitable implementations of these sensors are shown, respectively, in FIGS. 6, 7, and 8 to be described in greater detail hereinafter.

Coded rf signals generated and transmitted by the rf sensors S to the rf receiver 9 as mentioned hereinabove are of a common frequency, for example, 350 Mhz. In addition, each of the coded rf signals constitutes a plurality, for example, six, identical serial messages produced within a predetermined time period, for example, one second. Each of these messages contains system identification number information identifying the particular system, sensor identification information identifying the associated sensor, activity information relating to activity states of the sensor, and parity information. The use of system identification number information serves to distinguish the rf signals in the system from rf signals of the same frequency produced in other systems, for example, in systems in adjoining or proximate homes, apartments, etc. The use of sensor identification information serves to distinguish an rf signal of one sensor from rf signals of all other sensors in the same system. The activity information specifies certain activity states such as an occupied or unoccupied bathroom status, an open or closed door status of a refrigerator, an on or off state of a lamp or television receiver, etc. The use of multiple messages and parity information in a coded rf signal serves to increase or enhance the chances of the rf receiver 9 and associated apparatus capturing and processing needed information from the associated sensor.

Figure 10:
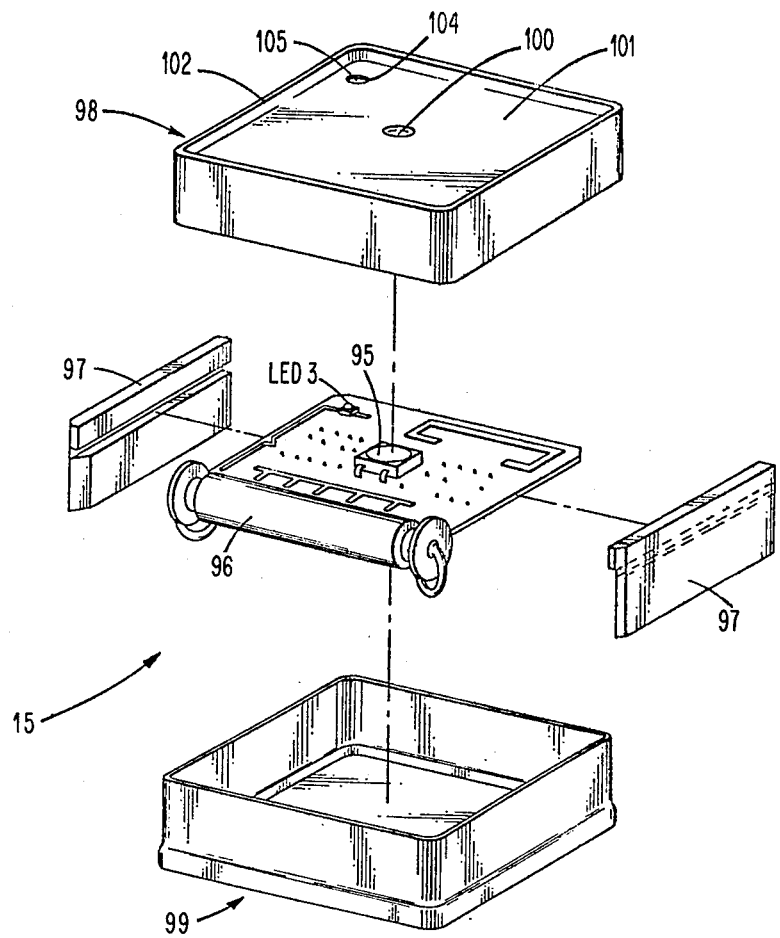
FIG. 10 is an exploded perspective view of components of the rf signalling device of FIG. 9.
Figure 11:
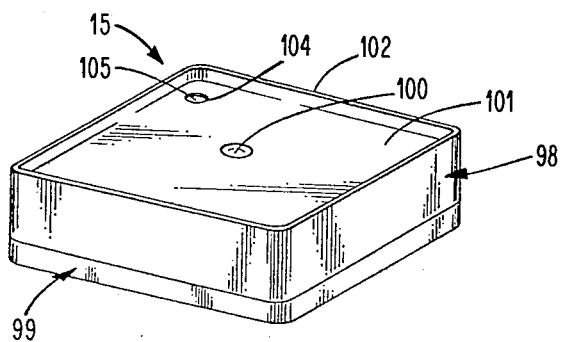
FIG. 11 illustrates the rf signalling device as shown in FIG. 10 in its final, assembled form.
Figure 9:
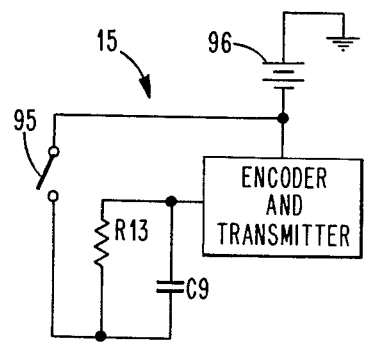
FIG. 9 is a schematic circuit diagram of a portable, user-actuated rf signalling device employed in the monitoring and signalling system in accordance with the invention for initiating alarm sequences.

As mentioned above, the system 1 is also arranged to perform active monitoring of alarm conditions as initiated by an individual during incapacity of the individual or during accident or emergency situations. This active monitoring is achieved by the use of one or more rf signalling devices 15. An rf signalling device 15 differs most significantly from the sensors S in that it is a portable, battery-powered, useractuated device adapted to be carried on, and to be actuated by, the person whose activities are to be monitored by the system. Actuation of the rf signalling device 15 by the user, for example, in an accident or emergency situation or upon becoming incapacitated, will, as in the case of the sensors S, cause a coded rf signal to be generated and transmitted to the rf receiver 9. The coded rf signal takes the same general form as the coded rf signals produced by the sensors S and includes a plurality of identical serial messages (e.g., six) each including system identification number information, identification information identifying the signalling device 15 and distinguishing the signalling device 15 from the other sensors S, activity information, and parity information. Although the signalling device 15 as briefly described hereinabove may be implemented in many different ways, a suitable implementation of the signalling device 15 is shown in FIGS. 9 to 11 to be discussed in greater detail hereinafter.

In addition to the active and passive monitoring of activities mentioned hereinabove, additional monitoring may be achieved in the system of the invention by the utilization of sensors which are hard-wired into the system rather than employing coded rf signals as in the case of the various sensors S and signalling devices 15. Specifically, a plurality of sensors for detecting fires, security violations (e.g., burglaries) or other alarm situations may be hard-wired into a buffer 16 employed to read instantaneous on/off states of these sensors. These various sensors are indicated in FIG. 1 as FIRE SENSOR NO. 1, FIRE SENSOR NO. 2, SECURITY SENSOR NO. 1 and SECURITY SENSOR NO. 2. Although not indicated in FIG. 1, hard-wired versions of the sensors S, as opposed to the aforementioned rf versions, may also be coupled to the buffer 16 or other similar buffer. As will be discussed in detail hereinafter, the states of the various hard-wired sensors coupled to the buffer 16 are quickly noted by a central processing unit CPU and an alarm sequence initiated should the state of any one of the hard-wired sensors indicate an alarm condition.

Coded rf signals generated and transmitted by the sensors S and signalling devices 15 to the rf receiver 9 as discussed hereinabove are processed within the receiver 9 to detect the rf coded signals and provide the coded signals in a digital format suitable for use by the aforementioned central processing unit CPU. The rf receiver 9 may be a tunedfrequency, super-regenerative design, for example, as described in the aforementioned copending application Ser. No. 084,976 in the name of William L. Geller. The central processing unit CPU preferably takes the form of a programmable microcontroller or microprocessor of which many models are commercially available and capable of use in the system 1. However, a particularly suitable implementation of the central processing unit CPU is a Mostek MK3870 programmable microprocessor as manufactured and sold by the Mostek Corporation, Carrollton, Texas. This particular microprocessor, which will be described hereinafter to the extent necessary to understand the present invention, is described in detail (including instruction sets, operation codes, etc.), in a publication of the Mostek Corporation entitled "Mostek Microcomputer 3870/F8 Data Book", Publication No. 79602, August, 1978.

The central processing unit CPU as shown in FIG. 1 includes a plurality of ports 0, 1, 4 and 5, each having eight bit locations 0-7 which may be selectively enabled under program control for the inputting or outputting of data in an 8-bit digital format, the eight bits of a word being designated in the following discussions as b0-b7. The aforementioned signals processed within the rf receiver 9 as a result of transmissions by the sensors S or portable signalling devices 15 are applied to bit location 5 of port 1 of the central processing unit CPU. The central processing unit CPU operates in response to each coded signal received at bit location 5 of port 1 to examine the signal as to several timing and formatting criteria and to either accept or reject the signal based on the satisfaction of these criteria. These criteria include the examination of messages of the signal as to pulse widths, the presence of noise (or "glitches"), word times, the order or sequence of data within the messages, parity, and the origin of the signal.

Once a message contained in the signal is examined and found acceptable as to pulse widths, the presence of noise, word times and the sequence of data within the message, the message is then subjected to further processing. This further processing includes determining (a) whether parity of the message is correct; and (b) whether the message originated with the system under discussion (as opposed to another system, such as a system in a proximate home, apartment, etc., employing the same frequency). If two successive messages satisfy these additional criteria as well as the other criteria, all within a predetermined time period (e.g., 2 seconds), the messages are accepted and the second message is then examined to determine whether it originated with a sensor S as opposed to a signalling device 15. The determination of (b) supra is accomplished by comparing the system identification information contained within the processed message with system identification number information corresponding to the system and stored in a programmable read only memory 20. The programmable read only memory 20 is enabled to supply the system identification number information stored therein to the central processing unit CPU in response to address signals produced by the central processing unit CPU at bit positions 0-5 of port 4 specifying the desired information, and in response to control signals, for example, logic "1" signals, established at bit positions 6 and 7 of port 4. The logic "1" control signals are detected by a logic circuit 25 whereupon the programmable read only memory 20 is enabled at this time by the logic circuit 25 to supply the system identification number information to bit positions 0-3 of port 5 of the central processing unit CPU. If the system identification number information of the processed message is the same as that stored in the programmable read only memory 20, the message is then further processed to ascertain the particular source of the message, that is, whether the message originated with one of the sensors S or with a signalling device 15. If the message originated with a signalling device 15, for example, as a result of an accident, emergency or incapacity of the individual, the central processing unit CPU notes this alarm condition and immediately initiates an alarm sequence which, if not aborted or cancelled by the individual as will be described hereinafter, will establish communication with the centralized communications center CCC for securing assistance for the individual. If the message originated with one of the sensors S within the system, the acceptance of this message is treated by the central processing unit CPU as an "all is well" situation and is used to control an activity timer AT employed within the central processing unit CPU.

The activity timer AT within the central processing unit CPU basically includes register circuitry and is arranged in response to each signal originating with one of the sensors S to be set to and cycle through a corresponding time period representing an activity monitoring time period. So long as a passively-monitored activity occurs within the corresponding time period, the activity timer AT will be caused to be reset and to repeat its timing cycle and no alarm sequence is initiated. Failure of the monitored activity to occur within the corresponding time period will result in the timing cycle of the activity timer AT elapsing, or timing out, and an alarm sequence being initiated. In accordance with the invention, two time periods are employed by the activity timer AT of the central processing unit CPU. A first time period of about 8-10 hours is used by the activity timer AT in connection with activities monitored by the ac line sensor 3, the switch sensor 6 and the telephone TL. The 8-10 hour period is selected since it represents a typical length of sleep period of an individual. For this reason, it is generally desirable that one of the ac line sensors 3 be used with a bedside lamp which, quite commonly, is the last appliance to be turned off by an individual before retiring for the night and likely to be turned on if the individual awakens during the night and performs some activity (e.g., using the bathroom). A second time period of about 1-2 hours is used by the activity timer AT in connection with bathroom activities and gives recognition to the fact, as determined by statistical analysis, that the majority of accidents occur within the bathroom. In this particular situation, the entry of an individual into a bathroom will be detected by the associated bathroom sensor 5 and cause the activity timer AT to operate in its 1-2 hour cycle, and the subsequent exit of the individual from the bathroom will be detected by the bathroom sensor 5 and cause the activity timer AT to operate in its 8-10 hour cycle. Thus, an accident, medical emergency or any other critical situation occurring or arising in the bathroom (assuming that the individual is unable to actuate the portable signalling device 15) will be detected much sooner in the bathroom than in any other room in the residence.

The bathroom sensor 5 as described hereinabove, in addition to having a shorter time period (1-2 hours) associated therewith, also is assigned a higher priority than the other sensors S and the telephone TL as to its ability to control the activity timer AT. The bathroom sensor 5 is given a higher priority since it is contemplated that, in addition to the individual whose activities are to be monitored, other individuals, such as a spouse, relatives, friends, neighbors, etc., may also be present from time to time within the residence of the monitored individual and make use of the same facilities as the monitored individual. In this case, it would be undesirable for such other individual, by the use of an appliance or the telephone TL while the monitored individual is in the bathroom, to change the timing period of the activity timer AT from its short time cycle (1-2 hours) to its long time cycle (8-10 hours). Thus, in accordance with the present invention, the central processing unit CPU is arranged to note, via the processing of sensor information contained within the rf signals, the higher priority of the bathroom sensor 5 and, once a bathroom sensor 5 has detected the entry of an individual into the associated bathroom and caused the activity timer AT to be set to its short time cycle, to ignore any other transmission by an ac line sensor 3 or a switch sensor 6, or any electrical signals supplied to the central processing unit CPU by virtue of use of the telephone TL. In the above fashion, the short timing cycle of the activity timer AT is always maintained for bathroom activities irrespective of other activities occurring within the residence.

As mentioned hereinabove, the failure of an individual to perform an activity monitored by any one of the sensors S or the telephone TL within the associated time period, or the actuation by the individual of the portable signalling device 15, will cause an alarm sequence to be initiated by the central processing unit CPU. This alarm sequence comprises two separate parts, specifically, a pre-alarm cycle and an actual alarm cycle. The pre-alarm cycle is used to provide local sensible alarms, specifically, visual and audible alarms, and has a duration, for example, 1 minute, sufficient to allow the individual, unless incapacitated, to cancel or abort the entire alarm sequence, thereby to prevent an unnecessary false alarm sequence. Failure to cancel or abort the alarm sequence during the pre-alarm cycle, for example, due to incapacity, automatically leads to the actual alarm cycle during which communication with the centralized communications center CCC is initiated.

The aforementioned local visual and audible alarms are produced during the pre-alarm cycle by respectively energizing a first light emitting diode LED1 and an audible alarm unit 27. The light emitting diode LED1 and the audible alarm unit 27 are both energized to produce their respective visual and audible alarms by means of a signal established by the central processing unit CPU at bit position 5 of port 0. This signal, typically at a logic "1" level, is inverted by an inverting amplifier I1 to a logic "0" level and used to establish the cathode of the light emitting diode LED1 and the negative side of the audible alarm unit 27 at a predetermined potential, for example, ground potential. This grounding operation allows a dc voltage $+V_{CC}$ as produced by a dc power supply circuit 28 to be applied across the light emitting diode LED1 via a current limiting resistance R1 and also across the audible alarm unit 27 thereby causing the light emitting diode LED1 to be illuminated and the audible alarm unit 27 to be actuated to produce an audible alarm or tone, for example, a 400 hertz tone. During the pre-alarm cycle, the light emitting diode LED1 and the audible alarm unit 27 are both energized continuously, that is, steadily, for the entire duration of the pre-alarm cycle, thereby informing the individual that the pre-alarm cycle is in process and that he or she, unless incapacitated, may cancel the alarm sequence. This cancellation may be desirable, for example, if the pre-alarm cycle of the alarm sequence was initiated due to prolonged inactivity (rather than incapacity) of the individual, or due to accidental or inadvertent actuation of a portable signalling device 15, or even due to the intentional actuation of the portable signalling device 15 for the sole purpose of testing the pre-alarm cycle of the system. In any one of these situations, the individual has a period of one minute from the commencement of the pre-alarm cycle to cancel or abort the alarm sequence. The cancellation of the alarm sequence is achieved by simply operating an alarm cancel switch 29 to a closed, or "off", position. The closure of the alarm cancel switch 29, which is coupled electrically between a ground pin and bit position 0 of port 1 of the central processing unit CPU, is detected by the central processing unit CPU at bit position 0 of port 1 and causes the activity timer AT, which is also employed to maintain a pre-alarm time period, (for example, the aforementioned one-minute time period), to be reset thereby to terminate the pre-alarm cycle and to re-initiate its timing cycle, specifically, its long (8-10 hour) timing cycle. In addition, the central processing unit CPU operates to turn off the light emitting diode LED1 and the audible alarm unit 27, specifically, by removing (i.e., inverting) the signal previously established at bit position 5 of port 0. As shown in FIG. 2, the alarm cancel switch 29 may be conveniently incorporated in a single unit with the light emitting diode LED1.

The alarm cancel switch 29 as described hereinabove may also be used at times other than during the cancellation of an alarm sequence. In such instances, the closure of the switch 29 will cause the activity timer AT of the central processing unit CPU to be reset and to re-initiate its long timing cycle, specifically, the 8–10 hour cycle, in the same manner as previously described. To this extent, therefore, the alarm cancel switch 29 may be considered as an additional activity-monitoring sensor, in much the same manner as the other sensors employed in the system as earlier described.

As mentioned previously, the failure of the individual to cancel an alarm sequence, for example, due to incapacity of the individual, automatically causes the actual alarm cycle to commence for the purpose of communicating an alarm condition to the centralized communications center CCC. During the actual alarm cycle, three major operations take place. First, an attempt is made to establish communication with the centralized communications center CCC, using the standard telephone network; second, the continuous visual and audible local alarms produced by the light emitting diode LED1 and the audible alarm unit 27 during the pre-alarm cycle are changed to intermittent, alternating on/off alarms, to inform the individual that an attempt is being made to establish communication with the centralized communications center CCC; and, third, once communication with the centralized communications center CCC is achieved, an alarm message is transmitted between the central processing unit CPU and the centralized communications center CCC, using bi-directional phase-reversal hand-shaking communications techniques.

Figure 56:
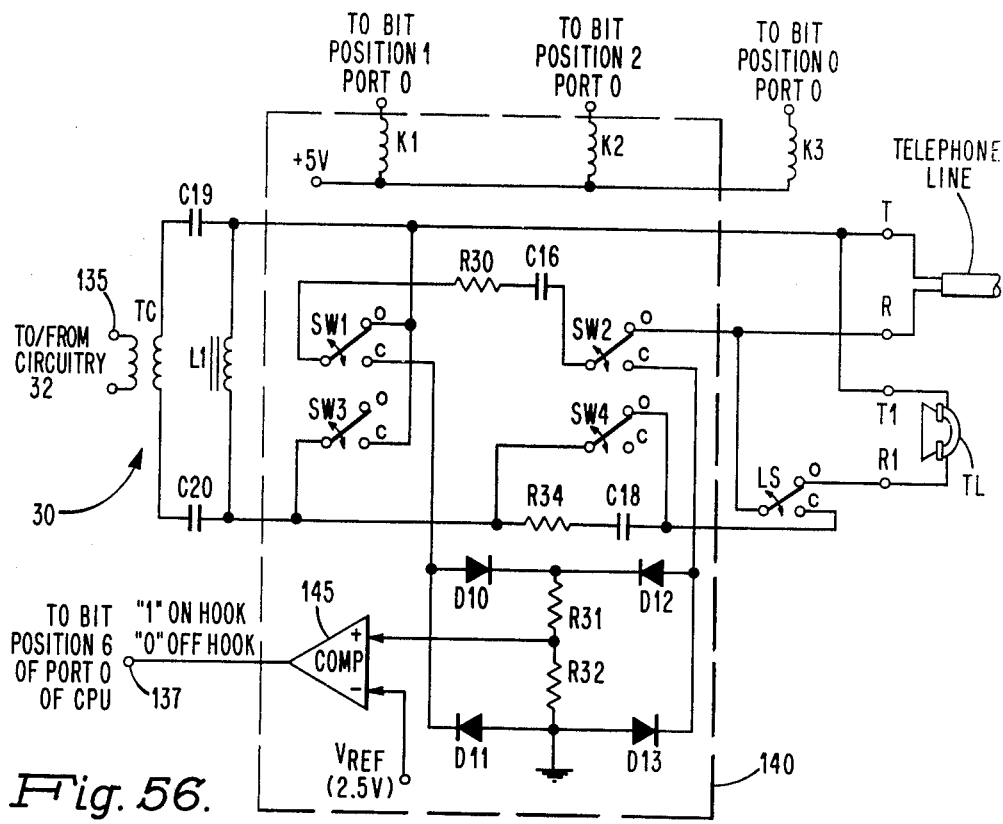
FIG. 56 is a schematic circuit diagram of a data transmission circuit employed in the monitoring and signalling system in accordance with the invention.

In order to establish communication with the centralized communications center CCC, the central processing unit CPU is arranged to cooperate with a data transmission circuit 30. As shown in FIG. 1, the data transmission circuit 30 interfaces with the central processing unit CPU via modem amplifier and filter circuitry 32, and also with the telephone TL and a standard telephone line to a telephone company central office (C.O.) and the centralized communications center CCC. In initiating communication with the centralized communications center CCC, the data transmission circuit 30, a suitable implementation of which is shown in FIG. 56, to be described in detail hereinafter, is arranged to execute a dialing sequence under control of signals produced by the central processing unit CPU at bit positions 0-2 of port 0. The dialing sequence executed by the data transmission circuit 30 under control of the central processing unit CPU includes the steps of (a) seizing the telephone line, specifically, by electrically disconnecting the telephone TL from the telephone line; (b) establishing a dc dialing loop within the data transmission circuit 30 for use in dialing operations; and, (c), after a predetermined period of time exceeding a standard dial tone period associated with the telephone company central office (C.O.), performing a dialing operation by making and breaking the dc loop established within the data transmission circuit 30 in accordance with a telephone number of the centralized communications center CCC. These operations are performed in the following manner.

A first control signal produced at bit position 0 of port 0 of the central processing unit CPU, typically at a logic "1" level, is inverted by an inverting amplifier I2 to a logic "0" level and applied to the data transmission circuit 30 and causes the data transmission circuit 30 to be connected to the telephone line and the telephone TL to be electrically disconnected from the telephone line. The disconnection of the telephone TL from the telephone line accordingly serves to terminate any call in process and, therefore, gives priority to the alarm sequence over other transmission sequences. The telephone TL will also be disconnected in the case of the handset being inadvertently left off/hook.

Once the data transmission circuit 30 has been connected with the telephone line as discussed hereinabove, a second control signal at bit position 1 of port 0 of the central processing unit CPU, typically at a logic "1" value, is inverted by an inverting amplifier I3 to a logic "0" level and applied to the data transmission circuit 30. This signal causes a dc dialing loop to be established within the data transmission circuit 30. After a period of time exceeding the period of a standard dial tone associated with the telephone company central office, a series of dialing pulses at bit position 2 of port 0 of the central processing unit CPU are inverted by an inverting amplifier I4 and applied to the data transmission circuit 30. These pulses serve to make and break the above-described dc loop established within the data transmission circuit 30 in accordance with a telephone number of the centralized communications center CCC. The making and breaking of the dc loop is detected by the telephone company central office (C.O.) whereupon the necessary connections are made to the centralized communications center CCC to connect the remote control unit RCU with the centralized communications center CCC.

In accordance with the present invention, the centralized communications center CCC may be reached using one of two possible telephone numbers. These numbers are stored in a digital data form in the programmable read only memory 20 and are used to derive the aforementioned dialing pulses at bit position 2 of port 0 of the central processing unit CPU. The telephone numbers stored in the programmable read only memory 20 are accessed in the same manner as previously described, specifically, by using bit positions 0-7 of port 4 of the central processing unit CPU to address the memory 20 for a desired telephone number and receiving the accessed telephone number at bit positions 0-3 of port 5. In attempting to establish communication with the centralized communications center CCC, a first one of the two telephone numbers stored in the memory 20, designated a primary telephone number, is first used by the central processing unit CPU and the data transmission circuit 30 in the execution of the aforementioned dialing sequence. If for some reason the data transmission circuit 30 is unable to successfully establish communication with the centralized communications center CCC using the first telephone number, for example, due to transmission line errors or problems or busy signal conditions, repeated attempts are made, still using the first telephone number, to establish a successful communication with the centralized communications center CCC. If after several attempts using the first telephone number, for example, after eight attempts, a successful communication cannot be established with the centralized communications center CCC, the second telephone number stored in the memory 20, designated a secondary telephone number, is then used, also up to a maximum of eight times. If a successful communication with the centralized communications center CCC still cannot be established after eight attempts using the second telephone number, the central processing unit CPU returns to the first telephone number and repeats the entire dialing cycle again, alternating between the two telephone numbers, in the same manner as described hereinabove, until the centralized communications center CCC has been reached.

During the entire time that the central processing unit CPU and the data transmission circuit 30 attempt to establish a successful communication with the centralized communications center CCC, the central processing unit CPU operates to illuminate the light emitting diode LED1 in an intermittent, alternating on/off fashion (e.g., one half second on, one half second off) and, likewise, to actuate the audible alarm unit 27 in an intermittent, alternating on/off fashion (e.g., one half second on, one half second off). The control of the light emitting diode LED1 and the audible alarm unit 27 is achieved at this time by the use of pulses established by the central processing unit CPU at bit position 5 of port 0. The simultaneous intermittent operation of the light emitting diode LED1 and the audible alarm unit 27 serves to inform the individual that communication with the centralized communications center CCC is in process. The intermittent operation of the light emitting diode LED1 and the audible alarm unit 27 continues until communication with the centralized communications center CCC has been completed, at which time the central processing unit CPU turns off the light emitting diode LED1 and the audible alarm unit 27 by discontinuing the signals at bit position 5 of port 0. By virtue of the silence that follows the above operations, the individual is given assurance that the centralized communications center CCC has been reached by a telephone call and that relief or a return communication should be forthcoming, thereby alleviating the fear of being hurt and alone. It should be noted that in the event the individual was not truly incapacitated but failed nonetheless to cancel the alarm sequence during the pre-alarm cycle, he or she can still cancel the alarm sequence by closure of the alarm cancel switch 29. However, once alarm message data is transmitted to the centralized communications center CCC, the option or opportunity of cancelling the alarm sequence by closure of the alarm cancel switch 29 is no longer available to the individual.

As mentioned previously, an alarm sequence may also be initiated by the central processing unit CPU in the event a hard-wired sensor (e.g., security and/or fire) connected to the buffer 16 is in a state indicating an alarm condition. For this purpose, the central processing unit CPU is programmed to make frequent, periodic interrogations of the buffer 16 to detect alarm conditions produced by any of the hard-wired sensors. This interrogation is made by accessing a gate input G of the buffer 16 by a signal at a logic "0" level at bit position 6 of port 4 of the central processing unit CPU. Alarm condition data from the buffer 16 is received at bit positions 0-5 of port 4 of the central processing unit CPU and retained within the central processing unit for use in the generation of an alarm message. Unlike an alarm sequence initiated in the case of a sensor S, an rf signalling device 15 or the telephone TL, an alarm sequence initiated in the case of a hard-wired sensor has no pre-alarm cycle. Thus, an alarm message is generated essentially immediately and the light emitting diode LED1 and the audible alarm unit 27 operate in their intermittent states. Further, and as will be discussed more fully hereinafter, the audible alarm unit 27 is caused to produce an audible alarm tone at a higher frequency rate than in the case of an alarm sequence initiated by a sensor S, an rf signalling device 15, or the telephone TL, thereby to distinguish audibly between the two types of alarm conditions. The centralized communications center CCC is reached by a telephone call in the same manner as earlier described in connection with an alarm sequence initiated by a sensor S, an rf signalling device 15 or the telephone TL.

Once the centralized communications center CCC has been reached by a telephone call as discussed hereinabove, an alarm message is transmitted between the remote control unit RCU and the centralized communications center CCC, using bi-directional, phase-reversal, handshaking communications techniques. As will be discussed in detail hereinafter, the alarm message is followed by the transmission of a timing control message between the centralized communications center CCC and the remote control unit for controlling timing parameters of the remote control unit RCU. This message is also transmitted using bi-directional, phase-reversal, handshaking communications techniques.

Figure 3:
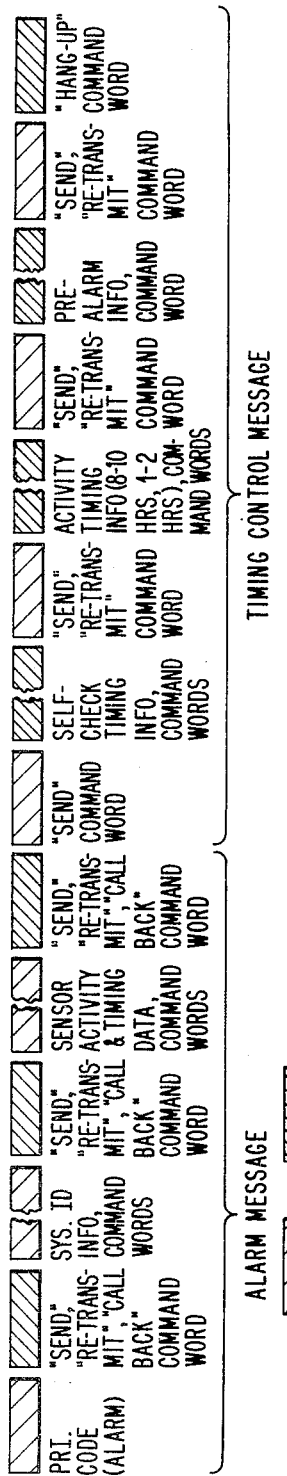
FIG. 3 illustrates a data transmission format and protocol employed during an alarm sequence for transmitting alarm and timing control messages between the remote control unit and a centralized communications center.
Figure 46:
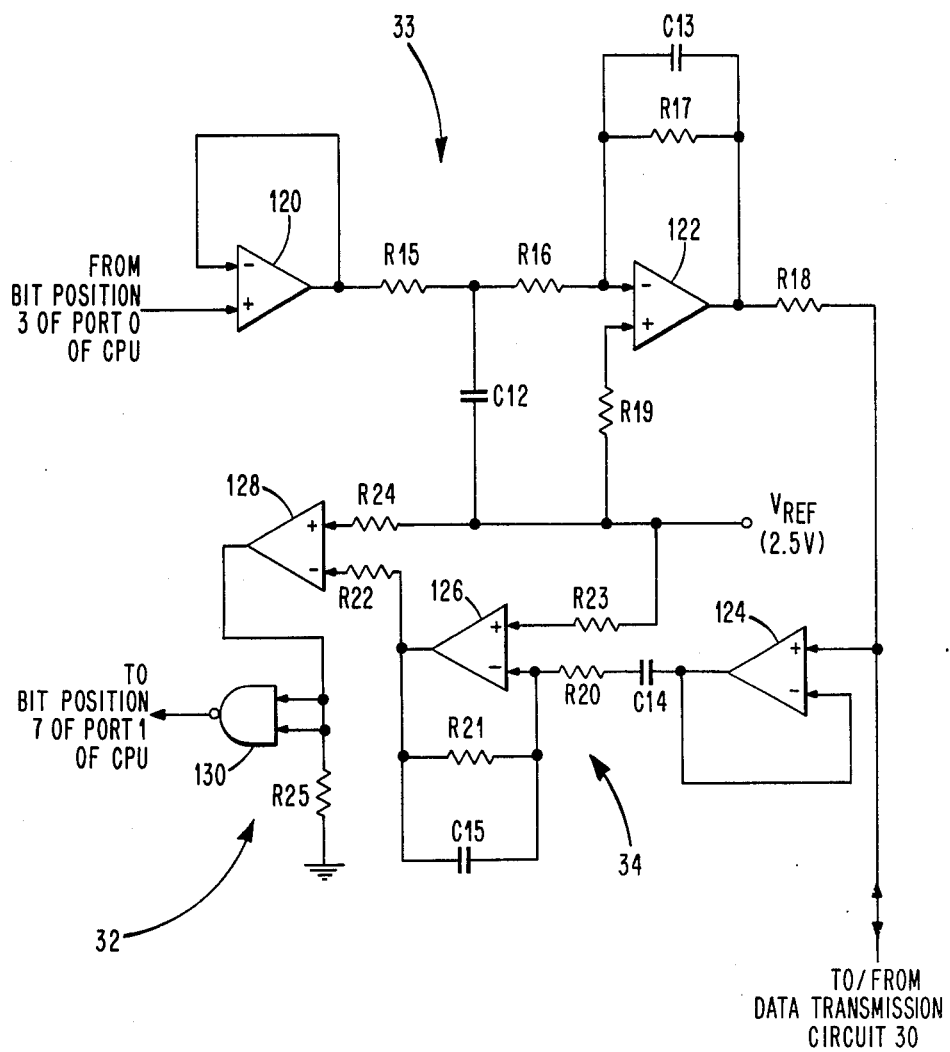
FIG. 46 is a schematic circuit diagram of modem amplifier and filter circuitry employed in the monitoring and signalling system in accordance wih the invention.

The alarm message as transmitted between the remote control unit RCU and the centralized communications center CCC is generally shown in FIG. 3 and comprises alarm data originating with the central processing unit CPU. This data includes, inter alia, priority code alarm information specifying the occurrence and type of alarm condition (e.g., fire, security, rf signalling device 15, sensor S), and system identification number information identifying the system from which the alarm message originated. Other data (e.g., sensor activity and timing data) is also transmitted to the centralized communications center CCC as part of the general data transmission protocol but, as will be discussed in detail hereinafter, this data is not actually utilized by the centralized communications center CCC during processing of the alarm data in the alarm message. The data transmitted to the centralized communications center CCC is established by the central processing unit CPU at bit position 3 of port 0, specifically, in a 900 hertz phase-reversal digital coded format, and applied to the aforementioned modem amplifier and filter circuitry 32 coupled between the central processing unit CPU and the data transmission circuit 30. The modem amplifier and filter circuitry 32, a suitable implementation of which is shown in FIG. 46, to be described in detail hereinafter, includes a transmit circuit 33 which operates to buffer, low-pass filter (to reduce the harmonic content) and attenuate the data to a form suitable for transmission. The data as processed by the circuitry 32 is then applied to the data transmission circuit 30 and coupled through the data transmission circuit 30 to the telephone line to be transmitted to the centralized communications center CCC.

In accordance with the invention and as indicated in FIG. 3, the alarm data in the alarm message as discussed hereinabove is transmitted to the centralized communications center CCC in a plurality of successive data words. Further, each data word with the exception of the first data word (alarm information priority word) is transmitted to the centralized communications center CCC only upon receipt of a command word from the centralized communications center CCC. This command word may be either a "send" command word indicating that the data word received by the centralized communications center CCC was accepted and that the next data word should be sent, or a "retransmit" command word indicating that the data word received by the centralized communications center CCC was in error (e.g., due to transmission errors or problems) and that the data word should be retransmitted. The centralized communications center CCC may also send a "call back" command word in the event a particular data word violates the data transmission protocol (for example, by being in an incorrect word position) or in certain error or busy conditions. In this case, the remote control unit RCU is informed by the "call back" command word to terminate the call (and transmission of data) and redial. Each data word or command word as transmitted between the remote control unit RCU and the centralized communications center CCC as discussed above comprises a total of eight information bits including a start bit, four data or command word bits, a command/data bit specifying the word as a data word or a command word, a parity bit, and a stop bit.

Each command word transmitted by the centralized communications center CCC to the remote control unit RCU as discussed hereinabove is transmitted over the telephone line to the data transmission circuit 30 and coupled therethrough to the modem amplifier and filter circuitry 32. The modem amplifier and filter circuitry 32 includes a receive circuit 34 which operates at this time to buffer, band-pass filter and digitize the command word and apply the processed command word to bit position 7 of port 1 of the central processing unit CPU. The receipt and acceptance of each command word by the central processing unit CPU serves to initiate the transmission of the next data word or, in the case of a "retransmit" command word, the previous data word of the message. It will be appreciated therefore, that the transmission of the alarm message between the remote control unit RCU and the centralized communications center CCC occurs in a bi-directional, handshaking fashion.

The processing at the centralized communications center CCC of alarm data in an alarm message as discussed hereinabove is accomplished by a modem unit 39 in conjunction with a central computer 40. The modem unit 39 is arranged to perform modem (modulation/demodulation) operations and both serial/parallel and parallel/serial conversion of data received thereby from the remote control unit RCU or transmitted thereby to the remote control unit RCU. The modem unit 39 may be implemented by a microcontroller or microprocessor (e.g., such as the aforementioned Mostek MK3870 microprocessor) as programmed to perform modem operations. These modem operations are performed in generally the same manner as modem operations are performed by the central processing unit CPU, as will be described in substantial detail hereinafter. The central computer 40 may be implemented by a variety of commercially-available programmable general-purpose computers. However, a particularly suitable computer which may be used in the present invention, and which will be described herein to the extent necessary to understand and appreciate the present invention, is a PDP11/03 computer as manufactured and sold by Digital Equipment Corporation, Maynard, Mass. This computer is described in detail in various publications of the Digital Equipment Corporation, including a publication entitled "Digital Microcomputer Processors, Microcomputer Handbook Series", 1978.

The central computer 40 operates in response to receiving alarm data from the remote control unit RCU to decode this data to note the alarm condition represented by the data, to decode the identification number information identifying the remote control unit which initiated the alarm sequence, and to log the receipt of the alarm data in an event file area of a disc storage unit 42 reserved for this purpose. If the operator at the computer 40 is not already busy with another call, a buzzer unit 45 is caused to be operated to inform the operator of the alarm message. The operator is then able, by the depression of a selected key on a function keyset 46, to obtain a subscriber file from the disc storage unit 42 relating to the individual from whose residence the alarm message originated and to display the information stored in this subscriber file on the face of a CRT display terminal 48. A typical subscriber file is shown in FIG. 4. As can be seen from FIG. 4, the information contained in the subscriber file includes, inter alia, personal information such as the individual's name, address, and telephone number, particular health or other significant problems or comments unique to the individual, and a listing of several telephone numbers which the operator may use to obtain assistance for the individual. The first telephone number in the list is normally that of the residence of the individual and is generally used first to establish personal communications with the individual, if possible, so that assistance will not be unnecessarily dispatched to the residence of the individual if the alarm message was due to some false alarm condition such as the inadvertent failure of the individual to cancel or abort an alarm sequence or due to a system malfunction. A telephone call to the residence of the individual, especially in the case wherein the individual has been incapacitated and is unable to reach the telephone TL, can be very important since it provides additional and comforting assurance, in the form of the ringing of the individual's telephone TL, that the centralized communications center CCC was reached by a telephone call and that action is being taken in response to the communication of the alarm condition to the centralized communications center CCC. Failure to establish personal telephone communication with the individual will generally require that one or more of the other individuals or organizations be called, such as a neighbor, police or fire department, an emergency service, doctor, relative, etc., so that needed assistance can be dispatched to the individual. Any one or more of the telephone numbers in the aforementioned listing may be dialed by the operator personally or, alternatively, by depressing another function key on the keyset 47 and an alphanumeric key on a keyboard 49 which causes any selected telehone number to be dialed automatically in a known fashion by an automatic dialing unit 50.

As mentioned previously, the transmission of an alarm message between the remote control unit RCU and the centralized communications center CCC is followed by the transmission of a timing control message between the centralized communications center CCC and the remote control unit RCU. This timing control message is initiated by a "send" command word from the remote control unit RCU, as indicated in FIG. 3 (first word in timing control message), and is employed to control certain timing parameters of the remote control unit RCU. These timing parameters include the two possible activity times (8–10 hours and 1–2 hours) used in connection with the various sensors in the system, and various pre-alarm timing parameters used in connection with the rf signalling devices 15. The timing parameters also include a self-check time which is used, as will be described in detail hereinafter, in a so-called "self-check" operation for determining whether various components of the system are operating in a proper fashion. The data to be incorporated into the timing control message is obtained by the central computer 40 from the subscriber file in the disc storage unit 42 during processing of the aforedescribed alarm message. More particularly, the central computer 40 operates to decode the system identification number information in the alarm message and, using this system identification information, to obtain the subscriber file from the disc storage unit 42. As indicated in FIG. 4, the subscriber file includes, in addition to the aforedescribed personal subscriber data, telephone numbers, etc., the two activity times (in minutes) to be used in connection with the various sensors in the system, the pre-alarm timing parameters to be used in connection with the rf signalling devices 15, and a self-check time (in minutes) representing a time of day at which a self-check call is expected or scheduled to take place. Based on the above timing information, the timing control message as transmitted between the centralized communications center CCC and the remote control unit RCU includes (a) self-check timing information (specified in minutes) for use by the remote control unit RCU in initiating the next self-check operation; (b) normal activity timing cycle information (e.g., 8–10 hours, specified in minutes) for use in connection with sensors other than bathroom sensors; (c) bathroom activity timing cycle information for use in connection with bathroom sensors (e.g., 1–2 hours, specified in minutes); (d) pre-alarm flag information for indicating whether a pre-alarm cycle should be associated with a portable signalling device 15; and (e) pre-alarm timing information, typically representing a time period of 1 minute, for use by the remote control unit RCU in connection with a pre-alarm cycle. The self-check timing information in the timing control message is generally selected to have a value for insuring that the next self-check operation initiated by the remote control unit RCU will commence at the same time of day as the last self-check operation. The value of this information is determined in a simple manner by the central computer 40 by comparing the expected self-check time as specified in the subscriber file with the present time, as represented by a local central clock CC at the computer 40, and establishing the self-check timing information at a value equal to the difference. The pre-alarm flag information in the timing control message, by appropriate selection of a value therefor (typically either a logic "1" or logic "0" value), allows an rf signalling device 15 to have either a one minute pre-alarm cycle associated therewith, as in the case of the other sensors, or alternatively, no pre-alarm cycle, in which case an actual alarm cycle will be immediately initiated upon actuation of an rf signalling device 15 for establishing communication with the centralized communications center CCC.

The timing control information in the timing control message generated by the centralized communications center CCC is, as in the case of the alarm message generated by the remote control unit RCU, transmitted to the remote control unit RCU in several successive data words. Each of these data words, if received, tested and accepted as a valid word by the remote control unit RCU, is followed by a "send" command word from the remote control unit RCU for requesting a new word. If the data word is not accepted as a valid word, for examle, due to transmission errors or other problems, a "retransmit" command word is sent by the remote control unit RCU to the centralized communications center CCC for requesting retransmittal of the word. At the conclusion of the message, as indicated in FIG. 3, a "hang-up" command word is sent by the centralized communications center CCC to the remote control unit RCU for instructing the remote control unit RCU to terminate the call. The "call back" and "hang-up" command words are not available for use by the remote control unit RCU, being available only to the centralized communications center CCC.

Once the data in the timing control message generated by the centralized communications center CCC has been accepted by the remote control unit RCU, the various timing information contained in the message is available for use by the appropriate timing components of the remote control unit RCU. A significant aspect of the timing information in the timing control message is that all or any part of this timing information may be established and changed at any desired time at the centralized communications center CCC, specifically, by employing the display terminal 48, under operator control, to access the subscriber file stored in the disc storage unit 42. These changes may be made, for example, to accommodate an individual's particular habits, physical or other infirmities or disabilities, or personal preferences. Thus, for example, if it is desired as an accommodation to an individual to increase or decrease the time period associated with the bathroom sensor (1–2 hours) or to increase or decrease the time period associated with the other sensors (8–10 hours), these changes can be easily incorporated into a timing control message at the centralized communications center CCC. Similarly, by appropriate incorporation into a timing control message, the pre-alarm period (1 minute) may also be increased or decreased. In the case of a portable signalling device 15, it may, as previously mentioned, have either the same pre-alarm period as the sensors S, or none at all. It is further possible, by appropriate modification of a timing control message, to change the self-check timing information so that a self-check operation will be initiated by the remote control unit RCU at some time of day other than the previously scheduled time of day. All or any one or more of the abovementioned timing changes can be accomplished at the centralized communications center CCC and, therefore, obviates the need, and associated costs, of sending service personnel into the residence of an individual to effect the changes. Further, since the timing changes can be effectuated only at the centralized communications center CCC, and not in the residence of the individual, the possibility of tampering by such individual is effectively eliminated.

Figure 5:
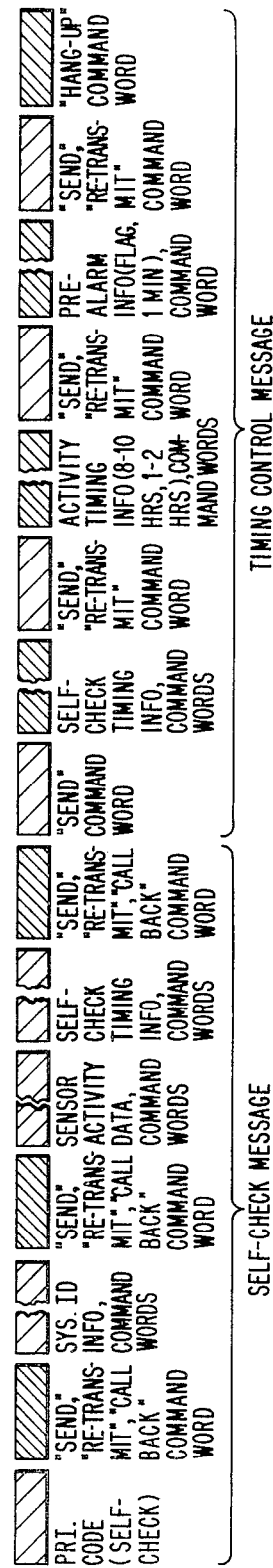
FIG. 5 illustrates a data transmission format and protocol employed during a self-check sequence for transmitting self-check and timing control messages between the remote control unit and the centralized communications center.

In the system as described hereinabove it is very important that the various components thereof, such as the sensors S, the remote control unit RCU, and the telephone line and network to the centralized communications center CCC, operate properly and reliably over extended periods of time. Thus, for example, if one of the sensors S malfunctions or fails altogether to operate so that a false alarm sequence is initiated, or if the remote control unit RCU or the telephone line malfunctions so that a valid alarm condition is not communicated to the centralized communications center CCC, it is important that the occurrence of such non-function or malfunction be detected and, to the extent possible, pinpointed, so that corrective action can be taken. In accordance with the present invention, the remote control unit RCU as described hereinabove is caused periodically, for example, once a day, to communicate bidirectionally with the centralized communications center CCC by means of a self-check operation or call to test normal operational aspects of various parts of the system, particularly the remote control unit RCU, the sensors S, and the telephone line and network. During the self-check operation, to be described in greater detail hereinafter, a self-check message as indicated in FIG. 5 is first transmitted between the remote control unit RCU and the centralized communications center CCC in a handshaking fashion. This message contains, in addition to information as employed in an alarm message, information relating to usage or operation of the sensors S and the rf signalling devices 15 as accumulated by the remote control unit RCU during normal operation thereof, as will be discussed in detail hereinafter. Upon the receipt, testing and acceptance of the data in the self-check message by the centralized communications center CCC, specifically, by the central computer 40, a timing control message as previously described and as also indicated in FIG. 5 is then transmitted between the centralized communications center CCC and the remote control unit RCU, also in a handshaking fashion.

The particular time at which a self-check operation is initiated is established by the remote control unit RCU, more particularly, by the aforementioned identification number information stored in the programmable read only memory 20. This identification number information is particularly convenient to use in self-check operations since it represents a number unique to the remote control unit RCU and differs from the number represented by the identification number information used in other systems. When this number is used in connection with a self-check operation, the self-check operation will normally be staggered in time relative to the self-check operations of other systems using different identification numbers, thereby effectively eliminating the possibility of several self-check operations taking place simultaneously. This feature can be especially important in power failure situations in which it would be undesirable for several remote control units to initiate self-check operations simultaneously following the restoration of power. Initially, the identification number information stored in the programmable read only memory 20, for example, the identification number 5 of the subscriber file as shown in FIG. 4, is employed to execute the first self-check call. This identification number generally corresponds to a prescribed self-check time, such as 12:05 a.m. When this identification number (e.g., 5) is used, the initial self-check call takes place five minutes after operating power is applied to the remote control unit. After the first self-check call has been made using this identification number, and as will be discussed more fully hereinafter, the central computer 40 at the centralized communications center CCC, by utilizing the identification number information and timing data maintained at the centralized communications center CCC, is able to determine the next self-check time and to communicate self-check timing data representing the next self-check time, specified in minutes, back to the remote control unit RCU to be then retained in a self-check timer SCT. The self-check timer SCT is decremented at a rate of once per minute. At such time as the self-check timer SCT has been decremented to 0 and goes negative, and provided that the telephone TL is in an on/hook condition (and in the absence of an alarm condition) as will be described hereinafter, the remote control unit RCU operates to seize the telephone line for permitting the next self-check operation to commence. Generally, the new self-check time is established so that the self-check timer SCT will be decremented to zero and go negative at a time of day during which little activity is expected of an individual, for example, between midnight and 5:00 a.m. (or 12:05 a.m. for the identification number 5). This time period is generally within the typical sleep period of an individual so that a self-check operation performed during this period is quite unlikely to interfere significantly with any normal activity of an individual. The identification number information stored in the programmable read only memory 20 as discussed hereinabove is accessed for purposes of the initial self-check operation in the same manner as earlier described, that is, at bit positions 0–7 of port 4 of the central processing unit CPU, and received by the central processing unit CPU at bit positions 0–3 of port 5. This information is retained within the self-check timer SCT and decremented until the number reaches zero and goes negative at which time, and provided that the telephone TL is in an on/hook condition (and no alarm conditions exists) the remote control unit RCU operates to seize the telephone line for permitting the initial self-check operation to commence.

As indicated hereinabove, before a self-check operation can commence, it is first necessary that the telephone line be seized by the remote control unit RCU preliminary to establishing communication with the centralized communications center CCC. In accordance with the present invention, and unlike an alarm sequence as previously described, the telephone line is caused to be seized for a self-check operation only when the telephone TL is not in use, that is, only when the telephone TL is in an on/hook condition. Thus, if the telephone TL is in use at the time of an attempted self-check operation, or the telephone TL is in an off/hook condition for some other reason (e.g., the handset is accidentally or inadvertently left off/hook), the remote control unit RCU will not seize the telephone line and the self-check operation is not performed at this time. Instead, the remote control unit RCU will wait until the telephone TL is in its on/hook condition again before making another attempt to perform the self-check operation.

The determination of the status of the telephone TL at any given time, particularly as such status relates to self-check operations, is accomplished by the central processing unit CPU in conjunction with the aforementioned data transmission circuit 30. On a frequent and, preferably, periodic basis, the central processing unit CPU operates to cause the data transmission circuit 30 to examine the value of dc voltage established across a pair of standard tip and ring terminals T, R. The value of this voltage may represent either an on/hook condition or an off/hook condition of the telephone TL. The telephone TL is also connected to the tip and ring terminals T, R via a pair of terminals T1, R1. The control of the data transmission circuit 30 is achieved at this time by means of control signals established at bit positions 1 and 2 of port 0 of the central processing unit CPU and inverted by the inverting amplifiers I3 and I4. When the voltage across the tip and ring terminals T, R at the time of examination has a value corresponding to an on/hook condition, an on/hook output signal, typically at a logic "1" level, is produced by the data transmission circuit 30 and applied to bit position 6 of port 1 of the central processing unit CPU; when the voltage across the tip and ring terminals T, R at the time of examination has a value corresponding to an off/hook condition, an off/hook output signal, typically at a logic "0" level, is produced by the data transmission circuit 30 and applied to bit position 6 of port 1 of the central processing unit CPU. In the event a ringing voltage is present at the terminals T, R at the time of the examination of the voltage across the terminals T, R, the output signals produced by the data transmission circuit 30 are caused to be analyzed by the central processing unit CPU as will be described in detail hereinafter to ascertain the actual occurrence of on/hook and off/hook conditions. The central processing unit CPU operates to monitor the on/hook and off/hook signals received at bit position 6 of port 1 and to utilize this information in connection with the abovementioned self-check operation. Thus, if at the time a self-check operation is scheduled to take place the telephone TL is in an off/hook condition, the central processing unit CPU will continue to cause the data transmission circuit 30 to periodically sample the state of the telephone TL until the state of the telephone TL has changed from an on/hook condition to an off/hook condition. At this time, and only at this time, a self-check operation will be permitted to commence.

As will be described in greater detail hereinafter, the abovementioned on/hook and off/hook output signals produced by the data transmission circuit 30 are also utilized by the central processing unit CPU to monitor usage of the telephone TL. In this case, the central processing unit CPU, by its continuous monitoring of the output signals produced by the data transmission circuit 30, looks for on/hook to off/hook transitions and off/hook to on/hook transitions of the telephone TL and, in response to each such transition, operates to reset the aforedescribed activity timer AT as an indication of use of the telephone TL. Thus, the activity timer AT will be reset both when the handset is removed from the cradle and when the handset is replaced on the cradle, thereby reducing the chance of a false alarm operation.

At such time as it has been determined that the telephone TL is in an on/hook condition and it is appropriate to initiate the transmission of a self-check message between the remote control unit RCU and the centralized communications center CCC, it is first required, as in the case of an alarm sequence, to establish communication with the centralized communications center CCC. This communication is established in the same manner as earlier described in connection with an alarm sequence, that is, by seizing the telephone line, specifically, by electrically disconnecting the telephone TL from across the telephone line, establishing a dc dialing loop within the data transmission circuit 30 and, after a period of time exceeding the duration of a standard dial tone, making and breaking the dc dialing loop in accordance with a telephone number of the centralized communications center CCC. The control of the data transmission circuit 30 in this situation is achieved, as in an alarm sequence, by means of control signals established at bit positions 0-2 of port 0 of the central processing unit CPU. The telephone number utilized to derive dialing pulses (at bit position 2 of port 0 of the central processing unit CPU) for use by the data transmission circuit 30 in the dialing operation (making and breaking of dc loop) is the aforedescribed first (primary) telephone number as stored in the programmable read only memory 20. This telephone number, which is accessed in the same manner as earlier described, may be used continuously for an indefinite number of times (as opposed to eight in an alarm sequence) in attempting to establish communication with the centralized communications center CCC. Further, only the first telephone number is used in the self-check operation, with the aforedescribed secondary telephone number stored in the programmable read only memory 20 being reserved exclusively for use in alarm sequences.

Upon establishing communication with the centralized communications center CCC, a self-check message may be transmitted between the remote control unit RCU and the centralized communications center CCC. This self-check message comprises information as maintained within the central processing unit CPU, including, as indicated in FIG. 5, (a) priority code information specifying that the message is a self-check message; (b) identification number information identifying the system (as derived from the programmable read only memory 20); and (c) sensor activity information specifying which of the sensors S and rf signalling devices 15 have been actuated and how often since the last self-check operation. The abovementioned sensor activity information represents an accumulation, or tally, of the total number of times that each sensor S and the rf signalling devices 15 in the system has been actuated since the last self-check operation. This information is typically retained within sensor activity registers of the central processing unit CPU, to be described more fully hereinafter, having been accumulated in the activity registers over a period of time as the activities monitored by the various sensors were performed by an individual and communicated by the sensors to the central processing unit CPU by means of coded rf signals. The sensor activity information is generally arranged in the self-check message in a given priority with the activity information for the signalling devices 15 appearing first and followed, in order, by the activity information for the bathroom sensors, ac line sensors (television and lamp) and switch sensors (refrigerator).

The information in the self-check message as described hereinabove is established at bit position 3 of port 0 of the central processing unit CPU and, as in an alarm sequence, has a 900 hertz phase-reversed digital coded format. This information is applied to the aforementioned modem amplifier and filter circuitry 32 and, after being processed thereby, coupled via the data transmission circuit 30 to the telephone line for transmission to the centralized communications center CCC. As in the case of an alarm message, the data in the self-check message is transmitted to the centralized communications center CCC in a plurality of data words with each data word except the first data word transmitted to the centralized communications center CCC being transmitted upon receipt of a command word ("send" or "retransmit") from the centralized communications center CCC. As in an alarm sequence, a "hang-up" command word is also sent by the centralized communications center CCC to the remote control unit RCU at the conclusion of a timing control message. "Call back" command words may also be sent by the center CCC to the remote control unit RCU. Each of the data words and command words has the same format as the data and command words in an alarm message. The various command words sent by the centralized communication center CCC, also in a 900 hertz phasereversal digital coded format, are coupled through the data transmission circuit 30 to the modem amplifier and filter circuitry 32 and, after being processed thereby, applied to bit position 7 of port 1 of the central processing unit CPU.

Once the data in the self-check message has been transmitted by the remote control unit RCU to the centralized communications center CCC and accepted by the centralized communications center CCC as discussed hereinabove, the data in the self-check message may then be processed by the centralized communications center CCC. The processing of the data in the self-check message is accomplished by the central computer 40. The central computer 40 operates to decode the self-check priority information contained in the data to note the self-check call represented by the data and to log the call into the log file in the disc storage unit 42. The system identification number information is also decoded to obtain from the disc storage unit 42 the aforementioned subscriber file. The self-check time in this file (upper right hand corner of FIG. 4) is then updated to the time at which the next self-check call is to take place, that is, the self-check time corresponding to the system identification number of the system originating the self-check operation. In the event a self-check call is not received by the centralized communications center CCC, or the self-check call is received but is in error, for reasons to be explained hereinafter, the self-check time in the subscriber file is not updated to the new self-check time. On a periodic basis, for example, every half hour, the subscriber file is accessed by the computer 40, as are all subscriber files, to determine if a self-check call was received. Generally, if the self-check time specified in the subscriber file at the time of accessing the file is earlier, for example, ½ hour to 1 hour before the present time, as established by the local central clock CC and displayed on the display terminal 48 (lower right hand corner), the self-check call is deemed to have been received and to be proper in form. The proper receipt of a self-check call thus suggests that the remote control unit RCU which initiated the self-check call is functioning properly and that the telephone line and network to the centralized communications center CCC are functioning properly. If, however, the interrogation of the subscriber file indicates that an expected self-check call was not made, or was excessively late, or if a self-check call was received but is erroneous, these situations suggest one or more of the following possibilities: the remote control unit RCU is not operating (e.g., a loss of operating voltage or system ac power); the remote control unit RCU is malfunctioning; the remote control unit RCU is being, or was (in the case of an excessively late self-check call) prevented from initiating a self-check operation due to a prolonged off/hook condition of the telephone TL; or the telephone line or network is faulty. In the case of failure to receive a self-check call or a valid self-check call, the central computer 40 operates to cause information relative to this failure, including the identification number information of the remote control unit RCU, to be stored in a maintenance log file section of the disc storage unit 42 reserved for this purpose. In addition, the missing or erroneous self-check call is noted in the subscriber file ("MAINTENANCE" entry, FIG. 4). The disc storage unit 42 may be accessed at any desired time for the information stored in the maintenance log file for the purpose of providing a hard-copy printout on a printer unit 52 displaying the identity of the remote control unit RCU which failed to make a self-check call or which made an erroneous self-check call. Such a printout may be utilized by service, repair or other personnel in determining or pinpointing the specific cause of the missing, excessively late or erroneous self-check call. Generally, in a missing, excessively late or erroneous self-check call situation as discussed hereinabove, the usual procedure to pinpoint the source of the problem is to telephone the residence of the individual to inquire as to obvious causes of the problem, such as a loss of power or a telephone having been left off/hook for a prolonged period, or to have the individual operate a portable rf signalling device 15 to initiate an intentional alarm sequence by which the remote control unit RCU and the telephone line and network to the centralized communications center CCC can be tested.

In the same manner as discussed hereinabove, the non-functioning or malfunctioning of one or more of the sensors S can be determined. As indicated in FIG. 4, the subscriber file also contains information, in a numerical coded fashion, as to which sensors have been installed in the residence of the individual. This information is compared by the computer 40 against the sensor activity information received in the self-check message and stored in a central memory CM of the computer 40 to determine whether a particular sensor installed in the residence of an individual was actuated since the last self-check operation (typically a period of one day). The failure of an installed sensor to be actuated since the last self-check operation, which failure is noted by storing corresponding indications (including identification information) in the central memory CM, suggests one of several possibilities: (a) the sensor may not be functioning, (b) the sensor is malfunctioning, or (c) simply that the individual did not in fact perform the activity monitored by the sensor in the time period between successive self-check operations. The central memory CM of the computer 40 may be accessed at any desired time, under operator control, to obtain a hard-copy printout on the printer unit 52 of the identity of any non-functioning or malfunctioning sensor S, together with the corresponding system identification number. The printout may then be used by service, repair or other personnel for determining the particular reason why the sensor was not actuated.

Following the transmittal of the self-check message between the remote control unit RCU and the centralized communications center CCC as discussed hereinabove, the remote control unit RCU transmits a "send" command word (first word in timing control message, FIG. 5) to the centralized communications center CCC for the purpose of initiating the transmission of the aforementioned timing control message between the centralized communications center CCC and the remote control unit RCU. This timing control message is assembled in the same manner and contains the same information as earlier described in connection with the timing control message (see FIG. 3) which followed the alarm message in an alarm sequence. The timing control message is transmitted between the centralized communications center CCC and the remote control unit RCU and utilized by the remote control unit RCU in the same manner as earlier described.

Figure 64:
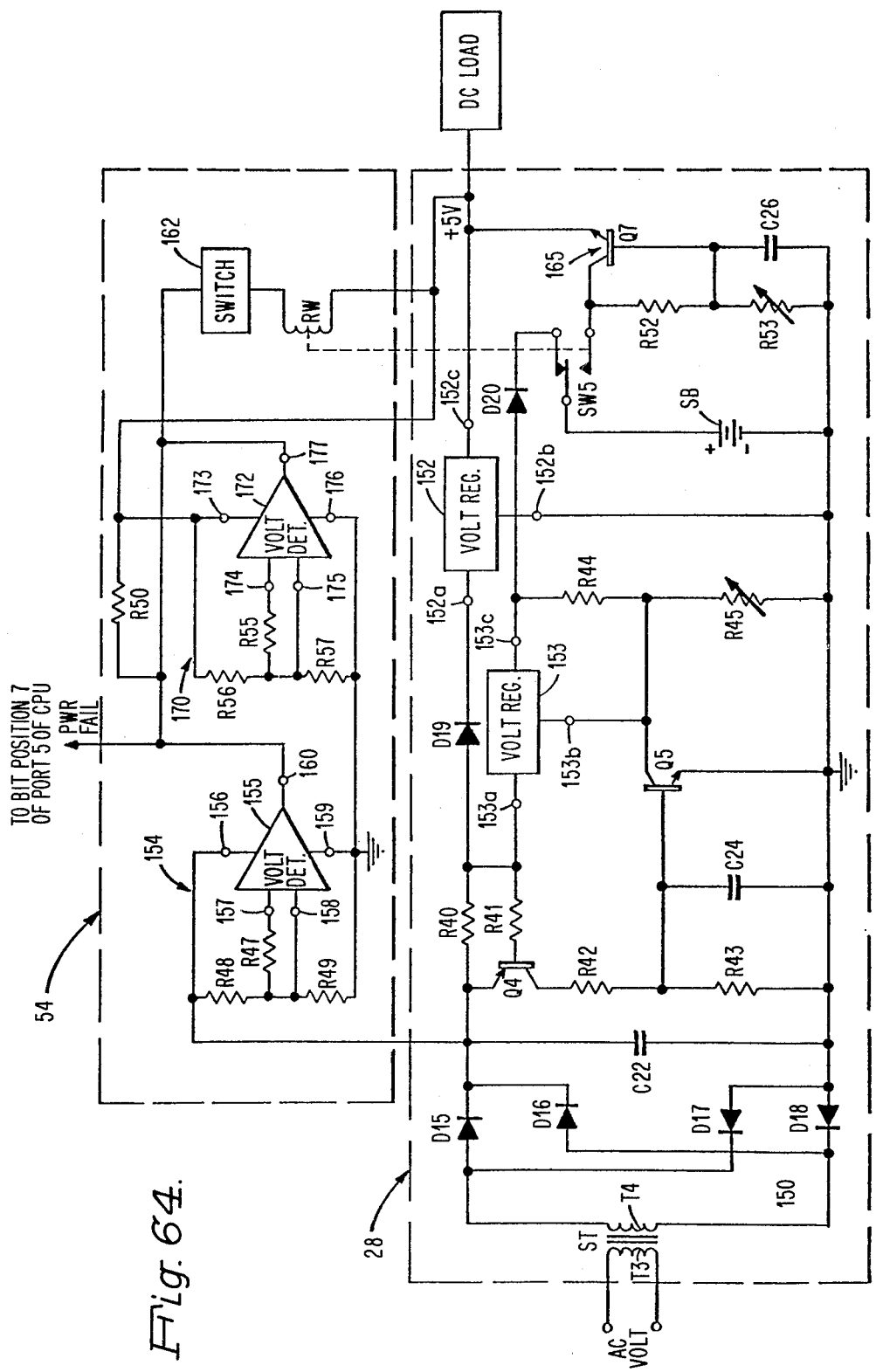
FIG. 64 is a schematic circuit diagram of a dc power supply circuit and a detector circuit employed in the monitoring and signalling system in accordance with the invention.
Figure 65:
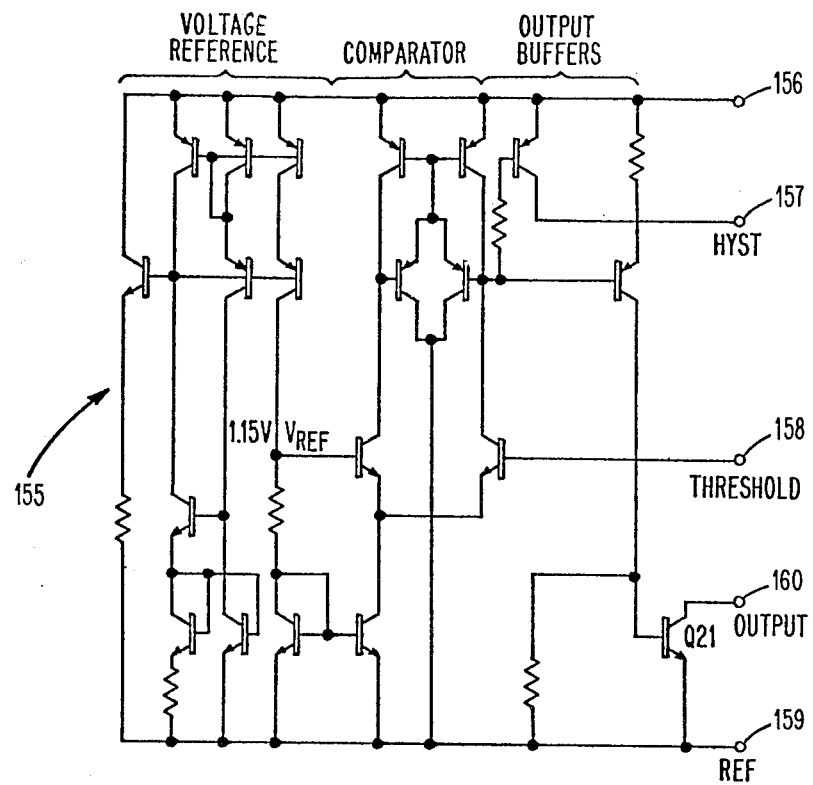
FIGS. 65 and 66 are schematic circuit diagrams of voltage detectors employed in the detector circuit shown in FIG. 64.
Figure 66:
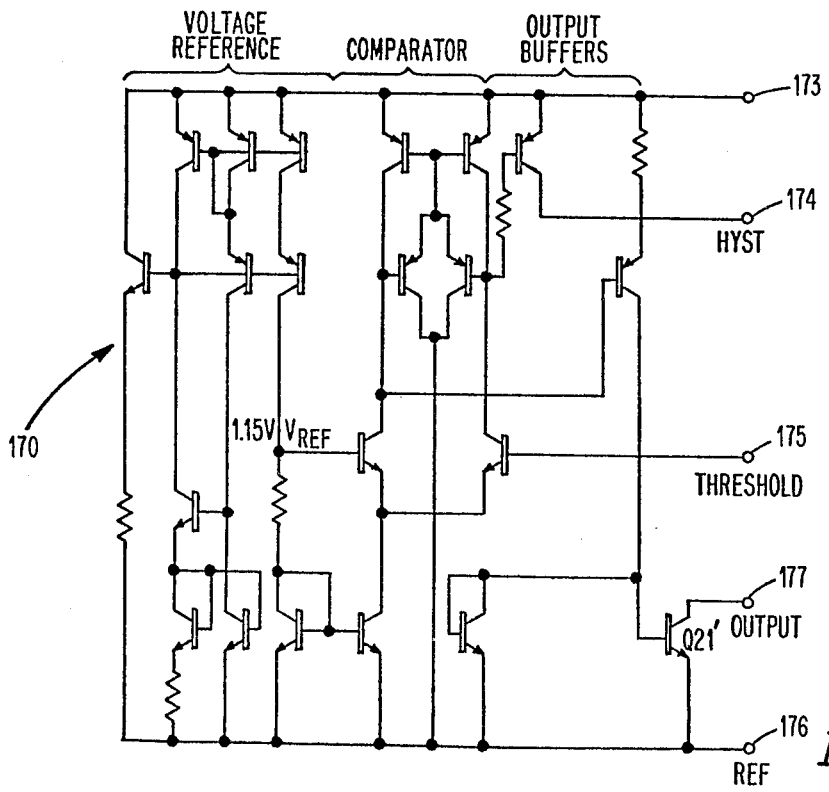

Operating power for the remote control unit RCU as discussed hereinabove is derived from the aforementioned dc power supply circuit 28. The dc power supply unit 28, a suitable implementation of which is shown in FIG. 64, to be described in detail hereinafter, is arranged to receive and convert an ac line voltage (e.g., 110 volts) to a dc voltage $+V_{CC}$ (e.g., $+5$ volts) for use by various components of the remote control unit RCU. These components, which collectively represent a dc load for the dc power supply circuit 28, include, as indicated in FIG. 1, the aforedescribed central processing unit CPU. In the event the dc voltage supplied to the remote control unit RCU, especially the central processing unit CPU, is terminated or reduced in value for some reason, for example, due to a loss of ac line voltage or failure of components used to derive dc voltages from the ac line voltage, a standby battery SB used in conjunction with the dc power supply circuit 28 is caused to be switched into operation to supply a standby dc voltage $+V_{CC}$ (e.g., $+5$ volts) to the remote control unit RCU. The standby battery SB, which may be used for a period of up to about six hours, is caused to be switched into operation by a detector circuit 54. The detector circuit 54, a suitable implementation of which is shown in FIGS. 64-66, to be described in detail hereinafter, operates to detect the loss or reduction of dc power and effects the actual transfer of the standby battery SB to the remote control unit RCU. The detector circuit 54 also operates in the event of a termination or reduction in value of the dc voltage supplied to the remote control unit RCU to supply an output signal indicative of this condition to the central processing unit CPU, specifically, at bit position 7 of port 5. This signal, designated PWR FAIL, is employed by the central processing unit CPU in connection with powering-up operations following a loss or reduction in dc voltage as will be discussed in greater detail hereinafter.

The detector circuit 54 also serves to continuously monitor the value of the dc voltage of the standby battery SB. When the value of this voltage declines to a predetermined level, for example, below 4.5 volts, the detector circuit 54 operates to disconnect the standby battery SB from the remote control unit RCU. This latter operation is considered necessary to protect the standby battery SB from permanent damage due to overdischarge and also to prevent the central processing unit CPU, which is an MOS-type device, from improperly operating due to the insufficient value of operating voltage. It is therefore preferred to completely deny operating voltage to the central processing unit CPU rather than risk improper operation thereof.

The loss of ac line voltage as discussed hereinabove can also have an effect on the usual and typical manner of operation of the sensors S employed in the system. As indicated in FIG. 1, each of the sensors S is powered by an ac voltage, specifically, the ac line voltage. In the event of a power failure, each of the sensors S will be rendered inoperative by the loss of ac voltage and thereby be prevented from monitoring its associated activity and generating and transmitting a coded rf signal to the rf receiver 9. However, upon restoration of the ac line voltage, each of the sensors S will respond to the restoration of ac line voltage in the same manner as though an activity monitored thereby had just been performed by the individual. As a result, the sensor will, in effect, turn "on", causing a coded rf signal to be generated and transmitted thereby, simultaneously with other sensors, to the rf receiver 9. Since the transmission of the coded signals by the sensors S in this situation do not reflect actual activities performed by the individual, it is important that these signals not be processed within the central processing unit CPU. To prevent processing of these signals, the central processing unit CPU operates to continuously monitor the PWR FAIL signal as presented by the detector circuit 54 at bit position 7 of port 5. During the occurrence of a power failure, this signal is at a first logic level (e.g., logic "1" level) and changes to a second logic level (e.g., logic "0" level) upon subsequent restoration of power, that is, during powering up. The central processing unit CPU operates to detect this transition and, for a predetermined time thereafter related to the normal duration of a powering-up operation, for example, two seconds, to ignore any signals received thereby from any of the sensors S. After this two second interval, the central processing unit CPU will again accept coded signals from the sensors S. It is to be noted that the portable signalling device 15 is unaffected by a power failure since it, unlike the sensors S, is a battery-powered unit and the central processing unit CPU is operating on standby power from the standby battery SB during the power failure. In this case, however, the central processing unit CPU must distinguish between the coded signal from a signalling device 15 and the coded signals from the sensors S in order to permit processing of the coded signal from the signalling device 15 while rejecting the coded signals from the sensors S. This latter operation is accomplished by the central processing unit CPU by accessing the programmable read only memory 20 which contains information specifying the presence or absence of battery backup, that is, a self-contained battery source, for each of the various sensors S and the signalling devices 15. Since the signalling device 15 is the only device to have battery backup, a coded rf signal produced thereby will be permitted to be processed during a power failure, specifically, to initiate an alarm sequence, while any coded rf signals from the sensors S will be rejected.

The description of the system 1 of the invention as presented hereinabove is directed to the monitoring (passive and active) of activities of an individual while the individual is in his or her residence. At such time as the individual must leave such residence for any prolonged period of time, for example, for more than the long time period (8–10 hours) of the activity timer AT of the central processing unit CPU, the activity timer AT must be suspended or disabled so that it will not time out and falsely initiate an alarm sequence. The activity timer AT may be disabled by the individual upon leaving his or her residence by simply toggling an on/off "vacant" switch 56. Operation of the switch 56, which is connected between the ground pin and bit position 1 of port 1 of the central processing unit CPU, is detected at bit position 1 of port 1 and results in the timing operation of the activity timer AT being suspended, or frozen. In addition, an on/off "vacant" light emitting diode LED2 which is normally in its illuminated "on" state when the system is in operation is caused to change from its illuminated "on" state to its darkened "off" state. The light emitting diode LED 2 is normally maintained in its illuminated state in the same manner as the light emitting diode LED1, that is, by means of a signal, typically at a logic "1" level, established at bit position 6 of port 0 of the central processing unit CPU and inverted by an inverting amplifier I5 to a logic "0" level to establish the cathode of the light emitting diode LED2 at ground potential. With the cathode of the diode LED2 at ground potential, the aforementioned dc voltage $+V_{CC}$ produced by the dc power supply circuit 28 is applied across the diode LED2 via a current-limiting resistance R2 and causes the diode LED2 to operate in its illuminated state. The darkened state of the diode LED2 is achieved by inverting the above signal at bit position 6 of port 0 of the central processing unit CPU. As shown in FIG. 2, the light emitting diode LED2 may be conveniently housed together with the on/off switch 56 in a single unit within the housing for the remote control unit RCU.

Upon return of the individual to his or her residence, the system may be reactivated again by toggling the on/off switch 56 or by performing any one of the activities monitored by the sensors S or the telephone TL. Any one of these acts will cause the activity timer AT to be reset to restart its timing cycle and also to cause the light emitting diode LED2 to be operated again in its illuminated state.

A.C. Line Sensor 3 (FIG. 6)

Figure 6:
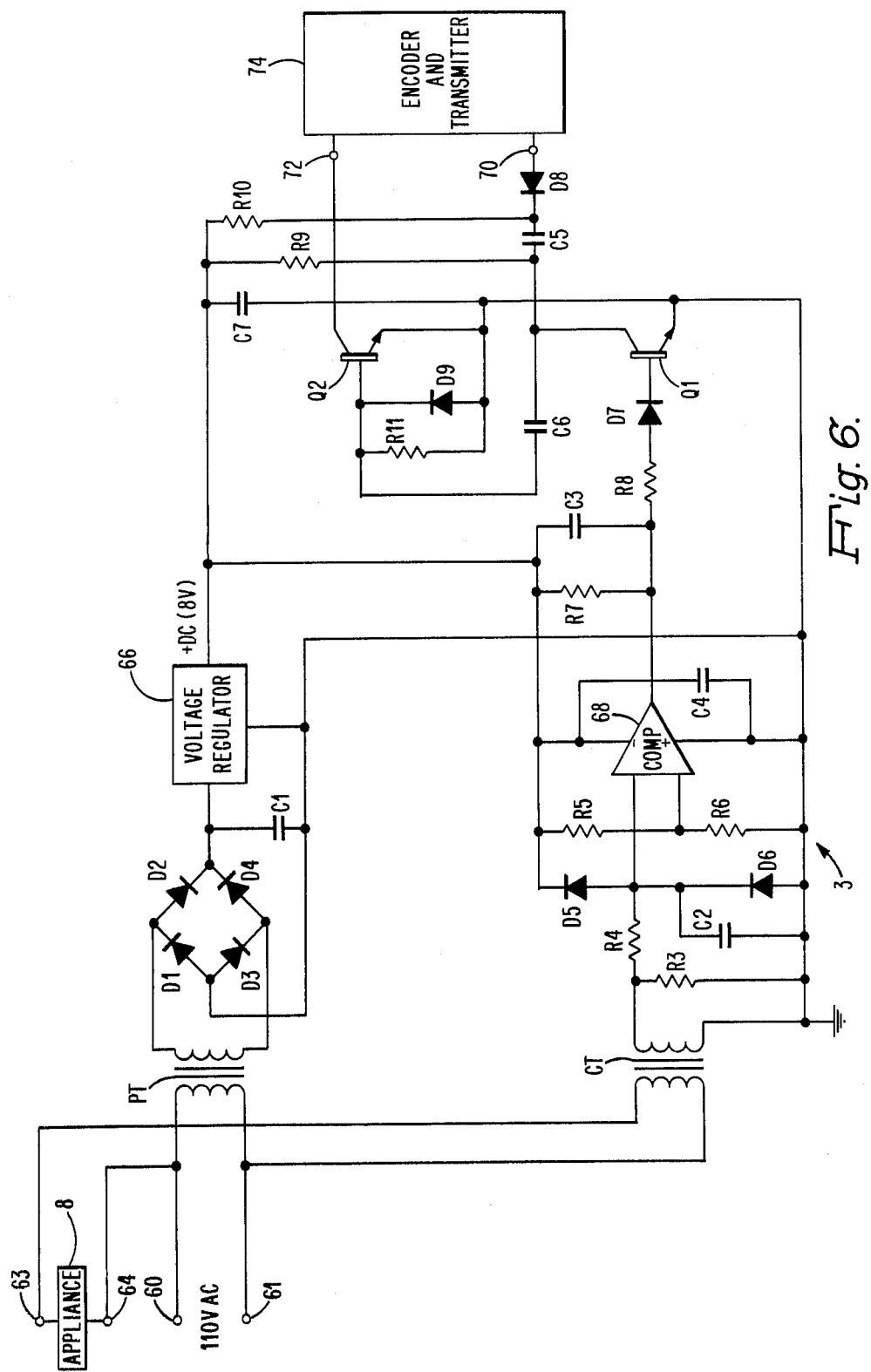
FIG. 6 is a schematic circuit diagram of an ac line sensor employed in the monitoring and signalling system in accordance wih the invention for monitoring usage of an electrical appliance such as a lamp or television receiver.

Referring now to FIG. 6 there is shown a detailed schematic diagram of a suitable implementation of an ac line sensor 3 as employed in the monitoring and signalling system 1 in accordance with the present invention. As shown in FIG. 6, the ac line sensor 3 includes a pair of electrical connections 60 and 61 for connecting the ac line sensor 3 to 110 volt ac household wiring. The ac line sensor 3 also includes electrical connections 63 and 64 for connection to a standard a.c. male plug of an electrical appliance 8, the operation of which is to be monitored by the ac line sensor 3. The ac electrical connection 60 is connected directly to the appliance connection 64 and also to the top end of the primary winding of a power supply transformer PT. The other ac electrical connection 61 is connected to the bottom end of the primary winding of the transformer PT and to the bottom end of the primary winding of a current transformer CT. The appliance connection 63 is connected to the top end of the primary winding of the current transformer CT. The primary winding of the current transformer CT is, therefore, in the path of current flowing through the appliance 8. The primary winding of the current transformer CT is a single turn, for example, of 12-guage wire.

A low voltage power supply for operating the ac line sensor 3 includes the power supply transformer PT which, as previously noted, has its primary winding connected across the ac line voltage connections 60 and 61. The secondary winding of the transformer PT is connected across a standard full-wave rectifier bridge comprising four diodes D1–D4. The output of the bridge is connected to a filter capacitance C1 and a voltage regulator 66. A suitable output voltage of the voltage regulator 66 is +8 volts DC.

The secondary winding of the current transformer CT is connected to circuitry which detects whether the appliance 8 is "on" or "off". A sense resistance R3 is connected across the secondary winding of the transformer CT and its value is selected so that the secondary voltage developed across it is proportional to the instantaneous current passing through the primary winding of the current transformer CT. The voltage developed across the sense resistance R3 is coupled to one input of a comparator 68 by a resistance R4 and a capacitance C2 which together form a filter to insure stable operation. A pair of diodes D5 and D6 protect the input of the comparator 68 from voltage surges. A reference voltage is applied to a second input of the comparator 68 by a voltage divider consisting of a pair of resistances R5 and R6 connected between the dc voltage source (output of the voltage regulator 66) and ground potential. The reference voltage produced provides a threshold voltage at the second input of the comparator 68 which must be exceeded by the voltage at the first input in order to drive the comparator 68. For purposes of the present invention, the threshold voltage is set at a typical value of 100 millivolts which is exceeded when the appliance 8 draws a sustained peak current of about 100 milliamperes. A resistance R7 and a capacitance C3 are connected in parallel between the positive voltage source and the output of the comparator 68. A capacitance C4 is connected across the comparator 68.

The output of the comparator 68 is coupled to the base of a first bipolar npn transistor Q1 by a resistance R8 and a diode D7. The emitter of the transistor Q1 is connected directly to ground potential and the collector is connected through a resistance R9 to the positive voltage supply and by way of capacitance C5 and a diode D8 to an output terminal 70. The juncture between the capacitance C5 and the diode D8 is connected to the positive voltage source through a resistance R10.

The collector of the first transistor Q1 is also connected by way of a capacitance C6 to the base of a second npn bipolar transistor Q2. A resistance R11 and a diode D9 are connected in parallel between the base and emitter of the transistor Q2, and the emitter is connected to ground potential and, via a capacitance C7, to the positive voltage source. The collector of the transistor Q2 is connected to an output terminal 72. Both output terminals 70 and 72 are connected as inputs to an encoder and transmitter 74 which, as will be described in detail hereinafter in connection with FIG. 12, transmits a coded rf signal indicating the change in operating state of the appliance 8 being monitored.

When the ac line sensor 3 is connected to the 110-volt ac supply with the appliance 8 connected to the connections 63 and 64 and in its "off" state, no current flows through the primary winding of the current transformer CT. Under these conditions, the input circuitry to the comparator 68 produces a voltage at the first input of the comparator 68 which is less than the reference voltage at the second input of the comparator 68, causing the output of the comparator 68 to be at a relatively high level, for example, at a logic "1" level. The capacitance C3 is in a discharged condition and base current is supplied to the transistor Q1, causing that transistor to conduct. The collector of the transistor Q1 is low, biasing the transistor Q2 in a non-conducting condition.

When the appliance 8 is turned "on", the current flowing through the appliance 8 also flows through the primary winding of the current transformer CT. A secondary voltage is developed across the sense resistance R3 which is proportional to the instantaneous current flowing through the primary winding. This voltage is an alternating voltage. When the positive peaks of the alternating voltage applied to the first input of the comparator 68 are greater than the threshold voltage at the second input, the comparator 68 is turned on. The output stage of the comparator 68 is a so-called open collector transistor which, when conducting, provides essentially a direct path between the output of the comparator 68 and ground potential, producing a logic "0" level at the output. During each positive peak with the output of the comparator 68 near ground potential, the capacitance C3 is rapidly charged to the dc supply voltage. In each period between positive peaks when the comparator 68 is off and does not present a short circuit between its output and ground potential, the voltage at the output tends to rise. In order for the voltage at the output to rise, the capacitance C3 must discharge. Since the only discharge path for the capacitance C3 is through the resistance R7, a combination which has a fairly long time constant, the voltage at the output of the comparator 68 rises very slowly. The voltage at the output thus remains sufficiently low so as to continuously provide a logic "0" for as long as the current through the appliance 8 is sufficient to produce positive peaks at the first input to the comparator 68 which are greater than the threshold voltage.

With the output of the comparator 68 at a logic "0", the source of base current drive for the transistor Q1 is removed and that transistor becomes nonconducting. As current flow through the collector of the transistor Q1 is reduced, the voltage at the collector rises. This positive transition is coupled to the base of the transistor Q2 by way of the differentiation action of the capacitance C6 and the resistance R11. The transistor Q2 conducts, causing its collector and the output terminal 72 connected thereto to go low. Thus, the turning off of the transistor Q1 momentarily biases the transistor Q2 to conduction, producing a negative-going pulse at the output terminal 72. This pulse is an indication that the appliance 8 whose use is being monitored has been turned from "off" to "on" and may be utilized by the encoder and transmitter 74 to transmit a signal to this effect.

When the appliance 8 attached to the ac line sensor 3 is turned from "on" to "off", the secondary voltage across the sense resistance R3 is reduced and the comparator 68 is turned off. The voltage at the output of the comparator 68 increases as the capacitance C3 discharges through the resistance R7. Base current is provided to the transistor Q1, causing that transistor to conduct. The voltage at the collector of the transistor Q1 decreases and the negative-going transition is coupled by way of the capacitance C5 and the diode D8 to the output terminal 70. A momentary negative-going pulse appears at the output terminal 70 and is applied to the encoder and transmitter 74 for transmission of a signal indicating that the appliance 8 has been turned "off".

The ac line sensor 3 as described hereinabove is also disclosed, and claimed, in a co-pending patent application Ser. No. 75,782, filed Sept. 17, 1979, in the name of Richard L. Naugle, entitled "SENSING APPARATUS", and assigned to GTE Laboratories Incorporated.

Figure 7:
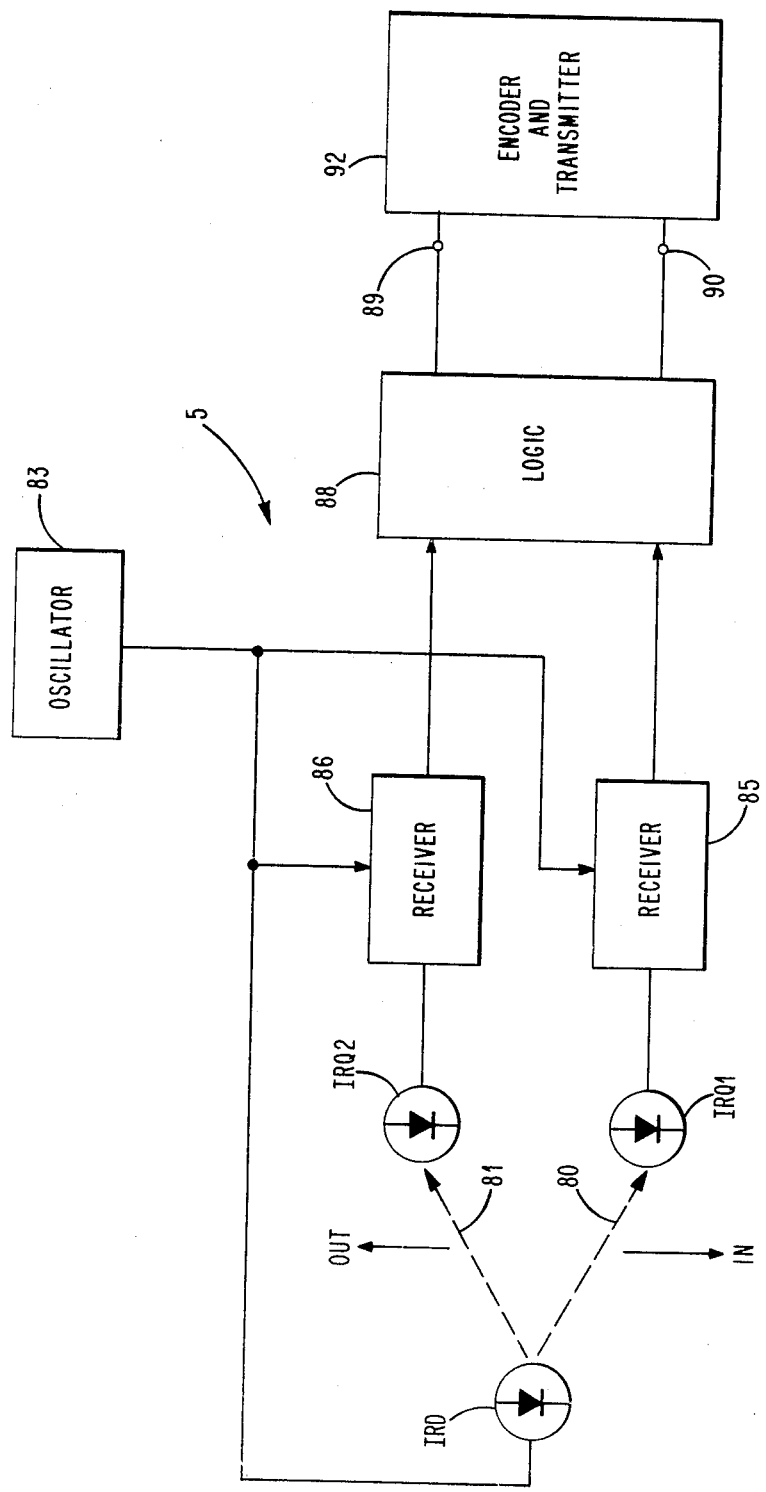
FIG. 7 is a schematic block diagram of an optical bathroom sensor employed in the monitoring and signalling system in accordance with the invention for monitoring the entry and exit of an individual from a room such as the bathroom.

Bathroom Sensor 5 (FIG. 7)

FIG. 7 illustrates in block diagram form a suitable implementation of a bathroom sensor 5 as employed in the monitoring and signalling system 1 in accordance with the present invention. The bathroom sensor 5 as shown in FIG. 7 includes an infra-red emitting diode IRD which is located at one side of a portal or opening such as a doorway to a room. For purposes of the present invention, this room may be a bathroom. A pair of infra-red detectors IRQ1 and IRQ2 are mounted on the opposite sides of the doorway. The elements IRD, IRQ1 and IRQ2 are positioned relative to each other so that two beams of infra-red radiant energy 80 and 81 pass across the doorway from the emitting diode IRD to the detectors IRQ1 and IRQ2, respectively. The detectors IRQ1 and IRQ2 are spaced apart along the direction of movement of a person through the doorway into or out of the bathroom. As indicated by the arrows and labels, the inner beam is the beam 80 to the detector IRQ1 and the outer beam is the beam 81 to the detector IRQ2. The emitting diode IRD and the detectors IRQ1 and IRQ2 are generally located at a height to allow persons to intercept the beams 80 and 81 but not common household or domestic pets.

The infra-red emitting diode IRD is driven by an oscillator 83, for example, a 2.5 kilohertz squarewave oscillator. The resulting infra-red beams 80 and 81 are received by the detectors IRQ1 and IRQ2 and converted to electrical signals which are applied to a pair of receivers 85 and 86, respectively. The oscillator 83 is also connected to the receivers 85 and 86 to insure that the receivers 85 and 86 respond to operation of the detectors IRQ1 and IRQ2 as a result of light beams from the emitting diode IRD rather than ambient light and other environmental radiation which might fortuitously impinge on either one of the detectors IRQ1 and IRQ2 while either beam is blocked. The receivers 85 and 86 therefore discriminate between the 2.5 kilohertz signals from the infrared emitter IRD and DC and low frequency components, particularly at 60 and 120 hertz, or ambient sources such as sunlight, electric lights and radiation from television receivers. The outputs of the receivers 85 and 86 as discussed hereinabove are applied to logic circuitry 88. The outputs of the logic circuitry 88 are applied via output terminals 89 and 90 to an encoder and transmitter 92. The encoder and transmitter 92 operates, as will be described in detail hereinafter in connection with FIG. 12, to produce coded rf signals representative of the entry and exit of an individual from the room (e.g., bathroom) in which the bathroom sensor 5 is used.

Under normal operating conditions, the infra-red emitter IRD generates pulses of infra-red radiant energy at the frequency of the oscillator 83. The beams 80 and 81 of pulsed infra-red energy travel across the doorway to the detectors IRQ1 and IRQ2, respectively. The receivers 85 and 86 process the outputs of the detectors IRQ1 and IRQ2, respectively. When an infra-red beam is being received by its associated detector, the output of the associated receiver is at a high level, for example, a logic "1". When an infra-red beam is blocked by a person passing through the beam and is not being received by its associated detector, the output of the associated receiver is at a low level, for example, a logic "0". The outputs of the receivers 85 and 86 are applied to the logic circuitry 88.

The logic circuitry 88 operated to produce a negative-going pulse at the output terminal 89 when the output of the receiver 85 is a logic "0" subsequent to the output of the receiver 86 being a logic "0". This event occurs when the inner beam 80 is broken subsequent to the breaking of the outer beam 81 indicating movement of an object through the doorway in the IN direction. A negative-going pulse is produced at the output terminal 90 when the output of the receiver 86 is a logic "0" subsequent to the output of the receiver 85 being a logic "0". This event occurs when the outer beam 81 is broken subsequent to the breaking of the inner beam 80 indicating movement of an object through the doorway in the OUT direction. Both output terminals 89 and 90 are connected as inputs to the encoder and transmitter 92 for transmitting coded rf signals indicating the entry or exit though the doorway as will be explained in detail hereinbelow.

The bathroom sensor 5 as described hereinabove is also disclosed, and claimed, in a co-pending application Ser. No. 75,769, filed Sept. 17, 1979, in the names of Richard L. Naugle and William L. Geller, entitled "EXIT-ENTRY APPARATUS", and assigned to GTE Laboratories Incorporated.

Figure 8:
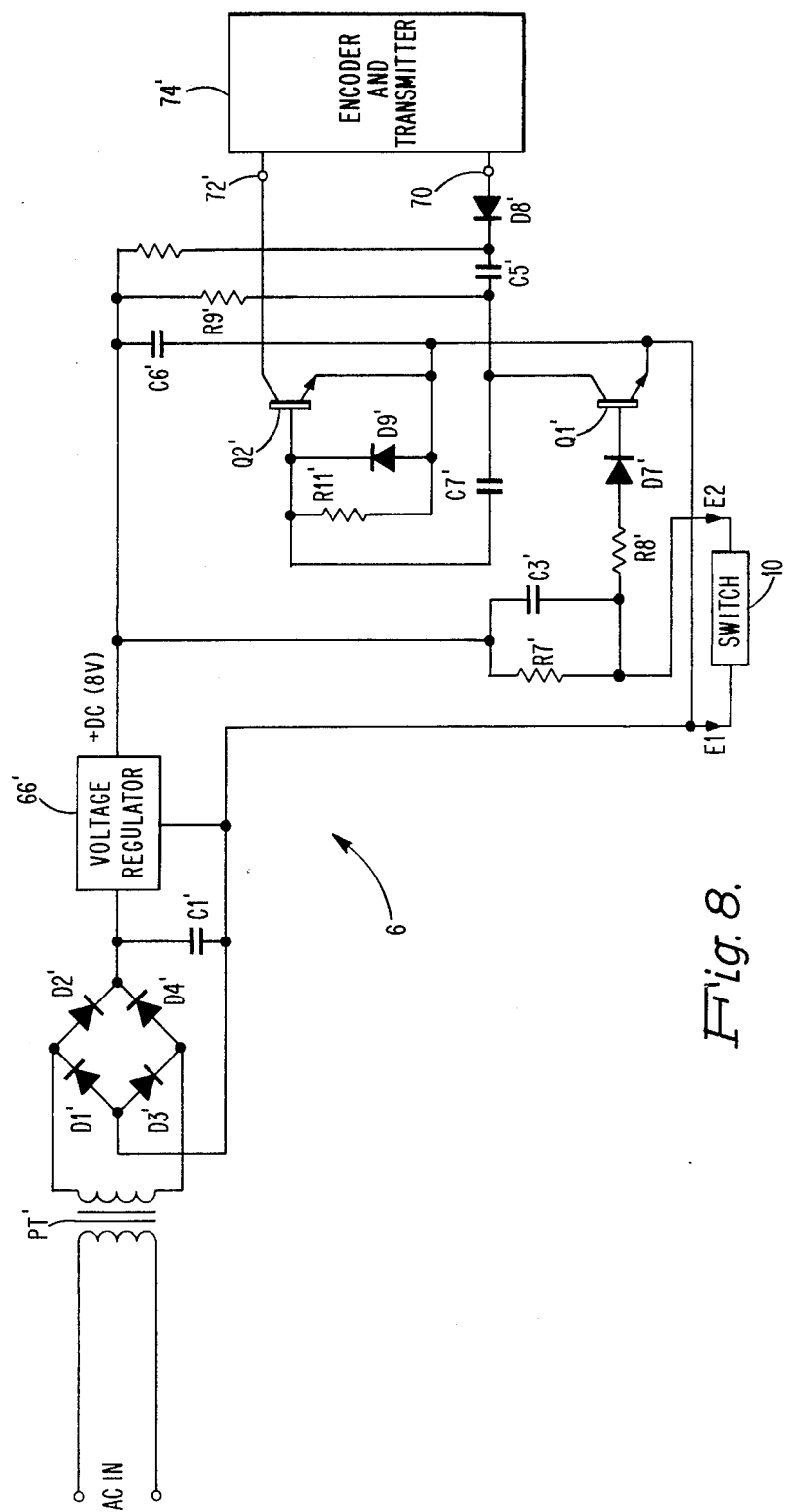
FIG. 8 is a schematic circuit diagram of a switch sensor employed in the monitoring and signalling system in accordance with the invention for monitoring actuation of a switch associated with a unit or appliance such as a refrigerator.

Switch Sensor 6 (FIG. 8)

FIG. 8 illustrates in detailed schematic diagram form a suitable implementation of a switch sensor 6 as employed in the monitoring and signalling system 1 in accordance with the present invention. The switch sensor 6 as shown in FIG. 8 is similar to the ac line sensor 3 as shown in FIG. 6 but does not require the ac detector circuitry used in the ac line sensor 3 and, in addition, the switch 10 employed with the switch sensor 6 is connected between a pair of points E1, E2, that is, across the voltage regulator and the RC charging circuit. The components of the switch sensor 6 which correspond to the components of the ac line sensor are shown with primed reference numerals in FIG. 8. The encoder and transmitter employed in the switch sensor 6 is the same as the corresponding unit employed in the ac line sensor 3 and in the bathroom sensor 5 and will be described in detail hereinafter in connection with FIG. 12.

Portable Signalling Device 15 (FIGS. 9–11)

FIGS. 9–11 illustrate a suitable implementation of a portable rf signalling device 15 as employed in the monitoring and signalling system 1 in accordance with the present invention. The portable rf signalling device 15 is adapted to be carried on the person (e.g., attached to clothing or kept in a pocket or purse) and to be manually actuated by the person in an accident, emergency, disability or incapacity situation. The signalling device 15 may also be actuated intentionally as part of a system test operation, specifically, by intentionally inducing an alarm sequence for testing operation of the system, especially the remote control unit RCU and the telephone line and network to the centralized communications center CCC.

The signalling device 15 is shown in schematic diagram form in FIG. 9. The signalling device 15 as shown in FIG. 9 differs principally from the ac line sensor 3, the bathroom sensor 5 and the switch sensor 6 as previously discussed in that it is actuated by a manually-actuated pressure-sensitive, depressible switch 95 (used in conjunction with a parallel resistance/capacitance combination R13, C9), and is powered directly by a dc voltage of a battery 96 (e.g., 9 volts) rather than by a dc voltage derived from an ac voltage. The encoder and transmitter employed by the signalling device 15 is the same as used in the other sensors. The electrical circuit components of the signalling device 15 are typically mounted on a carrier such as a standard printed circuit board as shown in FIG. 10 and enclosed together with mounting members 97 within a pair of rectangular shaped housings 98 and 99. The housings 98 and 99, typically of a plastic material, are telescoped within each other and sealed or "welded" at their mating surfaces by a material such as a solvent welding material. The sealing operation serves to strengthen the device, prevent tampering by the user, and to render the device water-resistant and thereby protect the circuitry within the housings from the effects of moisture, water or other liquids. This latter water-resistant feature of the signalling device 15 can be especially important if the device 15 is carried by the user into a bathtub or shower area.

Actuation of the signalling device 15 to produce and transmit a coded rf signal to the rf receiver 9 (FIG. 1) is accomplished by manually actuating the aforementioned switch 95 which causes the dc power of the battery 96 to be applied to, and to power, the signalling device. To this end, the switch 95 is arranged to be physically disposed internally within the housings 98 and 99 proximate to a small circular, concave indentation or dimple 100 formed generally in the center of a deflective, resilient, semi-rigid wall 101 of the upper housing 98. To actuate the signalling device 15, it is only necessary for the user to press down on the dimple 100 so that the semi-rigid wall 101 of the upper housing 98 is deflected downwardly slightly and the pressure applied to the dimple 100 is transmitted to, and actuates, the switch 95. As the switch 95 returns to its initial position, the force of this return operation is transmitted back to the user via the dimple 100 thereby providing tactile feedback to the user as a positive indication that the switch 95 was, in fact, actuated. Application of pressure to any other part of the wall 101 of the housing 98 will not actuate the switch 95 since these parts are not in physical contact or proximate to the switch 95. As a result, the possibility of false or unintentional actuation of the signalling device 15, for example, by bumping, sitting, or rolling onto the device 15, is minimized. By the provision of the dimple 100 in an otherwise flat wall, a user can readily and easily locate the dimple 100 solely by the sense of feel and thereupon operate the device 15 by a simple dimple-pushing operation. The provision of the dimple 100 in an otherwise flat wall could be important if, for example, a user were required to operate the signalling device 15 in the dark or if the user were blind. The dimple pushing operation may generally also be performed quite readily by a person whose hands are adversely affected by arthritis or some other affliction.

The upper housing 98 of the signalling device 15 further has an upstanding ridge or rim 102 formed at the perimeter of the wall 101 and restraining the edges of the wall 101. The rim 102 serves to further minimize unintentional or accidental actuation of the switch 95 by spacing, or recessing, the wall 101 and the dimple 100 formed therein from any flat surface against which the signalling device 15 may be placed. The rim 102 also serves as a "shock absorber" by absorbing the effects of impact in the event the signalling device 15 is accidentally or unintentionally dropped against some hard surface or object. The rim 102 further serves as a locator for the dimple 100 should a user find it necessary to operate the signalling device 15 in the dark or if the user is blind.

The upper housing 98 as described above further includes a small circular opening 104 at a corner region thereof and located above a light emitting diode LED3. The light emitting diode LED3 is arranged within the signalling device 15 as indicated in FIG. 10 so as to be illuminated each time that the switch 95 is actuated by the user. The opening 104 is covered from inside the housing 98 with a small piece of colored (e.g., red) light-transmitting tape 105 for permitting passage therethrough of light from the light emitting diode LED3 to alert or inform the user (a sighted user) that the signalling device 15 has been actuated. The tape 105 also serves to seal the opening 104 to prevent passage of liquids into the interior of the signalling device 15.

Typical dimensions for the signalling device 15 in its assembled form as shown in FIG. 11 are $2\frac{1}{4}''\times 2\frac{1}{4}''\times 13/16''$. The rectangular configuration of the signalling device 15 prevents the signalling device from rolling in the event it is dropped by the user. A typical weight for the signalling device 15 is about 1.5 ounces. The signalling device 15 is, thus, small, lightweight and convenient for carrying by the user, for example, in a pocket or purse or, although not shown, by a clip which may be attached to the signalling device 15 and secured to an article of clothing of the user.

The signalling device 15 as described hereinabove is also disclosed, and claimed, in the aforementioned co-pending patent application Ser. No. 965,756, filed Dec. 4, 1978, now U.S. Pat. No. 4,224,602, in the names of Richard W. Anderson and Alfred I. Bottner, and entitled "SIGNALLING DEVICE". Design aspects of the signalling device 15 are also disclosed and claimed in a co-pending design patent application Ser. No. 965,757, filed Dec. 4, 1978 in the name of Alfred I. Bottner, and entitled "SIGNALLING DEVICE".

Figure 12:
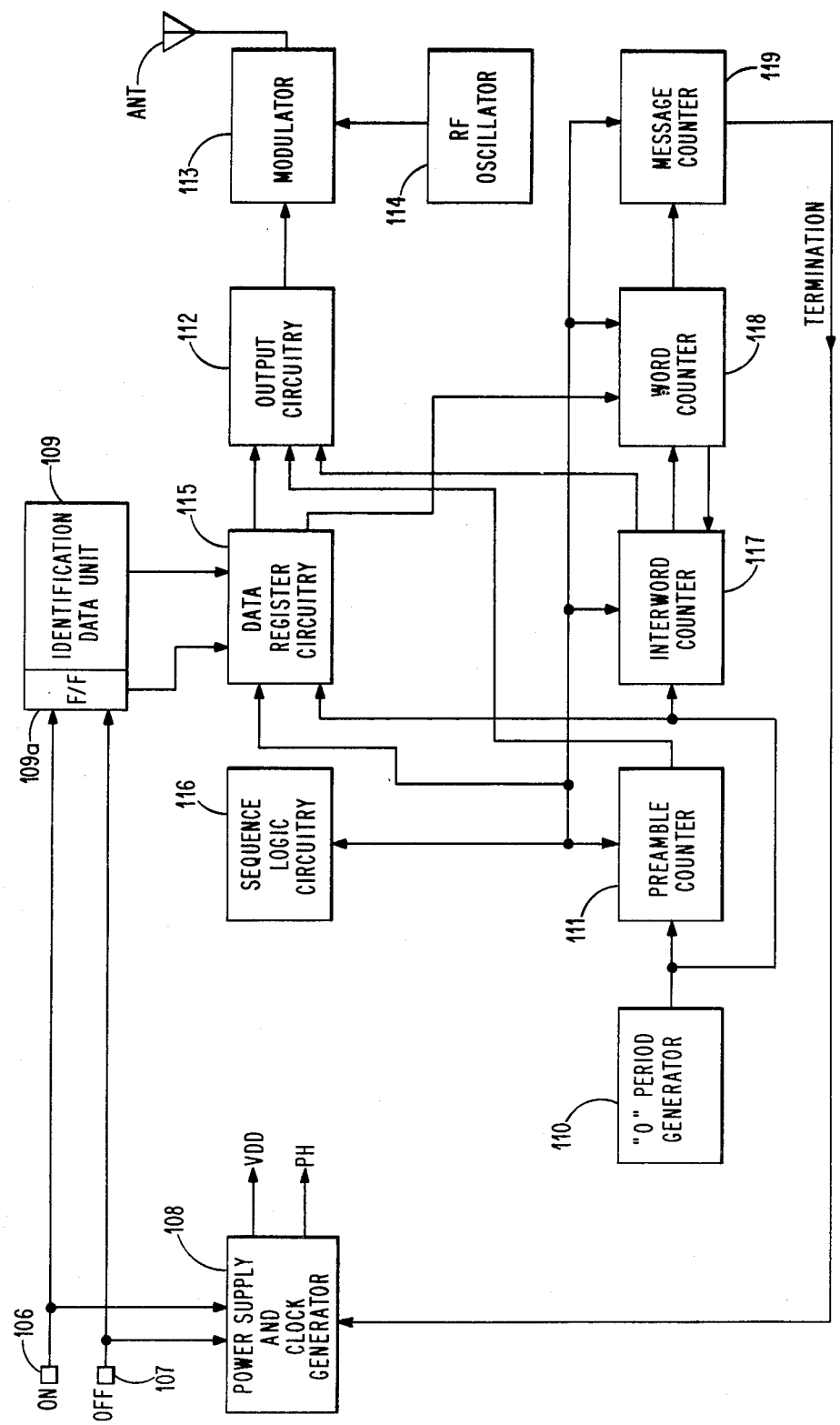
FIG. 12 is a schematic block diagram of an encoder and transmitter as employed in each of the ac line sensor, bathroom sensor, switch sensor and rf signalling device.

Encoder and Transmitter (FIG. 12)

A suitable implementation of the encoder and transmitter as employed in each of the ac line sensor 3, bathroom sensor 5, switch sensor 6 and rf signalling device 15 is shown in block diagram form in FIG. 12. The encoder and transmitter of FIG. 12 as employed in the present invention operates to send predetermined encoded messages by rf transmission in response to momentary electrical signals received at either of a pair of input terminals 106 and 107. The encoder and transmitter is in a standby mode until an input signal is received at one of the input terminals 106 and 107. In response to an input signal, a power supply section 108 of the encoder and transmitter provides operating potential, designated VDD, and clock pulses, designated PH, to the other elements of the encoder and transmitter as shown in FIG. 12. The encoder and transmitter sends either one of two possible messages, each for a total of six times within a one-second interval. The particular message depends upon which input terminal receives the input signal. By way of example, one of the messages may be sent in response to a lamp or television being turned "on", an rf signalling device 15 being actuated, or in response to a refrigerator door being opened, or an individual entering the bathroom, in which case a negative-going pulse appears at the input terminal 106. Similarly, the other message may be sent in response to the lamp or television being turned "off", or in response to the refrigerator door being closed, or an individual exiting from the bathroom, in which case a negative-going pulse appears at the input terminal 107. Each of the six messages is transmitted as a continuous wave rf signal at a frequency of 350 Megahertz which is digitally encoded by an NRZ (non-return-to-zero) code. With the NRZ code, logic 0's and logic 1's are not represented by voltage levels but by the duration or period between voltage transitions. With this code as employed in the specific embodiment under discussion, a logic "0", or short bit, is a pulse 1.85 milliseconds in duration and a logic "1" or long bit, is a pulse 5.55 milliseconds in duration, or three times the logic "0" bit. The rf signal is 100% amplitude modulated by the NRZ digital pulses. Upon completion of a transmission, the encoder and transmitter returns automatically to the standby mode, this latter event occurring upon receipt by the power supply section 108 of a TERMINATION signal.

Figure 13:
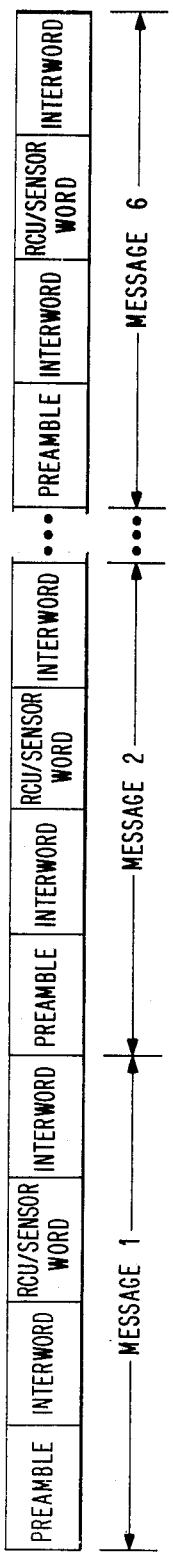
FIG. 13 illustrates a plurality of messages as produced by the encoder and transmitter shown in FIG. 12.

The format of a complete transmission cycle is illustrated in FIG. 13. As shown in FIG. 13, a message includes a preamble, an interword, an RCU/sensor word, and a second interword. This sequence is repeated for a total of six times, and then the encoder and transmitter turns off to revert to the standby state. The RCU/sensor word is a 16-bit word, including fourteen bits identifying the source of the transmission, that is, the remote control unit and the sensor initiating the transmission, an activity bit which indicates whether the input signal occurs at the terminal 106 or the terminal 107, and a 16th bit which is a parity bit. A typical message is illustrated in the voltage level diagram of FIG. 17. The first portion of the message is a preamble of 18 logic 0's as represented by voltage transitions every 1.85 milliseconds. The preamble is followed by an interword period which is equal to the duration of six logic 0's (11.1 milliseconds). The RC/sensor word then follows, with a spacing between transitions of 1.85 milliseconds representing a logic "0" and a spacing between transitions of 5.55 milliseconds representing a logic "1". A second interword having the same duration as six logic 0's (11.1 milliseconds) follows the RCU/sensor word.

The apparatus of FIG. 12 operates in the following manner to produce a complete six-message coded rf signal. The power supply and clock generator section 108 provides the VDD operating potential and clock pulses PH to all the elements of the apparatus as needed. An identification data unit 109 uniquely identifies the particular remote control unit and sensor which is the source of the transmission and includes an arrangement of 14 open connections and shorts to ground to represent a selected combination of 14 logic 1's and 0's. A 15th bit for the RCU/sensor word, representing an activity bit, is provided by a flip-flop 109a which is set in one logic state or the other depending upon whether the input signal appears at the input terminal 106 or the input terminal 107.

A "0" period generator 110, which is a divider, divides down the PH clock pulses and produces output pulses of 1.85 milliseconds duration, the basic short bit, or logic "0", pulse period. The output of the "0" period generator 110 is applied to a preamble counter 111 which counts and passes the pulses through to output circuitry 112. From the output circuitry 112 the pulses are applied to a modulator 113 where they 100% modulate the 350 MHz output of an rf oscillator 114. The higher voltage level causes the modulator 113 to pass the 350 Mhz carrier signal, and the lower voltage level causes the modulator 113 to block the carrier signal. The resulting continuous wave rf signal is transmitted by an antenna ANT. During the preamble period, the identification data unit 109 and the contents of the flip-flop 109a are loaded into data register circuitry 115.

Figure 17:
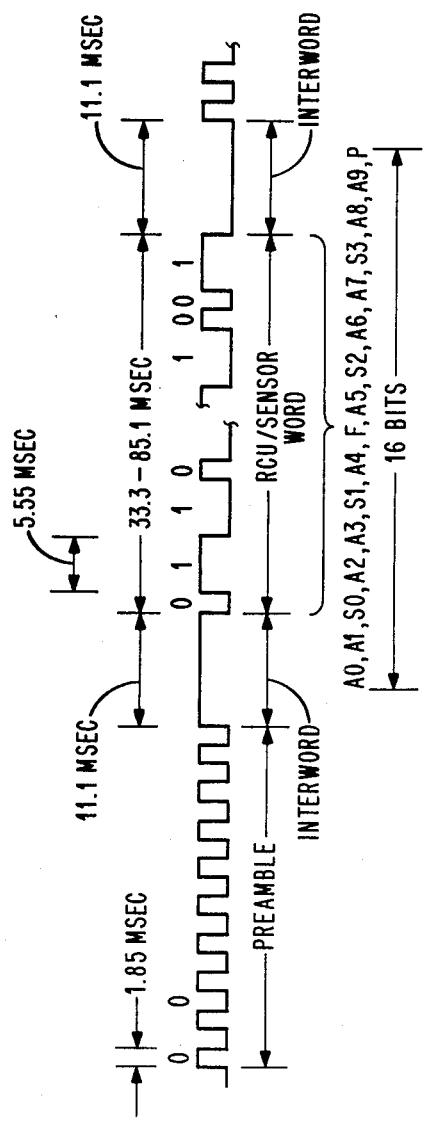
FIG. 17 illustrates the formatting of data in each of the messages as shown in FIG. 13.

When the preamble counter 111 has passed the 18 logic 0's of a preamble, it signals sequence logic circuitry 116 which then enables an interword counter 117. The interword counter 117 also receives pulses from the "0" period generator 110 and produces a steady output for a period of six logic 0's (11.1 milliseconds) as shown in the diagram of FIG. 17. This output is applied to the output circuitry 112 and then to the modulator 113.

After the interword counter 117 signals the end of the interword, the sequence logic circuitry 116 causes the data register circuitry 115 to read out the 15 bits of data stored therein to the output circuitry 112. The data stored in the data register circuitry 115 as logic 0's and 1's determine whether an output voltage transition occurs after one or three 1.85 millisecond pulses from the "0" period generator 110. The data register circuitry 115 includes a parity generator for adding an appropriate 16th parity bit to provide odd parity.

A word counter 118 counts the transitions as the 16 bit RCU/sensor word of a message is being transmitted. Upon detecting the end of the word, the word counter 118 produces an indication to a message counter 119 which stores a count. Signals from the word counter 118 to the sequence logic circuitry 116 and the interword counter 117 cause the interword counter 117 to generate a second interword equal to six logic 0's (11.1 milliseconds).

After the second interword has been produced, the sequence logic circuitry 116 causes the process to be repeated and another message identical to the first message and including a preamble, first interword, RCU/sensor word, and second interword, to be transmitted. At the end of the RCU/sensor word of each message a count is added to the count stored in the message counter 119. When the message counter 119 receives the sixth count indicating that the RCU/sensor word of the sixth message has been transmitted, it produces a logic "1" TERMINATION signal to the power supply and clock generator 108. As indicated hereinabove this signal causes the power supply and clock generator 108 to power down, terminating the VDD operating potential and also the clock signals PH to the various components of the apparatus thereby preventing any further rf transmission until another input signal is received at one of the input terminals 106 and 107.

A suitable implementation of the power supply and clock generator 108 which may be employed in the present invention is disclosed in detail, and claimed, in the aforementioned co-pending application Ser. No. 75,783, filed Sept. 17, 1979, in the names of Jeffrey R. Fox, Arthur Margolies and Rob Moolenbeek.

Figure 14:
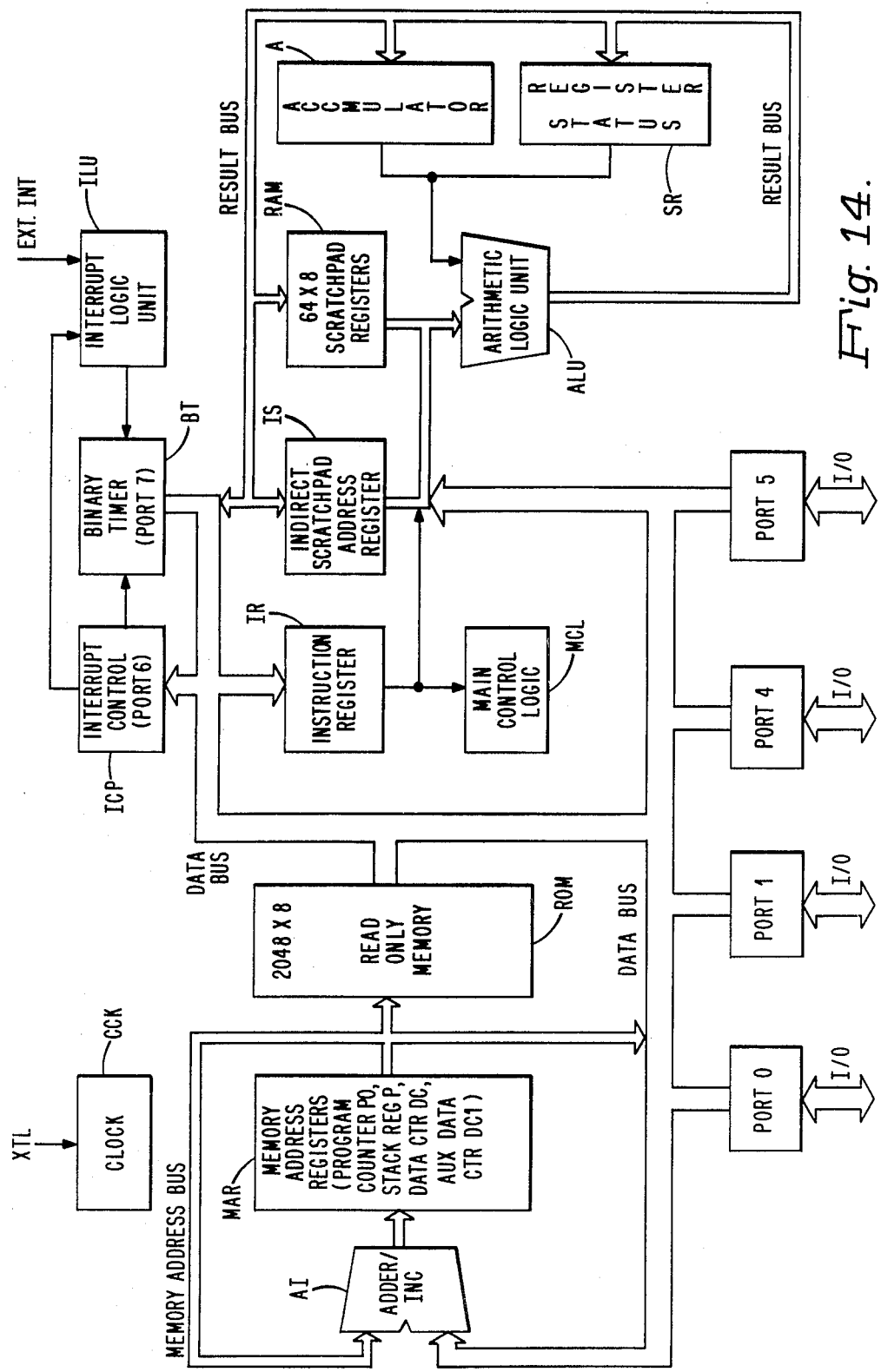
FIG. 14 is a schematic block diagram of a central processing unit employed in the remote control unit in accordance with the invention.

Central Processing Unit CPU—System Architecture (FIG. 14)

Referring now to FIG. 14, there is shown in block diagram form the central processing unit CPU in accordance with the present invention. The particular implementation of the central processing unit CPU as shown in FIG. 14, and which will be described herein to the extent necessary to understand and appreciate the invention, is a Mostek MK3870 single-chip 8-bit microprocessor. This particular microprocessor is capable of executing an instruction set of more than 70 commands, and features 2048 bytes of read only memory (ROM), 64 bytes of scratchpad random access memory (RAM), a programmable binary timer, 32 bits (4 ports) of I/O (Input/Output), and a single +5 volt ($+V_{CC}$) power supply requirement.

The central processing unit CPU, once programmed, functions as a custom microcontroller with its operational characteristics determined only by its hardware specifications and internal firmware (program stored in ROM). For purposes of the present invention, the central processing unit CPU is programmed to perform the following general functions:

a. Maintain timekeeping functions, i.e., activity timer AT, self-check timer SCT, pre-alarm time, etc;

b. Store timing data received from the centralized communications center CCC, allowing all timers (activity timer AT, self-check timer SCT, pre-alarm time, etc.) to be remotely programmable;

c. Process coded signals from the sensors S and the portable signalling devices 15;

d. Accumulate activity data from each sensor S and the rf signalling devices 15;

e. Determine an alarm condition;

f. Function as a self-contained modem in data communication with the centralized communications center CCC;

g. Perform a self-check operation with the centralized communications center CCC, transmitting a tally of all sensor activity data; and h. Perform dialing operations.

The central processing unit CPU as shown in FIG. 14 is controlled to perform the abovementioned operations by means of operation codes (OP codes) stored in firmware in a program read only memory ROM (2048×8). The read only memory ROM represents the main memory for the central processing unit CPU. An instruction register IR receives each OP code of an instruction to be executed from the program read only memory ROM via a data bus. During all OP code fetches, eight bits are latched into the instruction register IR. Once latched into the instruction register IR, a main control logic unit MCL denotes the instruction and provides the necessary control gating signals to all circuit elements. The program read only memory ROM operates in conjunction with four 11-bit memory address registers MAR, including a program counter PO, a stack register P, a data counter DC and an auxiliary data counter DC1. The program counter PO is used to address instructions or immediate operands. The stack register P is used to save the contents of the program counter PO during an interrupt or subroutine call. Thus, the stack register P contains the return address at which processing is to resume upon completion of the subroutine or the interrupt subroutine.

The central processing unit CPU also includes an adder/incrementer logic unit AI which operates in conjunction with the memory address registers MAR. This logic unit is used to increment the program counter PO or the data counter DC when required and is also used to add displacements to the program counter PO on relative branches or to add data bus contents to the data counter DC for certain instructions.

The microprocessor program and data constants for the central processing unit CPU are stored in the program read only memory ROM. When access to this memory is required, the appropriate address register (program counter PO or data counter DC) is gated onto a memory address bus, and the output of the memory is gated onto the main data bus. The first byte in the programmable read only memory ROM is location zero. Additional memory is provided in the central processing unit CPU in the form of 64 8-bit scratchpad registers RAM which may be used as general purpose random access memory. These 64 scratchpad registers are addressed by a 6-bit indirect scratchpad address register IS.

Arithmetic or logic operations are performed in the central processing unit CPU by means of an arithmetic and logic unit ALU. The arithmetic and logic unit ALU receives commands from the main control logic unit MCL and, after performing the required arithmetic or logic operations, provides the result on a result bus. The arithmetic operations that can be performed in the arithmetic and logic unit ALU are binary add, decimal adjust, add with carry, decrement and increment. The logic operations that can be performed are AND, OR, EXCLUSIVE/OR, 1's complement, shift right, and shift left. Besides providing the result on the result bus, the arithmetic and logic unit ALU also provides four signals representing the status of the result. These signals, which are stored in a status register SR, represent CARRY, OVERFLOW, SIGN, and ZERO conditions of the result of the operation.

The principal register for data manipulation within the central processing unit CPU is an accumulator A. The accumulator A serves as one input to the arithmetic and logic unit ALU for arithmetic or logical operations. The results of operations performed by the arithmetic and logic unit ALU are stored in the accumulator A.

Inputting and outputting of data from the central processing unit CPU is by way of four bidirectional I/O (Input/Output) ports. These are ports 0, 1, 4, and 5. In addition, there is an interrupt control port ICP which is addressed as port 6, and a binary timer BT addressed as port 7. An output instruction causes the contents of the accumulator A to be latched into the addressed port. An input instruction transfers the contents of a port to the accumulator A. All data transfers between the accumulator A and the I/O ports are 1's complemented. The abovementioned interrupt control port ICP is implemented by an 8-bit register and the binary timer BT is implemented by an 8-bit binary down counter which is software programmable. The interrupt control 8-bit register and the binary timer BT operate in conjunction with an interrupt logic unit ILU during external interrupt operations. Central timing for the central processing unit CPU is achieved by means of a crystal controlled central clock CCK.

Figure 15:
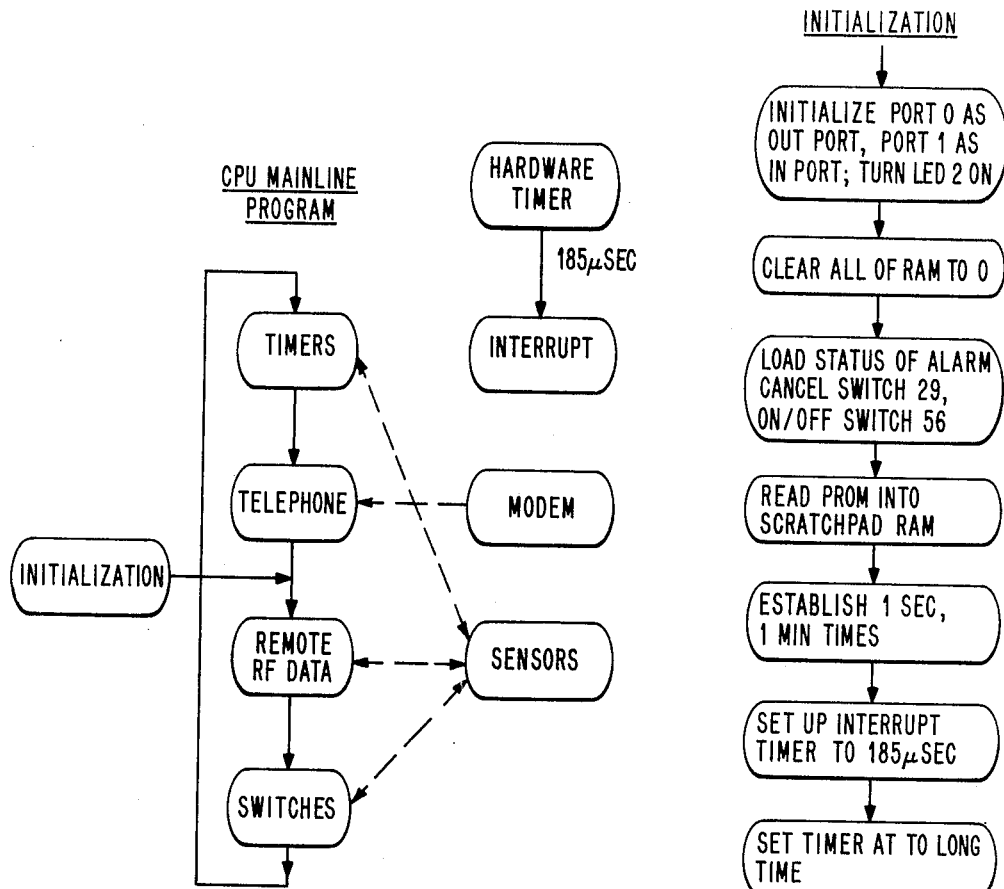

Central Processing Unit—Program (FIG. 15)

The program for the central processing unit CPU of FIG. 14 is shown in a general, simplified flowchart form in FIG. 15. The program as shown in FIG. 15 generally comprises eight routines and subroutines which are executed at various times and in response to various events during the normal operation of the monitoring and signalling system 1 of the invention. Four of the eight routines, designated in FIG. 15 as TIMERS, TELEPHONE, REMOTE RF DATA, and SWITCHES, collectively represent a principal part of the program, referred to as the mainline program, and are executed repeatedly in a continuous loop. These four routines also interact at different times with subroutines as shown in FIG. 15 and designated MODEM, SENSORS and INTERRUPT. There is also an INITIALIZATION routine which is employed to initialize the system during powering-up, that is, prior to jumping into the principal loop of the mainline program, specifically, via the REMOTE RF DATA routine.

The TIMERS routine of the mainline program is employed to maintain the various timers utilized in the system. Although there are many timers used in the system (e.g., "seconds" and "minutes" timers), as will be readily apparent hereinafter, the principal timers are the activity timer AT (8-10 hour normal cycle and 1-2 hour bathroom cycle) and the self-check timer SCT. Both of these timers are decremented once per minute. The activity timer AT is loaded with a count corresponding to a particular time cycle at each occurrence of an activity monitored by one of the sensors S. When such an activity occurs, the SENSORS subroutine is executed. This subroutine determines what count to load into the activity timer AT, that is, a count corresponding to an 8-10 hour period (for an activity monitored by an ac line sensor 3, switch sensor 6 or the telephone TL) or a count corresponding to a 1-2 hour period (for an activity monitored by a bathroom sensor 5). As previously discussed, the timing out or elapsing of the time maintained by the activity timer AT will cause a pre-alarm cycle to be initiated which, if not aborted, will lead to an actual alarm cycle during which an alarm message is transmitted between the remote control unit RCU and the centralized communications center CCC and followed by a timing control message (see FIG. 3). The light emitting diode LED1 and the audible alarm unit 27 are also energized to their "on" states during the alarm sequence (continuously during the pre-alarm cycle and then intermittently during the actual alarm cycle).

The self-check timer SCT is initially loaded with a count corresponding to a particular time as initially derived from the system identification number and thereafter by a count from the centralized communications center CCC (in a timing control message generated by the centralized communications center CCC). As previously discussed, the timing out of the self-check timer SCT will, subject to certain pre-conditions, initiate a self-check operation during which a self-check message is transmitted between the remote control unit RCU and the centralized communications center CCC and followed by a timing control message (see FIG. 5). The TIMERS routine as discussed above is also used in connection with the SENSORS subroutine to establish a time period (e.g., 2 secs) coinciding with a powering-up period following a power failure during which any coded rf signals produced by the sensors S are ignored, or rejected, by the remote control unit RCU.

Communication with the centralized communications center CCC, for transmitting mutual, bidirectional messages between the remote control unit RCU and the centralized communications center CCC, are handled by the TELEPHONE routine. The TELEPHONE routine is an executive type of program in that it directs other routines (in particular the INTERRUPT and MODEM subroutines) to accomplish its tasks. These tasks include managing dialing operations and the data transmission protocol employed by the remote control unit RCU and the centralized communications center CCC. The MODEM subroutine actually performs the operations of phase-reversal encoding a 900 hertz tone to generate data in alarm and self-check messages to be transmitted to the centralized communications center CCC and decoding 900 hertz phase-reversal data in timing control messages as received from the centralized communications center CCC.

The REMOTE RF DATA routine is utilized in connection with data receiver over the rf transmission link from the sensors S and the portable signalling devices 15. This routine examines the several (e.g., six) messages of each coded signal as to various criteria (word lengths, presence of noise or "glitches", system and sensor identification numbers, parity, etc.) and either accepts or rejects the signal based on its satisfaction of these criteria. This routine also utilizes timing interval information, for example, a 1½–2 second interval, during which a pair of consecutive messages of a coded signal must be accepted (by satisfying the above criteria) before further processing is permitted to take place.

The SENSORS subroutine, in addition to its purpose and use as discussed hereinabove, also is utilized in performing operations such as updating sensor activity information within the remote control unit RCU, and changing the remote control unit RCU from a vacant status to a non-vacant status, for example, in response to one of the sensors S or the telephone TL operating to monitor an associated activity following the placing of the remote control unit RCU in its vacant status.

The SWITCHES routine of the mainline program of the central processing unit CPU is utilized in the monitoring of the "on"/"off" states of the alarm cancel switch 29 and the on/off switch 56. As previously discussed, actuation of the alarm cancel switch 29 to its "off" position has the effect of resetting the activity timer AT and of turning off the light emitting diode LED1 and the audible alarm unit 27, and the actuation of the on/off switch 56 to its "off" position has the effect of freezing or suspending the decrementing of the activity timer AT and of turning off the light emitting diode LED2.

Certain of the operations performed by the routines discussed hereinabove, more particularly, by the MODEM subroutine and the REMOTE RF DATA routine, are of a time critical nature. By way of example, the processing of alarm and self-check messages in the transmit and receive modes of operation of the MODEM subroutine and the processing of coded signals by the REMOTE RF DATA routine require precise, critically-timed operations and sequences. A suitable basic unit of time for each of the above operations is, as will be discussed more fully hereinafter, 185 microseconds. In order to execute the above operations, the mainline program of the central processing unit CPU is interrupted once every 185 microseconds. The 185 microsecond interval is achieved in an INTERRUPT subroutine in a hardware fashion, specifically, by a hardware timer (e.g., crystal controlled oscillator) of the central processing unit CPU. The execution of the INTERRUPT subroutine allows the time-critical operations of the MODEM subroutine and the REMOTE RF DATA routine to be performed during the INTERRUPT subroutines, while the less time-critical or non-time-critical operations are performed during the mainline program. The INTERRUPT subroutine has a typical execution time of 92.5 microseconds, thereby leaving the remaining 92.5 microseconds for the mainline program to execute. A single pass or loop of the mainline program takes no more than 23 milliseconds (worse case situation).

Figure 16:
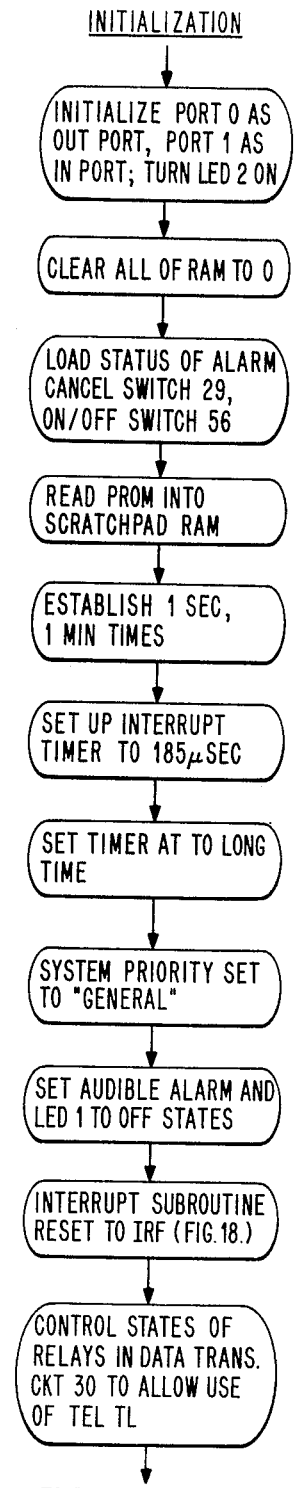

Before the central processing unit CPU is able to perform its required operations utilizing the various routines and subroutines shown in FIG. 15, it is first necessary that the central processing unit CPU be initialized. This initialization takes place during initial powering up and is accomplished by use of an INITIALIZATION routine. The INITIALIZATION routine is shown in detail in a flowchart form in FIG. 16. As indicated in FIG. 16, the following initialization operations are performed in sequence:

(a) Ports 0 and 1 of the central processing unit CPU are selected as output and input ports, respectively, and established at logic levels to cause the on/off (vacant) light emitting diode LED2 to be turned on to indicate that the system is active;

(b) The scratchpad registers of the random access memory RAM are cleared, or reset, to zero;

(c) The initial status or states of the alarm cancel switch 29 and the on/off (vacant) switch 56 are sampled at bit positions 0 and 1, respectively, of port 1 of the central processing unit CPU and loaded within a corresponding scratchpad register of the central processing unit CPU;

(d) The programmable read only memory 20 (PROM) is addressed at bit positions 0–7 of port 4 and the data stored therein is applied to bit positions 0–3 of port 5 of the central processing unit CPU and stored in associated scratchpad registers. The data includes default (initial) times for the activity timer AT (e.g., 1–2 hour bathroom cycle and 8–10 hour normal cycle); default (initial) pre-alarm cycle time (e.g., 1 minute); identification number information for use in the first, or initial, self-check operation; and flag information (e.g., a single bit) specifying whether the portable rf signalling devices 15 are to have a pre-alarm cycle assigned thereto;

(e) One-second and one-minute timer scratchpad registers in the central processing unit CPU are initialized to indicate times of one second and one minute (for use in register decrementing operations);

(f) An interrupt timer port 7 of the central processing unit CPU is initialized to 185 microseconds (for use in subsequent INTERRUPT subroutine operations);

(g) The activity timer AT is set to its normal, long time cycle (e.g., 8–10 hours);

(h) A system priority scratchpad register in the central processing unit CPU is set to a value of 4 corresponding to a "general" priority level;

(i) The audible alarm unit 27 and the light emitting diode LED1 are set to "off" states via bit position 5 of port 0 of the central processing unit CPU;

(j) The INTERRUPT subroutine is reset to an interrupt operation IRF in readiness to process coded rf signals produced by the sensors S and/or a portable rf signalling device 15; and (k) The data transmission circuit 30 is reset via bit positions 0 and 1 of port 0 of the central processing unit CPU to establish relays in the circuit 30 at states for permitting an individual to make normal use of the telephone TL.

Processing of Coded RF Signals (FIGS. 13 and 17-19)

Each coded signal as produced at the output of the rf receiver 9, in an NRZ (non-return to zero) coded format as previously discussed, is examined within the central processing unit CPU as to several timing and formatting criteria. These criteria include the examination of the signal as to pulse widths, the presence of noise (e.g., "glitches"), word times, the order or sequence of data within messages of the signal, parity (odd), the origin of the signal (that is, whether the signal originated with the system under discussion as opposed to some other system), and the identity of the sensor in the system which initiated transmission of the signal. The general nature and format of a typical coded signal as produced at the output of the rf receiver 9 and examined by the central processing unit CPU is shown in FIG. 13. As shown in FIG. 13, and as previously briefly described, the coded signal includes six successive identical messages each comprising, in succession, a preamble, an interword, an RCU/sensor word, and a second interword. FIG. 17 illustrates the format of each message. The preamble of each message comprises 18 logic "0" bits (NRZ), each having a duration or pulse width of 1.85 msec, and is used in conjunction with the preambles of the other messages to separate the several messages from each other. The interwords of each message, by virtue of appearing before and after the RCU/sensor word, serve to frame the RCU/sensor word within the message. Each interword has a duration or pulse width equal to the duration of six logic 0's or 11.1 msec. The RCU/sensor word comprises 10 address bits A0-A9, 4 function bits S0-S3, a single activity bit F, and an odd parity bit P, the latter bits (sixteen) being in the particular sequence indicated in FIG. 17. The RCU/sensor word, represented by a combination of sixteen binary "0" and "1" bits, has an overall duration of between 33.3 msec (minimum) and 85.1 msec (maximum). A logic "1" bit has a duration or pulse width of 3 times a logic "0" bit, or 5.55 msec.

The address bits A0-A9 serve to identify the remote control unit RCU from which the coded rf signal originates. The ten address bits accordingly are adequate to provide identification numbers for up to 1024($2^{10}$) different remote control units. The function bits S0-S3 serve to identify the particular sensor S or the portable signalling device 15 which caused the transmission of the coded rf signal. The four function bits S0-S3 accordingly are adequate to identify and to distinguish between up to sixteen ($2^4$) sensors S and signalling devices 15. The activity bit F is used in conjunction with the various sensors S and has a logic value ("1" or "0") for indicating a first or second condition, such as an occupied or vacant condition of a bathroom, a lamp or television being "on" or "off", etc. The parity bit P has a logic "1" or logic "0" value and is selected in light of the logic values of the other bits in the RCU/sensor word to achieve an overall odd parity for the word.

In the processing of the abovedescribed coded signal within the central processing unit CPU, the signal is repetitively sampled during successive interrupt subroutines, that is, every 185 microseconds, and successive samples compared to detect transitions in the level of the signal. The number of samples between successive transitions are counted to determine the nature of the pulse occurring between the transitions, that is, whether the pulse represents a logic "1", a logic "0", an interword, or a glitch or other pulse of impermissible or invalid width. For purposes of the present invention, a logic "0" is represented by a sampling count (minimum/maximum) of 8-12, a logic "1" is represented by a sampling count of 24-36, an interword is represented by a sampling count of 48-72, and a glitch is represented by a sampling count of 0-4. The processing of the coded signal is such that any glitch represented by a count of 0-4 is ignored, that is, it is treated as though it never occurred. Each preamble is similarly ignored. In addition, any interword not preceded by a 16-bit word (e.g., an RCU/sensor word) will lead to the rejection of the interword and, in the case of a second interword, the rejection of the message within which the interword appeared. Any pulse which has an impermissible or invalid width, that is, a width between a logic "0" and a logic "1" or a width between a logic "1" and an interword, will also lead to the rejection of the message within which the pulse appeared.

Once a message has been tested as to the above criteria and found to satisfy these criteria, the message is then examined to determine whether it satisfies the odd parity requirements and also to determine its origin, that is, whether the message originated with the system under discussion or from some other system (e.g., a system in an adjoining or proximate home, apartment, etc.). If the message satisfies the parity (odd parity) requirements and, in addition, the message originated with the system under discussion, the next succeeding message is then examined to determine whether it satisfies all of the foregoing criteria within a predetermined time period following the preceding message, for example 1½ seconds (avg.) (or about 2 seconds from the beginning of the first message). If the second message also satisfies all of the criteria for a valid message within the 1½ second interval following the first message, both messages are accepted and the second message is then examined further to extract from the RCU/sensor word thereof the identity of the sensor S or the portable signalling device 15 which caused the transmission of the coded rf signal. If the second message does not satisfy all of the criteria for a valid message or it does not fall within the 1½ second interval following the first message, a new effort commences to acquire the necessary pair of successive valid messages.

Figure 18:
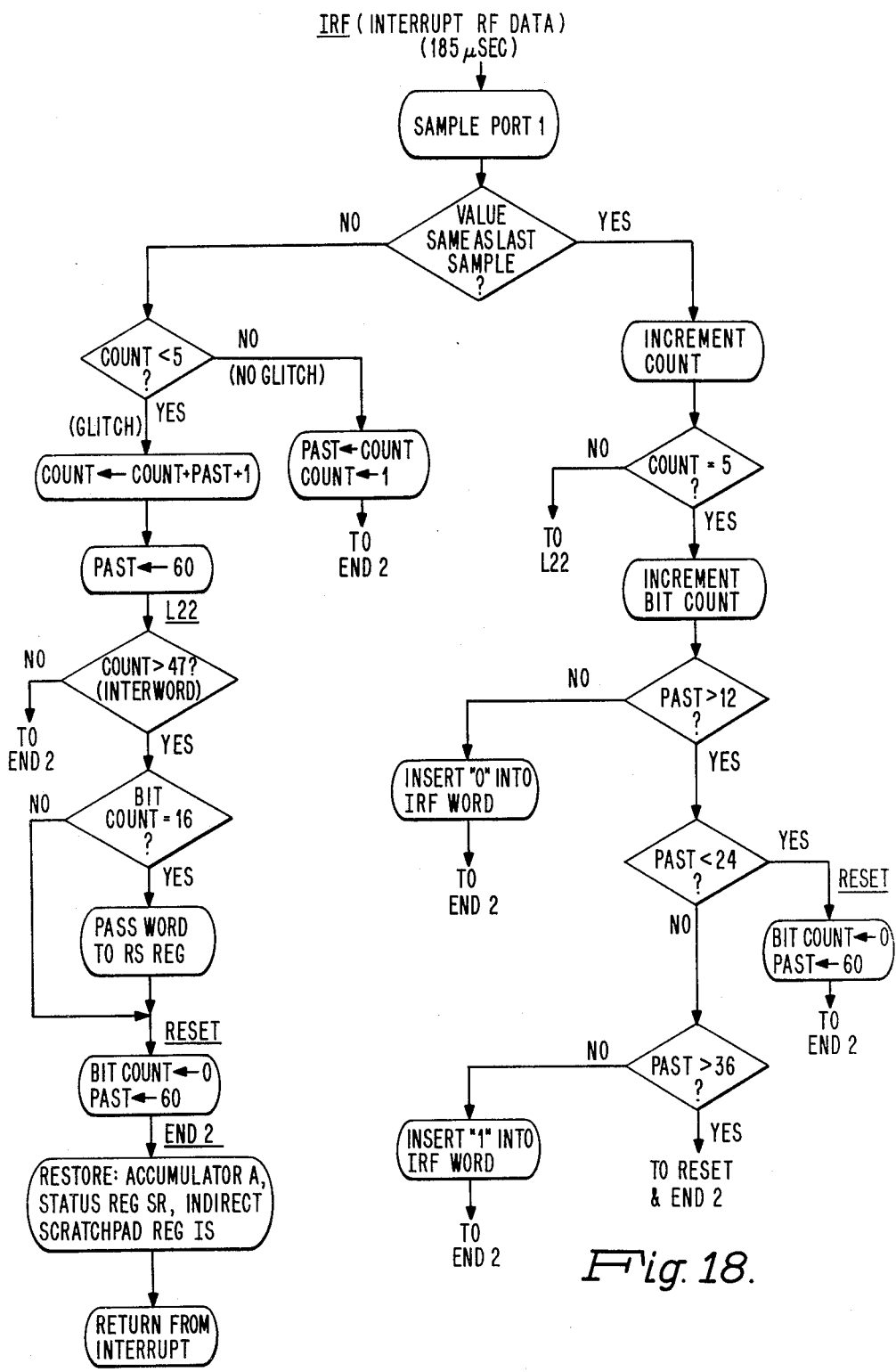

The manner in which the abovedescribed processing of a coded signal is achieved by the central processing unit CPU can be more fully appreciated by reference to the flowchart diagram of FIG. 18. During each INTERRUPT subroutine, that is, every 185 microseconds, an interrupt operation IRF is executed. This operation commences as indicated in FIG. 18 with the inputting, or sampling, of the data (coded signal) present at port 1 of the central processing unit CPU. The eight bits from this inputting operation are applied to the accumulator A and masking information as derived from the read only memory ROM, specifically, a hex 20, is then applied to the arithmetic logic unit ALU and serves to mask all of the bits of the eight-bit word except bit b5. The logic value of this bit is then placed in the accumulator A and represents a present sample. This sample is then compared in the arithmetic logic unit ALU, specifically, by an EXCLUSIVE/OR operation, with the previous sample as stored in a PREVIOUS INPUT scratchpad register (initially at a logic "0" level). The sample is then stored in the PREVIOUS INPUT scatchpad register to be used for comparison purposes during the next sampling operation.

As successive sampling operations take place, each sample is compared with the previous sample to determine if a change has occurred in the values of the two samples. In the event a particular sample has the same value as the previous sample, this condition indicates that a transition has not occurred in the coded signal and a COUNT scratchpad register used to retain the count for the pulse presently being sampled is caused to be incremented to register the occurrence of the sample. In the event a given sample has a value different from the previous sample, this condition indicates that a transition has occurred in the coded signal, and the COUNT register is then examined to determine if the count therein corresponds to a glitch which has an associated count of 0–4. This latter determination is accomplished by comparing the count in the COUNT register with a value of 5 as derived from the read only memory ROM. If the count in the COUNT register is less than 5, that is, 0 to 4, this count corresponds to a glitch and is processed so as to effectively ignore or reject the glitch from the pulse in which it appeared. This rejection is accomplished by summing together the count in the COUNT register, representing the existing count for the pulse being sampled, a count of 1 representing the present sample, and the existing count in a PAST scratchpad register used to store the count for the previous pulse. The total count is then returned to the COUNT register to represent the new present count for the pulse being sampled and in which the glitch appeared. The above summation operation is performed using the accumulator A and the arithmetic logic unit ALU, and the count of 1 used in the summation operation is derived from the read only memory ROM. It is to be noted that in the case of the first, or initial, transition in the coded signal, the count established in the COUNT register is clearly less than 5, and, since the COUNT and PAST registers contain initial counts of 0 (due to initialization operations), the count established in the COUNT register as a result of the above summation operation has a value of $1(0+0+1=1)$.

Once the result of the above summation operation has been transferred to the COUNT register, a count of 60, representing a suitable value for use in subsequent operations, is derived from the read only memory ROM and placed into the PAST register. The program then proceeds to a point L22, to be discussed in detail hereinafter, for determining whether the pulse being sampled and in which the glitch appeared is an interword and, if so, if it is the second interword in the message following a 16-bit word (e.g., RCU/sensor word).

In the event the count in the COUNT register as discussed hereinabove is not less than 5, that is, 5 or greater, this condition indicates that the pulse being sampled and in which a transition has occurred is not a glitch, and the count in the COUNT register is transferred to the PAST register to represent the count for the pulse just sampled. A count of 1 as derived from the read only memory ROM is then placed into the COUNT register to register the occurrence of the present sample. The program then proceeds to a point END2 in the program which, as will be discussed more fully hereinafter, represents a return to the point in the mainline program at which the interrupt subroutine commenced.

As mentioned hereinabove, whenever a pair of successive samples have the same value, the COUNT register is caused to be incremented. After each incrementing of the COUNT register, the count in this register is examined to determine whether it corresponds to a pulse having a width greater than a glitch, that is, a value equal to 5. This latter operation is accomplished by comparing the count in the COUNT register with a count of 5 as derived from the read only memory ROM. In the event the count in the COUNT register is not equal to 5, and in the absence of a transition in the coded rf signal, the program proceeds to the aforementioned point L22. As previously mentioned, at the point L22 a determination is made as to whether the pulse being sampled is an interword and, if so, if it is the second interword following a 16-bit word (RCU/sensor word). In the event the count in the COUNT register is equal to 5, a BIT COUNT scratchpad register used to count the number of bits or pulses sampled, and initially cleared during initialization operations, is caused to be incremented.

At each incrementing of the BIT COUNT register, the previous pulse is further tested to determine whether it represented a logic "1", a logic "0" or a pulse of illegal or impermissible width, for example, between a logic "1" and a logic "0" or between a logic "1" and an interword. More particularly, at each incrementing of the BIT COUNT register, the count in the PAST register corresponding to the previous pulse is examined to determine whether it had a value representing a logic "1", a logic "0", or a pulse of illegal or impermissible width (e.g., between a logic "0" and a logic "1" or between a logic "1" and an interword). The count in the PAST register is first compared with a count of 12 as derived from the read only memory ROM which corresponds to the maximum width of a logic "0" pulse. If the count in the COUNT register is less than or equal to 12, the pulse to which the count in the COUNT register corresponds is taken as a logic "0", and a logic "0" is inserted into and stored in a IRF scratchpad register for possible future use in the event the coded signal satisfies all of the pulse width criteria of the system. The program then proceeds to the point END2 in the program for returning to the point in the mainline program at which the interrupt subroutine commenced.

In the event the count in the PAST register as mentioned above is greater than 12, this condition indicates that the count in the PAST register does not correspond to a logic "0", that is, the count corresponds to a logic "1" or a pulse of illegal or impermissible width, and the count in the PAST register is then compared with a count of 24 as derived from the read only memory ROM corresponding to the minimum width of a logic "1". If the count in the PAST register is less than 24 (but greater than 12), this result indicates that the count corresponds to a pulse of illegal or impermissible width, that is, between a logic "1" and a logic "0", and the subroutine proceeds to a point RESET in the program for effectively rejecting the pulse of illegal or impermissible width and initiating a new sequence of sampling operations. As indicated in FIG. 18, at the RESET point in the program, the BIT COUNT register is reset to 0 and the PAST register is set to some suitable count, for example, a count of 60. The program then proceeds to the point END2 in the program for returning of the point in the mainline program at which the interrupt subroutine commenced. In the event the count in the PAST register as discussed hereinabove is greater than 24, this result indicates that the count corresponds to either a logic "1" or a pulse of illegal or impermissible width, that is, between a logic "1" and an interword, and the count in the PAST register is then compared with a count of 36 as derived from the read only memory ROM corresponding to the maximum width of a logic "1" pulse. In the event the count in the PAST register is less than or equal to 36 (but greater than 24), the pulse to which the count corresponds is taken as a logic "1", and a logic "1" is inserted into and stored in the IRF register. The routine then proceeds to the point END2 for returning to the point in the mainline program at which the interrupt subroutine commenced. In the event the count in the PAST register is greater than 36, this result indicates that the count corresponds to a pulse of illegal or impermissible width (that is, between a logic "1" and an interword), and the routine proceeds to the RESET and END2 points in the program.

As described previously, any glitch present in the coded signal and defined to have a corresponding count of 0-4 is caused to be ignored during processing of the signal. In addition, any interword which is not preceded by a 16-bit word will lead to rejection of the interword and, in the case of a second interword of a message, the rejection of the message in which the interword appears. Similarly, a preamble in a message will also be rejected. The manner in which the above interword and preamble rejection operations are performed will now be described.

At such time as the program shown in FIG. 18 reaches the point L22, that is, after either rejecting a glitch or when processing a pulse which is of a width greater than a glitch, the count in the COUNT register is examined to determine whether it corresponds to an interword. This latter operation is performed by comparing the count in the COUNT register with a count of 47 as derived from the read only memory ROM. If the count in the COUNT register has a value less than or equal to 47, this result indicates that the count does not correspond to an interword, and the program proceeds to the point END2 for returning to the point in the mainline program at which the interrupt subroutine commenced. If the count in the COUNT register is greater than 47, this result indicates that the count corresponds to an interword, and the BIT COUNT register is then examined to determine if it contains a count of 16. This count corresponds to the number of bits in the RCU/sensor word which the second interword in a message is required to follow. In the event the BIT COUNT register does not have a count of 16 therein, this condition indicates that the interword is either the first interword of a message preceded by a preamble not having exactly 16 "0" bits, or the interword is the second interword of the message preceded by fewer than the required number (16) of RCU/sensor bits. In either situation, the routine proceeds to the RESET and END2 points in the program and thereby rejects the interword. In the event the BIT COUNT register has a count of 16 therein, this condition indicates that the interword is either the first interword of a message preceded by 16 "0" bits of the preamble, or the interword is the second interword of the message preceded by the required 16 bits of an RCU/sensor word. In the former situation, the 16 "0" bits of the preamble are caused to be later rejected, as will be described hereinafter. In each of the above situations, the 16 bits of the word (preamble or RCU/sensor word) present in the IRF register are caused to be transferred to a RS scratchpad register for use in the REMOTE RF DATA routine (see FIG. 19). Following the transfer of the data to the RS register, the routine proceeds to the RESET and END2 points in the program. As indicated in FIG. 18, in the RESET operation, the BIT COUNT register is reset to 0 and a count of 60 from the read only memory ROM is placed in the PAST register. Following the RESET operation, that is, in the END2 operation, the accumulator A, the status register SR, and the indirect scratchpad register IS are restored to their respective values as of the time of the commencement of the interrupt subroutine. These values were caused to be stored in a scratchpad register upon commencement of the interrupt subroutine.

Upon transfer of the 16-bit word from the IRF register to the RS scratchpad register, the word is examined to determine if it is a valid RCU/sensor word, that is, its parity is correct and it contains the proper identification number information of the present system as opposed to some other system (such as a system in an adjacent or proximate home, apartment, etc.). In addition, once a first such word in the RS scratchpad register is accepted as valid, the next 16-bit word in the RS scratchpad register is examined to determine if it is also valid and, if so, whether its acceptance occurs within a predetermined time interval, for example, 1½ seconds, of the acceptance of the first 16-bit RCU/sensor word. If the RCU/sensor words of two successive messages out of six satisfy all of the criteria for valid messages, the RCU/sensor word of the second message is then processed to extract the sensor identification number information (bits S0-S3) and the activity information (bit F) of use by the SENSORS subroutine (FIGS. 20 and 22-24). The above operations are performed by the central processing unit CPU during the mainline program, specifically, the REMOTE RF DATA routine, and will now be described in connection with FIG. 10.

Figure 19:
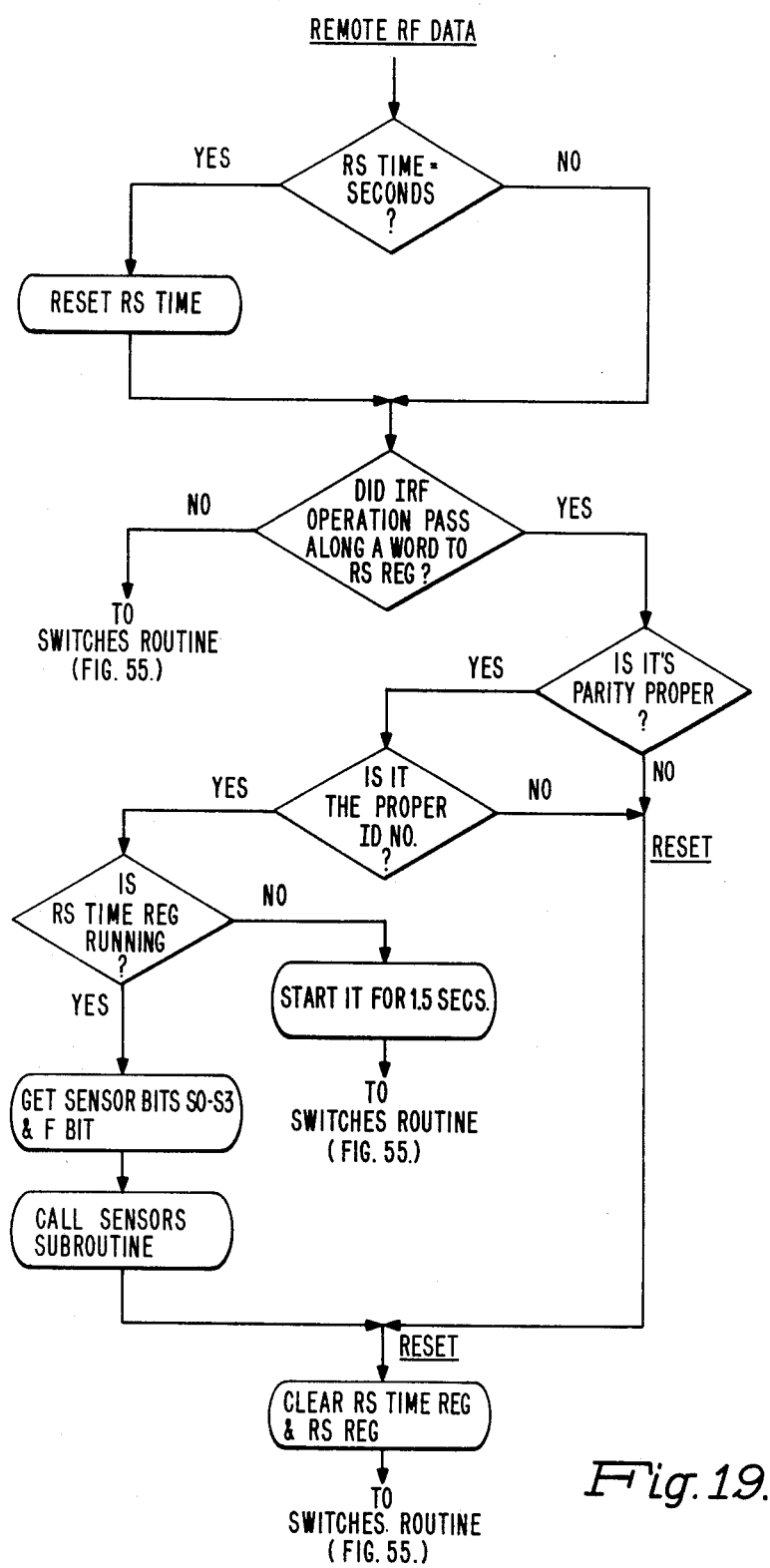

The REMOTE RF DATA routine as shown in FIG. 19 is executed upon the placement and acceptance of a 16-bit RCU/sensor word in the RS register. This routine utilizes a pair of scratchpad registers, designated RS TIMER and SECONDS, which are controlled as will now be described to establish timing operations and periods for use in testing the 16-bit words of a pair of successive messages as mentioned hereinabove. The SECONDS register is set to a count of 60, as derived from the read only memory ROM, and caused to be decremented at intervals of one second to a count of 1. The RS TIME register is initially set to a count of 0. As indicated in FIG. 19, when the counts of the two registers are different, as determined by comparing the counts of the two registers, the routine proceeds to examine the contents of the RS scratchpad register to determine if a word was placed therein during the aforedescribed IRF interrupt operation. The RS register is considered to store a 16-bit word if it contains information other than all 0's. If the RS register contains a 16-bit word (e.g, bits are other than all 0's), the information in the RS register is then examined to determine if it satisfies the parity (odd) requirements of the system. If the RS register contains all 0's corresponding to a reset condition, this condition indicates that either no word was placed in the RS register during the IRF interrupt operation or 16 bits of a preamble were placed in the RS register, and the routine continues in the mainline program to execute the SWITCHES routine. In the latter instance where the 16 bits in the RS register were derived from a preamble, the above action results in rejection of the preamble.

In order to determine whether the data in the RS register satisfies the system parity requirements, a "parity routine" is executed within the REMOTE RF DATA routine of FIG. 19. A series of logic 0's are initially placed in a PARITY scratchpad register. The RS register is then examined on a bit by bit basis. The first time a logic "1" is found in the RS register, the 0's in the PARITY register are changed to all 1's. The next time a logic "1" is found in the RS register, the 1's in the PARITY register are all changed back to 0's. This bit-reversing process continues until all of the bits in the RS register have been examined. At this time, the PARITY register should have all 1's in order to satisfy the system parity (odd) requirements. If the data in the RS register satisfies the parity requirements, the data is then examined to determine if it contains the identification number information of the present system as opposed to some other system. If the parity of the data in the RS register is not correct, as determined by the above-described "parity routine", the routine proceeds to a point RESET. At this point, the RS TIME and the RS register are reset, whereupon the routine proceeds to the SWITCHES routine in the mainline program.

The determination of whether the identification number information of the data in the RS register is proper is determined by addressing the aforedescribed programmable read only memory 20 at bit positions 0–7 of port 4 and receiving the requested identification number information at bit positions 0–3 of port 5. This identification number information has the pattern of bits A0–A9 as shown in FIG. 17. In performing the required comparison operations, the bits S0–S3, F and P of the data in the RS register are first zeroed out, and the remaining bits A0–A9 are then compared with the corresponding bits A0–A9 of the identification number information from the programmable read only memory 20. A proper matchup of the compared bits A0–A9 indicates that the identification number information in the RS register is proper and correct. Otherwise, the routine proceeds to the abovementioned point RESET for resetting the RS TIME and RS registers.

Once the data from one word in the RS register has been determined to contain the proper identification number information, an attempt is then made to examine the 16-bit word from the next message in the RS register to determine if it satisfies all of the abovementioned requirements, that is, the parity and identification number requirements, and, if these requirements are satisfied, to determine whether the acceptance of this word takes place within 1½ seconds of the acceptance of the previous word. In making these determinations, the RS TIME register is first examined to determine if it is running, that is, if it contains a count other than its initial count of 0. If the RS TIME register is running, it is controlled, in conjunction with the SECONDS register, to provide a 1½ second timing interval from the end of the first message. This interval is established by subtracting a count of 2 as derived from the read only memory ROM from the SECONDS register and placing the result in the RS TIME register. When the counts in the two registers become the same, this event indicates that an interval of 1½ seconds has passed from the acceptance of the previous word whereupon the RS TIME register is caused to be reset to its 0 count. In the 1½ second interval, the 16-bit word of the second message in the RS register is examined in the same fashion as the previous word as discussed hereinabove. If the 16-bit word of the second message satisfies the parity and identification number requirements before the 1½ second interval has expired, that is, before the counts in the SECONDS and RS TIME registers become the same, the word is accepted as valid and then used for purposes of further processing. If the 16-bit word of the second message does not satisfy the above requirements before the expiration of the 1½ second interval, the resetting of the RS TIME and RS registers effectively serves to reject the first of the two messages and causes a new examination of subsequent messages to take place in search of two successive valid 16-bit words having the required time relationship.

Once the second one of a pair of successive words has been accepted as valid as discussed hereinabove, the sensor identification information (bits S0–S3) and activity information (bit F) contained within the second accepted word is extracted from the word for utilization by the SENSORS subroutine. The extraction of the bits S0–S3 of the sensor identification information and bit F of the activity information is accomplished by utilizing masking information from the read only memory ROM, specifically, a hex 12A4, to mask all bits of the RCU/sensor word except the bits S0–S3 and F. The bits S0–S3 are transferred to a corresponding NUMBER scratchpad register and the bit F is transferred to a corresponding F-BIT scratchpad register to be then available for use during the SENSORS subroutine. Following the transfer of the bits S0–S3 and F to their associated registers, the SENSORS subroutine is called, and the RS and RS TIME registers are reset, whereupon the program proceeds to the SWITCHES routine (FIG. 15) in the mainline program. The SWITCHES routine will be described in detail hereinafter.

PROCESSING OF SENSOR INFORMATION, SENSORS SUBROUTINE (FIGS. 20-24)

Once the bits S0–S3 and F of a 16-bit RCU/sensor word of a coded signal have been extracted from the RCU/sensor word and stored in the NUMBER and F-BIT registers, respectively, as discussed hereinabove, the extracted data is then available for use by the SENSORS subroutine. In addition, data relating to the occurrence of a fire or security (e.g., burglary) condition or to the use of the telephone TL, which is also stored in the NUMBER register as will be discussed more fully hereinafter, is also available for use by the SENSORS subroutine. In this subroutine, the data stored in the NUMBER register is examined as to its origin as represented by the sensor identification number (bits S0–S3) identifying the sensor which generated the data. In addition, the priority of each sensor which generates data, as represented by a priority number in an associated register, designated PNUM, is also examined. In accordance with the present invention, the various sensors (active and passive) employed within the system are assigned the following sensor identification numbers and priority numbers:

|  | Sensor I.D. Number |  | Priority Number |
| --- | --- | --- | --- |
| FIRE SENSOR #1 | 0 | ↑ | 0 (highest) |
| FIRE SENSOR #2 | 1 | ↑ | 0 |
| SECURITY SENSOR #1 (e.g., burglar) | 2 | ↑ | 1 |
| SECURITY SENSOR #2 (e.g., burglar) | 3 | Group 1 | 1 |
| RF SIGNALLING DEVICE 15 #1 | 4 | ↓ | 2 |
| RF SIGNALLING DEVICE 15 #2 | 5 | ↓ | 2 |
| BATHROOM SENSOR 5 #1 | 6 | ↑ | 3 |
| BATHROOM SENSOR 5 #2 | 7 | ↑ | 3 |
| AC LINE SENSOR 3 #1 (e.g., television) | 8 | Group 2 | 4 |
| AC LINE SENSOR 3 #2 (e.g., lamp) | 9 | ↓ | 4 |
| SWITCH SENSOR 6 #1 (e.g., refrigerator) | 10 | ↓ | 4 |
| SWITCH SENSOR 6 #2 | 11 | ↓ | 4 |
| TELEPHONE TL | 12 | ↓ | 4 (lowest) |

As indicated in the above table, the various sensors are generally placed into two groups. The first group, designated GROUP 1, includes the sensors whose monitored activities are of a high-priority, critical nature and generally require immediate attention, such as the generation of alarm sequences. The sensors in this group include the fire and security sensors and the rf signalling devices 15. The second group, designated GROUP 2, includes the sensors whose monitored activities are of a lower priority, less critical nature in that they do not require immediate alarm sequences. The sensors in this second group include the bathroom sensors 5, the ac line sensors 3, the switch sensor 6, and the telephone TL.

The examination of the abovementioned sensor identification number information (bits S0–S3), activity information (F-bit), and priority information stored in the NUMBER, F-BIT and PNUM registers serves to determine such matters as whether an alarm sequence is required to be initiated (with or without a pre-alarm cycle), whether the activity timer AT should be reset (to either its long time period or, in the case of entry into a bathroom, F-bit=1, its short time period), and whether the occurrence of the activity to which the data relates should be recorded in a sensor activity register assigned to the particular sensor which caused generation of the data. As the above examination takes place, the SENSORS subroutine also determines whether the data in the NUMBER register resulted from an rf transmission by one of the ac-based sensors S during the powering-up period following a power failure. As mentioned previously, during the powering-up period following a power failure, each sensor S responds to the powering-up operation as though an activity monitored thereby had just been performed. As a result, the sensor S turns "on" and initiates a transmission simultaneously with the other sensors S. In accordance with the invention, the central processing unit CPU operates to detect the resumption of power following a power failure and, for a period of time thereafter, for example, 2 seconds, to ignore or refuse for processing any transmission by any of the ac-based sensors S. During this two-second powering-up interval, however, an rf signalling device 15, by virtue of being a battery-operated device, is able to function in its normal fashion and have a coded rf signal produced thereby processed in the usual manner by the central processing unit CPU (which is backed up by the standby battery SB during a power failure).

The processing of the data stored in the NUMBER, F-BIT and PNUM registers may be more fully understood by reference to the flowchart diagrams of FIGS. 20–24. The SENSORS subroutine starts with FIG. 20. The initial action taken in FIG. 20 is an examination of the data in the NUMBER register. This examination serves to determine whether the data in the NUMBER register originated with one of the higher priority group of sensors (GROUP 1, including the fire sensors, the security sensors and the rf signalling devices 15), or one of the lower priority group of sensors (GROUP 2, including the ac line sensors 3, the bathroom sensors 5, the switch sensor 6 and the telephone TL). This determination is accomplished by comparing the sensor identification number (bits S0–S3) in the NUMBER register with a number 5 as derived from the read only memory ROM and representing the sensor identification number of the lowest priority sensor (rf signalling device 15) in the first group of sensors. If the sensor identification number in the NUMBER register has a value of 5 or less, this result indicates that the sensor identification number corresponds to one of the first group of sensors, that is, a fire sensor, a security sensor or an rf signalling device 15, and the F-BIT register is then examined to determine the nature of the F bit (activity bit) stored therein, that is, whether it has a logic "1" or a logic "0" value. If the sensor identification number in the NUMBER register has a value greater than 5, this result indicates that the sensor identification number corresponds to one of the second group of sensors, that is, to an ac line sensor 3, a bathroom sensor 5, a switch sensor 6, or the telephone TL, and the subroutine proceeds to the next step.

For an F bit associated with a fire sensor, security sensor or rf signalling device 15 to be valid, it is required to have a logic "1" value. This bit is examined, specifically, by comparing its value with a number 0 as derived from the read only memory ROM, to determine if it is a logic "1" or a logic "0". If the F bit has a value other than 0, indicating that the F bit is a logic "1", the F bit is accepted as valid and the subroutine proceeds to the next operation. If the value of the F bit is equal to 0, indicating that the F bit is a logic "0", this condition represents an invalid value for the F bit and the subroutine proceeds to a point RETURN (FIG. 23), to be discussed more fully hereinafter.

Once the data in the NUMBER and F-BIT registers has been examined as discussed above, the data in the NUMBER register is then further examined to determine if it originated with one of the ac-based sensors S during a powering-up interval following a power failure. This determination is important in preventing improper operation of the system. For example, if after a power failure a restoration of power occurs while an individual is in the bathroom, the restoration of power can have the effect of causing the associated bathroom sensor 5 to turn "on" and transmit a coded rf signal and thereby simulate a bathroom exit. As a result, the activity timer AT will be caused to be set to its long period (e.g., 8–10 hours) rather than remaining in its required short period. Unless the coded rf signal produced by the bathroom sensor 5 during the powering-up period is ignored, or rejected, an injury to the individual while in the bathroom will not be detected until after the long period of the activity timer AT has expired rather than after the short period. To prevent this undesirable mode of operation, the central processing unit CPU operates to monitor periodically the state of the system power and, upon detecting a power restoration after a power failure, to ignore any transmission from an ac-based sensor for a specified period, for example, 2 seconds. Following this 2 second interval, coded rf signals produced by the ac-based sensors will again be accepted for processing. Coded rf signals produced by an rf signalling device 15 will be accepted for processing both during a power failure and during power restoration since it is a battery-powered device and the central processing unit CPU has a standby battery backup during the power failure (for up to about six hours).

The monitoring of the system power by the central processing unit CPU may be more fully understood by reference to a "power monitor routine" as shown in the flowchart diagram of FIG. 21. Once during the time of every main loop (23 milliseconds maximum), the central processing unit CPU operates in the mainline program to determine if the system power is on or off by sampling the value of the system power as represented by a PWR FAIL signal. This signal is applied by the detector circuit 54 (FIG. 1) to bit position 7 of port 5 of the central processing unit CPU. The sampling of port 5 produces an 8-bit word which is placed into the accumulator A. All bits of this word except bit b7, which has a logic value of "1" when power is present and a logic value of "0" when power is absent, are masked by means of masking information, specifically, a hex 80, as derived from the read only memory ROM. In the event bit b7 has a logic value of "0" indicating an absence or loss of power, a count corresponding to a two-second interval is derived from the aforementioned SECONDS scratchpad register, by subtracting a count of 2 therefrom, and applied to a PWR TIMER scratchpad register, as indicated in FIG. 21. If during the next main loop there is still an absence or loss of power, another count corresponding to a two-second interval is derived from the SECONDS register and loaded into the PWR TIMER register. The above process is repeated over and over again until power has again been restored. The restoration of power is detected by the value of bit b7 changing from a logic "0" to a logic "1". At the occurrence of this change or transition, a count corresponding to a two-second interval is no longer reintroduced into the PWR TIMER register. The count in the SECONDS register, which is decremented at a one-second rate, ultimately reaches the same value as present in the PWR TIMER register, thereby indicating the termination or elapsing of a two-second interval following the restoration of power. The coincidence of the counts in the two registers is determined by comparing the counts with each other. A difference in the values of these counts indicates that power is either absent or the powering-up operation is in process; a similarity of these counts indicates that the powering-up operation is complete and data from the ac-based sensors can be accepted again. In this latter instance, the PWR TIMER register is caused to be reset, specifically, by putting a 0 count into the PWR TIMER register. The presence of this count in the PWR TIMER register accordingly permits signals produced by the ac-based sensors to be accepted again for processing.

Figure 23:
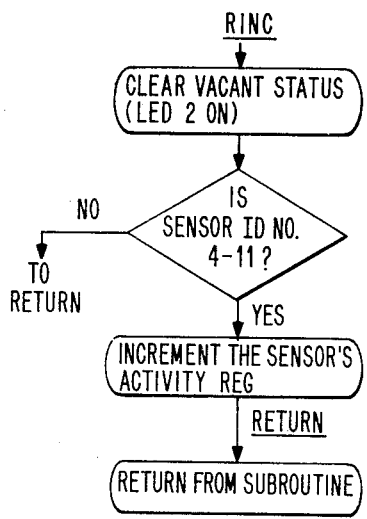

As the abovedescribed operations as set forth in FIG. 21 take place, the SENSORS subroutine as shown in FIG. 20 operates as part of its examination of the data in the NUMBER and F-BIT registers to determine whether the data in the NUMBER and F-BIT registers was generated by a sensor during a powering-up operation. This determination is accomplished by examining the count in the PWR TIMER register as discussed in connection with FIG. 21. If the PWR TIMER register has a count of 0 therein, thereby indicating that the PWR TIMER is not running, that is, power is present or a powering-up operation has been completed, the SENSORS subroutine proceeds to the next operation. If the PWR TIMER register has a count of other than 0 therein, indicating that a powering up operation is taking place, an examination is then made of the data in the NUMBER register to determine if it was generated by an ac-based (ac-powered) sensor S or by a battery-powered sensor. This determination is accomplished by checking a predetermined area of the programmable read only memory 20 to determine whether the particular sensor as identified by the sensor identification information (bits S0–S3) in the NUMBER register does or does not have battery backup. Since there are several sensors in the system, the programmable read only memory 20 normally has a separate area therein assigned to each sensor, with a 4-bit word being stored therein to represent either the presence of battery backup (e.g., four logic 1's) or the absence of battery backup (e.g., four logic 0's). It will be noted in this respect, however, that the only sensor in the system which has battery backup is an rf signalling device 15. Thus, if the sensor which generated the data in the NUMBER register was an ac-based sensor, such as an ac line sensor 3, a bathroom sensor 5 or a switch sensor 6, the accessing of the area of the programmable read only memory 20 assigned to this sensor will indicate the lack of battery backup and no further processing of the data in the NUMBER register will take place during the powering-up interval. The program then proceeds to the point RETURN (FIG. 23). However, if the sensor which generated the data in the NUMBER register was an rf signalling device 15, which is a battery-powered device, the accessing of the area of the programmable read only memory 20 assigned to the rf signalling device will indicate the presence of battery backup and permit the subroutine to proceed to the next operation, even during the powering-up interval, so that further processing of the data generated by this device can take place. The accessing of the programmable read only memory 20 for the required information as discussed hereinabove is accomplished via bit positions 0–7 of port 4 and the accessed information is received at bit positions 0–3 of port 5.

Once it has been determined that the data in the NUMBER and F-BIT registers originated with a sensor (any sensor) while power is present or with an rf signalling device 15 during a powering up operation (or power failure situation) as discussed hereinabove, the SENSORS subroutine proceeds to determine whether the system at that particular time is working on data requiring an alarm sequence to be produced. This determination is accomplished by comparing the present priority of the system, as contained in a PRIORITY scratchpad register (which has a general priority value of 4 during initialization but subject to change during subsequent system operation), with a number 2 as derived from the read only memory ROM and representing the lowest priority number of the GROUP 1 sensors. If the system priority number in the PRIORITY register has a value equal to or less than 2, this condition indicates that the system is presently in an alarm or pre-alarm mode and the SENSORS subroutine proceeds to the next operation. If the system priority number in the PRIORITY register has a value greater than 2, that is, 3 or more, this condition indicates that the system is then working on data originating with a GROUP 2 sensor (a bathroom sensor 5, an ac line sensor 3, a switch sensor 6, or the telephone TL), or, alternatively, the system is in an alarm or pre-alarm mode as a result of operation of a GROUP 2 sensor (e.g., due to an expiration of the activity timer AT). In either situation, the SENSORS subroutine proceeds to the next operation. In this next operation, the priority of the sensor which generated the data present in the NUMBER and F-BIT registers is examined. If the priority number of the sensor which generated the data present in the NUMBER and F-BIT registers has a value of 2 or less, as determined by comparing the sensor priority number in the PNUM register with a number 2 as derived from the read only memory ROM, this condition indicates that an alarm or pre-alarm mode is required and the SENSORS subroutine proceeds to the next operation. The priority number in the PNUM register as mentioned above is derived, for example, following power failure checking operations, by dividing the sensor identification number information (bits S0–S3) by 2. If the result is greater than four, a number 4 as derived from the read only memory ROM is loaded into the PNUM register; otherwise, the actual result is loaded into the PNUM register. If the priority of the sensor which generated the data present in the NUMBER and F-BIT registers has a value greater than 2, that is, 3 or more, this condition indicates that the data in the NUMBER and F-BIT registers originated with a GROUP 2 sensor (a bathroom sensor 5, an ac line sensor 3, a switch sensor 6 or the telephone TL) and that the activity timer AT is required to be reset to one of its time periods as determined by the identity of the particular sensor. The above condition can also indicate that the system is an alarm or pre-alarm mode due to operation of a GROUP 2 sensor resulting in the activity timer AT timing out (going negative). In either case, the SENSORS subroutine proceeds to a point S5 which will now be discussed in detail in connection with FIG. 22.

Figure 22:
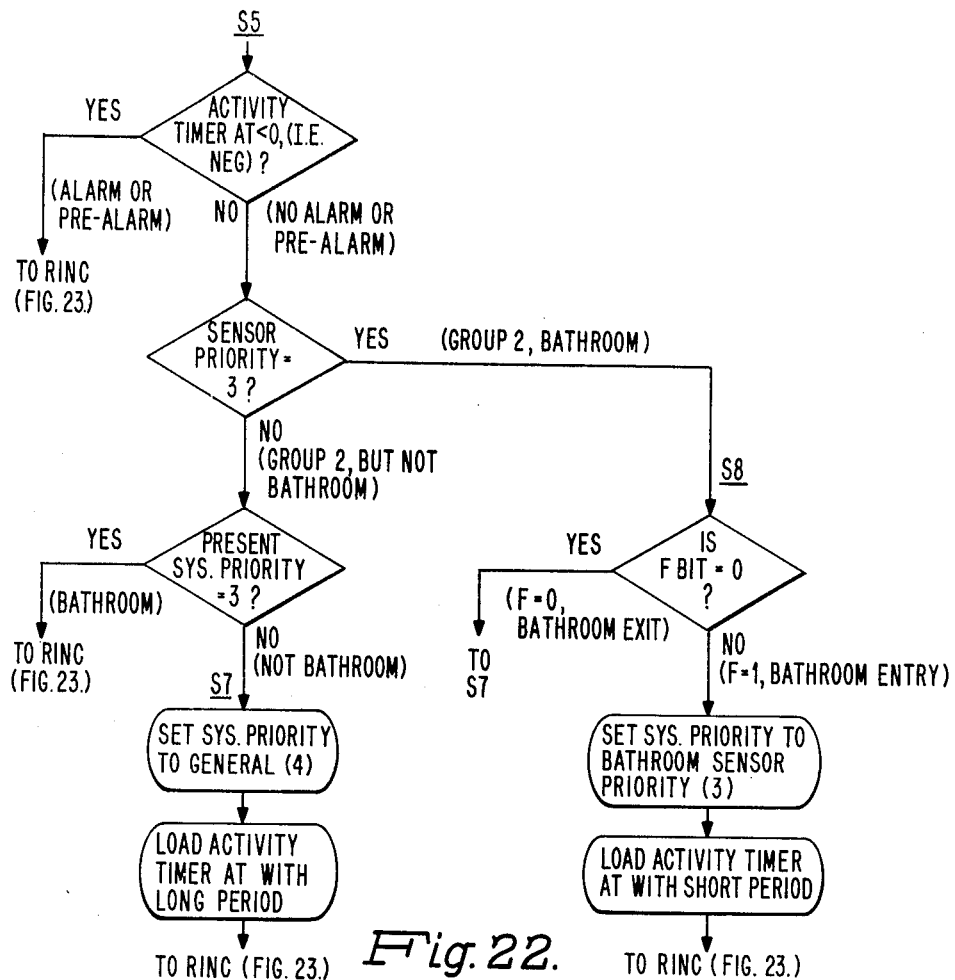

Referring to FIG. 22, the first operation to be performed once the examination of the PNUM register indicates that the sensor priority number retained therein corresponds to a GROUP 2 sensor is to determine the particular state of the activity timer AT, that is, whether it is operating at that instant in an alarm or pre-alarm mode or it is simply decrementing one of its two time periods. The particular state of the activity timer AT, which is generally implemented by a pair of scratchpad registers designated ATH and ATL, can be readily determined by noting whether it contains a positive or negative count. If the count is negative, this condition indicates that the system is operating in an alarm or pre-alarm mode and the SENSORS subroutine proceeds to a point RINC to record the occurrence of the sensor operation, as will be discussed in detail hereinafter in connection with FIG. 23. If the count in the activity timer AT is positive, this condition indicates that the system is not operating in an alarm or pre-alarm mode and that the particular count in the activity timer AT, corresponding to one of its two time periods, is being decremented in the usual fashion. In order to perform the above examination of the state of the activity timer AT, the count represented by the high byte of the ATH register is compared with a number $-1$ as derived from the read only memory ROM. If the result of the comparison is 0 or a positive number, this condition indicates that the system is in the alarm or pre-alarm mode. Conversely, if the result of the comparison is a negative number, this condition indicates that the system is not operating in an alarm or pre-alarm mode and that the activity timer AT is being decremented in the usual fashion.

If the system is not in the alarm or pre-alarm mode, the SENSORS subroutine proceeds to examine the PNUM register to determine whether the priority number retained therein corresponds to the bathroom sensor 5, which has a priority number of 3, as opposed to one of the other sensors in the GROUP 2 sensors having a lower operating priority (but larger priority number), such as an ac line sensor 3, a switch sensor 6, or the telephone TL. This determination is accomplished by comparing the priority number stored in the PNUM register with a number 3 as derived from the read only memory ROM and representing the priority number of the bathroom sensor 5. If the priority number in the PNUM register has a value greater than 3, that is, 4 or more, this condition indicates that the priority number corresponds to a GROUP 2 sensor other than the bathroom sensor 5, that is, an ac line sensor 3, a switch sensor 6, or the telephone TL, and also that the data stored in the NUMBER and F-BIT registers originated with a GROUP 2 sensor other than the bathroom sensor 5. If the priority number in the PNUM register has a value equal to 3, this condition indicates that the priority number corresponds to the bathroom sensor 5 and also that the data stored in the NUMBER and F-BIT registers originated with the bathroom sensor 5. The SENSORS subroutine then proceeds to a point S8 in the program, to be discussed in detail hereinafter.

If the priority number in the PNUM register corresponds to a GROUP 2 sensor other than the bathroom sensor 5 as discussed hereinabove, the SENSORS subroutine proceeds to the next operation to determine if the system is then working on data which originated with a bathroom sensor 5. This determination is accomplished by comparing the system priority number in the PRIORITY register with a number 3 as derived from the read only memory ROM and representing the priority number of the bathroom sensor 5. If the system priority number in the PRIORITY register is equal to 3, this condition indicates that the system is working on data originating with a bathroom sensor 5 and the SENSORS subroutine proceeds to the point RINC (FIG. 23) in the program for recording the occurrence of a sensor operation. If the system priority number is greater than 3, that is, 4 or more, this condition indicates that the system is not working on data originating with a bathroom sensor 5 and the SENSORS subroutine proceeds to a point S7 in the program. At point S7 in the program, the system priority is caused to be set to a general priority number and, in addition, the activity timer AT is caused to be reset, or loaded, with a count corresponding to the long time period (e.g., 8–10 hours) of the activity timer AT. The system priority is set to 4, that is, the general priority number, by deriving a number 4 from the read only memory ROM and placing this number into the PRIORITY register. The activity timer AT is then set to its long time period (e.g., 8–10 hours) by accessing a pair of scratchpad registers designated LONG TIME and transferring a count from the registers corresponding to the long time period to the registers ATL and ATH of the activity timer AT. The SENSORS subroutine then proceeds to the point RINC in the program for recording the occurrence of the sensor operation.

Returning now to point S8 (FIG. 22) in the SENSORS subroutine, there is indicated the various operations which are executed in response to operation of a bathroom sensor 5. In this case, and as previously noted, the sensor priority number in the PNUM register has a value of 3. In executing operations relating to the bathroom sensor 5 in the SENSORS subroutine, it is first necessary to determine whether a given bathroom-related activity represents an entry or an exit from the bathroom. As previously discussed, an entry into a bathroom causes the activity timer AT to be set to its short period and a subsequent exit from the bathroom causes the activity timer AT to be set back to its long period. The entry or exit activity is determined by examining the value of the F bit in the F-BIT register, specifically, by comparing the logic value of this bit with a number 0 as derived from the read only memory ROM. If the F bit has a logic value of "1", this condition indicates that there has been a bathroom entry; if the F bit has logic value of "0", this condition indicates that there has been a bathroom exit. In the case of a bathroom entry, it is required that the system priority number be set to that of the bathroom sensor 5 and, in addition, that the activity timer AT be set to its short time period (e.g., 1-2 hours). The system priority is set to the priority number of the bathroom sensor 5, that is, the number 3, by deriving a number 3 from the read only memory ROM and placing this number into the PRIORITY register. The activity timer AT is then set to its short time period (e.g., 1-2 hours) by accessing a pair of scratchpad registers designated SHORT TIME and transferring a count from the registers corresponding to the short time period to the registers ATL and ATH of the activity timer AT. The SENSORS subroutine then proceeds to the point RINC (FIG. 23) in the program for recording the occurrence of the bathroom sensor operation (bathroom entry). In the case of a bathroom exit as discussed above, in which case the F bit has a logic value of "0", the SENSORS subroutine proceeds to the aforementioned point S7 (FIG. 22) in the subroutine whereupon, as previously discussed, the system priority is caused to be set to a general priority number (4) and the activity timer AT is caused to be set to its long time period (e.g., 8-10 hours). The SENSORS subroutine then proceeds to point RINC (FIG. 23) in the program for recording the occurrence of the bathroom sensor operation (bathroom exit).

As noted hereinabove, many operations of sensors employed in the system are caused to be recorded to establish and maintain a running tally of usage of these sensors. The sensors whose operations are recorded in accordance with the present invention include the ac line sensors 3, the bathroom sensors 5, the switch sensor 6, and the rf signalling devices 15. The operations of fire and burglar sensors are not recorded. Similarly, and in order to conserve scratchpad storage, the operations of the telephone TL are also not recorded. An operation of any one of the sensors for which running tallies are maintained will be recorded even though it occurs during an alarm or pre-alarm mode or even if it will not have any effect on the operation of the system. Thus, for example, if one of the sensors is operated during an alarm or pre-alarm mode, the time period of the activity timer AT will not be altered so that the negative count therein is changed to a positive count and the alarm sequence is thereby terminated. The operation of the sensor will, however, be recorded. This particular situation is depicted in FIG. 22 (the activity timer AT contains a negative number). In similar manner, if a GROUP 2 sensor other than the bathroom sensor 5 operates while the bathroom is occupied, the short time period established for the activity timer AT during entry into the bathroom will not be changed to its long period. Again, however, the operation of the sensor will be recorded. This particular situation is also depicted in FIG. 22 (the present priority is equal to 3).

The manner in which operations of the sensors S and the rf signalling devices 15 are recorded can be more fully understood by reference to the flowchart diagram of FIG. 23 showing a RINC operation. Each operation of one of the sensors S or the rf signalling devices 15 initially causes the light emitting diode LED2 (FIG. 1) to be turned on (even if already on) to indicate the active, as opposed to vacant, status of the system. This operation is performed by accessing port 0 of the central processing unit CPU for an 8-bit word and masking all but bit b5 with masking information, specifically, a hex DF, as derived from the read only memory ROM. This bit, having a logic value of "0", is inverted internally to a logic "1" and thereupon inverted again to a logic "0" by the inverting amplifier I5 (FIG. 1) and applied to the light emitting diode LED2. Once this operation has been performed, the sensor identification number information (bits SO-S3) in the NUMBER register is examined to determine whether it represents a number between 4 and 11 corresponding to the sensor identification number of the sensors for which running tallies are maintained. If the sensor identification number information in the NUMBER register represents a number between 4 and 11, this condition indicates that the operation of the sensor which caused the data to be stored in the NUMBER register is to be noted, for example, in a corresponding sensor activity scratchpad register designated SAR. If the sensor identification number information in the NUMBER register does not represent a number between 4 and 11, this condition indicates that the sensor which caused the data to be stored in the NUMBER register is not the type of sensor whose operation is to be tallied. As mentioned previously, these sensors are the fire and security sensors and the telephone TL. The above operations by which the sensor identification number information in the NUMBER register is examined is accomplished by adding a number −4 as derived from the read only memory ROM to the number represented in the NUMBER register and examining the result. If the result is a negative number, the subroutine proceeds to the point RETURN in the program. If the result is a positive number, this number is compared with a number 6 as derived from the read only memory ROM; if the number is greater than 6, the subroutine proceeds to the point RETURN in the program. If the number is less than 6, this condition indicates that the sensor operation is to be noted in its associated SAR register. This latter operation is accomplished by adding a hex 30 to the last result (less than 6) and using this new result to address and increment an SAR register corresponding to the particular sensor. For different results, different SAR registers are caused to be addressed and incremented. By way of example, results of hex 30, 31, 32, 33, 34, 35, 36 and 37 correspond, respectively, to the rf signalling device #1, rf signalling device #2 bathroom sensor #1, bathroom sensor #2, ac line sensor #1, ac line sensor #2, switch sensor #1 and switch sensor #2.

Once a particular SAR register has been incremented as discussed hereinabove, the subroutine proceeds to the point RETURN in the program. At this particular point in the program, the address stored in the stack register P, representing the location in the program as of the time of commencement of the SENSORS subroutine, is transferred to the program counter PO.

The SENSORS subroutine as discussed hereinabove is also employed to initiate alarm sequences, with or without pre-alarm cycles, in response to transmissions by GROUP 1 sensors. In this situation, the conditions which give rise to an alarm sequence are, as previously discussed and indicated in FIG. 20, valid data (including F bit = "1") present in the NUMBER and F-BIT registers and associated sensor priority number information in the PNUM register having a value of 2 or less. In this particular situation, and before an alarm sequence is initiated, a determination is first made as to whether the system is already working on data requiring the initiation of an alarm sequence. This determination is accomplished, as indicated in FIG. 20, by comparing the system priority number in the PRIORITY register with the sensor priority number in the PNUM register. If the system priority number in the PRIORITY register has a value equal to or less than 2 and is less than the sensor priority number in the PNUM register, indicating that the system is already working in an alarm or pre-alarm mode, the program proceeds to the point RINC for recording the occurrence of the sensor activity (e.g., actuation of a sensor during an alarm or pre-alarm sequence). If the system priority number in the PRIORITY register is greater than the sensor priority number in the PNUM register, indicating that the sensor requiring the initiation of an alarm sequence is of greater importance than the sensor which initiated the present alarm sequence (e.g., the detection of a fire being more important than actuation of an rf signalling device 15), a determination is then made as to whether the sensor priority number corresponds to a fire or security sensor or to an rf signalling device 15. This determination is accomplished by comparing the sensor priority number in the PNUM register with a number 2 as derived from the read only memory ROM. If the sensor priority number has a value less than 2, that is, a value of 0 or 1, this condition indicates that the sensor which caused data to be stored in the NUMBER and F-BIT registers is a fire or security sensor and the subroutine proceeds to a point S1 in the program to initiate an actual alarm cycle, that is, without a pre-alarm cycle, as will be discussed more fully hereinafter. If the sensor priority number in the PNUM register has a value equal to 2, this condition indicates that the sensor which caused the data to be stored in the NUMBER and F-BIT registers is an rf signalling device 15 and the subroutine proceeds to a point S4 (FIG. 24) in the program to determine whether the rf signalling device 15 is supposed to have a pre-alarm cycle associated therewith. This latter determination is accomplished in the manner indicated in the flowchart diagram of FIG. 24.

Figure 24:
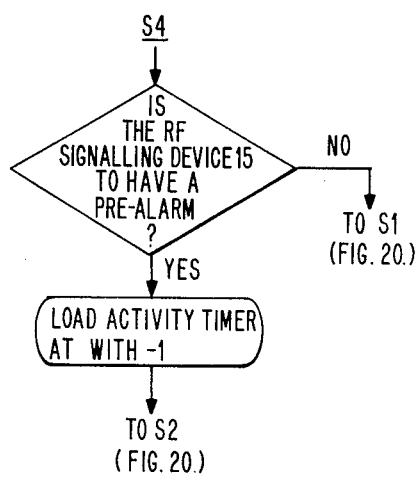

The initial action taken in FIG. 24 is the examination of a PRE-ALARM scratchpad register which contains data (as a result of the INITIALIZATION routine or as received from the centralized communications center CCC) specifying whether the rf signalling device 15 is or is not to have a pre-alarm cycle. If the data in the PRE-ALARM register specifies that the rf signalling device 15 is not to have a pre-alarm cycle, the subroutine proceeds to the aforementioned point S1 (FIG. 20) in the program to initiate an actual alarm cycle. If the signalling device 15 is to have a pre-alarm cycle, the activity timer AT is caused to be loaded with a number −1, as derived from the read only memory ROM, which causes a pre-alarm cycle to be initiated. The subroutine then proceeds to the aforementioned point S2 (FIG. 20), to be discussed more fully hereinafter.

In the event an actual alarm cycle is to be initiated without a pre-alarm cycle, that is, the priority number in the PNUM register has a value of 0 or 1 as previously discussed, the subroutine as shown in FIG. 20 operates at the point S1 in the program to load the activity timer AT with a number −17 as derived from the read only memory ROM. This loading operation, by virtue of involving a number which is more negative than the range of numbers (e.g., −1 to −16) associated with a pre-alarm, immediately initiates an actual alarm cycle during which communication with the centralized communications center CCC is initiated as will be discussed more fully hereinafter. Following the loading operation, the subroutine proceeds to the point S2 in the program. At the point S2, the priority of the system is changed to that of the GROUP 1 sensor which caused initiation of the alarm cycle, specifically, by transferring a priority number (0, 1 or 2) corresponding to the GROUP 1 sensor from the PNUM register to the PRIORITY register, and then starting the TELEPHONE routine to initiate communication with the centralized communications center CCC. This latter operation is followed by clearing the buzzer variables, specifically, by placing a number 0 in a BUZZER LOAD TIME scratchpad register employed in connection with the operation of the audible alarm 27 unit (FIG. 1), as will be discussed more fully hereinafter. The subroutine then proceeds to the point RINC in the program for recording the operation of any rf signalling device 15 (but not fire or security sensors which have sensor identification numbers outside of the 4 to 11 range) which caused initiation of the alarm sequence.

TIMERS ROUTINE (FIGS. 25–28)

Figure 25:
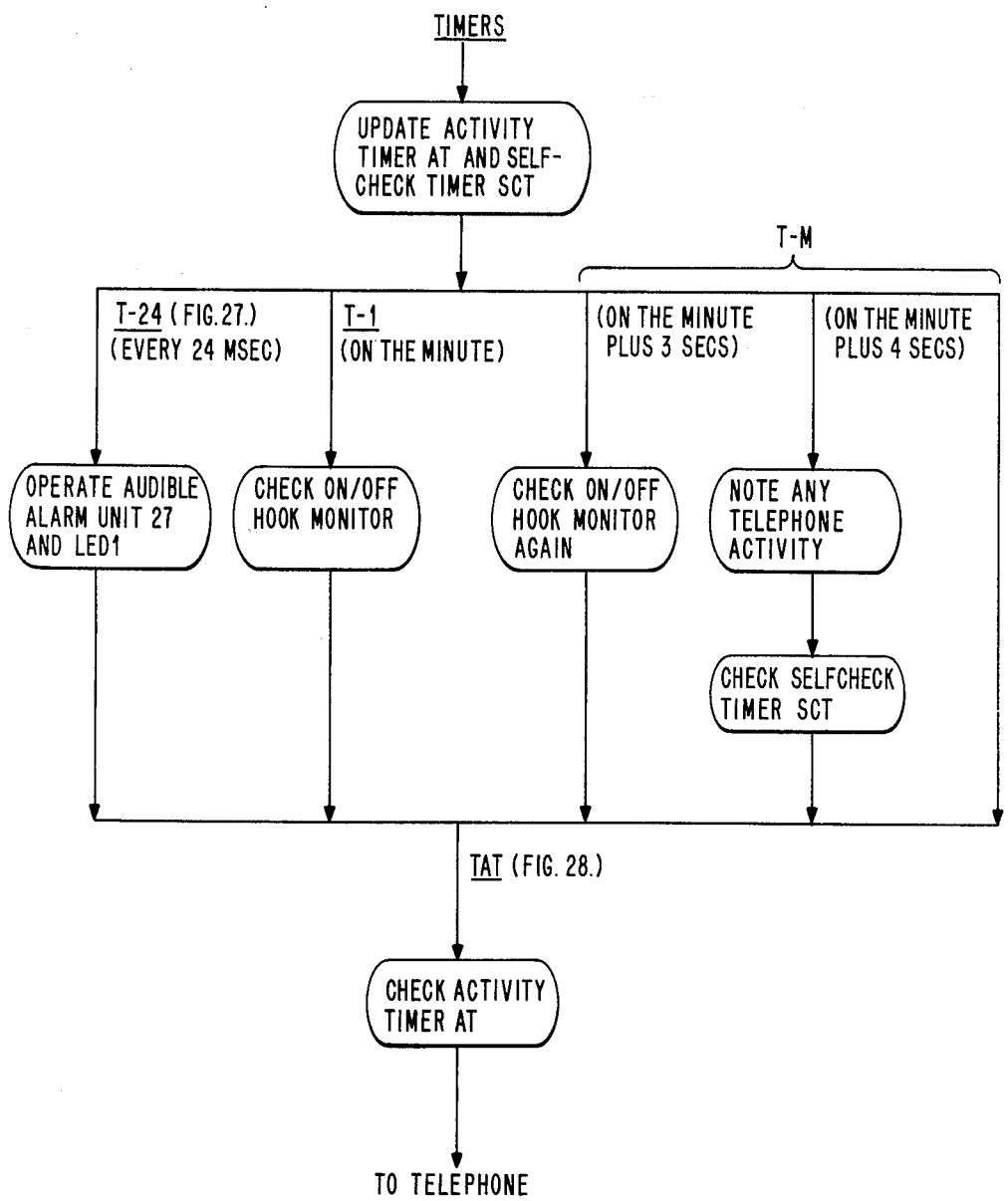

Once a negative (alarm) count has been established in the activity timer AT as discussed in the preceding section, the audible alarm unit 27 (FIG. 1) is caused to be operated to produce an audible tone and the light emitting diode LED1 is caused to be illuminated for the duration of time that the activity timer AT contains a negative count. The manner in which these and other time related operations are performed can best be understood by reference to the TIMERS routine shown in flowchart form in FIGS. 25–28. Referring first to FIG. 25, there is shown the general overall organization of the TIMERS routine. This routine is employed to establish a variety of time intervals, including one second, one minute, and 24 millisecond intervals. These intervals are used in timer updating and decrementing operation, energization of the audible alarm unit 27 and the "alarm" light emitting diode LED1, and, in conjunction with the TELEPHONE routine, in initiating communication with the centralized communications center CCC, especially for self-check calls following certain on/hook and off/hook monitoring activities as indicated in FIG. 25 and to be discussed in greater detail hereinafter. The TIMERS routine as shown in FIG. 25 commences with an updating of the activity timer AT (assuming that the system is in operation) and the self-check timer SCT (whether the system is operating or not). This updating operation is shown in detail in the flowchart diagram of FIG. 26 and will now be described in detail.

In general, the updating operation requires the establishing of one second and one minute timing intervals. These intervals are established by use of a pair of scratchpad registers, designated TMU and TML, which respectively retain upper and lower bytes of data representing a count and are caused to count down at 185 microsecond interrupt intervals to derive a one second interval. The TML and TMU registers are decremented, respectively, every 185 microseconds and 24 milliseconds. The operations as set forth in FIG. 26 commence with an examination of the TML register to determine if it contains a negative count. If so, the TMU register is decremented by subtracting therefrom a count of 1 as derived from the read only memory ROM. If the TML register does not contain a negative count, the routine proceeds to a point T−M (see FIG. 25) to perform various on/hook, off/hook and other related operations in connection with initiating communication with the centralized communications center CCC as will be described more fully hereinafter.

Each time that the TMU register is decremented, it is examined to determine whether it has reached a count of 0. If the TMU register has been decremented to 0, this condition indicates that an interval of one second has elapsed and the TMU register is initialized by putting a hex 2B as derived from the read only memory ROM into the TMU register (24 milliseconds x hex 2B=1 second). If the TMU register has not been decremented to 0, a hex 80 as derived from the read only memory ROM is added to the contents of the TML register and the sum placed into the TML register to initialize the TML register. This latter operation, which occurs every 24 milliseconds, serves to reset the most significant bit (MSB) of the TML register thereby to establish a positive number in the TML register. The routine then proceeds to a point T24 (FIG. 27) for performing operations relating to the energization of the audible alarm unit 27 and the "alarm" light emitting diode LED1 as will be discussed more fully hereinafter.

Upon initializing the TMU register as discussed hereinabove, the TML register is initialized by adding a hex 1D as derived from the read only memory ROM to the contents of the TML register and placing the sum back into the TML register. This operation serves to compensate or adjust for the fact that additional interrupt operations (each 185 microseconds) have occurred since the elapsing of one second and should make the count in the TML register positive. To insure that sufficient adjustment has been made, the TML register is examined to determine if it contains a negative count. If it does not, this condition indicates that there was not an excessive overrun, that is, the previous adjustment was satisfactory, and that a time interval of one second has elapsed. If the count in the TML register is negative, this condition indicates that there was an overrun of more than 28 (hex 1C, where hex 1C=hex 1D−1) interrupt operations and that further adjustment is necessary. This adjustment is accomplished by decrementing the TMU register, specifically, by subtracting a count of 1 therefrom, and then adding a hex 80 as derived from the read only memory ROM to the contents of the TML register and placing the sum back in the TML register. This latter operation also signifies the elapsing of a time interval of one second. Upon the elapsing of this one second interval, the earlier described SECONDS register, which initially contains a count of 60 therein as derived from the read only memory ROM, is caused to be decremented by a count of one. Upon decrementing the SECONDS register, it is then examined to determine if it has been decremented to a count of 0. If it has, this condition indicates that a time interval of one minute has elapsed (it being recalled that the SECONDS register starts with a count of 60) and the SECONDS register is then reset to a count of 60 again as derived from the read only memory ROM. If the SECONDS register has not been decremented to a count of 0, the routine then proceeds to the point T−M for performing operations in connection with the initiation of communication with the centralized communications center CCC.

Once the SECONDS register has been reset (to 60) as discussed hereinabove, an examination is then made to determine whether the system is operating, that is, whether it is on or off. This determination is made by examining the bit position and port of the central processing unit CPU associated with the "vacant" light emitting diode LED2, specifically, bit position 6 of port 0. If bit position 6 of port 0 is at a logic "1" level corresponding to an "on" state of the light emitting diode LED2, this condition indicates that the system is on and the activity timer AT is caused to be decremented, specifically, at a rate of once per minute. This operation is followed by the decrementing of the self-check timer SCT, also at the rate of once per minute. If bit position 6 of port 0 is at a logic "0" level corresponding to an "off" state of the diode LED2, this condition indicates that the system is off and the self-check timer SCT is caused to be decremented. The self-check timer SCT is thus decremented whether the system is on or off while the activity timer AT is decremented only when the system is on. Following the decrementing of the self-check timer SCT, the routine proceeds to a point T−1 (see FIG. 25) in the program for performing on/hook, off/hook monitoring operations in connection with initiating communication with the centralized communications center CCC as will be discussed more fully hereinafter.

Figure 27:
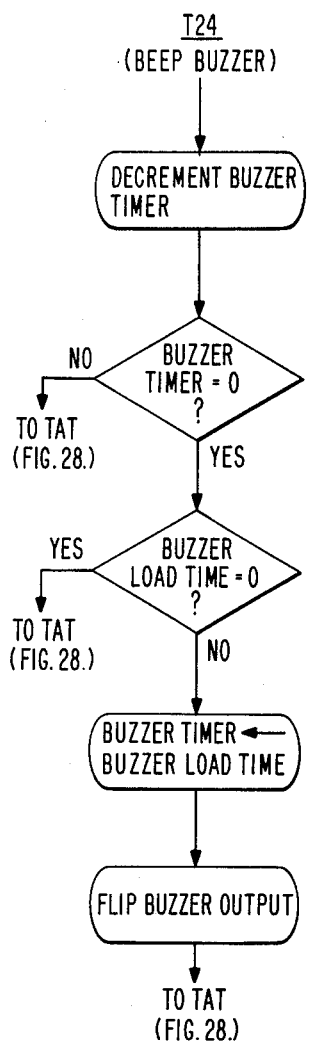

The manner in which the audible alarm unit 27 and the diode LED1 are operated during an alarm cycle is illustrated in FIG. 27. Every 24 milliseconds, a BUZZER TIMER scratchpad register employed to control operation of the audible alarm unit 27 and the "alarm" light emitting diode LED1 is caused to be decremented. Following this operation, the BUZZER TIMER register is examined to determine if it contains a count of 0 therein. If it does not contain a count of 0, this condition indicates that the audible alarm unit 27 and the diode LED1 are to be maintained in their existing states and the routine proceeds to a point TAT, shown in FIG. 28, and now to be described in detail.

Figure 28:
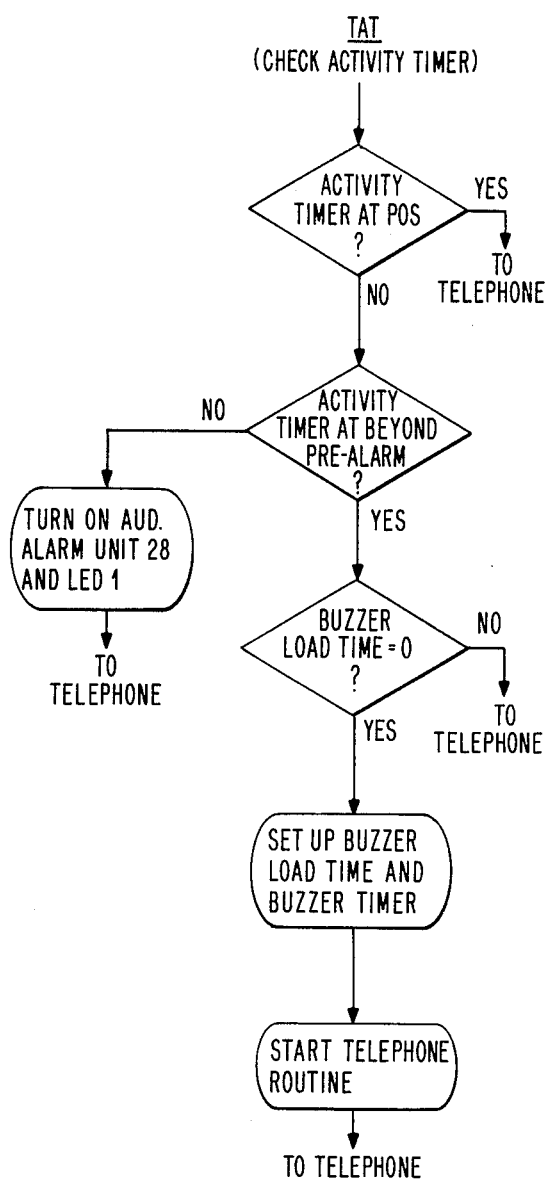

In general, the TAT operation as shown in FIG. 28 determines whether the activity timer AT is in the requisite state to energize the audible alarm unit 27 and the diode LED1. The initial action taken in FIG. 28 is to determine whether the activity timer AT contains a positive or negative number. If the activity timer AT contains a positive number, this condition indicates that the system is not operating in an alarm sequence and the routine proceeds to the TELEPHONE routine in the mainline program. If the activity timer AT contains a negative number, this condition indicates that an alarm sequence is in process and that operation of the audible alarm unit 27 and the diode LED1 is required. The abovementioned determination of the positive or negative state of the activity timer AT is readily achieved by comparing the count present in the activity timer AT with a −1 as derived from the read only memory ROM. If the result of this comparison is greater than −1 (the most significant bit is a logic "0"), the routine proceeds to the TELEPHONE routine in the mainline program. If the result of the comparison is not greater than −1 (the most significant bit is a logic "1"), the routine proceeds to determine whether the activity timer AT is beyond the pre-alarm time. This latter operation is accomplished by comparing the number in the activity timer AT, which is constantly being decremented, with the negative of a number as contained in the aforementioned PRE-ALARM scratchpad register and derived either from the programmable read only memory 20 during initialization (that is, the pre-alarm default time) or received from the centralized communications center CCC during a timing control message. In the event the activity timer AT is not beyond the pre-alarm time, as indicated by the count in the activity timer AT being greater than or equal to the negative of the pre-alarm number, this condition indicates that the audible alarm unit 27 and the diode LED1 are required to be operated in a continuous fashion for the entire duration of the pre-alarm cycle. This continuous operation of the alarm unit 27 and the diode LED1 is achieved by accessing port 1 of the central processing unit CPU to derive an 8-bit word and, by an AND operation, masking all bits except bit b5 with masking information, specifically, a hex DF, as derived from the read only memory ROM. BIT b5 is then forced to a logic "0" value and inverted at port 1 and then by the inverting amplifier I1 (to a logic "0" level) and applied to the audible alarm unit 27 and the diode LED1, causing these devices to produce their respective continuous, simultaneous audible and visual indications.

In the event the activity timer AT is beyond the pre-alarm interval, as indicated by the count in the activity timer AT being less than the negative of the pre-alarm number, a BUZZER LOAD TIME scratchpad register employed to retain information for operating the audible alarm unit 27 and the diode LED1 in an intermittent on-off fashion is examined to determine whether it contains a count of other than 0 therein specifying the intermittent manner of operation of the alarm unit 27 and the diode LED1. If the BUZZER LOAD TIME register does contain a count of other than 0 therein, the routine proceeds to the TELEPHONE routine in the mainline program. If the BUZZER LOAD TIME register contains a count of 0 therein, both the BUZZER LOAD TIME register and the aforementioned BUZZER TIMER register are caused to be loaded with a count, as derived from the read only memory ROM, specifying the frequency at which the audible alarm unit 27 and the diode LED1 are to be operated. In the case of a fire or security alarm situation, as represented by a priority number of 0 (fire) or 1 (security) in the PRIORITY register, a hex 15 as derived from the read only memory ROM is loaded into the BUZZER LOAD TIME and BUZZER TIMER registers; in all other cases, a hex 31 as derived from the read only memory ROM is loaded into the BUZZER LOAD TIMER and BUZZER TIMER registers. The count of hex 15 provides first on/off times of equal duration for the alarm unit 27 and the diode LED1, specifically, 360 milliseconds (15×24 milliseconds), and the count of hex 31 provides second on/off times of equal duration for the alarm unit 27 and the diode LED1, specifically, 744 milliseconds (31×24 milliseconds). In both cases, the duty cycle is 50 percent. At the conclusion of the above loading operations, the TELEPHONE routine is started.

As mentioned previously in connection with FIG. 27, the BUZZER TIMER register is decremented every 24 milliseconds. At such time as the BUZZER TIMER register has been decremented to 0, as indicated in FIG. 27, this condition indicates that it may be required to operate the alarm unit 27 and the diode LED1 in an intermittent on/off fashion, as determined by the contents of the BUZZER LOAD TIME register. If the BUZZER LOAD TIME register contains a count of 0 therein, this condition indicates that intermittent operation of the alarm unit 27 and the diode LED1 is not required (e.g., during initialization or during pre-alarm), and the routine proceeds to the point TAT (FIG. 28) as previously described. If the BUZZER LOAD TIME register does not contain a count of 0 therein, this condition indicates that it is desired to operate the alarm unit 27 and the diode LED1 in an intermittent fashion and the number (either hex 15 or hex 31) retained in the BUZZER LOAD TIME register is loaded into the BUZZER TIME register. Following this loading operation, port 0 is accessed by the central processing unit CPU to derive an 8-bit word, and all bits except bit b5 are masked in an EXCLUSIVE/OR operation by masking information, specifically, a hex 20 as derived from the read only memory ROM. Bit b5 is then alternately flipped in value and at a frequency as determined by the count retained in the BUZZER LOAD TIME register. After being inverted by the inverting amplifier I1, bit b5 is applied to the audible alarm unit 27 and to the diode LED1 to cause energization of these devices between their on and off states. Following these operations, the routine proceeds to the point TAT in the program. This latter operation ultimately leads to the TELEPHONE routine, to be described in detail hereinafter. At the end of the TELEPHONE routine, specifically, when communication has been concluded with the centralized communications center CCC, that is, upon receipt of a "hang-up" command word, the TELEPHONE routine operates to place a count of 0 in the BUZZER LOAD TIMER register for terminating the intermittent operation of the audible alarm unit 27 and the light emitting diode LED1.

Communication with Centralized Communications Center CCC (FIGS. 29–42)

During an alarm sequence as discussed hereinabove, more particularly, following the pre-alarm cycle (if any) of the alarm sequence, the remote control unit RCU operates to initiate communication with the centralized communications center CCC for the purpose of informing the centralized communications center CCC of the alarm condition. As previously discussed, this communication involves transmitting an alarm message between the central processing unit CPU and the centralized communications center CCC and is followed by the transmission of a timing control message between the centralized communications center CCC and the remote control unit RCU (see FIG. 3), using bi-directional phase-reversal hand-shaking communications techniques. An alarm sequence as will be discussed herein employs the same data transmission protocol as a self-check operation. In the case of a self-check operation, to be described in greater detail hereinafter, a self-check message is transmitted between the remote control unit RCU and the centralized communications center CCC and is followed by the transmission of a timing control message between the centralized communications center CCC and the remote control unit RCU (see FIG. 5). The timing control messages for the two types of operations, that is, alarm and self-check operations, are the same. Although an alarm sequence will be primarily discussed in this section, due to the common data transmission protocol employed in the system, certain aspects of self-check operations utilizing this common protocol will also be described in this section.

In establishing communication with the centralized communications center CCC in an alarm sequence, the central processing unit CPU is arranged to cooperate with the data transmission circuit 30 which interfaces via the modem amplifier and filter circuitry 32 with the central processing unit CPU and with the telephone TL and a standard telephone line to the telephone company central office (C.O.) and the centralized communications center CCC. In initiating communication with the centralized communications center CCC, the data transmission circuit 30 is arranged to execute a dialing sequence under control of signals produced by the central processing unit CPU at bit positions 0-2 of port 0. This dialing sequence includes as previously described, the steps of (a) seizing the telephone line, specifically, by electrically disconnecting the telephone TL from the telephone line; (b) establishing a dc dialing loop within the data transmission circuit 30 for use in dialing operations; and (c), after a predetermined period exceeding a standard dial tone period associated with the telephone company central office (C.O.), performing a dialing operation by making and breaking the dc loop established within the data transmission circuit 30 in accordance with a telephone number of the centralized communications center CCC. As previously mentioned, the centralized communications center CCC may be reached using one of two possible telephone numbers as stored in the programmable read only memory 20. In attempting to establish communication with the centralized communications center CCC, a first one of the two telephone numbers, designated a primary telephone number, is first used by the central processing unit CPU and the data transmission circuit 30 in the execution of the aforementioned dialing sequence. If for some reason the data transmission circuit 30 is unable to establish communication with the centralized communications center CCC using the first telephone number, for example, due to transmission line errors or problems or busy signal conditions, the first telephone number is again used, in a repeated fashion, up to a maximum of eight times. After eight unsuccessful attempts, the second telephone number, designated a secondary telephone number, is then used, also up to a maximum of eight times. Failure to reach the centralized communications center CCC after eight attempts using the secondary telephone number leads to the primary number being used again, for eight more attempts, and the entire telephoning sequence being repeated again in the same manner as discussed above until a handshake is established with the centralized communications center CCC.

As previously discussed, once the centralized communications center CCC has been reached by a telephone call, an alarm message is transmitted between the remote control unit RCU and the centralized communications center CCC. The alarm data contained in the alarm message, which is established at bit position 3 of port 0 of the central processing unit CPU, comprises priority alarm information specifying the occurrence and type of alarm condition, and system identification number information identifying the system from which the alarm message originated. The alarm message also includes sensor activity information indicating usage of sensors S and rf signalling devices 15 (as contained in the SAR registers) but this information is caused to be rejected by the centralized communications center CCC. As will be discussed hereinafter, the sensor activity information as mentioned above is also incorporated in a self-check message, which has the same protocol or format as an alarm message, and accepted for processing by the centralized communications center CCC to determine non-functioning or malfunctioning of components in the system. The alarm message as discussed hereinabove is transmitted between the remote control unit RCU and the centralized communications center CCC in a plurality of successive data words. Further, each data word, with the exception of the first data word (alarm word), is transmitted to the centralized communications center CCC only upon receipt of a command word from the centralized communications center CCC. This command word may be either a "send" command word indicating that the data word received by the centralized communications center CCC was accepted and that the next data word should be sent, or a "retransmit" command word indicating that the data word received by the centralized communications center CCC was in error (e.g., due to transmission errors or problems) and that the data word should be retransmitted. The centralized communications center CCC may also send a "call back" command word in the event the centralized communications center CCC is not ready to accept data words at that particular time or in certain error conditions, in which case the remote control unit RCU is informed by the "call back" command word to terminate the call and redial. The centralized communications center CCC indicates the satisfactory conclusion of an alarm sequence by the transmission to the remote control unit RCU of a "hang-up" command word which instructs the remote control unit RCU to terminate the call. Each data word or command word as transmitted between the remote control unit RCU and the centralized communications center CCC as discussed above includes a start bit, four data or command bits, a command/data bit specifying the word as a data word or a command word, a parity bit, and a stop bit. The start, stop and parity bits are inserted into each word during the MODEM subroutine as will be discussed more fully hereinafter.

Figure 29:
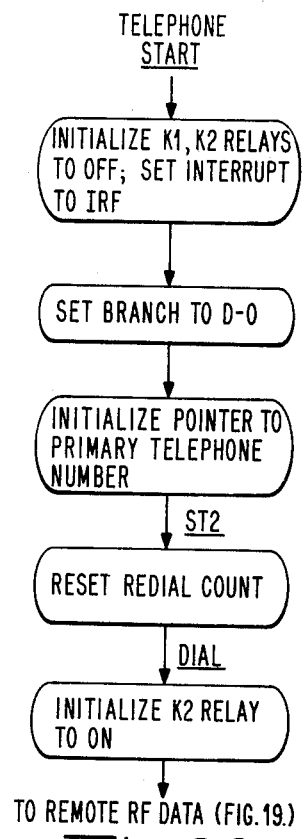

The manner in which the abovementioned bidirectional transmission of data between the remote control unit RCU and the centralized communications center CCC takes place can better be understood by reference to the flowchart diagrams of FIGS. 29-42 setting forth pertinent portions of the TELEPHONE routine and associated interrupt subroutines. The portions of the TELEPHONE routine are generally performed in succession, using operations as shown in FIGS. 29-33 and 35-42. A BRANCH scratchpad register is employed to vector to the appropriate operation. The initial branch operation is designated START and is illustrated in FIG. 29. The START branch operation shown in FIG.

29 commences with the initialization of certain components of the data transmission circuit 30, specifically, a short relay K1 and a dial relay K2 as shown in FIG. 56, in preparation of a dialing sequence as mentioned hereinabove. This initialization operation is accomplished by accessing port 0 of the central processing unit CPU to derive an eight-bit word and, by utilizing an OR operation, masking bits b1 and b2 with data (hex 03) as derived from the read only memory ROM. Bits b1 and b2 are established to have logic "0" values at port 0 and, after being inverted by the inverting amplifiers I3 and I4 to logic "1" values, are applied to the windings of the relays K1 and K2 to cause these relays to operate in their deenergized, or "off" states. The initialization operation as discussed above further includes setting the interrupt branch to the earlier described point IRF (FIG. 18) in the program so that only operations in connection with the REMOTE RF DATA routine can take place.

Once the above initialization operations have been achieved, a branch operation to a point D−0 (FIG. 30) is set. This latter operation is accomplished by decrementing the BRANCH register to a value of −2. (This register initially has a value of 0 therein and is decremented to a value of −1 for the present START operation and then to the value of −2 for the D−0 branch operation.) Following the setting of the branch operation to D−0, a pointer initialization operation is executed by placing the appropriate address of the primary telephone number (first telephone number) stored in the programmable read only memory 20, and which will be used initially in dialing operations, into a scratchpad register designated START POINTER. Another scratchpad register, designated REDIAL, is then caused to be reset by loading a count of 8 as derived from the read only memory ROM into the REDIAL register. This count of 8 represents the maximum number of times that the primary telephone number may be used in succession before turning to the secondary telephone number. Following the resetting of the REDIAL register, the dial relay K2 is caused to be initialized to its "on" state. This latter operation is performed by accessing port 0 to derive an eight-bit word and, by use of AND and OR masking operations, establishing bit b2 at port 0 to have a logic value of "1". When bit b2 is inverted by the inverting amplifier I4 to a logic "0" value, the dial relay K2 is caused to be operated in its energized state in preparation for the dialing operation. The START branch operation then proceeds to the REMOTE RF DATA routine (FIG. 19) in the mainline program. The REMOTE RF DATA routine and other routines in the mainline program are then executed and ultimately the program proceeds to the TELEPHONE routine which branches to the D−0 branch operation as shown in FIG. 30.

Figure 30:
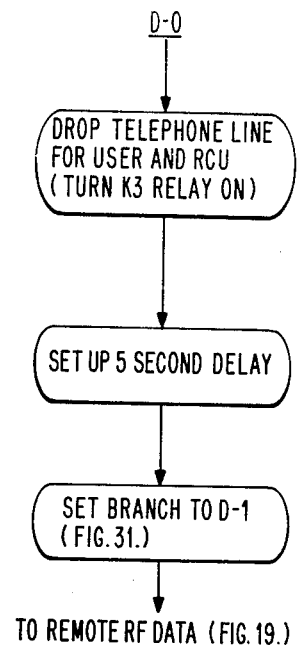
Figure 31:
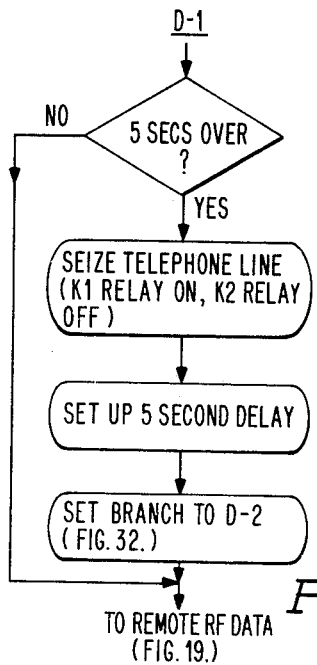

In the D−0 branch operation as shown in FIG. 30, the initial action taken is to cause a line relay K3 in the data transmission circuit 30 as shown in FIG. 56 to operate in its energized, or "on", state so that the telephone TL is electrically disconnected from across the telephone line. This operation accordingly serves to terminate any call or other off/hook condition (e.g., the handset being inadvertently left off/hook) that might then be in progress and thereby give priority to the alarm sequence. To disconnect the telephone TL, port 0 of the central processing unit CPU is accessed to derive an eight-bit word and all bits except bit b0 are masked, by use of an AND operation, with data as derived from the read only memory ROM. Bit b0 is established to have a logic "1" value at the port 0 and, after being inverted to a logic "0" value by the inverting amplifier I2, applied to the winding of the line relay K3 to cause this relay to operate in its energized, or "on" state. A five-second period or delay is then established by subtracting a count of five from the aforementioned SECONDS register and placing this count into a scratchpad register designated DELAY TIME OUT. This five-second period is desirable to insure sufficient time to seize the telephone line for dialing operations. Following the above operation, the BRANCH register is decremented to a value of −3 to set the program to the next, specifically, D−1, branch operation as shown in FIG. 31. The routine then proceeds to the REMOTE RF DATA routine and other routines in the mainline program, ultimately proceeding to the TELEPHONE routine and the D−1 branch operation of FIG. 31.

In the D−1 branch operation as shown in FIG. 31, the initial action taken is to determine whether the aforementioned five-second interval in the D−0 branch operation has expired. This determination is accomplished by comparing the contents of the SECONDS register, which is decremented every second, with the contents of the DELAY TIME OUT register. If the contents are not the same, this condition indicates that the five-second interval has not elapsed and the D−1 branch operation proceeds to the REMOTE RF DATA and other routines in the mainline program, ultimately returning to the D−1 branch operation. If the contents of the SECONDS and DELAY TIME OUT registers are the same, this condition indicates that the five-second interval has elapsed and the branch operation proceeds to seize the telephone line by establishing a short across the telephone line which serves to get a dial tone. This latter operation is achieved by operating the short relay K1 in its energized, or "on" state, and by operating the dial relay K2 in its deenergized, or "off" state. These states for the relays K1 and K2 are specifically achieved by accessing port 0 of the central processing unit CPU to derive an eight-bit word and, by use of AND and OR operations, masking bits b1 and b2 with data as derived from the read only memory ROM. Bits b1 and b2 are established to have logic values of "1" and "0", respectively, at port 0 and, after being inverted to logic "0" and "1" values by the respective inverting amplifiers I3 and I4, applied to the windings of the relays K1 and K2 to respectively operate the relays K1 and K2 in their energized and deenergized states. Following these operations, another five-second interval or delay is established by deriving a count of 5 from the SECONDS register and applying this count to the DELAY TIME OUT register, in the same manner as earlier described. The BRANCH register is then decremented to a count of −4 to set the program to the next, specifically, D−2, branch operation. The routine then proceeds to the REMOTE RF DATA and other routines in the mainline program, ultimately proceeding to the D−2 branch operation of the TELEPHONE routine as shown in FIG. 32.

Figure 32:
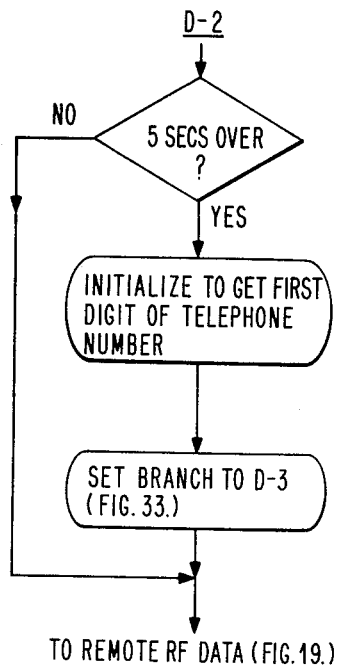

In the D−2 branch operation as shown in FIG. 32, the initial action taken is to determine whether the five-second interval or delay established in the D−1 branch operation has elapsed. This determination is achieved in the same manner as earlier described, that is, by determining whether the contents of the SECONDS and DELAY TIME OUT registers are the same. If they are not, this condition indicates that the five-second interval has not elapsed and the routine proceeds to the REMOTE RF DATA and other routines in the mainline program, ultimately returning to the D−2 branch operation of the TELEPHONE routine. If the contents of the SECONDS and DELAY TIME OUT registers are the same, this condition indicates that the five-second interval has elapsed and the program proceeds to an initialization operation by which the first digit of the primary telephone number is obtained. This latter operation is achieved by transferring the contents of the aforementioned START POINTER register to a scratchpad register designated PHONE NUMBER POINTER and used in conjunction with the START POINTER register. The BRANCH register is then decremented to a count of −5 to set the program to the next, specifically, D−3, branch operation. The routine then proceeds to the REMOTE RF DATA and other routines in the mainline program, ultimately proceeding to the D−3 branch operation of the TELEPHONE routine as shown in FIG. 33.

Figure 33:
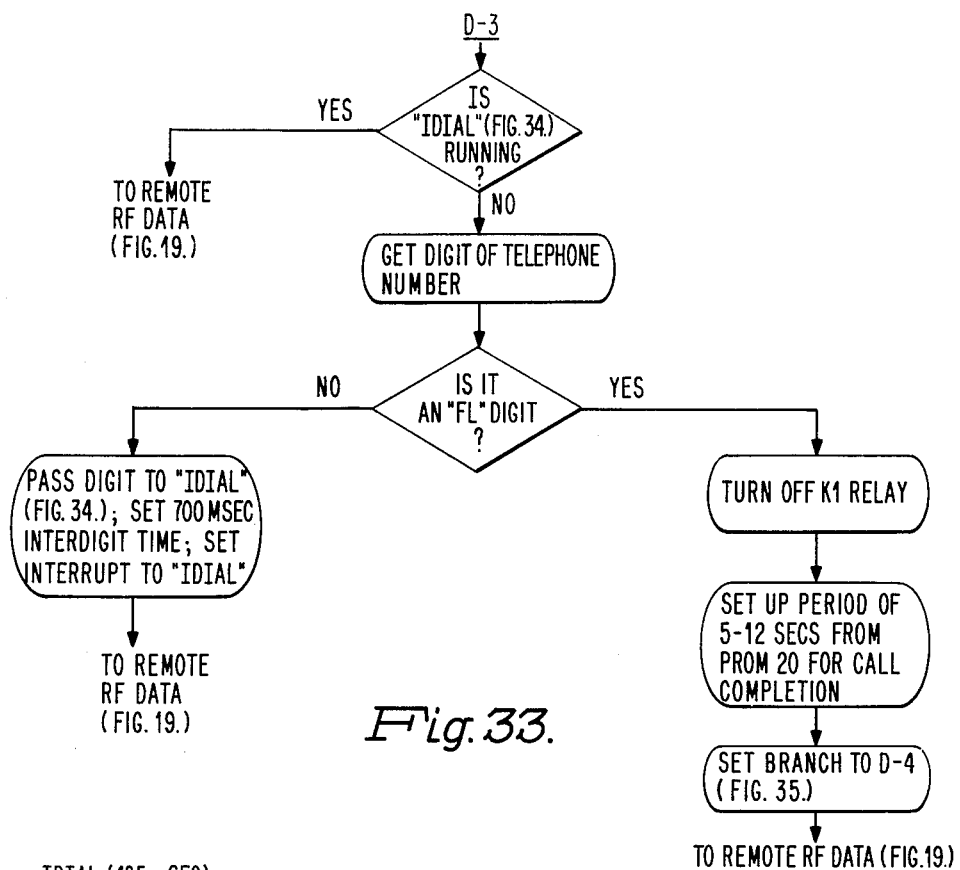
Figure 34:
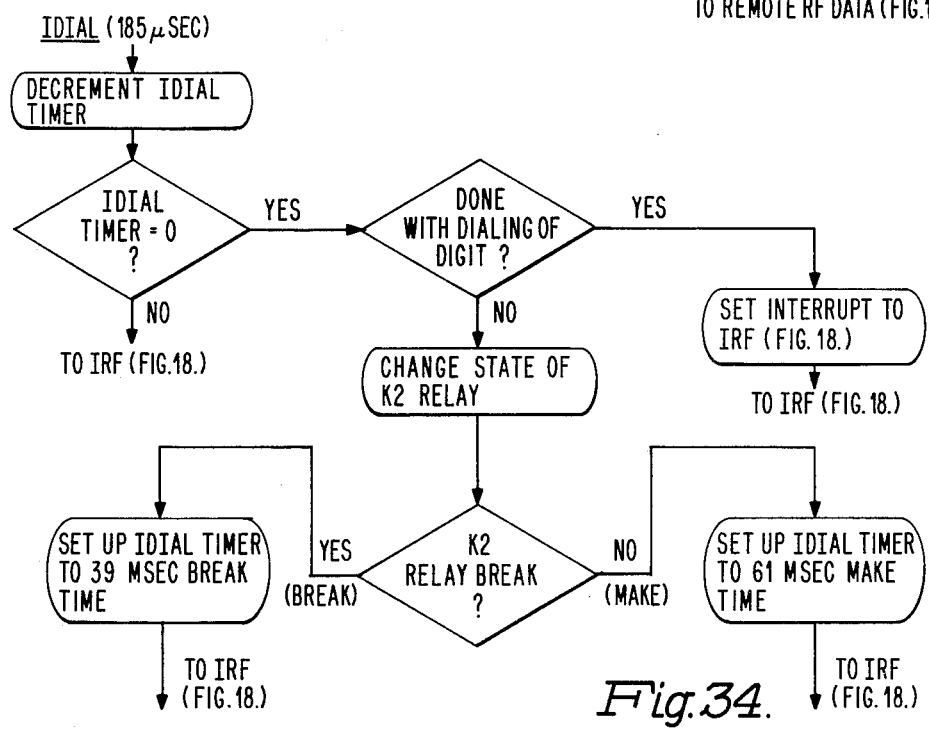

In the D−3 branch operation as shown in FIG. 33, the initial action taken is to determine whether an interrupt dial routine, designated IDIAL, is in operation. The IDIAL routine, to be discussed in detail hereinafter in connection with FIG. 34, is employed as part of the INTERRUPT subroutine for effecting the actual telephone line make/break operations in accordance with the individual digits of a telephone number employed in a dialing sequence. In the present instance, the IDIAL routine is not in operation since the IRF routine was set in the START branch operation (FIG. 29) to work only on the REMOTE RF DATA routine. In those instances in which the IDIAL routine is operative, the D−3 branch operation proceeds to the REMOTE RF DATA and other routines of the mainline program, ultimately returning to the D−3 branch operation of the TELEPHONE routine. In the event the IDIAL routine is not operative as discussed hereinabove, the D−3 branch operation proceeds to obtain a digit of the primary telephone number from the programmable read only memory 20. This digit is obtained by decrementing the PHONE NUMBER POINTER register, which contains the address of a digit in the programmable read only memory 20 and, accessing the memory 20 to obtain the digit at the specific address location. As previously discussed, the programmable read only memory is accessed at port 4 of the central processing unit CPU and the accessed information is received at port 5 of the central processing unit CPU. The digit of the telephone number received from the memory 20 is stored in the accumulator A. Following this latter operation, the digit stored in the accumulator A is examined to determine that it is actually a digit of a telephone number as opposed to a so-called "FL" digit which is stored as a flag in the programmable read only memory 20 following the last digit of a telephone number to indicate the end of the telephone number. Until such time as the FL digit of a telephone number has been reached, the program determines, by examining the digit stored in the accumulator A, that the digit is not an FL digit and proceeds to pass the digit to the IDIAL routine as shown in FIG. 34 so that the digit may be dialed. In this latter operation, the digit stored in the accumulator A is doubled in value and the resultant number is placed into a scratchpad register designated IDIAL NUMBER 2. The doubling of the value of the above digit represents the total number of make and break operations required to dial the particular digit (e.g., the digit "4" requires 4 make operations and 4 break operations, or a total of 8 make and break operations). In addition to the above operation, a standard 700 millisecond interval, as derived from the read only memory ROM and representing the interdigit time that a telephone line is held, is caused to be placed into a pair of scratchpad registers designated IDIAL TIMER. The interrupt branch operation of the INTERRUPT subroutine is then set to the IDIAL routine, following which the program proceeds to the REMOTE RF DATA and other routines of the mainline program.

As mentioned hereinabove, the actual dialing of a digit is accomplished in the execution of the IDIAL routine. This routine is executed during the INTERRUPT subroutine every 185 microseconds and, as shown in FIG. 34, commences with the decrementing of the IDIAL TIMER registers every 185 microseconds. Upon decrementing the IDIAL TIMER registers, they are examined to determine whether they have been decremented to a count or value of 0 indicating that the make or break time has expired. If the IDIAL TIMER registers have not been decremented to 0, the routine proceeds to the point IRF in the program (FIG. 18) for performing interrupt operations relative to the REMOTE RF DATA routine. If the IDIAL TIMER registers have been decremented to 0, an examination is then made to determine whether the dialing of a digit has been completed. This determination is accomplished by decrementing the IDIAL NUMBER 2 registers and examining the count therein to determine if it is positive or negative. If it is negative, this condition indicates that the dialing of a digit has been completed and the routine proceeds to set the interrupt variable to the operation IRF rather than IDIAL, thereby concluding IDIAL operations. The program eventually returns to the branch operation D−3 (FIG. 33) and, since the IDIAL routine is not being executed, the D−3 branch operation proceeds to obtain the next digit of the telephone number being used and execute the operations as indicated in FIG. 33. In the event the abovementioned IDIAL NUMBER 2 registers contain a positive number as opposed to a negative number, this condition indicates that the dialing of the digit has not been completed and steps are taken to execute telephone line make and break operations. These operations are executed by first reversing the energization state of the dial relay K2. To accomplish this reversal, port 0 of the central processing unit CPU is accessed to derive an eight-bit word and, by use of an EXCLUSIVE/OR operation (with a "1" from the read only memory ROM), inverting the logic value of bit b2 from its existing value. Bit b2 as established at port 0 and also as applied to the winding of the relay K2 (after being inverted by the inverting amplifier I4) causes the relay K2 to reverse its particular energization state. Following this operation, the state of the relay K2 is examined to determine if it corresponds to a make operation or a break operation. If it corresponds to a break operation, a standard break time of 39 milliseconds as derived from the read only memory ROM is established in the IDIAL TIMER register; if the state of the relay K2 corresponds to a make operation, a standard make time of 61 milliseconds as derived from the read only memory ROM is established in the IDIAL TIMER registers. Following the establishing of either the break time or make time in the IDIAL TIMER registers, the IDIAL routine proceeds to the operation IRF in the program for performing interrupt operations relative to the RE- MOTE RF DATA routine. As successive IDIAL routines are executed, the operations of establishing make and break times in the IDIAL TIMER registers are executed in alternation until the digit has been dialed. At the conclusion of the dialing operation, at which time the IDIAL NUMBER 2 register has been decremented to a negative count as previously noted ("DONE WITH DIALING OF DIGIT?", FIG. 34), the routine proceeds to set the interrupt variable to the operation IRF in the program, ultimately returning to the D−3 branch operation to get the next digit of the telephone number being used, as previously discussed and depicted in FIG. 33.

Returning to the D−3 operation of FIG. 33, at such time as the last digit of a telephone number has been dialed and the PHONE NUMBER pointer has been decremented to the address of the "FL" digit stored in the programmable read only memory 20 following the last digit of the telephone number, this FL digit is detected and used to cause the short relay K1 to be operated in its de-energized, or "off", state. This latter operation serves to remove the short as established across the telephone line during dialing operations. This deenergization of the short relay K1 is performed by accessing port 0 of the central processing unit CPU to derive an eight-bit word and, by using an OR function, masking all bits except bit b1 with data derived from the read only memory ROM. Bit b1 is established to have a logic "0" value at port 0 and, after being inverted to a logic "1" value by the inverting amplifier I3, is applied to the winding of the short relay K1 to cause the relay K1 to operate in its deenergized, or "off" state. The de-energization of the short relay K1 is followed by placing into the DELAY TIME OUT register a time period of about 5-12 seconds representing a reasonable time period for a call to go through the telephone company central office (C.O.). This 5-12 second time period is obtained from the programmable read only memory 20. This latter operation is then followed by decrementing the BRANCH register to a count or value of −6 corresponding to the next, specifically, D−4, branch operation. The routine then proceeds to the REMOTE RF DATA and other routines in the mainline program, ultimately proceeding to the D−4 branch operation of the TELEPHONE routine as shown in FIG. 35.

Figure 35:
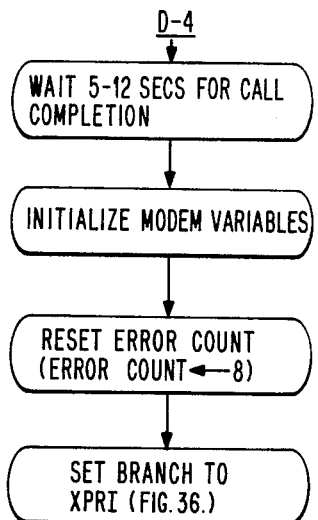

In the D−4 branch operation as shown in FIG. 35, the initial action taken is to wait 5-12 seconds for the abovedescribed telephone call to get through to the centralized communications center CCC. This latter event is detected by noting when the contents of the DELAY TIME OUT register is the same as the SECONDS register. When this occurs, certain variables of the MODEM subroutine are initialized, as will be discussed more fully hereinafter, to allow modem (modulator/demodulator) operations to commence. A count of eight as derived from the read only memory ROM and representing the maximum number of erroneous transmissions allowed to take place is then placed into a scratchpad register designated ERROR COUNT. The BRANCH register is then decremented to a count or value of −7 corresponding to the next, specifically, XPRI, branch operation. The program then proceeds to the XPRI branch operation as shown in FIG. 36.

Figure 36:
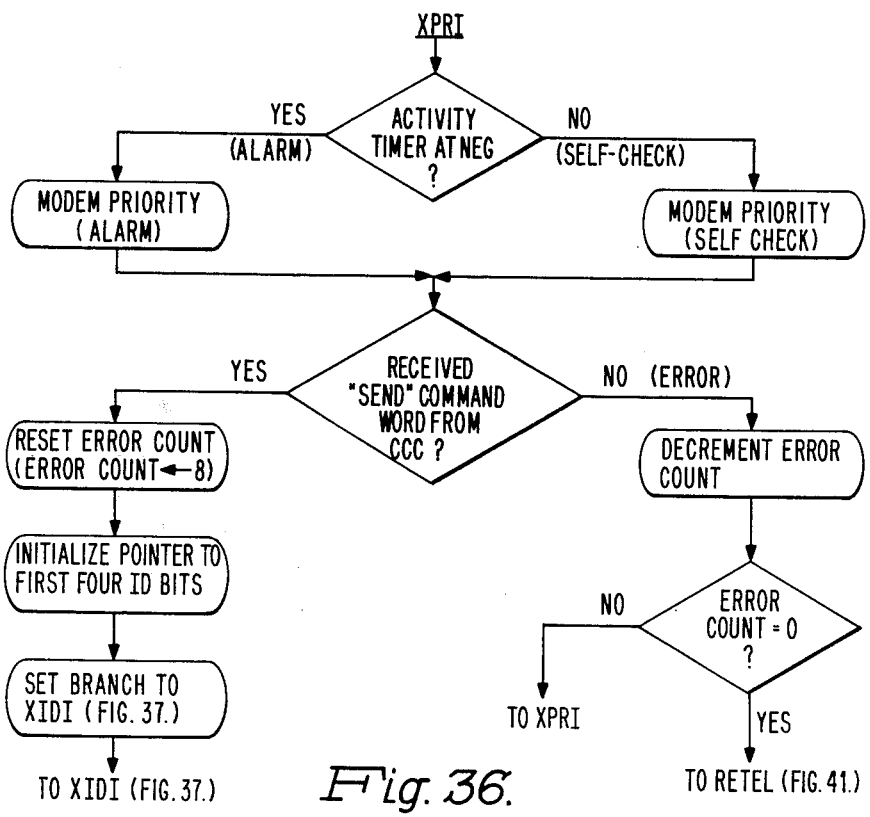

The XPRI branch operation as shown in FIG. 36 commences with the examination of the activity timer AT to determine whether it has a negative count or a positive count therein. If the activity timer AT has a negative count therein, this condition indicates that an alarm sequence is in progress and a modem priority operation is initiated. In this modem priority operation, the priority number information in the PRIORITY register is combined by use of an OR function with a hex 10 as derived from the read only memory ROM and the result is used to set a flag specifying the information in the PRIORITY register as a data word as opposed to a command word. The data word is then stored in a scratchpad register designated RO and the MODEM subroutine, to be discussed hereinafter, is called to transmit the data word in the RO register to the centralized communications center CCC as part of an alarm message, and also to receive return data from the centralized communications center CCC. In the event the activity timer AT has a positive value therein, this condition indicates a self-check call is in effect and modem operations similar to those just described are performed, in this specific case using priority number information corresponding to the number 5 to form the priority data word. In this case, the priority number information is derived from the read only memory ROM as opposed to the PRIORITY register.

Following either one of the above modem operations (alarm or self-check), a determination is made as to whether a "send" command word has been received from the centralized communications center CCC in response to the priority data word transmitted to the centralized communications center CCC. This determination is accomplished by comparing the eight bits received from the MODEM subroutine (including the start bit, command bits, command/data flag bit, stop bit and parity bit) with a hex CO as derived from the read only memory ROM. In the event a "send" command word of proper form (that is, all bits have the required logic values) is not received from the centralized communications center CCC, this condition indicates an error condition and the ERROR COUNT register is decremented from its existing value (originally eight). After each decrementing of the ERROR COUNT register, the count therein is examined to see if it is equal to 0. A count in the ERROR COUNT register of other than 0 results in the retransmission of the priority data word, specifically, a return to the XPRI operation. If several erroneous transmissions occur such that the ERROR COUNT register has been decremented to a value or count of 0, this condition indicates that the maximum allowable number of erroneous transmissions has been reached and the routine proceeds to the point RETEL in the program, to be discussed hereinafter in connection with FIG. 41, whereby the attempt to establish bi-directional communication with the centralized communications center CCC is terminated, requiring a new call to be started from the beginning.

In the event a proper "send" command word is received from the centralized communications center CCC, indicating that the priority data word was received and accepted by the centralized communications center CCC, the ERROR COUNT register is reset, by placing a count of eight into the register, in the manner earlier described, and an initialization operation is commenced in preparation of sending data representing the system identification number information to the centralized communications center CCC. To perform this latter operation, the programmable read only memory 20 is accessed to obtain the address of the first four bits of the total number of bits (12) comprising the system identification number information and placing this address into a scratchpad register designated ADDRESS POINTER. Once the initialization operation has been performed, the BRANCH register is decremented to a count or value of −7 corresponding to the next branch operation, specifically, an XIDI branch operation. The program then proceeds to the XIDI branch operation as shown in FIG. 37.

Figure 37:
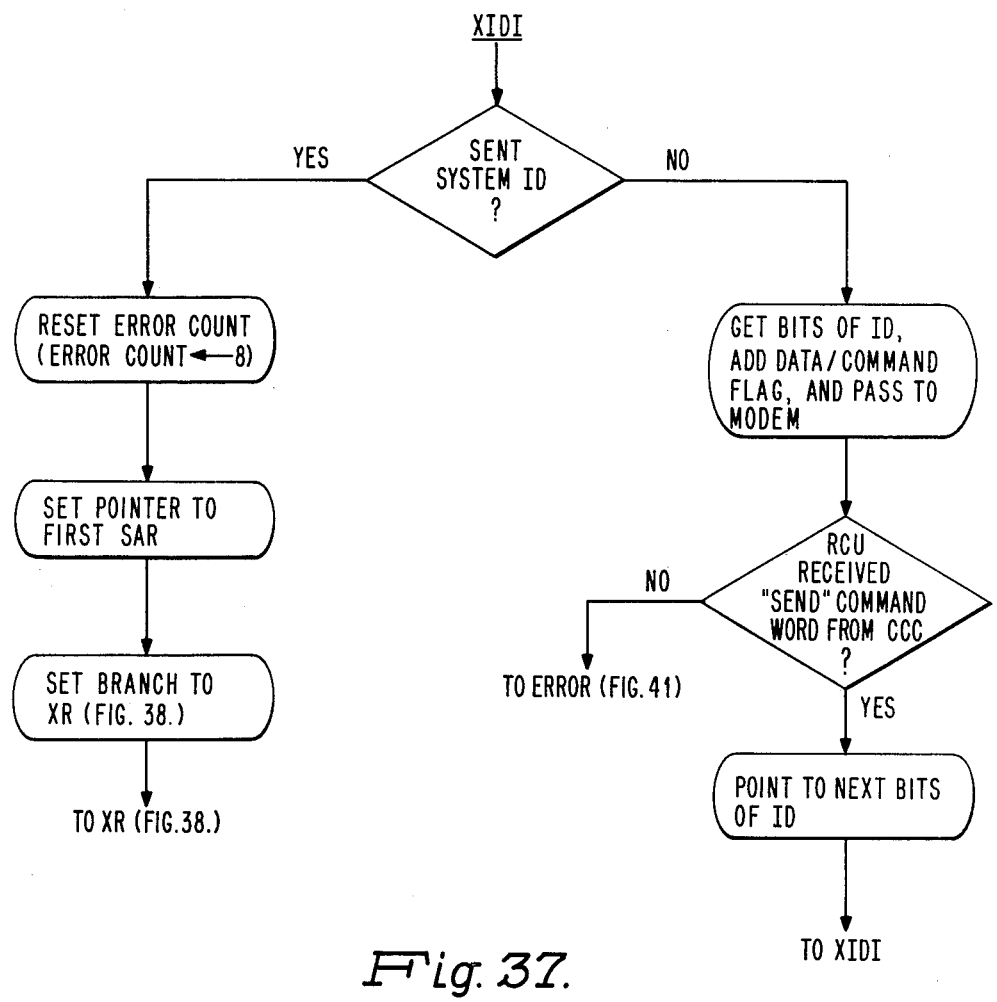
Figure 41:
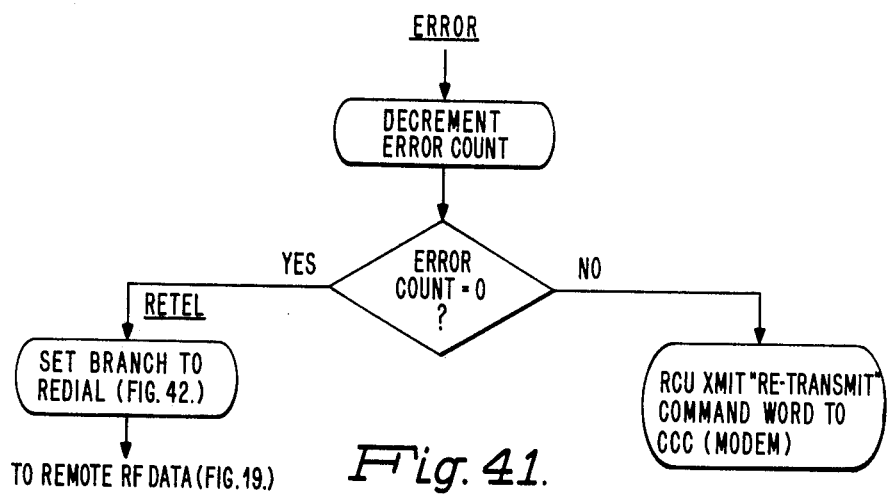

In the XIDI branch operation as shown in FIG. 37, the first action taken is to determine whether the system identification number information has been transmitted to the centralized communications center CCC. This determination is accomplished by comparing the address in the ADDRESS POINTER register, which is initially established at a value of hex 13 (the upper four bits of the 12-bit identification number), with a hex 10 as derived from the read only memory ROM and representing the location in the programmable read only memory 20 following the lower four bits of the 12-bit identification number. When the two compared addresses are not the same, this condition indicates that all of the system identification number information has not been transmitted to the centralized communications center CCC, and the initial four bits of the identification number information are obtained from the programmable read only memory 20, using the address in the ADDRESS POINTER register. A flag bit having a logic "1" value is then added to the four bits to specify the word so formed as a data word and the word is then passed on to the MODEM subroutine. In the MODEM subroutine, additional bits, specifically, start, stop and parity (odd) bits, are added to the data received thereby and the resulting eight-bit data word is then transmitted to the centralized communications center CCC. If this word is received and accepted by the centralized communications center CCC, a "send" command word is returned by the centralized communications center CCC to the remote control unit RCU and stored in the accumulator A. The receipt of this "send" command word by the remote control unit RCU causes the ADDRESS POINTER register to be decremented to the address in the programmable read only memory 20 of the next four bits of the system identification number information. The program then returns to the operation XIDI and the above process is repeated until all of the system identification number information (12 bits) has been obtained from the memory 20 and transmitted, together with the appropriate data flag, start, stop and parity bits, to the centralized communications center CCC. This latter event is attained when the ADDRESS POINTER register has been decremented to the aforementioned value of hex 10. In the event any eight-bit data word containing system identification number information transmitted to the centralized communications center CCC is not followed by a "send" command word from the centralized communications center CCC, for example, due to a transmission line error or other problems, the program proceeds to a routine ERROR as shown in FIG. 41, to be discussed in detail hereinafter.

Once the entire system identification number information has been transmitted to the centralized communications system CCC as discussed hereinabove, the ERROR COUNT register is reset by loading a count of eight therein, in the same manner as earlier described. The ADDRESS POINTER register is then set to a value of hex 60 as derived from the read only memory ROM and representing the address of the upper four bits of the upper byte of the first one of the aforementioned plurality of sensor activity registers SAR (see FIG. 23) in which sensor activity information is retained on a continuing basis. The first SAR register is employed to retain a continuing count or tally of the number of times that the rf signalling device 15 #1 has been actuated. Other SAR registers are employed to retain continuing running counts or tallies of the number of times that other ones of the sensors in the system have been actuated, namely, the rf signalling device #2, the bathroom sensor 5 #1, the bathroom sensor 5 #2, the ac line sensor 3 #1 (e.g., television), the ac line sensor 3 #2 (e.g., lamp), and the switch sensor 6 (e.g., refrigerator). As mentioned previously, no tallies or running counts are maintained for the fire or security (burglar) sensors or for the telephone TL. In addition to the above SAR registers, a pair of additional scratchpad registers, constituting the self-check timer SCT and designated SELF CHECK, are also used as part of the common alarm/self-check protocol for retaining upper and lower bytes of a count (in minutes) specifying the time that a self-check operation is to commence. Once the ADDRESS POINTER register has been set to the address of the first SAR register as discussed above, the BRANCH register is decremented to a value of −9 representing the next branch operation, specifically, an XR branch operation. The program then proceeds directly to the XR branch operation as shown in FIG. 38.

Figure 38:
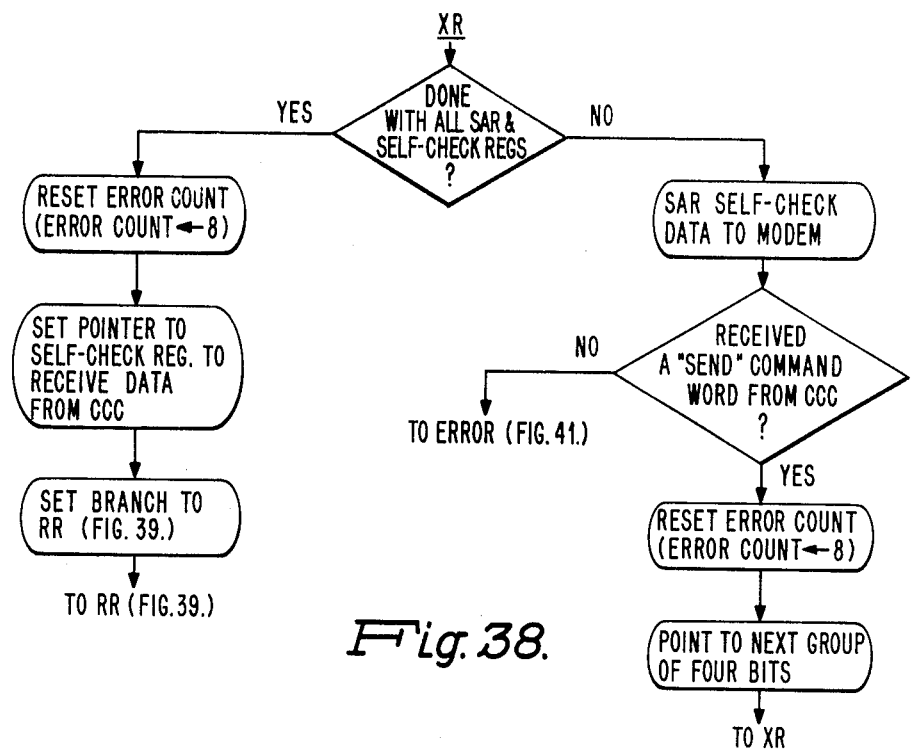

In the XR branch operation as shown in FIG. 38, the initial action taken is to determine if the sensor activity and self-check information retained within the SAR and SELF-CHECK registers has been transmitted to the centralized communication center CCC. This determination is accomplished by comparing the address of the ADDRESS POINTER register with a hex 74 as derived from the read only memory ROM and representing the address of the lower half of the low byte of the second SELF-CHECK register. When the compared addresses are not the same, this condition indicates that the sensor activity and self-check timing information has not been transmitted, or completely transmitted, to the centralized communications center CCC, and the program proceeds to obtain this information, starting with the first SAR register, and to transmit the information to the centralized communications center CCC. The latter operations are achieved by first accessing the first SAR register, using the address in the ADDRESS POINTER register, and passing the upper four bits of the sensor activity information contained in the first SAR register, together with a logic "1" flat bit specifying the information as a data word, to the MODEM subroutine. Additional bits, specifically, start, stop and parity (odd) bits, are added to the data word received by the MODEM subroutine and the resulting word is transmitted to the centralized communications center CCC. If the eight-bit data word is received and accepted by the centralized communications center CCC, a "send" command word is returned by the centralized communications center CCC to the remote control unit RCU and retained in the accumulator A. The proper receipt of the "send" command word by the remote control unit RCU causes the ERROR COUNT register to be reset, in the same manner as earlier described, and the ADDRESS POINTER register to be incremented to the next address to obtain the lower four bits of the sensor activity information retained in the first SAR register. The above operations are repeated many times until all of the information in all of the SAR registers and the two SELF-CHECK registers has been transmitted, together with appropriate data flag, start, stop and parity bits, to the centralized communications center CCC and properly acknowledged by "send" command words from the centralized communications center CCC. It is to be noted that, unlike a self-check operation, the data in the SAR registers is read out therefrom in an alarm sequence in a non-destructive fashion. In the event any data word transmitted to the centralized communications center CCC is not followed by a "send" command word from the centralized communications center CCC, for example, due to a transmission line error or other problems, the program proceeds to the aforementioned operation ERROR.

Figure 39:
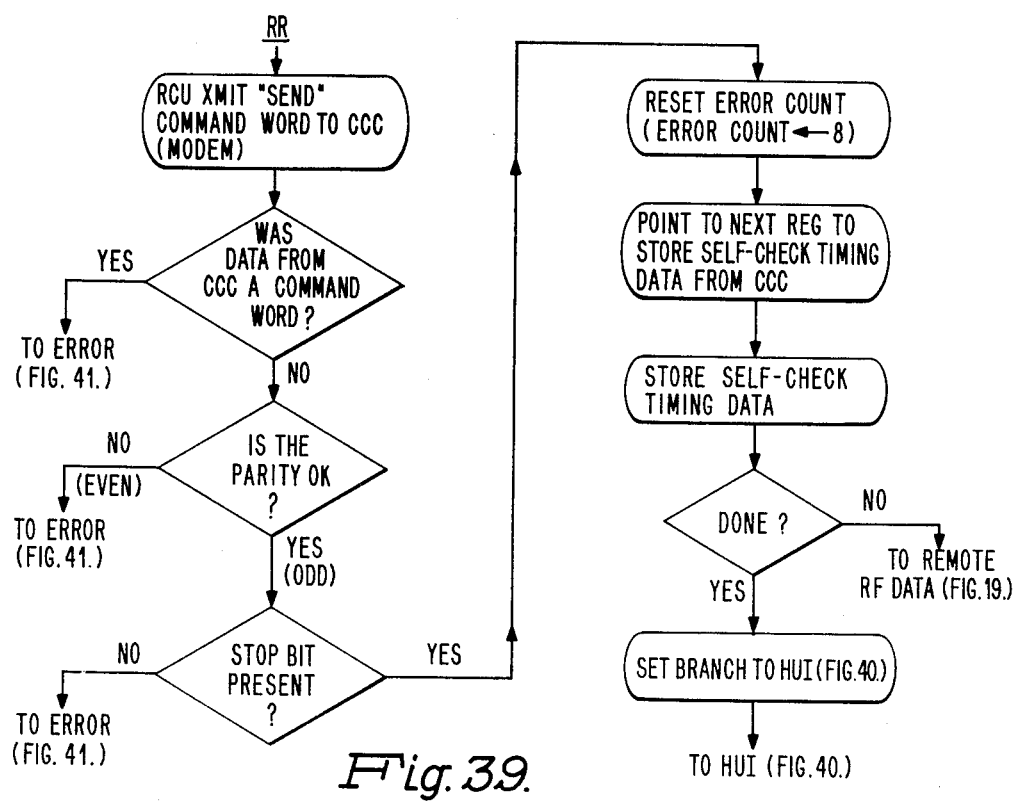

Once all of the information contained in the SAR and SELF-CHECK registers has been transmitted to the centralized communications center CCC as discussed hereinabove, the ERROR COUNT register is again reset and the ADDRESS POINTER register is set to a value, specifically, hex 6F, representing the appropriate address of the upper four bits of the first SELF-CHECK register in which self-check timing information in a timing control message from the centralized communications center CCC is to be stored. The BRANCH register is then decremented to a value of −10 corresponding to the next branch operation, specifically, an RR branch operation as shown in FIG. 39. The program then proceeds directly to the RR branch operation.

In the RR branch operation as shown in FIG. 39, the initial action taken is the transmission by the remote control unit RCU, utilizing the MODEM subroutine, of a "send" command word in a message to the centralized communications center CCC (see FIG. 3). If this command word is received and accepted by the centralized communications center CCC, it is followed by the transmission from the centralized communications center CCC of various timing data in the timing control message to the remote control unit RCU. This data, which is transmitted by the centralized communications center CCC in successive data words, is the same as that as transmitted by the centralized communications center CCC during a self-check operation and includes: self-check timing information specifying, as previously described, the remaining time, in minutes, before a self-check call is scheduled to be initiated by the remote control unit RCU; normal activity timing information (e.g., 8–10 hours, specified in minutes); bathroom activity timing information (e.g., 1–2 hours, specified in minutes), pre-alarm flag information indicating whether a pre-alarm cycle is to be associated with the rf signalling devices 15; and pre-alarm timing information (e.g., 1 minute) for use by the remote control unit RCU in connection with a pre-alarm cycle.

Each data word transmitted by the centralized communications center CCC, together with its associated command/data flag bit, start bit, stop bit and parity (odd) bit, is received by the MODEM subroutine and placed into the accumulator A whereupon various tests are performed on the word to determine if it should be accepted. The first test performed is to determine that the word is a data word, which is expected, as opposed to a command word, which would suggest an error situation. This latter operation is executed by masking the contents of the accumulator A, in an AND operation, with a hex 20 as derived from the read only memory ROM and testing the result of the bit representing the command/data flag bit. If the result is a logic "0", this condition indicates that the received word was not a data word (i.e., the flag bit is not a data flag bit) and the program proceeds to the ERROR routine. If the result is a logic "1", this condition indicates that the word was a data word (i.e., the flag bit is a data flag bit) and it is then tested to determine if its parity is correct. This operation is performed by placing the received word (less the stop bit) into a scratchpad register used for parity operations, designated 1 PARITY, and, in the general manner earlier described in connection with parity determinations for the REMOTE RF DATA routine (FIG. 19), examined to determine if it has odd parity.

If the word does not have odd parity, the program proceeds to the ERROR routine. If the word has the proper odd parity, it is then examined to determine if the stop bit, having a logic "1" value, is present therein. This operation is performed by placing the word into the accumulator A and masking the contents of the accumulator A, in an AND operation, with a hex 80 as derived from the read only memory ROM. If the result is a logic "0", this condition indicates that the bit in the stop bit position in the word has an erroneous logic "0" value and the program proceeds to the ERROR routine. If the result is a logic "1", this condition indicates that the bit in the stop bit position in the word has the proper logic "1" value for a stop bit and indicates that the word received from the centralized communications center CCC is a proper data word. The ERROR COUNT register is then caused to be reset, in the manner as earlier described. The ADDRESS POINTER register is then incremented to point to the first register, specifically, the first one of the aforementioned SELF CHECK registers employed to store the self-check timing information received from the centralized communications center CCC during the present transmission sequence. This latter operation is then followed by actually storing in these registers the first self-check timing word received from the centralized communications center CCC. At this point, and since all the data transmitted by the centralized communications center CCC has not been stored in associated scratchpad registers, the program proceeds to the REMOTE RF DATA routine which ultimately returns to the RR branch operation for receiving and testing a new word from the centralized communications center CCC. The determination that all of the data from the centralized communications center CCC, including the self-check timing data, activity timing data, and the pre-alarm flag and timing data, has not been stored in associated registers is accomplished by comparing the contents of the ADDRESS POINTER register with a hex 7D as derived from the read only memory ROM and representing the address of the last timing register. If the compared data is not the same, this condition indicates that all of the data from the centralized communications center CCC has not been stored in the SELF-CHECK registers and the other registers employed to store the activity timing data and the pre-alarm flag and timing data. The program then proceeds to the REMOTE RF DATA routine.

Figure 40:
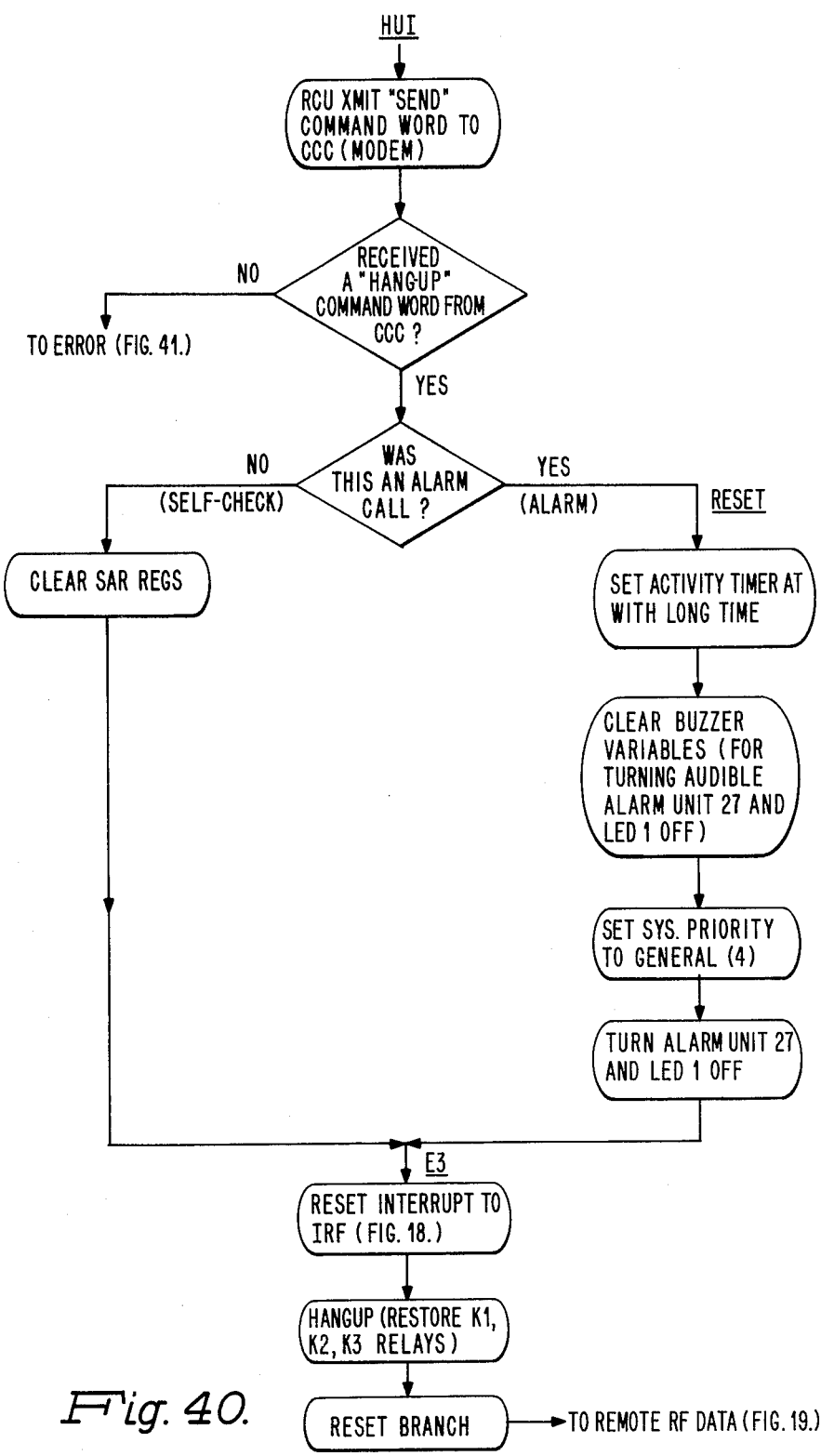

The above data testing operations are performed repetitively until each word transmitted by the centralized communications center CCC has been received and either accepted or rejected (ERROR routine), with each word accepted in the RR branch operation being followed by a "send" command word (via the MODEM routine) for requesting a new word from the centralized communications center CCC. At such time as all of the data transmitted by the centralized communications center CCC has been stored in the SELF-CHECK and the other appropriate registers, as indicated by the contents of the ADDRESS POINTER register being equal to a hex 7D, the BRANCH register is decremented to a value of −11 representing the next branch operation, specifically, an HU1 branch operation as shown in FIG. 40. The program then proceeds directly to the HU1 branch operation.

In the HU1 branch operation as shown in FIG. 40, the initial action taken is to send, via the MODEM subroutine, a "send" command word to the centralized communications center CCC for the purpose of receiving a "hang-up" command word from the centralized communications center CCC to terminate the telephone call. The word received from the centralized communications center CCC is stored in the accumulator A and compared with a hex C6 as derived from the read only memory ROM. If the contents of the accumulator A is not equal to a hex C6, this condition indicates that the word was not a proper "hang-up" command word (e.g., improper bit values) and the program proceeds to the ERROR routine. If the contents of the accumulator A is equal to a hex C6, this condition indicates that the word was the desired and expected "hang-up" command word and the program proceeds to determine if the present sequence is an alarm sequence and, if so, to place the long activity timing information (e.g., 8–10 hours) as received from the centralized communications center CCC into the activity timer AT. The determination that the present sequence is an alarm sequence is accomplished by examining the count in the activity timer AT to see if it is negative. If it is, the normal activity timing information is loaded from the aforementioned LONG TIME registers into the activity timer AT. The buzzer variables are then cleared by placing a count of 0 as derived from the read only memory ROM into the aforedescribed BUZZER LOAD TIME register so that the operation (intermittent) of the audible alarm unit 27 and the light emitting diode LED1 can be terminated. The priority of the system is then set to the general priority by placing a count of 4 as derived from the read only memory ROM into the PRIORITY register. The audible alarm unit 27 and the light emitting diode LED1 are then actually operated to their "off" states, specifically, by accessing port O of the center processing unit CPU to derive an eight-bit word and, by performing an OR operation with bit b5 and a hex 20 as derived from the read only memory ROM, establishing bit b5 to have a value at port O of logic "0". This bit b5 is then inverted by the inverting amplifier I1 to a logic "1" value for turning off the audible alarm unit 27 and the light emitting diode LED1, in the manner as previously described.

In the event an examination of the activity timer AT as described hereinabove following the receipt of an expected "hang-up" command word from the centralized communications center CCC indicates that the sequence is not an alarm sequence, that is, the activity timer AT contains a negative count, this condition indicates the execution of a self-check sequence. In this latter situation, the program as shown in FIG. 40 proceeds to clear, or reset, the SAR registers to prepare these registers for receiving and storing therein new sensor activity data. The previous data in the SAR registers is therefore destroyed. The program then proceeds, as in the case of an alarm sequence, to reset the INTERRUPT subroutine to the IRF operation (FIG. 18). This latter operation is then followed by returning the relays K1-K3 (FIG. 56) to their original states, that is, their states prior to the present call, thereby to terminate the present call. The BRANCH register is then reset, by loading a count of 0 as derived from the read only memory ROM into the BRANCH register. The program then proceeds to the REMOTE RF DATA routine.

As previously discussed, whenever an error condition occurs in the transmission of data between the remote control unit RCU and the centralized communications center CCC, in either direction, the routine then in effect is directed to the aforementioned ERROR routine. The ERROR routine, which is shown in FIG. 41, can be called and executed in a number of different situations including the following: a command word is received by the remote control unit RCU when a data word is expected; a data word received by the remote control unit RCU has incorrect parity or lacks the proper stop bit; and an expected "hang-up" command word is not received by the remote control unit RCU.

Figure 42:
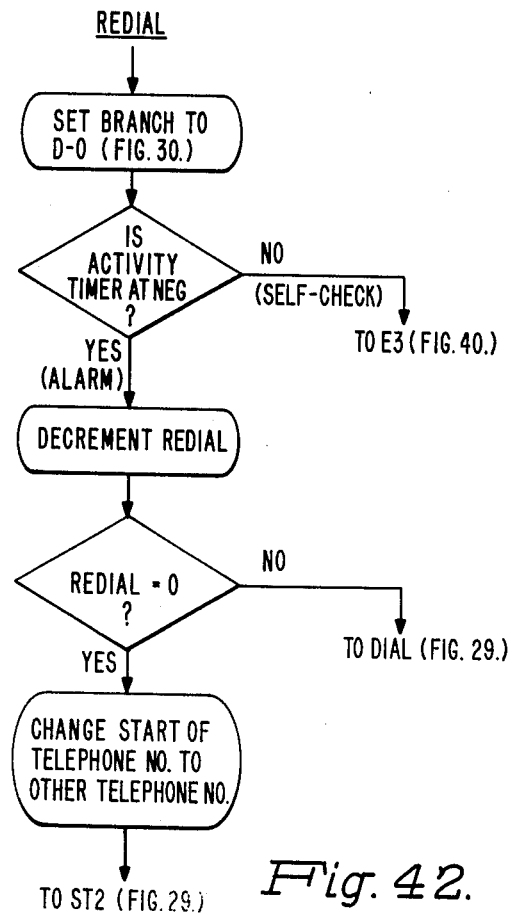

Referring to FIG. 41, the first action taken whenever an error situation occurs is to decrement the ERROR COUNT register. As previously mentioned, the ERROR COUNT register is initially loaded, or set, to a count of 8 representing the maximum number of errors permitted before aborting a call. So long as the count in the ERROR COUNT register is greater than 0, the remote control unit RCU operates, via the MODEM subroutine, to send a "retransmit" command word back to the centralized communications center CCC to cause retransmission by the centralized communications center CCC of the last word sent thereby. At such time as the ERROR COUNT register has been decremented eight successive times to a count of 0, the program proceeds to the aforementioned point RETEL in which the BRANCH register is loaded to a count of −14 representing the next branch operation, specifically, a REDIAL branch operation as shown in FIG. 42, for aborting the present call and initiating a new call. The program then proceeds to the REMOTE RF DATA routine which ultimately returns to the REDIAL branch operation.

Referring now to the REDIAL branch operation as shown in FIG. 42, the initial action taken is to set the BRANCH register back to its count of −2 corresponding to the D−O branch operation (see FIG. 30). The count loaded into the BRANCH register is derived from the read only memory ROM. The activity timer AT is then examined to determine whether the count therein is negative, corresponding to an alarm sequence, or positive, corresponding to a self-check sequence. If the count in the activity timer AT is negative, the aforedescribed REDIAL register, which was originally set to a count of eight representing the maximum number of times that either the primary or secondary telephone number can be used in succession before switching to the other telephone number, is caused to be decremented. The count in the REDIAL register is then examined. So long as the REDIAL register has a count greater than 0, this condition indicates that the above-mentioned maximum of eight successive uses of the telephone number, initially the primary telephone number, has not been reached and the program proceeds to a point DIAL in FIG. 29 to reinitiate the telephone call using the current telephone number. At such time as the REDIAL register has been decremented to 0, indicating that eight successive but unsuccessful calls using the current telephone number have been made, a switch is made from the current telephone number to the other telephone number, by changing the pointing location of the aforementioned START POINTER register to the other telephone number in the programmable read only memory 20. This latter operation is performed by using the contents of the START POINTER register in an EXCLUSIVE/OR operation with a hex 12 as derived from the read only memory ROM. The program then proceeds to the earlier described point S2 in the START brach operation as shown in FIG. 29 for making the initial telephone call using the second telephone number. If the second telephone number is used up to eight successive times without success in reaching the centralized communications center CCC, the above EXCLUSIVE/OR operation will cause the START POINTER register to change its pointing direction back to the first telephone number in the memory 20 so that the first telephone number can be used again. The above process occurs repeatedly and in alternation until the centralized communications center CCC is reached by a call.

In the REDIAL branch operation as described hereinabove, specifically, in the examination of the contents of the activity timer AT, a positive count in the activity timer AT suggests a self-check sequence. In such a case, as may occur in connection with telephone calls in self-check operations, to be described more fully hereinafter, the program proceeds to a point E3 as shown in the HU1 branch operation of FIG. 40 for terminating an existing self-check telephone call. A new attempt will be made on the next minute when the self-check timer SCT is examined, as will be discussed in greater detail hereinafter.

MODEM OPERATIONS (FIGS. 43-54); MODEM AMPLIFIER AND FILTER CIRCUITRY 32 (FIG. 46)

The transmission and reception of data by the remote control unit RCU, whether during an alarm sequence or a self-check sequence, requires substantial modulation/demodulation (modem) operations. Modulation involves the generation of a 900 hertz carrier, inverting the phase of this carrier for each logic "0" bit to be transmitted, and using the same phase of the carrier for each logic "1" bit to be transmitted. These operations are set forth in FIGS. 44 and 45. Demodulation involves the sampling of incoming data at a high rate (specifically, at the interrupt rate of 185 microseconds), detecting a 900 hertz carrier, locking onto the phase of this carrier, and subsequently detecting phase reversals or the lack thereof while permitting certain timing variations, or skewing, of the data. These operations are set forth in FIGS. 47 to 54. Received data is analyzed as to whether it represents data words, command word, or errors, in the manner earlier described in connection with the TELEPHONE routine.

Information transfer between the remote control unit RCU and the centralized communications center CCC occurs at a 50 baud (bits/second) rate, resulting in a bit time which is equivalent to 18 cycles of the 900 hertz carrier (900/50=18), or 19.8 milliseconds. A transmitted word comprises a reference tone followed by 8 bits, resulting in a word time of 178.2 (9×19.8) milliseconds. The 8 bits of a typical word include, as previously described, a start bit, a four-bit data or command word, a command/data bit, a parity (odd) bit, and a stop bit. A logic "0" bit is encoded as a 180-degrees phase reversal of the 900 hertz carrier, as referenced to the previous bit. Logic "1" bits are represented by the absence or lack of this phase reversal. As previously described, all data transmissions are bi-directional in nature, that is, the remote control unit RCU sends data to the centralized communications center CCC, then the centralized communications center CCC sends acknowledgement to the remote control unit RCU, etc.

The 900 hertz carrier as mentioned hereinabove is generated by the central processing unit CPU by simply toggling bit position 3 of port O every 555 milliseconds. To generate a phase reversal in this carrier, it is only required to neglect toggling bit position 3 of port O for a 555 millisecond period. The resultant half-cycle skew is a 180-degrees phase shift in the carrier waveform.

Figure 43:
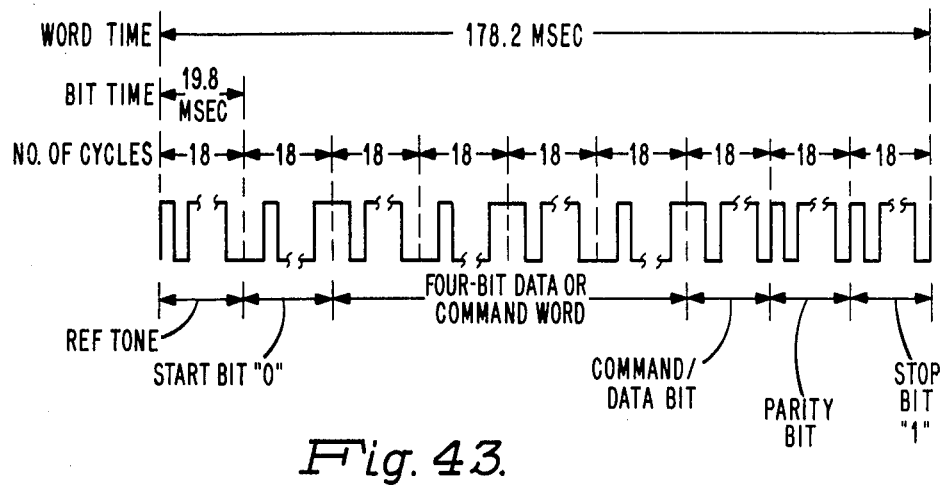
FIG. 43 illustrates the formatting of data in a word transmitted between the remote control unit and the centralized communications center during an alarm or self-check sequence.

A transmitted word is indicated in FIG. 43 and is generated as follows. Initially, 18 cycles of the 900 hertz carrier are generated as a reference tone. At the end of the 18th cycle, a phase reversal is achieved to represent a start bit ("0"). Thereafter, every 18th cycles, the logic state of the bit to be transmitted is examined. If it is a logic "0", the phase of the 900 hertz carrier is shifted 180 degrees; otherwise, it is left unaltered. A stop bit is always transmitted as a logic "1" data bit.

In the receive mode of operation of the central processing unit CPU, the central processing unit CPU performs carrier detection by sampling bit position 5 of port 1 at the interrupt rate, that is, every 185 microseconds. This is done only when data is expected or anticipated, that is, during a data transmission. This sampling rate results in six samples every 900 hertz period. Each sampled bit is shifted into a word, which always reflects the six most recent sampled bits; as a new bit is added, the oldest is dropped. Successive six-bit sample words are compared with known bit pattern variations of a 900 hertz waveform until either a match is found (carrier detected) or a predetermined time period during which data is expected expires (no carrier or loss of carrier). Once the carrier has been detected, the central processing unit CPU monitors for a sudden 180-degrees phase shift in the sampled incoming waveforms, using the abovedescribed process. When a phase reversal is detected (indicating a start bit), the central processing unit CPU delays the equivalent of 9 cycles of the 900 hertz carrier, to position itself in the middle of a bit time, and then stores the sampled incoming waveform as a phase reference. Thereafter, every 18 cycles, the central processing unit CPU compares the instantaneous phase of the incoming waveform with the previously stored phase reference, recording logic 0's for every phase revesal and logic 1's otherwise. Following each comparison, the previous phase reference is replaced by the new sampled incoming waveform. Eventually, a received word is accumulated which can be tested for parity and errors, and further processed as required. Should either the 900 hertz carrier or the start bit not be detected by the central processing unit CPU when anticipated (no carrier or loss of carrier) the central processing unit CPU will repeat the word generation process, that is, transmit the "retransmit" command word and process the received data, using several such attempts as previously described in detail in connection with the TELEPHONE routine.

Figure 44:
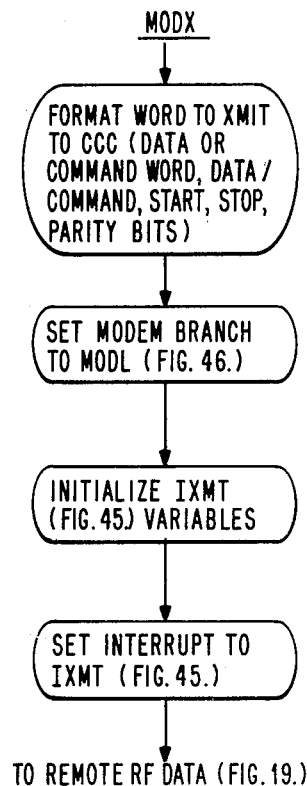
Figure 45:
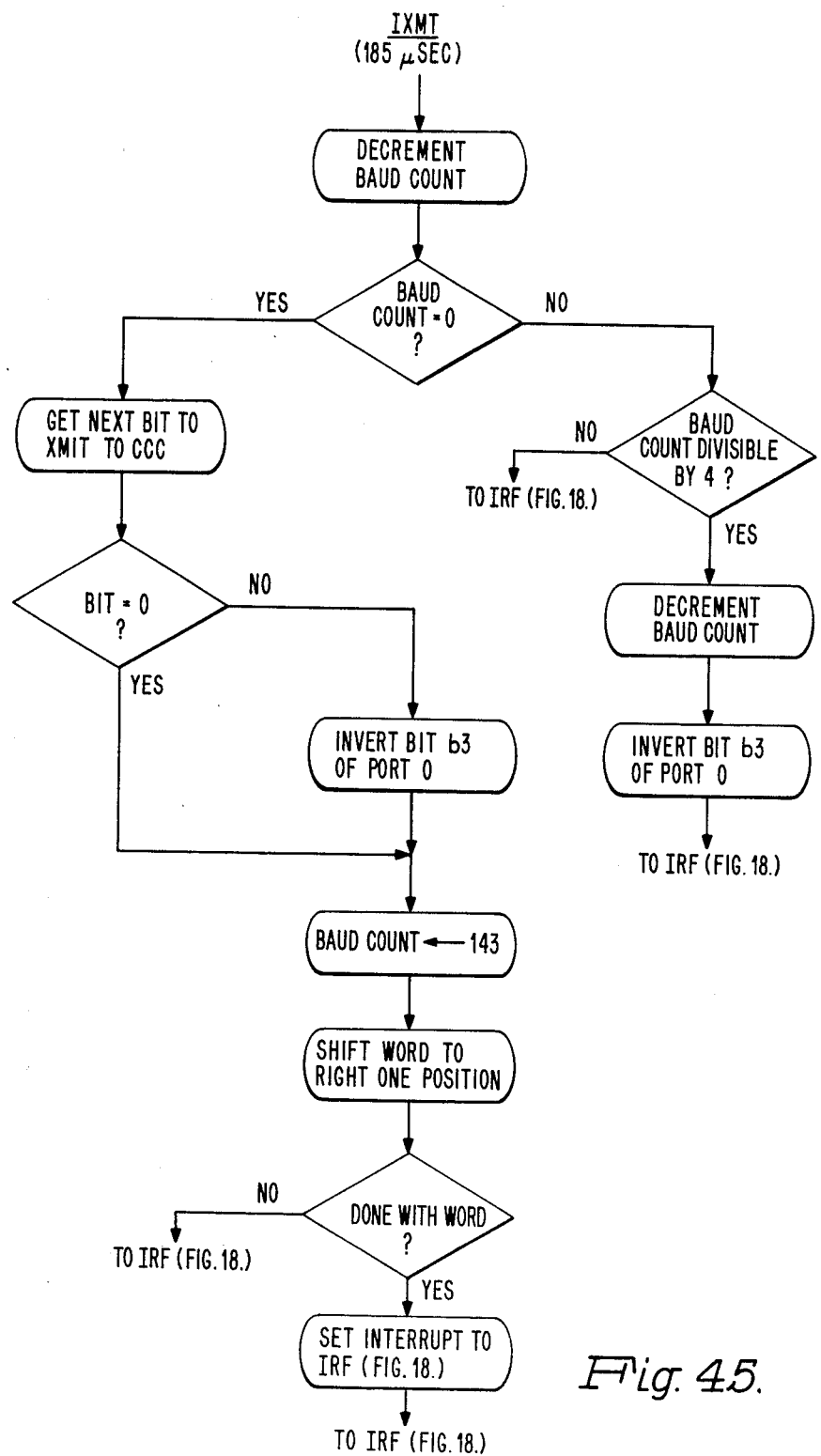

The manner in which a transmit operation takes place is indicated in FIGS. 44 and 45. The modem operation involves the execution of multiple branch operations as directed by a MODEM BRANCH scratchpad register, commencing with a branch operation or routine MODX as shown in FIG. 44. As indicated in FIG. 44, the MODX routine commences with the formatting of a word to be transmitted by the remote control unit RCU to the centralized communications center CCC. This formatting is accomplished by taking five bits stored in the RO scratchpad register, comprising a data or command word (four bits) and a single command-/data bit, and adding a start bit, a parity (odd) bit and stop bit. The start bit is added by simply shifting the five bits in the RO scratchpad register to the left one position which automatically adds a start bit of a logic "0" value; the parity bit is calculated by using the "parity routine" as previously described in connection with the REMOTE RF DATA routine (FIG. 19); the stop bit is added by performing an OR operation on the data in the RO register and a hex 80 as derived from the read only memory ROM, which operation produces a stop bit of a logic "1" value. The above operations are followed by decrementing a MODEM BRANCH scratchpad register (which initially is set to a count or reset value of 0) to a count of −1 corresponding to the next branch operation, specifically, a MODL branch operation. As will be described hereinafter in connection with FIG. 47, the MODL branch operation is a demodulation (receive) operation executed as part of the MODEM subroutine.

Following the decrementing of the MODEM BRANCH register, certain variables associated with interrupt transmit operations, designated IXMT and performed during the INTERRUPT subroutine, are caused to be initialized. Specifically, a count of 9 as derived from the read only memory ROM is loaded into a BIT COUNT IXMT scratchpad register, and a count of 143 as derived from the read only memory ROM is loaded into a BAUD COUNT scratchpad register. The count of 9 corresponds to the total number of bits to be transmitted in connection with a single word and includes a 900 hertz reference bit or tone and the aforementioned eight bits of a word as stored in the RO register. The count of 143 is related to the total number of interrupts, specifically, 108, in a bit time, more particularly, 1⅓ of the number of interrupts (4/3 × 108 = 143) in a bit time. Following the above initialization operations, the eight bits in the RO register are placed into a WORD-TO-XMIT scratchpad register. The routine is then set to the interrupt operation IXMT, specifically, by loading the data counter DC with the starting address of the IXMT operation. The program then proceeds to the REMOTE RF DATA routine in the mainline program.

The MODEM subroutine is interrupted in normal course, that is, every 185 microseconds, to perform the interrupt IXMT operation as shown in FIG. 45. As indicated in FIG. 45, the IXMT operation commences with the decrementing of the aforementioned BAUD COUNT register. This register is decremented every 185 microseconds and is examined after each decrementing operation to determine if it contains a count or value of 0 therein. If the count in the BAUD COUNT register is equal to 0, this condition indicates that 18 cycles of the same phase, that is, one bit of a duration of 19.8 milliseconds, has been transmitted, and the next bit is obtained to be transmitted to the centralized communications center CCC. The one bit period requires 108 (6×18) interrupts. If the count in the BAUD COUNT register is other than 0, this condition indicates that 18 cycles of the same phase have not occurred and that the particular bit then being processed has not been completely transmitted to the centralized communications center CCC. In this case, the count in the BAUD COUNT register is examined in an arithmetic division operation to determine if cycles of a 900 hertz reference bit or tone should be generated in the particular bit time. More specifically, the count in the BAUD COUNT register is divided by the number 4 and the remainder used to either generate cycles of a 900 hertz reference tone or to return to the IRF interrupt operation (FIG. 18). The number 4 is employed, in conjunction with decrementing of the BAUD COUNT register as will be described, since it is more convenient to use in arithmetic operations than the number 3 which represents the number of interrupts (each of 555 microseconds duration) that are required to take place before cycles of a 900 hertz reference bit or tone can be generated. In the event the count in the BAUD COUNT register is divisible by 4, the BAUD COUNT register is decremented by a count of 1, thereby to achieve an equivalent divide-by-three arithmetic operation, and the bit at bit position 3 of the port O is then inverted in value to generate cycles of the 900 hertz reference bit in the particular bit period. The above arithmetic division operation is accomplished by loading the count in the BAUD COUNT register into the accumulator A and performing an AND operation with a hex 03 as derived from the read only memory ROM. If the result is a 0, this condition indicates that the count in the BAUD COUNT register is divisible by 4; otherwise, it is not. The inversion of the bit at bit position 3 or port 0 is accomplished by accessing and inputting the eightbit word at port 0 and performing an EXCLUSIVE/OR operation with bit b3 and a hex 08 as derived from the read only memory ROM. The result is then applied to bit position 3 of port 0 and serves to toggle this bit position every third interrupt (555 microseconds) to generate cycles of the 900 hertz bit or tone. In the event the BAUD COUNT register is not divisible by the number 4 as described hereinabove, the program returns to the IRF interrupt operation. This latter operation ultimately returns to the mainline program and back to the IXMT interrupt operation. The toggling of bit position 3 of port 0 as described above also returns to the IRF operation and, ultimately, back to the IXMT operation. Multiple IXMT operations are performed in a successive, repetitive fashion until the count in the BAUD COUNT register has been decremented to a value of 0 indicating that 18 cycles (19.8 milliseconds) of the same phase, that is, a complete bit, have been transmitted to the centralized communications center CCC. When this condition occurs, the next bit to be transmitted is obtained from the aforementioned WORD-TO-XMIT register. This new bit is then examined to determine its particular logic value. If this bit has a logic value of "0", the BAUD COUNT register is caused to be set to a count of 143 as derived from the read only memory ROM. In this case there is no toggling of bit position 3 of port 0 for a period equal to three interrupts (555 microseconds), thereby achieving a phase reversal. If the new bit has a logic value of "1", bit position 3 of port 0 is inverted or toggled, in the same manner as earlier described, to keep the 900 hertz reference tone going at the same phase. Following this latter operation, the BAUD COUNT register is, as in the previous situation, caused to be set to a count of 143. The establishing of the 143 count in the BAUD COUNT register serves to initialize the BAUD COUNT register to start a new bit period of 108 (6×18)

cycles. Following the initialization of the BAUD COUNT register, the word retained in the WORD-TO-XMIT register is shifted to the right one position whereupon an examination is made to determine if an entire word has been transmitted. This determination is accomplished by loading the accumulator A with the contents of the BIT COUNT IXMT register, decrementing this data and testing for a value of 0. If the result of this test is not 0, this condition indicates that an entire word has not been transmitted and the program proceeds to the IRF interrupt operation, ultimately returning to the IXMT interrupt operation for executing the same operations as described hereinabove. At such time as a complete word has been transmitted, as indicated by a value of 0 for the test of the contents of the BIT COUNT IXMT register (in the accumulator A), the program is set to the IRF interrupt operation, specifically, by loading the data counter DC with the starting address of the IRF operation. The IRF operation ultimately returns to the IXMT operation for processing subsequent words, utilizing the aforedescribed MODX operation (FIG. 44).

Data bits produced at bit position 3 or port 0 for transmission to the centralized communications center CCC as described above requires additional processing before being actually placed onto the telephone line. This additional processing serves to match the data produced by the central processing unit CPU to the particular operating characteristics of the telephone line and is accomplished by the modem amplifier and filter circuitry 32 as shown in detail in FIG. 46. For purposes of data transmission, the modem amplifier and filter circuitry 32 includes the aforementioned transmit circuit 33 which comprises, as shown in FIG. 46, an operational amplifier 120, a plurality of resistances R15–R19, a pair of capacitances C12 and C13, and an operational amplifier 122. The operational amplifier 120 operates to buffer the data produced at bit position 3 of port 0 of the central processing unit CPU and to apply this data to an active filter comprising the resistances R15 to R17, the capacitances C12 and C13, and the operational amplifier 122. This active filter serves to low pass filter the data received from the operational amplifier 120 thereby reducing to acceptable limits the amount of harmonic content of the data applied to the telephone line. The data is then attenuated by the resistance R18, which is an impedance-matching resistance, resulting in a transmitted signal amplitude of 900 millivolts (peak to peak). The data is then coupled via the data transmission circuit 30 to the telephone line, in a manner to be described in detail hereinafter in connection with FIG. 56.

Data generated by the central processing unit CPU and transmitted via the data transmission circuit 30 to the centralized communications center CCC results, in the normal situation, in data being received back from the centralized communications center CCC to be tested by the central processing unit CPU. This reply data, which is also coupled through the data transmission circuit 30 as will be discussed in detail hereinafter, is also processed by the modem amplifier and filter circuitry 32 as shown in FIG. 46. For purposes of received data, the modem amplifier and filter circuitry 32 includes the aforementioned receive circuit 34 which comprises, as shown in FIG. 46, operational amplifiers 124, 126 and 128, a Schmitt trigger circuit 130, resistances R20–R25, and capacitances C14 and C15. Incoming data, typically at a signal amplitude of 200 millivolts (peak to peak) is buffered by the operational amplifier 124 and applied to a high-pass filter comprising the resistance R20 and the capacitance C14. The resistance R20 and the capacitance C14 serve to high-pass filter the data received from the operational amplifier 124 and to apply the high pass filtered data to a low-pass filter comprising the resistance R21, the capacitance C15, and the operational amplifier 126. This low-pass filter, which has a typical gain of approximately 5, serves to provide a signal amplitude at the output of the operational amplifier 126 of approximately 1 volt (peak to peak). The abovedescribed high-pass and low-pass filters combine to form a bandpass filter with a center frequency of approximately 900 hertz and serve to reduce interference from noise and 60 hertz line frequency which might otherwise degrade the processed data. The data is then applied via the resistance R22 to the operational amplifier 128, which is connected to function as a voltage comparator, and compared against a reference signal of about 2.5 volts. The output of the operational amplifier 128 is a TTL-compatible representation of the incoming data. The rise times and thresholds of this signal are further improved by the Schmitt trigger circuit 130, the output of which is then applied to bit position 7, of port 1 of the central processing unit CPU. The data received at bit position 7 of port 1 is the data which is processed in the demodulation mode of operation of the central processing unit CPU as will now be described in detail in connection with FIGS. 47 to 54.

The demodulation function of the central processing unit CPU is initiated by the MODL routine as shown in FIG. 47, which, as previously discussed, is established as a branch operation during the MODX routine (FIG. 44). The MODL routine is established as a branch operation in the MODX routine in the expectation that data transmitted by the remote control unit RCU to the centralized communications center CCC will, in the normal and typical situation, result in return data from the centralized communications center CCC. To this extent, the MODL routine, which is part of the MODEM subroutine, serves to initiate operations for finding, and locking onto, the 900 hertz carrier in the data received at bit position 7 of port 1 of the central processing unit CPU. As indicated in FIG. 47, the initial action taken in the MODL routine is to determine that the transmit (modulation) operation IXMT of the central processing unit CPU has actually been fully completed. This determination is accomplished by simply examining the data counter DC to see if it still points to the IXMT operation. If the data counter DC no longer points to the IXMT operation, this indicates that the transmitting of data by the central processing unit CPU has been fully completed and the MODEM BRANCH register is decremented to a count of −2 corrresponding to the next branch operation, specifically, a MODRCV branch operation, to be described in detail hereinafter in connection with FIG. 53. If the data counter DC still points to the IXMT operation, this indicates that the transmitting of data by the central processing unit CPU has not been fully completed, whereupon the program proceeds to the REMOTE RF DATA routine (FIG. 19) and the mainline program.

Once the MODEM BRANCH register has been decremented to a count of −2 (MODRCV) as described above, a predetermined time-out time period, specifically, approximately 0.2 seconds, is caused to be loaded into a pair of TIMEOUT scratchpad registers. This time period corresponds to a particular time interval during which it is normally expected to receive data from the centralized communications center CCC following a transmission by the central processing unit CPU. This time period is achieved in the TIMEOUT registers by loading a hex 0539 as derived from the read only memory ROM into the TIMEOUT registers and decrementing this number every 185 microseconds to achieve the 0.2 second interval. Following the above loading operation, the program proceeds to a point designated FND during which certain initialization operations are performed. These initialization operations include the clearing, or resetting, of a phase reverse variable V2 contained in a V2 scratchpad register. This variable, which represents the number of phase reversed cycles of a 900 hertz carrier, is initialized to a value of 0 to indicate that no phase reversed cycles of the 900 hertz carrier have yet been received. The program is then set to an interrupt operation IFIND, specifically, by loading the data counter DC with the starting address of the IFIND operation, whereupon the IFIND operation commences. The IFIND operation, shown in FIG. 48, is used to locate the first cycle of received data. As the IFIND operation is executed, the MODL routine, as part of the MODEM subroutine, branches to itself and remains in a busy loop. This loop continues until either the TIMEOUT registers have timed out or the INTERRUPT subroutine has found the start bit in received data, as will be described hereinafter.

The IFIND operation commences, as indicated in FIG. 48, with a sampling, every 185 microseconds, of the data at bit position 7 of port 1 of the central processing unit CPU. The value of each sampled bit is shifted into a SAMPLE scratchpad register as part of the process of building up a 6-bit sample word. The TIMEOUT registers are then decremented by means of a two byte subtraction. A total number of 1337 interrupts will cause the TIMEOUT registers to be decremented to 0 (185 microseconds × 1337 interrupts ≈ 0.2 seconds). After each decrementing of the TIMEOUT registers, the TIMEOUT registers are examined to determine if the time interval therein has been decremented to 0. If the time interval in the TIMEOUT registers has been decremented to 0 at this time, this condition indicates that no data has been received from the centralized communications center CCC in the 0.2 second time period following a transmission by the central processing unit CPU. The timing out of the TIMEOUT registers is treated as an error condition, for example, as a result of a loss of carrier due to a wrong telephone number or transmission line error, and causes the INTERRUPT subroutine to be reset to the IRF operation. This latter operation is followed by a jump operation to an entry point TIMEOUT (FIG. 49) in the MODEM subroutine as will be discussed in greater detail hereinafter.

In the event the TIMEOUT registers have not timed out, the sample in the SAMPLE register is examined to determine if it represents a 900 hertz square wave or an approximation thereof. This determination is accomplished by taking the 6-bit sample word in the SAMPLE register, using this sample word in an AND operation with a hex 7E to get rid of the least significant bit (LSB) and the most significant bit (MSB), and comparing the result with each of a hex 0E, hex 4E and hex 06. The various hex values are derived from the read only memory ROM. The hex 0E represents a perfect waveform (000111) while the hex 4E and hex 06 represent a waveform with shifted edges (100111 and 000011, respectively). If the above result compares with any of the hex 0E, 4E, or 06 numbers, the 6-bit sample word is accepted as representing a 900 hertz square wave or an approximation thereof. Otherwise, the program enters a busy loop and waits for the next interrupt. When a 6-bit sample word has been determined to be a 900 hertz square wave or an approximation thereof as discussed above, the INTERRUPT subroutine is set to an operation IRCVWO (FIG. 50), to be discussed hereinafter, during which a sample is taken of received data every 185 microseconds and shifted into the SAMPLE register to build up a word. Following the setting of the INTERRUPT subroutine to the operation IRCVWO, the program jumps to an operation FOUND which represents another entry point in the MODEM subroutine. The FOUND operation is shown in FIG. 49.

Figure 49:
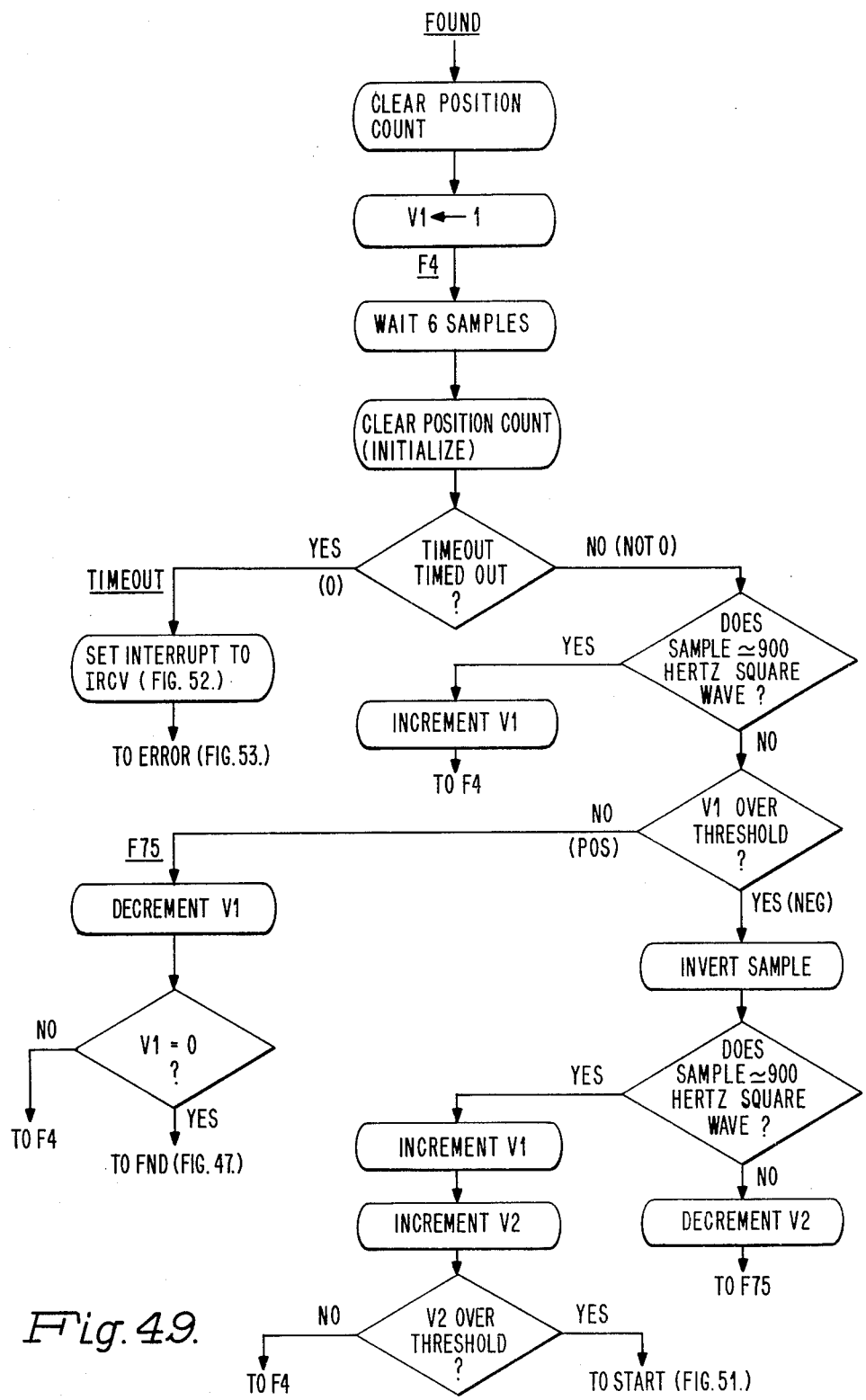

The FOUND operation as shown in FIG. 49 commences with the clearing, or resetting, of a POSITION COUNT scratchpad register. This register is employed to determine the number of samples taken during the aforementioned IRCVWO operations, as will be discussed more fully hereinafter. After the POSITION COUNT register has been cleared, a variable V1 scratchpad register employed to count the number of received 900 hertz tones is initialized to a value or count of 1 as derived from the read only memory ROM. The initialization of the V1 register is followed at a point F4 in the routine by a delay of six sampling periods corresponding to six executions of the IRCVWO operation. The IRCVWO operation is shown in FIG. 50 and, as will now be described, is employed as an interrupt operation to take successive samples of received data, specifically, a sample every 185 microseconds.

Figure 50:
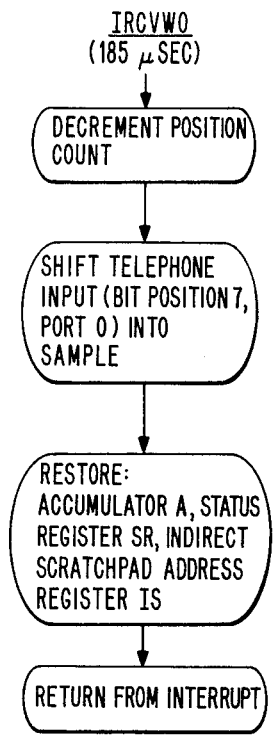

As shown in FIG. 50, the IRCVWO operation commences with the decrementing of the POSITION COUNT register (by a count of 1). A sample is then taken of bit position 7 of port 0 and shifted into the SAMPLE register. The accumulator A, the status register SR and the indirect scratchpad address register IS (FIG. 14) are then restored in normal fashion to the values which they had at the point of the interrupt. The mainline program is then re-entered from the interrupt operation in the usual fashion by taking the address of where the mainline program was interrupted and transferring this address from the stack register P to the program counter PC.

Each IRCVWO operation as discussed above causes the POSITION COUNT register to be decremented by a count of 1. When six executions of the IRCVWO operation have taken place, the POSITION COUNT register has a count of −6 therein corresponding to one cycle of the 900 hertz tone. To determine the conclusion of the six executions of the IRCVWO operations, and, thus, six sampling operations, the count in the POSITION COUNT register is compared in the FOUND operation shown in FIG. 49 with a −6 as derived from the read only memory ROM. If the two compared values are the same, the POSITION COUNT register is cleared, or reset, to initialize the POSITION COUNT register to repeat the same operations as just described. If the two compared values are not the same, this condition indicates that six sampling operations have not yet occurred and the POSITION COUNT register is not cleared until the required number (six) of sampling operations (IRCVWO operations) have taken place.

Once the POSITION COUNT register has been cleared as discussed above, the TIMEOUT registers are examined to determine if they have timed out. This determination is accomplished by subtracting a count of 6 as derived from the read only memory ROM from the count then present in the TIMEOUT registers and checking the result to see if it is 0 or less. If the result is 0 or less, this indicates an error condition and the program proceeds to the point TIMEOUT. At this time, the INTERRUPT subroutine is set to an operation IRCV (FIG. 52), to be described hereinafter, which step proceeds to a point ERROR (FIG. 53), also to be described hereinafter.

In the event the TIMEOUT registers have not timed out as discussed above, the last sample word shifted into the SAMPLE register is examined to determine if it is a 900 hertz reference tone or an approximation thereof. In addition, the sample word is examined to determine if it contains permissible timing variations, or skewing. In accordance with the invention, skewing of the sample word by one interrupt time (185 microseconds) to the left or to the right will result in acceptance of the sample word as a reference tone but not skewing which exceeds these values. The determination of whether the sample word is a 900 hertz reference tone or an approximation thereof is accomplished in the same manner as earlier described, that is, by taking the sample word in the SAMPLE register, using this sample word in an AND operation with a hex 7E to get rid of the least significant bit (LSB) and the most significant bit (MSB), and comparing the result with each of a hex 0E, hex 4E and hex 06. A comparison with any of the hex 0E, 4E and 06 values indicates that the sample word is a 900 hertz reference tone or an approximation thereof. To determine whether the sample word is skewed to the left or right by a single interrupt, the above sample word is also compared with a hex 46, 66, and 42 corresponding to a shift to the right one interrupt (for each of the three possible waveforms) and with a hex 1C, 1E and 0C corresponding to a shift to the left one interrupt (for each of the three possible waveforms). These hex values are also derived from the read only memory ROM. A comparison with either of these hex values will lead to acceptance of the sample word and, as indicated in FIG. 49, cause the variable V1 register to be incremented to count the occurrence of the 900 hertz tone or sample. In addition, a skew of one interrupt to the right will cause the POSITION COUNT register to be incremented one count to compensate for the skew to the right, and a skew of one interrupt to the left will cause the POSITION COUNT register to be decremented one count to compensate for the skew to the left. The program then proceeds to the aforementioned point F4 to wait for the conclusion of the next set of 6 samples (IRCVWO operations), in the same manner as just described.

If a sample word as discussed hereinabove is not found acceptable by virtue of not being a 900 hertz tone or an approximation thereof or by virtue of having excessive skew, an examination is then made of the variable V1 in the V1 register to determine if enough cycles of a 900 hertz reference tone have nontheless occurred to justify looking for a start bit or tone. This determination is accomplished by comparing the count in the V1 register with a value of 9 as derived from the read only memory ROM and representing a threshold value of one half of a bit period. If the result of the comparison is a negative number, this indicates that enough cycles of the 900 hertz reference tone exist to look for a start bit, and the sample word in the SAMPLE register is caused to be inverted. The inversion of the sample word is achieved by simply complementing the SAMPLE register. If the comparison of the count in the V1 register with the abovementioned value of 9 results in a positive number, this indicates that not enough cycles of the 900 hertz reference tone have occurred to look for a start bit, and the program proceeds to a point F75 to decrement the V1 register to indicate that the 6-bit sample word in the SAMPLE register is not a 900 hertz tone or an approximation thereof. The V1 register is then examined to determine if it has been decremented to 0. If it has not, the program proceeds to the aforementioned point F4 in the FOUND operation to execute the various operations as indicated, in the same manner as earlier described. If the V1 register has been decremented to 0, this condition indicates that the received data, specifically, the reference tone or other data, has been lost, requiring that the entire process as discussed hereinabove be repeated from the beginning. The program accordingly proceeds to the point FND in the MODL operation of FIG. 47 to attempt to find and lock onto the reference tone.

As mentioned hereinabove, if the examination of the V1 register indicates that enough cycles of the 900 hertz reference tone have occurred to look for the start bit or tone, the 6-bit sample word then present in the SAMPLE register is caused to be inverted. Once this inversion has taken place, the inverted sample word is examined to determine if it is a 900 hertz tone or an approximation thereof. This sample word is also examined to determine if it is skewed, specifically, by one interrupt to the left or to the right. The above operations are performed in the same manner as discussed hereinabove. If the sample word is not a 900 hertz tone or an approximation thereof or is skewed excessively, either of these results causes the variable V2 register, which stores the number of phase reversed waveforms, to be decremented to indicate that the sample word did not pass the required tests. The program then proceeds to the abovementioned point F75 to decrement the variable V1 register to indicate that the sample word did not pass the required tests. If the sample word does pass the required tests, this is an indication at this point that the sample word represents a good phase reversed tone or bit, specifically, the start bit of a logic "0" value. In this case, the variable V1 register, which counts the number of 900 hertz tones, is incremented to indicate that the sample word represents a good 900 hertz phase reversed tone, and, similarly, the variable V2 register is incremented to indicate the receipt of the start bit tone. The V2 register is then examined to determine if it has a count therein equal to a threshold value of 9 representing 9 cycles of a 900 hertz start tone, that is, one half of a bit period. If it does not, the program proceeds to the point F4 in the FOUND operation to look for the next sample (after 6 interrupts or IRCVWO operations) and perform the specified operations as indicated in FIG. 49. If the V2 register contains a count of 9 therein, the program proceeds to an operation START, which will now be described in connection with FIG. 51, for initiating operations to sample the centers of bits of data and/or command words, the command/data bit, parity bit and stop bit.

Figure 51:
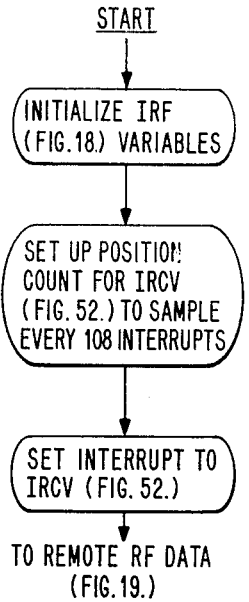
Figure 52:
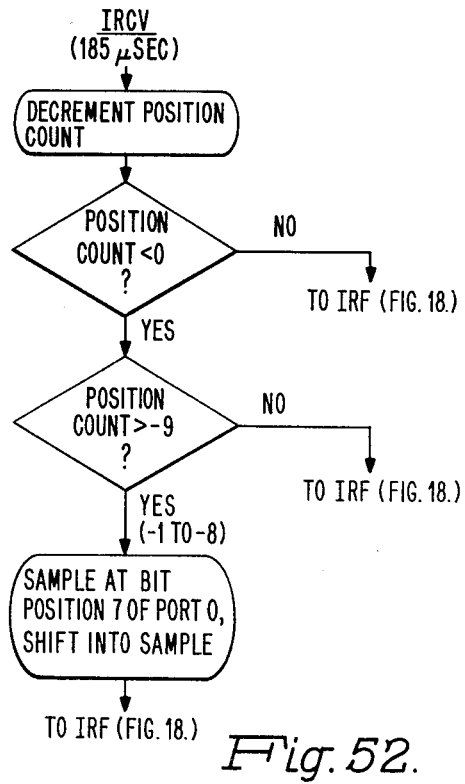

The START operation as shown in FIG. 51 is employed to process data following the start bit or tone. The START operation begins at the middle or center of the start bit and commences as shown in FIG. 51 with the initialization of certain variables employed in connection with IRF operations. This initialization is desirable at this time since the REMOTE RF DATA routine (FIG. 19) was stopped while a search for a 900 hertz reference tone and the start bit or tone was being performed. The initialization includes clearing the upper and lower bytes of the 16-bit word in the IRF register, and clearing the PAST COUNT and BIT COUNT registers (employed in the REMOTE RF DATA routine, FIG. 19). Following the initialization operation, a count of 108 as derived from the read only memory ROM is added to the POSITION COUNT register to set the POSITION COUNT register to a point which is 108 samples (or interrupts) from the center of the start bit thereby corresponding to the center of the next bit. This operation is required for IRCV operations as shown in FIG. 52 and serves to compensate for the fact that the IRCVWO interrupt operations (FIG. 50) as previously discussed continue to take place even after a good phase reversed start bit has been tested and accepted, causing the count in the POSITION COUNT register to be decremented further. Following this latter operation, the INTERRUPT subroutine is set to the IRCV interrupt operation, specifically, by placing the start address of the IRCV interrupt operation in the data counter DC. The program then proceeds to the REMOTE RF DATA routine for performing the appropriate steps of that routine. The REMOTE RF DATA routine is interrupted as are all the mainline routines so that the IRCV interrupt operation can be executed.

The IRCV interrupt operation is performed every 185 microseconds and commences, as indicated in FIG. 52, with the decrementing of the POSITION COUNT register. The POSITION COUNT register is then examined to determine if the count therein is less than 0. If it is not, this condition indicates that the IRCV operation has not reached the center of the bit or tone following the start bit or tone. In this case, the program proceeds to the IRF subroutine (FIG. 18) which, in normal course, returns to the mainline program and the mainline program is ultimately interrupted to return to the IRCV interrupt operation for repeating the various steps as discussed hereinabove. At such time as the POSITION COUNT register has been decremented to a count less than 0, this condition indicates that the IRCV operation has at least reached the center of the bit or tone following the start bit or tone, and an examination is then made to determine if the count in the POSITION COUNT register is greater than $-9$, that is, between $-1$ and $-8$. These counts of $-1$ to $-8$ correspond to the number of samples, that is, 8 samples, to be taken of the bit following the start bit. If the count in the POSITION COUNT register is between $-1$ and $-8$, the data at bit position 7 of part 1 of the central processing unit CPU is sampled and the value of the sampled bit is shifted into the SAMPLE register. The program then proceeds to the IRF subroutine. As noted in FIG. 52, the program also proceeds to the IRF subroutine when the count in the POSITION COUNT register is not between $-1$ and $-8$, that is, outside of the eight sample period. The IRF subroutine ultimately returns in normal course to the mainline program and, in particular, to a MODRCV operation as indicated in FIG. 53.

Figure 53:
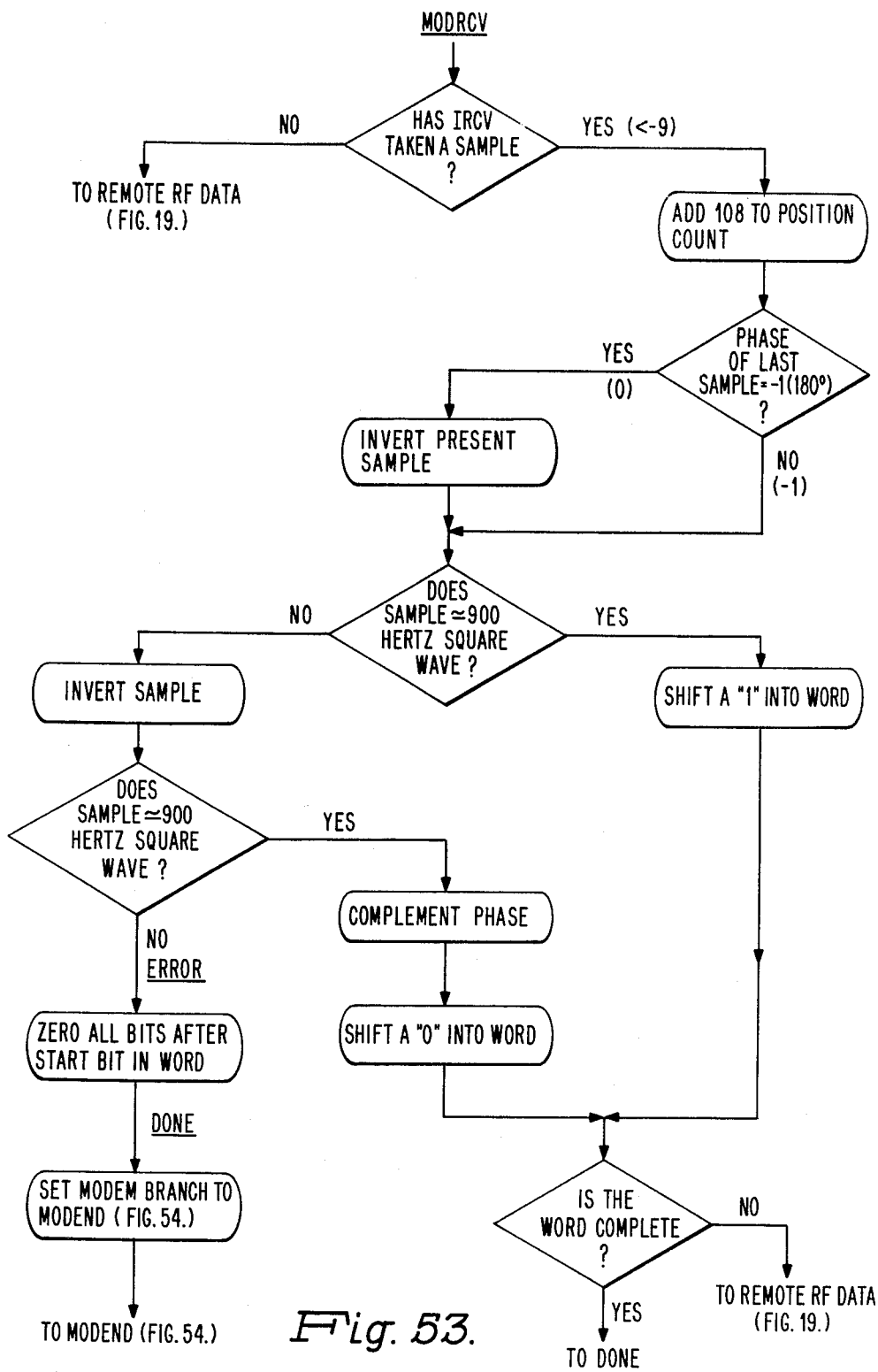

As shown in FIG. 53, the initial action taken in the MODRCV operation is to determine if a sample has been taken during the IRCV (FIG. 52) operation. This condition is indicated by the POSITION COUNT register containing a count less than $-9$ (e.g., $-10$, 11, etc.). To determine if the sample has been taken, the count in the POSITION COUNT register is compared with a $-9$ as derived from the rear only memory ROM. If the count in the POSITION COUNT register is not less than $-9$ (i.e., $-8$, $-7$, etc.), the program proceeds to the REMOTE RF DATA routine for execution of the appropriate steps of that routine. If the count in the POSITION COUNT register is less than $-9$, a count of 108 as derived from the read only memory ROM is added to the POSITION COUNT register so that the register is set to a point to correspond to the center of the next bit or tone, that is, 108 interrupts.

Following the above operation, a determination is made of the absolute phase of the last sample, for example, the start bit or tone, in order to establish an initial phase reference for use in subsequent operations. This determination is accomplished by using the contents, specifically, a $-1$, as initially placed in a PHASE register for use in absolute phase determining operations. The PHASE register is loaded into the accumulator A, complemented, and the result tested to determine if it is 0 or a negative number, specifically, a $-1$. If the result is a $-1$, this condition indicates that the phase of the last 6-bit sample word was the same as that of the reference tone or bit. The new sample word then present in the SAMPLE register is then tested to determine if it is a 900 hertz tone or an approximation thereof and also to determine if it is skewed by interrupt to the left or to the right. If the result of the above operation is a 0, this condition indicates that the phase of the last sample, for example, the start bit, was opposite to that of the reference tone or bit. In this latter situation, the new sample word then present in the SAMPLE register is inverted, for example, by simply complementing the SAMPLE register, and then tested to determine, as in the above situation, if it is a 900 hertz tone or an approximation thereof, and to determine if it skewed by one interrupt to the left or right. In each of the above cases, the tests performed on the inverted or non-inverted sample word are executed in the same manner as earlier described in connection with the FOUND operation in FIG. 49. In the event the sample word tested is determined to be a 900 hertz tone or an approximation thereof and also to contain no more than the permissible amount of skew, this indicates that the sample word was not phase reversed relative to the last bit (e.g., the start bit) and, accordingly, a logic "1" bit is shifted into a WORD register to build up a word for subsequent processing purposes. The WORD register initially contains a hex 7F as derived from the read only memory ROM during the TELEPHONE routine (initialization operations, FIG. 35) for establishing the most significant bit (MSB) in the WORD register at a logic "0" value, corresponding to the logic value of the start bit, and all other bits at a logic "1" value. In the event the abovementioned sample word is found not to be a 900 hertz tone or an approximation thereof or it contains more than the permissible amount of skew, this result indicates that the sample word either is a phase reversed sample word or noise, and the sample word is inverted, in the same manner as earlier described, and tested once again to determine if the sample word as inverted is a 900 hertz tone or an approximation thereof and it contains no more than the permissible amount of skew. If the inverted sample word passes these latter tests, this is an indication that the sample word is a phase reversed sample relative to the previous bit, that is, it is a logic "0" bit, and the contents of the PHASE register are complemented to correspond to the present phase reversal. A logic "0" bit is then shifted into the WORD register. In the event the above sample word does not pass the required tests, the sample word is considered to be noise or other erroneous signal, and the program proceeds to the aforementioned point ERROR for indicating or recording the erroneous situation. Specifically, the error situation is indicated by causing all bits in the WORD register following the start bit to be set at a logic "0" value. As will be explained hereinafter, this will provide a delay before the remote control unit RCU transmit the next word. The program then proceeds to a point DONE for setting the next branch operation to a MODEND operation (FIG. 54), specifically, by decrementing the MODEM BRANCH register to a −3, whereupon the MODEND operation is executed, in a manner to be described in detail hereinafter.

Once a logic "1" bit or logic "0" bit has been shifted into the WORD register as described hereinabove, a test is then made to determine if the word in the WORD register is complete, that is, it includes a start bit, a data or command word, a command/data bit, a parity bit and a stop bit. The word is complete within the WORD register only after the bits of a received word have been sampled in the manner as described in detail hereinabove and the appropriate bit values placed into the WORD register. At any time that the WORD register does not contain a complete word, the program proceeds as indicated in FIG. 53 to the REMOTE RF DATA routine in the mainline program. The progrm ultimately returns in the MODRCV operation as shown in FIG. 53 so that the various steps as described hereinabove can be executed to build up a complete word in the WORD register. The testing of the word in the WORD register to determine if it is complete is accomplished by examining the least significant bit (LSB) stage of the WORD register to determine if the most significant bit (MSB), representing the start bit (logic "0"), has been shifted into the least significant bit stage. Specifically, the word in the WORD register is loaded into the accumulator A, used in an AND operation with a hex 01 as derived from the read only memory ROM, and the result tested for a 0 or other than 0. If the result is other than 0, the program proceeds to the REMOTE RF DATA routine as previously mentioned. If the result is 0, the program proceeds to the aforementioned point DONE for setting the branch operation to a MODEND operation, as previously mentioned, and then to the operation MODEND as will now be described in detail in connection with FIG. 54.

Figure 54:
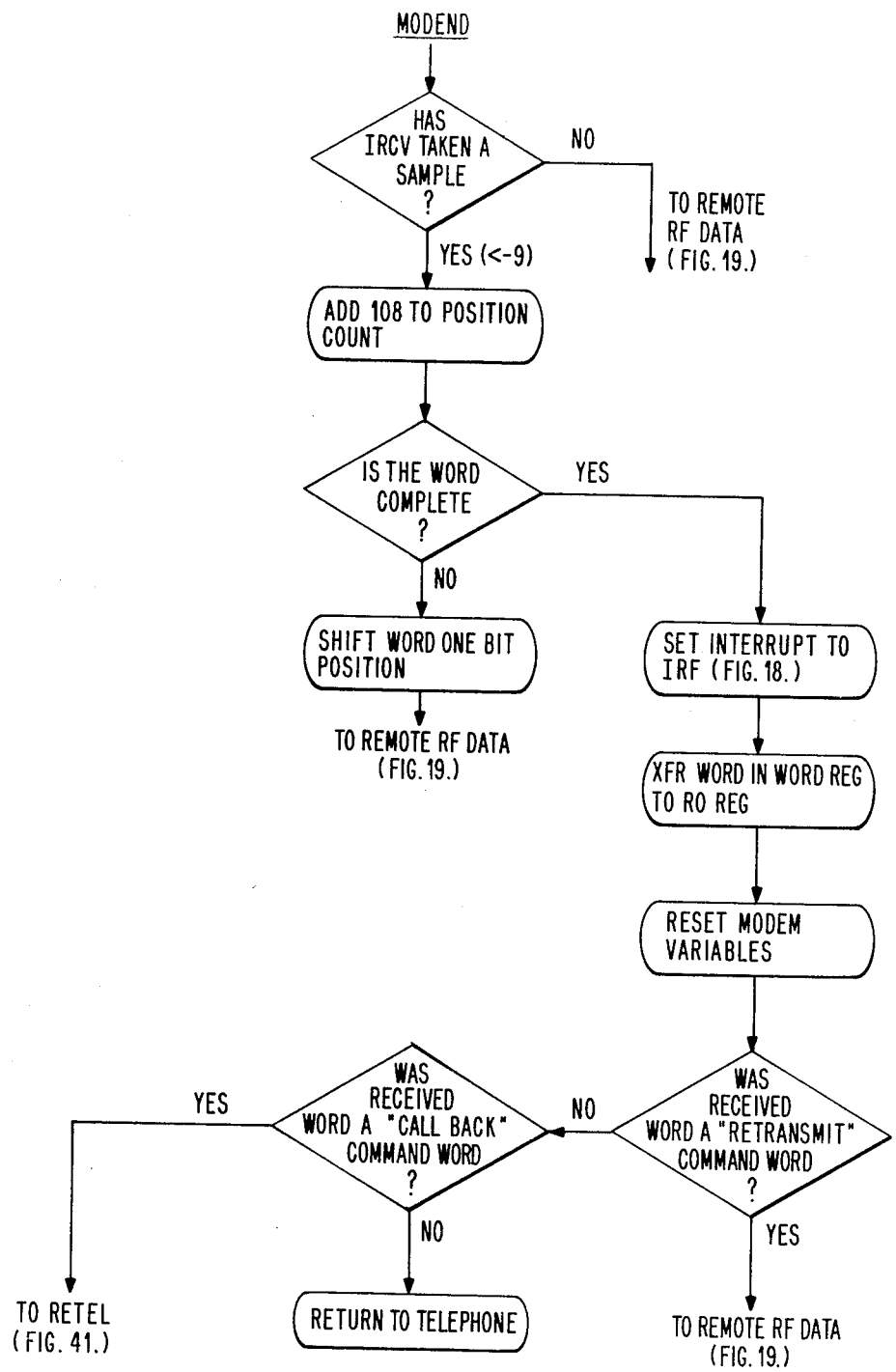

The MODEND operation as shown in FIG. 54 commences with a determination, as in the MODRCV operation (FIG. 53), of whether a sample was taken in the preceding IRCV interrupt operation (FIG. 52). Although at this point the received word has been completely received and processed, an IRCV interrupt operation following the received word provides a delay before the remote control unit RCU transmits the next word. The actual state of the IRCV interrupt operation is determined by examining the POSITION COUNT register to determine, as in the MODRCV operation, if the count in the POSITION COUNT register is less than −9 (i.e., −10, −11, etc.). If the count in the POSITION COUNT register is not less than −9, this condition indicates that the delay is not complete and the program proceeds to the REMOTE RF DATA routine. If the count in the POSITION COUNT register is less than −9, a count of 108 as derived from the read only memory ROM is added to the POSITION COUNT register to re-establish the required timing in the event of an error situation. This operation is followed by an examination of the word in the WORD register, in the same manner as previously described, to determine if the word is complete, that is, the start bit (MSB=0) has been shifted into the least significant bit (LSB) stage of the WORD register. If the start bit has not been shifted into the least significant bit stage, this is an indication that the word in the WORD register had an error condition and the word in the WORD register is shifted one bit position. This shifting operation serves to shift a logic "0" bit into the most significant bit (MSB) stage of the WORD register. The MODEND operation will then repeat the abovementioned actions until enough delays have occurred so that the start bit is shifted into the least significant bit (LSB) stage of the WORD register. It will be noted that in the event an error situation occurred as earlier described, the WORD register will contain all logic "0" bits at the completion of the MODEND operation and be rejected as failing the odd parity requirements, causing a "retransmit" command word to be sent by the remote control unit RCU to the centralized communications center CCC, as previously described. Once the word in the word register has been shifted one bit position as discussed above, the program proceeds to the REMOTE RF DATA routine.

In the event that start bit in the WORD register has been shifted into the least significant bit stage as discussed above, this condition indicates that the word in the WORD register is complete and steps are then taken to initiate further processing of the word. Specifically, the INTERRUPT subroutine is set to the IRF interrupt operation, and the word in the WORD register is transferred to the previously mentioned RO register employed in the MODX routine (FIG. 44). The INTERRUPT subroutine is set to the IRF interrupt operation by placing the start address of the IRF interrupt operation in the data counter DC. Following the transfer of the word in the WORD register to the RO register, certain modem variables as originally set during the TELEPHONE routine are caused to be reset. These reset operations include resetting the MODEM BRANCH register to −1, resetting PHASE register to 0, and resetting the WORD register so that all bits except the most significant bit are set to logic "1" values (e.g., by placing a hex 7F from the read only memory ROM into the WORD register).

Once the above variable resetting operations have been performed, the word in the RO register is examined to determine if it is a "retransmit" command word or a "call back" command word of proper form. To determine if the word is a proper "retransmit" command word (e.g., all bits are of proper logic value), the contents of the RO register is loaded into the accumulator A and compared with a hex 82 as derived from the read only memory ROM. If the compared values are the same, this is an indication that the word is a "retransmit" command word and the program proceeds to the REMOTE RF DATA routine. If the compared values are not the same, this is an indication that the word is not a proper "retransmit" command word (e.g., bits don't have proper logic values), and the word is then tested to determine if it is a proper "call back" command word. To determine if the word is a "call back" command word of proper form, the contents of the RO register is loaded into the accumulator A and compared with a hex 84 as derived from the read only memory ROM. If the compared values are the same, this is an indication that the word is a proper "call back" command word (e.g., the bits are of proper logic values) and the program proceeds to the aforementioned point RETEL (FIG. 41) for reinitiating the telephone call (that is, hanging up, redialing, etc.). If the compared values are not the same, this is an indication that the word is not a proper "call back" command word, and the word, which is still present in the accumulator A, is returned to the TELEPHONE routine.

SWITCHES ROUTINE (FIG. 55)

As previously described, during a pre-alarm or actual alarm condition, the individual whose activities are being monitored is able, with certain limitations, to cancel or abort the pre-alarm or actual alarm condition. The manner in which this cancellation can be executed is indicated in the SWITCHES routine as shown in FIG. 55.

Figure 55:
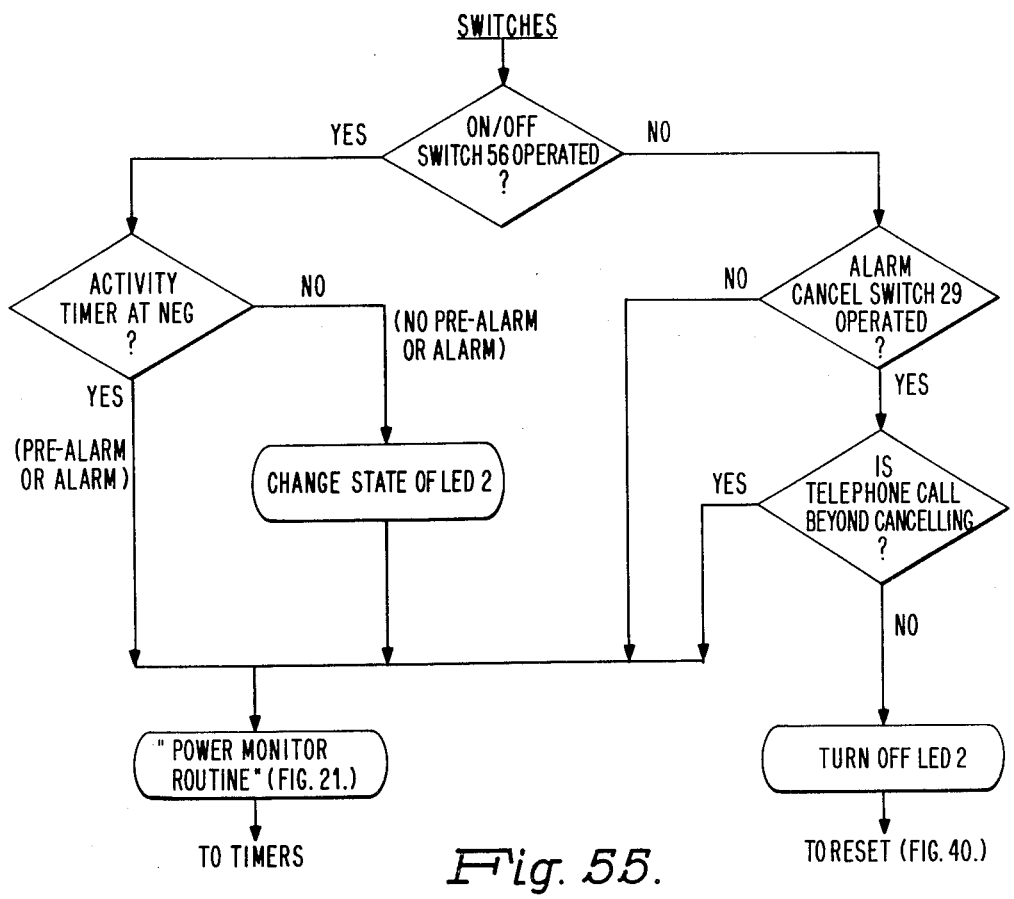

The SWITCHES routine as shown in FIG. 55 commences with an examination of the on/off (vacant) switch 56 and the alarm cancel switch 29 to determine any changes in the states of these switches since the last execution of the SWITCHES routine. The states of the switches 56 and 29 as determined by the SWITCHES routine are maintained in a PAST SWITCH STATUS register. Changes in the states of the switches 56 and 29 are determined by accessing port 1 of the central processing unit CPU to derive an 8-bit word, using this 8-bit word in an EXCLUSIVE/OR operation with the contents of the PAST SWITCH STATUS register, masking the result of this operation with a hex 03 as derived from the read only memory ROM, and comparing this result with a 01 as derived from the read only memory ROM. If the result is a negative value, this indicates that the on/off switch 56 has changed state; if the result is a 0, this indicates that the alarm cancel switch 29 has changed state; if the result is a value greater than 0, this indicates that neither of the switches 56 and 29 changed state. The states of the switches 56 and 29 as determined by this operation are caused to be retained in the PAST SWITCH STATUS register.

In the event the on/off switch 56 has changed state, an examination is then made of the activity timer AT to determine if the count therein is negative, corresponding to a pre-alarm or actual alarm condition. This examination is necessary since it is undersirable to turn the system off during a pre-alarm or actual alarm condition. If the activity timer AT contains a negative count, the program proceeds, via the "power monitor routine" shown in FIG. 21 and previously described, to the TIMERS routine. The power monitor routine as indicated in FIG. 55 and previously described is not related to the operation of the switches 56 and 29 per se but is placed as a matter of convenience in the SWITCHES routine so that it may be executed in the mainline program. If the activity time AT as discussed above contains a positive count therein, this condition indicates that no pre-alarm or actual alarm condition exists, and the "vacant" light emitting diode LED2 is caused to change states. This latter operation is performed by accessing port 0 of the central processing unit CPU to derive an 8-bit word, using the 8-bit word in an EX-CLUSIVE/OR operation with a hex 40 as derived from the read only memory ROM, and outputting this result to port 0. Bit b6 of port 0 is inverted in value by the inverting amplifier I5 and utilized to change the state of the diode LED2. The program then proceeds via the "power monitor routine" to the TIMERS routine. As previously described in connection with the TIMERS routine of FIGS. 25-28, actuation of the on/off switch 56 by an individual upon leaving his or her abode serves, in the absence of a pre-alarm or actual alarm condition, to "freeze" the state or contents of the activity timer AT. The subsequent operation of the on/off switch 56 upon the return of the individual to his or her abode serves to reset the activity timer AT thereby effectively serving as a monitored activity.

In the event the alarm cancel switch 29 has been actuated as mentioned hereinabove, a determination is then made as to whether the telephone call in process is beyond cancelling. During the transmission of alarm data in an alarm message to the centralized communications center CCC as previously described, the telephone call cannot be cancelled once the priority information in the message has been sent. To determine if the call is beyond cancelling, the BRANCH register used in the TELEPHONE routine is examined to see if the count or value therein is beyond −7 corresponding to the branch operation in which the priority information is transmitted to the centralized communications center CCC. If the BRANCH register is beyond −7, the call cannot be cancelled and the program proceeds via the "power monitor routine" to the TIMERS routine. The absence of a change in the state of the alarm cancel switch 29 will also cause the program to proceed via the "power monitor routine" to the TIMERS routine.

In the event an alarm message telephone call is not beyond cancelling, that is, the BRANCH register is not beyond −7, the light emittinhg diode LED2 is caused to be changed to its "on" state. This latter operation indicates that the abode is not vacant and is accomplished by accessing port 0 to derive an 8-bit word, using the 8-bit word in an AND operation with a hex BF as derived from the read only memory ROM, outputting the result to port 0, and inverting bit b6 from a logic "1" value to a logic "0" value (in the inverting amplifier I5) to thereby turn the diode LED2 on. The program then proceeds to the point RESET in the TELEPHONE routine (FIG. 40) for terminating the telephone call, as previously described.

DATA TRANSMISSION CIRCUIT 30 (FIG. 56); SELF-CHECK CALL

Referring now to FIG. 56, there is shown in detail the data transmission circuit 30. As previously discussed, the data transmission circuit 30 is arranged to coupled data as generated during alarm sequences and self-check sequences between the central processing unit CPU and the telephone line to the centralized communications center CCC. This data is 900 hertz phase-reversed data and, as previously discussed in detail, is transmitted between the central processing unit CPU and the centralized communications center CCC in a bi-directional fashion. As previously noted, although the data incorporated in alarm and self-check messages is different and is used in different ways, the protocol for the two types of messages is the same. A principal difference in the manner in which the data transmission circuit 30 is employed in the transmission of the two types of messages is that an alarm message will always to coupled through the data transmission circuit 30, that is, whether the telephone TL is in nose or not, whereas a self-check message will be coupled through the data transmission circuit 30 only when the telephone TL is not in use. This latter state of the telephone TL is represented by an on/hook condition and is determined by repetitively sampling the state of the telephone TL. The results of these repetitive sampling operation, which may take place both in the presence and absence of a ringing voltage as will be described in detail hereinafter, may also be used to provide indication of usage of the telephone TL as a monitored activity in the same sense as usage of other sensors in the system.

The data transmission circuit 30 as shown in FIG. 56 includes a first terminal 135, the aforementioned pair of terminals T, R, and an output terminal 137. The first terminal 135 is coupled via the transmit circuit 33 and the receive circuit 34, respectively, of the modem amplifier and filter circuitry 32 to bit position 3 of port 0 and bit position 7 of port 1 of the central processing unit CPA. The terminal 135 is arranged to receive data from bit position 3 of port 0 of the central processing unit CPU (via the circuitry 32) for transmittal to the centralized communications center CCC, and to couple data as received from the centralized communications center CCC to bit position 7 of port 1 of the central processing unit CPU (again via the circuitry 32). The terminals T and R represent standard tip and ring terminals and are connected with the telephone line. The telephone line in turn is connected in a standard fashion to the telephone company central office C.O. The output terminal 137 of the data transmission circuit 1 is connected directly to bit position 6 of port 1 of the central processing unit CPU and is employed to provide indications to the central processing unit CPU of the state of the telephone TL, that is, whether the telephone TL is in an on/hook condition or an off/hook condition. On/hook to off/hook and off/hook to on/hook transitions in the two possible states of the telephone TL may also be detected by the central processing unit CPU at the output terminal 137 and be employed by the central processing unit CPU as indications of usage of the telephone TL as a monitored activity.

When no data transmission is to take place between the terminals 135 and T, R, a user or an individual whose activities are being monitored is able to make and receive telephone calls over the telephone line via the telephone TL connected across the aforementioned pair of subscriber terminals T1 and R1. At this time, the telephone TL is connected across the tip and ring terminals T, R and, thus, across the telephone line, by means of a switch LS connected in series with the terminals R and R1 as shown in FIG. 56.

Before any transmission of a self-check message as previously described can occur between the terminals 135 and T, R, it is a requirement that the user's telephone TL be in an on/hook condition, that is, disconnected from across the terminals T, R and the telephone line. This on/hook condition of the telephone TL is detected by a status monitor circuit 140. The telephone status monitor circuit 140, to be described in detail hereinafter, operates to examine the voltages across the tip and ring terminals T, R and, depending on whether the voltage across the terminals T, R at the time of examination has a value corresponding to an on/hook condition or to an off/hook condition, to produce a corresponding first or second output signal at the output terminal 137. More particularly, if the voltage across the tip and ring terminals T, R at the time of examination has a value corresponding to an on/hook condition, typically between 40 and 56 volts d.c. (in the absence of a ringing voltage), a first output signal, specifically, a logic "1" output signal, is produced at the output terminal 137 and, thus, at bit position 6 of port 1 of the central processing unit CPU. If the voltage across the tip and ring terminals T, R at the time of examination has a value corresponding to an off/hook condition, typically less than 20 volts d.c. (in the absence of a ringing voltage), a second output signal, specifically, a logic "0" output signal, is produced at the output terminal 137 and, thus, at bit position 6 of port 1 of the central processing unit CPU. In the event a ringing voltage is present across the terminals T, R at the time of examination of the voltage across the terminals T, R, the logic values of the output signals produced at the output terminal 137 may differ from the logic values of the output signals produced at the output terminal 137 in the absence of the ringing voltage. In this case, and as will be discussed more fully hereinafter, the output signals produced at the output terminal 137 when a ringing voltage is present must be analyzed to determine actual on/hook and off/hook conditions. At such time as an on/hook condition is detected, either in the presence or absence of a ringing voltage, the data transmission circuit 30 is enabled by the central processing unit CPU to allow data in the self-check message to be transmitted between the terminal 135 and the tip and ring terminals T, R for application to the telephone line and transmission to the centralized communications center CCC. This data is processed by the computer 40 at the centralized communications center CCC whereupon a return transmission of data is initiated by the centralized communications center CCC, as previously described.

The examination by the status monitor circuit 140 of the voltages across the tip and ring terminals T, R occurs on a frequent, and preferably, periodic basis, for example, on the minute and on the minute plus three seconds. Normally, a sampling of the voltage across the tip and ring terminals T, R once per minute (e.g., on the minute) would be adequate. However, if at the time of sampling a call into the residence has been made, with the attendant ringing of the telephone TL, the ringing voltage, typically 225 volts (peak-to-peak), is superimposed on the dc voltage across tip and ring terminals and changes the instantaneous voltage on the telephone line. If the voltage on the telephone line is sampled on a negative excursion of the ringing voltage, an output signal will be produced at the output terminal 137 signifying an off/hook condition when, in fact, the telephone TL is in an on/hook condition. Unless this situation is prevented or corrected, the system will, in a manner as previously discussed (SENSORS subroutine), detect this apparent "change" in the state of the telephone TL, place the "vacant" light emitting diode LED2 in its off (non-illuminated) state signifying that someone is in the abode or residence (RINC, FIG. 23), and re-initiate the timing of the activity timer AT (see FIG. 26). If the above mode of operation takes place during an absence of the individual from the residence, especially a prolonged absence, the activity timer AT may time out and initiate an unwanted false alarm sequence.

To avoid the above result, samples of the voltage across the tip and ring terminals T, R are taken, as mentioned above, on the minute and on the minute plus three seconds. A standard ringing cycle has an "on" time of about 2 seconds and an "off" time, or silent period, of about 4 seconds. The three-second period is chosen since it is intermediate to the 2 second "on" time and the 4 second "off" time. Thus, if two successive samples are taken of the voltage across the tip and ring terminals T, R, that is, on the minute and on the minute plus 3 seconds, and output signals of different logic values are produced at the output terminal 137, either a "01" or "10" sequence, either of these conditions indicates that a ringing voltage is across the telephone line and the output signals are caused to be rejected by the central processing unit CPU. However, if the two samples produce output signals of the same value at the output terminal 137, either a "00" or "11" sequence, these two conditions indicate valid off/hook and on/-hook conditions, respectively, and are accepted by the central processing unit CPU.

The above operation of the status monitor circuit 140 and its utilization in a self-check sequence will be better understood from the following discussion of a telephone monitoring sequence as set forth in the flowchart diagrams of FIGS. 57 to 62, taken in conjunction with the data transmission circuit 30 of FIG. 56 and waveforms shown in FIGS. 62(A)-62(E).

Figure 57:
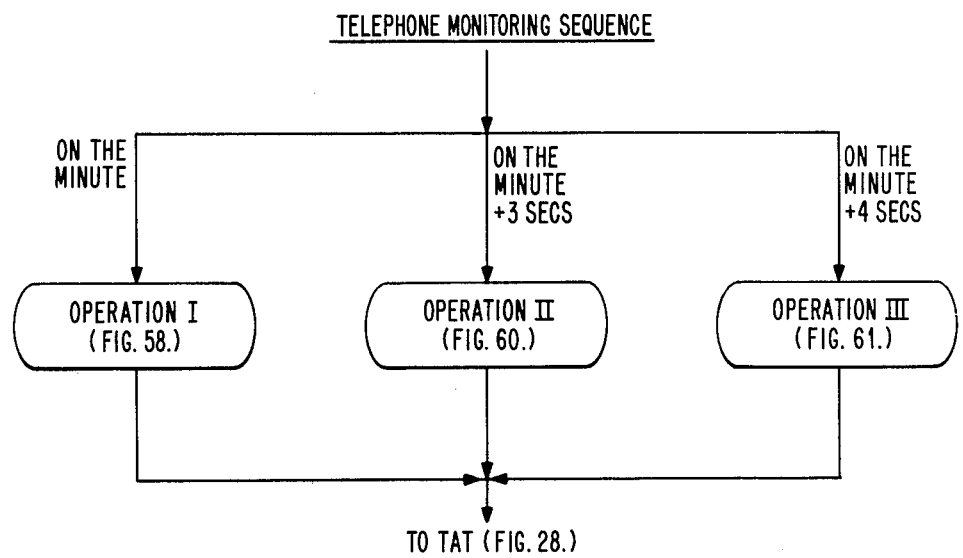

Referring now to FIG. 57, there is shown the general order of events of a telephone monitoring sequence. The general sequence as shown in FIG. 57 includes: a first operation I (shown in detail in FIG. 58) is executed on the minute, including a first sampling operation; a second operation II (shown in detail in FIG. 60) which is executed on the minute plus three seconds, including a second sampling operation; and a third operation III (shown in detail in FIG. 61) which is executed on the minute plus four seconds. The third operation III includes an examination (on the minute plus four seconds) of the values of the two samples taken in the operations I and II. All of the operations proceed upon their execution to the operation TAT for checking the activity timer AT, as previously discussed in detail (see FIG. 28).

Figure 58:
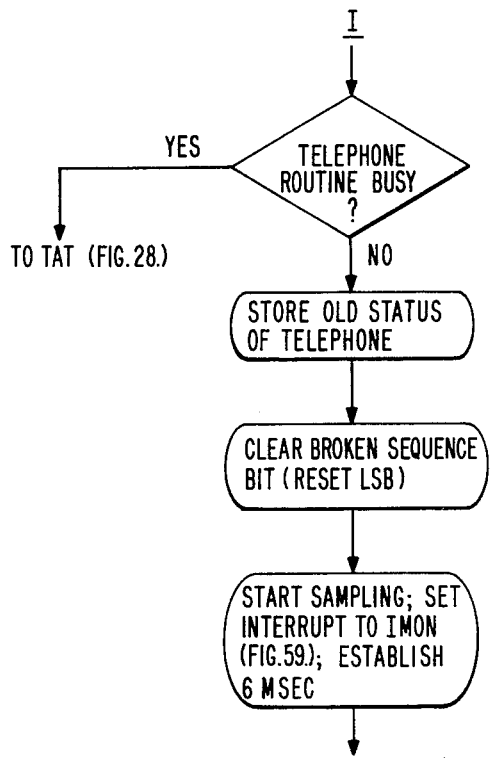

The operation I as shown in FIG. 58 commences with a determination of whether the TELEPHONE routine is busy at this time, more particularly, if a fire or security (e.g., burglar) alarm sequence is in process, or if a portable signalling device 15 has been actuated to initiate an alarm sequence, or the activity timer AT has timed out. In any of these situations, it would be undesirable to initiate a telephone monitoring operation. To determine the state of the TELEPHONE routine, the BRANCH register as employed in the TELEPHONE routine is examined to see if it contains a value of 0 or other than 0. If the contents of the BRANCH register is not 0, this indicates that the TELEPHONE routine is busy and the program proceeds to the operation TAT; if the contents of the BRANCH register is 0, this indicates that the TELEPHONE routine is not busy with one of the abovementioned alarm operations and the program proceeds to store the "old" status of the telephone TL. This latter operation is performed in connection with a MONITOR FLAG scratchpad register. This register is normally set to all 0's during the initialization operation, including the setting to "0" of a flag bit b6 representing an on/hook condition. To store the "old" status, this bit b6 is shifted to the right one position to bit b5, this latter position in the register representing a status storage position. This shifting operation is followed by resetting to a logic "0" the least significant bit (LSB) of the MONITOR FLAG register. This bit represents a "broken sequence" bit and is employed in the event of the occurrence of a subsequent fire or security alarm sequence, or an alarm sequence initiated by actuation of an rf signalling device 15. After the resetting of the "broken sequence" bit, the first sample of the voltage across the tip and ring terminals T, R may be initiated. To initiate the first sampling operation, it is required that the short relay K1 and the dial relay K2 of the data transmission circuit 30 be energized. This operation is initiated by accessing port 0 to derive an eight-bit word, performing and AND operation with this word and a hex F9 as derived from the read only memory ROM, and outputting the result back to port 0. The bits at bit positions 1 and 2, at logic "1" values, are inverted to logic "0" values by the inverting amplifiers I3 and I4 to place first ends of the relays K1 and K2 at ground potential. This grounding operation, corresponding to point "a" in FIGS. 62(A) and 62(B), allows a 5 volt signal produced by the dc power supply circuit 28 to be applied to opposite ends of the relays K1 and K2 for energizing these relays. In addition to energizing the relays K1 and K2, the INTERRUPT subroutine is set to an interrupt operation IMON (FIG. 59), to be described hereinafter, by putting the start address of the IMON interrupt operation into the data counter DC. A hex 31 as derived from the read only memory ROM is then loaded into an IMON TIMER scratchpad register. This loading operation establishes a guaranteed closure time of 6 milliseconds (hex 31×185 microseconds=6 milliseconds) for the relays K1 and K2. The program then proceeds to the operation TAT.

Figure 59:
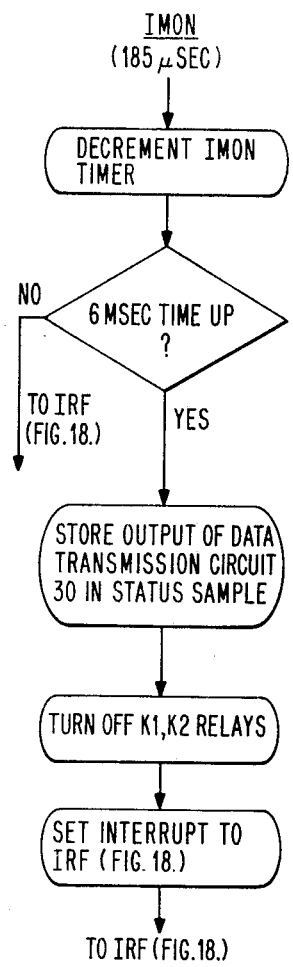

The IMON operation as shown in FIG. 59 is executed every 185 microseconds and commences with a decrementing of the IMON TIMER register. The IMON TIMER register is then examined to determine if it has been decremented to a count or value of 0 representing the expiration of the 6 millisecond closure time established for the relays K1 and K2. If the count in the IMON TIMER register has not been decremented to 0, indicating that the 6 millisecond interval has not expired, the program proceeds to the IRF interrupt operation (FIG. 18). The IRF interrupt operation ultimately returns to the IMON interrupt operation for repeating the steps as discussed above. When the IMON TIMER register has been decremented to 0, indicating the expiration of the 6 millisecond interval and corresponding to point "b" in FIGS. 62(A) and 62(B), the output signal present at the output terminal 137 of the data transmission circuit 30, representing the value of the first sample (on the minute), is received at bit position 6 of port 1. This port is accessed to derive an eight-bit word, and this word, including the bit b6 at bit position 6, is stored in a STATUS SAMPLE scratchpad register. The manner in which the first sample operation is performed to produce the associated output signal at the output terminal 137 can be fully understood by reference to the data transmission circuit 30 of FIG. 56.

Upon the energization of the relays K1 and K2 as discussed hereinabove, a pair of switches SW1 and SW2 associated with the relays K1 and K2 are caused to switch from first (de-energized) to second (energized) positions. The first and second positions of the switches SW1 and SW2 are indicated in FIG. 56 by the designations "o" and "c", respectively. When the switches SW1 and SW2 are in their first (de-energized) positions as shown in FIG. 56, the voltage then present across the tip and ring terminals T, R is applied via the switches SW1 and SW2 across a series combination of a current-limiting resistance R30 and a sampling capacitance C16. This voltage serves to charge the capacitance C16 to the existing line voltage value, for example, to either a value of 40-56 volts for an on/hook condition (in the absence of a ringing voltage) or to a value of less than 20 volts for an off/hook condition (in the absence of a ringing voltage). At such time as the relays K1 and K2 are energized, specifically, during the negative duration of the initial sampling pulse (on the minute) as shown in FIGS. 62(A) and 62(B), the switches SW1 and SW2 are actuated to their second positions as a result of which the resistance R30 and the capacitance C16 are uncoupled from across the tip and ring terminals T, R. The uncoupling action does not interfere in any manner with the subscriber's use of the telephone TL.

The voltage established across the capacitance C16 as discussed above is applied to and examined by circuitry including four diodes D10-D13, a pair of resistances R31 and R32 connected in series between the junctures of the diodes D10, D12, and D11, D13 and ground potential, and a comparator 145 coupled between the juncture of the resistances R31 and R32 and the output terminal 137. The diodes D10 and D13 are provided and required for the specific situation in which the voltage at the tip terminal T is positive relative to the ring terminal R and, similarly, the diodes D11 and D12 are provided and required for the alternative situation in which the voltage at the tip terminal T is negative relative to the ring terminal R. The resistances R31 and R32 are employed as a voltage divider circuit.

Assuming that the voltage at the tip terminal T is positive relative to the ring terminal R, the voltage across the capacitance C16 at the time of the above described uncoupling action establishes a current path which extends from the capacitance C16, through the switch SW2 in its second position, the diode D13, the resistances R32 and R31, the diode D10, the switch SW1 in its second position, and the resistance R30 back to the capacitance C16. If the voltage at the tip terminal T is negative relative to the ring terminal R, the voltage across the capacitance C16 at the time of the uncoupling action establishes a current path which extends from the capacitance C16, through the resistance R30, the switch SW1 in its second position, the diode D11, the resistances R32 and R31, the diode D12, and the switch SW2 in its second position, back to the capacitance C16.

As current flows through the resistances R31 and R32 in either of the two abovedescribed situations, a voltage is developed across the resistance R32 which, in a common voltage divider fashion, is equal to R32/(R31+R32) times the voltage across both of the resistances R31 and R32. The voltage across R32 is always positive with respect to ground potential and is compared in the comparator 145 with a reference voltage $V_{REF}$ (e.g., 2.5 volts dc). If the value of the voltage across the resistance R32 is greater than the value of the reference voltage $V_{REF}$, a logic "1" output signal is produced at the output terminal 137 of the comparator 145 indicating an apparent on/hook condition of the telephone TL. If the value of the voltage across the resistance R32 is less than the value of the reference voltage $V_{REF}$, a logic "0" output signal is produced at the output terminal 137 of the comparator 145 indicating an apparent off/hook condition of the telephone TL.

Figure 60:
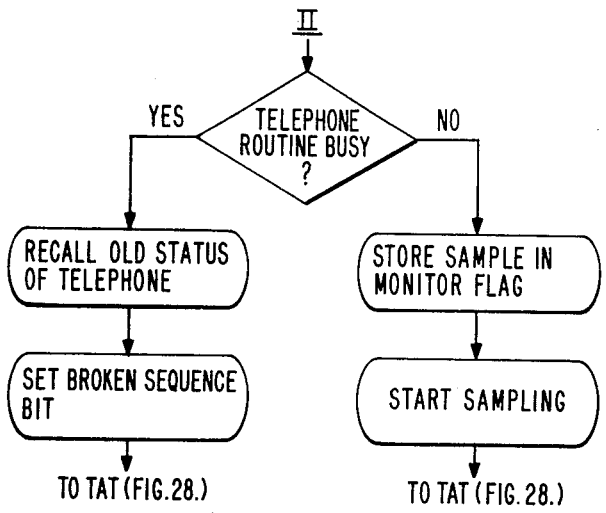

Once an output signal representative of the value of the first sample (on the minute) has been produced at the output terminal 137 and applied to the central processing unit CPU as described hereinabove, the relays K1 and K2 must be de-energized. This de-energization operation is indicated in FIG. 59 and is executed by accessing port 0 of the central processing unit CPU to derive an eight-bit word, performing an OR operation with this word and a hex 06 as derived from the read only memory ROM, and outputting the result to port 0. The bits at bit positions 1 and 2, at logic "0" values, are inverted to logic "1" values by the inverting amplifiers I3 and I4 to remove the first ends of the relays K1 and K2 from ground potential, thereby de-energizing these relays. This de-energization of the relays corresponds to point "d" in FIGS. 62(A) and 62(B). Once the relays K1 and K2 have been de-energized following the first sample, the INTERRUPT subroutine is set to the interrupt operation IRF by placing the start address of the IRF interrupt operation in the data counter DC. The program then proceeds to the interrupt operation IRF. The operation IRF ultimately proceeds to operation II as shown in FIG. 60.

Figure 26:
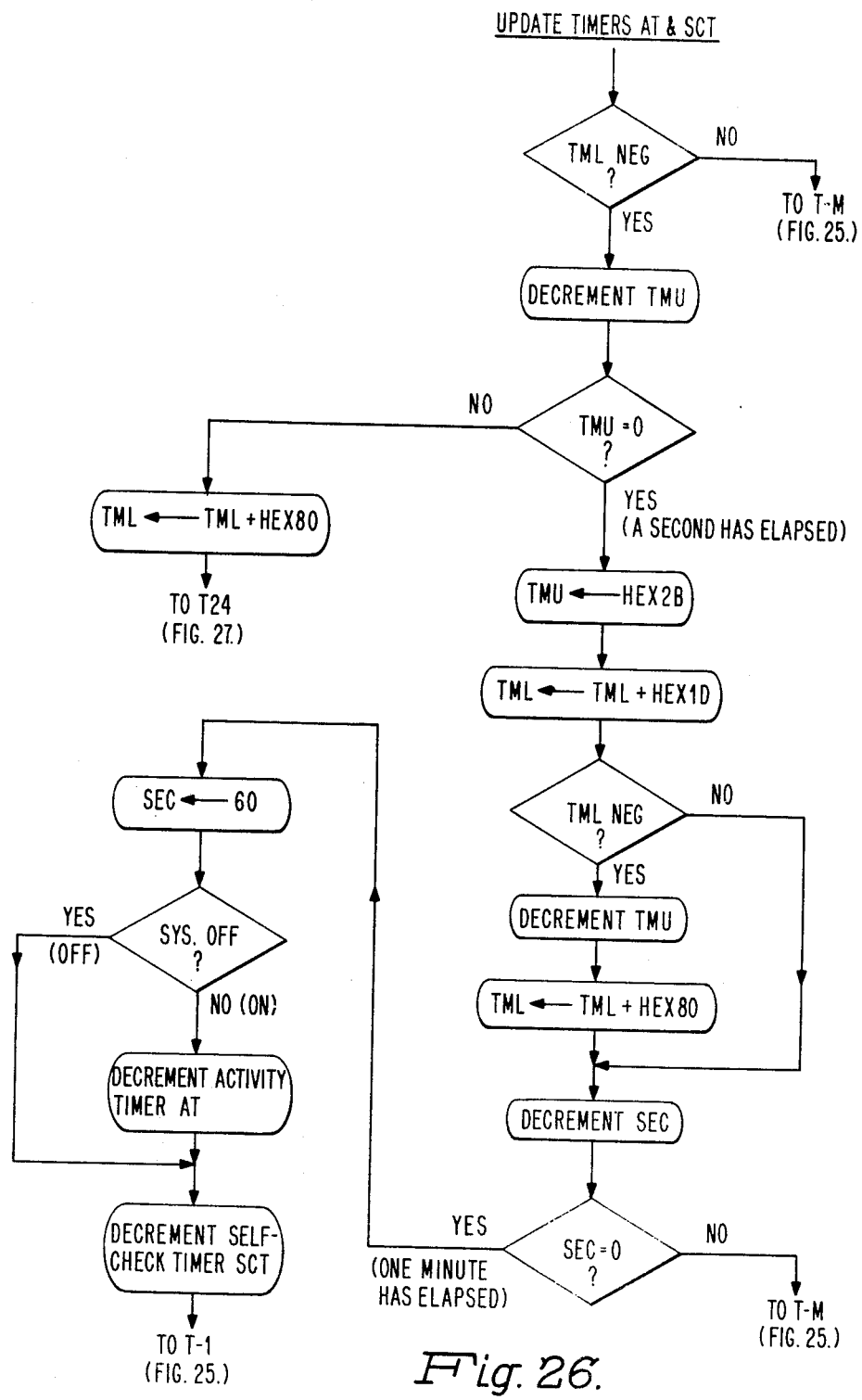
Figure 61:
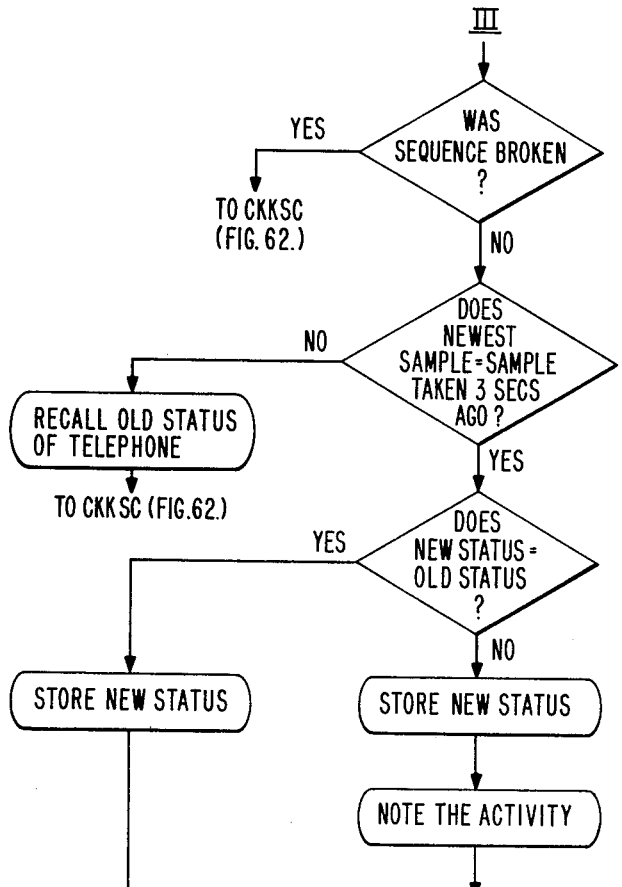

As previously mentioned, operation II takes place on the minute plus three seconds. The three second interval corresponds to a count of 57 in the SECONDS register as employed in the TIMERS routine (FIG. 26). To determine the occurrence of this particular count, the accumulator A is loaded with the contents of the SECONDS register and compared with a hex 39 as derived from the read only memory ROM. If the compared values are the same, this indicates that the SECONDS register contains a count or value of 57 and operation II is executed; otherwise, a check is made for a count of 56 and, if there is a match, to execute operation III (FIG. 61). Assuming that operation II is to be performed, the initial action taken is to determine, as in operation I, if the TELEPHONE routine is busy. In the event the TELEPHONE routine is busy (the BRANCH register contains other than 0), the "old" status is recalled, by shifting bit b5 in the MONITOR FLAG register to the left one position to become bit b6 again, and the "broken sequence" bit in the MONITOR FLAG register is set to a logic "1". This latter operation is performed by using the contents of the MONITOR FLAG register in an OR operation with a hex 01 as derived from the read only memory ROM. The result of this OR operation automatically sets the "broken sequence" bit to a logic "1". The program then proceeds to the TAT operation. In the event the TELEPHONE routine is not busy (the BRANCH register contains other than a 0), the sample taken during the first sampling operation and retained in the STATUS SAMPLE register is placed into the MONITOR FLAG register. This operation is performed by using the contents of the STATUS SAMPLE register in an AND operation with a hex 40 as derived from the read only memory ROM, thereby to mask all bits except bit b6, and to add the result to the MONITOR FLAG register to thereby store the sample in the bit position b6 of the MONITOR FLAG register. Following this operation, the second sample, on the minute plus three seconds, is initiated for examining the voltage across the tip and ring terminals T, R, following which the program proceeds to the TAT operation.

The second sampling operation involving the data transmission circuit 30 is performed in the same manner as described in connection with operation I in FIG. 58 and the IMON operation in FIG. 59 with the value of the second sample being stored in the STATUS SAMPLE register. Following the taking of the second sample, operation III as shown in FIG. 61 is executed in order to compare the result of the two samples taken on the minute (Operation I) and on the minute plus three seconds (Operation II).

Operation III as shown in FIG. 61 is executed on the minute plus four seconds. The four second interval corresponds to a count of 56 in the SECONDS register. To determine the occurrence of this particular count, the contents of the SECONDS register, which is present in the accumulator A, is compared with a hex 38 as derived from the read only memory ROM. If the compared values are the same, this indicates that the SECONDS register contains a count or value of 56 and operation III is executed; otherwise, the program proceeds to the operation TAT. Assuming that operation III is to be performed, the initial action taken is to determine if the telephone monitoring sequence under discussion was broken by an alarm condition. To determine if the telephone monitoring sequence was broken, the contents of the MONITOR FLAG register is loaded into the accumulator A and used in an AND operation with a hex 01 as derived from the read only memory ROM. If the result is equal to 1, this condition indicates that the sequence was broken and the program proceeds to an operation CHKSC for checking the self-check timer SCT, as will be described in detail hereinafter in connection with FIG. 62. If the result is other than 1, this condition indicates that the sequence was not broken and the two samples taken on the minute (operation I) and on the minute plus three seconds (operation II) are compared to determine if they are the same or different. This comparison is performed by loading the contents of the MONITOR FLAG register into the accumulator A, using this data in an AND operation with a hex 40 as derived from the read only memory ROM, and storing the result in a scratchpad register designated R1. The contents of the STATUS SAMPLE register, representing the new sample, is then loaded into the accumulator A and used in an AND operation with a hex 40 as derived from the read only memory ROM. The contents of the R1 register (derived from the MONITOR FLAG register) is then used in an EXCLUSIVE/OR operation with the data in the accumulator A. If the result of the EXCLUSIVE/OR operation is a logic "0", this indicates that both samples are of the same value, either logic 1's or logic 0's. If the result of the EXCLUSIVE/OR operation is a logic "1", this indicates that the two samples were not of the same value, more particularly, that one of the two samples was a sample taken while a ringing voltage was present on the telephone line. In this latter situation, the two samples are effectively rejected by recalling the "old" status, specifically, by shifting bit b5 of the MONITOR FLAG register left one position to bit position b6. The program then proceeds to the CHKSC operation.

In the situation as discussed hereinabove, in which the two samples have been determined to be the same, a determination is then made as to whether the new, or present, status of the telephone TL, that is, an on/hook condition represented by a pair of successive logic 1's at the output terminal 137 or an off/hook condition represented by a pair of successive logic 0's at the output terminal 137, is the same as the old, or previous, status. As previously indicated, changes or transitions in the two possible states of the telephone TL may be used by the central processing unit CPU as an indication of usage of the telephone TL and thereby constitute a monitored activity in the same sense as other sensors employed in the system. To determine if a change in the state of the telephone TL has occurred relative to the previous state, the contents of the MONITOR FLAG register is loaded into the accumulator A and used in an AND operation with a hex 20 as derived from the read only memory ROM. The AND operation serves to zero all bits except the "old" status bit b5. Bit b5 is then shifted in the accumulator A to the left one position to the "new" status bit position b6. Bit b6 is then used in the accumulator A in an EXCLUSIVE/OR operation with the contents of the R1 register. If the result of the EXCLUSIVE/OR operation is 0, this condition indicates that there was no change in the status of the telephone TL, that is, the new status is the same as the old status, and the new status is stored in the MONITOR FLAG register. This latter operation is performed by loading the contents of the R1 register into the accumulator A and then loading the contents of the accumulator A into the MONITOR FLAG register. The program then proceeds to the operation CHKSC. If the result of the above EXCLUSIVE/OR operation is other than 0, this condition indicates that there was a change in the status of the telephone TL, that is, the new status (on/hook or off/hook) was different from the previous status (off/hook or on/hook). In this case, the change in activity is noted, specifically, by storing the new status in the MONITOR FLAG register and by calling the SENSORS subroutine to note the activity by re-initiating the timing cycle (long time period) of the activity timer AT, etc., in the manner as previously described in detail. It will be recalled, however, that no running tally is maintained of the usage of the telephone TL. Once the SENSORS subroutine has been called, the program proceeds to the operation CHKSC as shown in FIG. 62.

Figure 62:
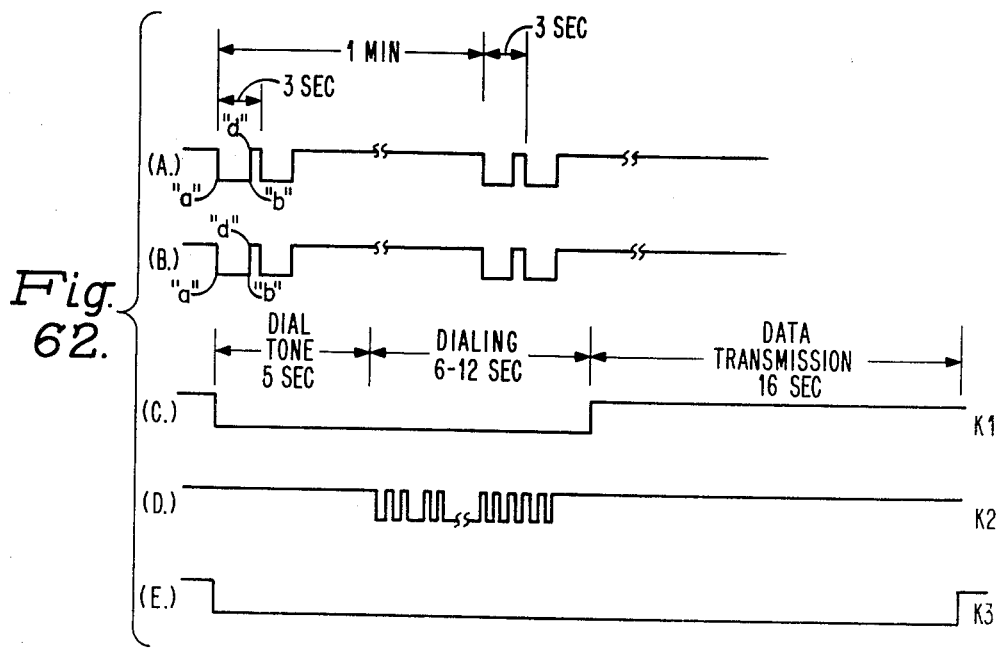
FIGS. 62(A)-62(E) are waveforms of signals employed to control the data transmission circuit of FIG. 56.

The operation CHKSC as shown in FIG. 62 is executed to determine whether the time of a scheduled self-check call has arrived and, in addition, the telephone TL is in an on/hook state. The former condition is satisfied if the self-check timer SCT contains a negative count and the latter condition is satisfied if bit b6 of the MONITOR FLAG register has a logic "1" (on/hook) value. If the self-check timer SCT does not contain a negative count, or it contains a negative count but bit b6 of the MONITOR FLAG register does not have a logic "1" value, the program proceeds to the operation TAT. If both of the above conditions are satisfied, the TELEPHONE routine is examined to determine if it is idle. This idle condition is determined by examining the BRANCH register employed in the TELEPHONE routine to see if it contains a 0, corresponding to an idle condition, or other than a 0. If the BRANCH register contains a 0, the BRANCH register is decremented to a −1 to start the TELEPHONE routine, in the manner as earlier described. The program then proceeds to the TELEPHONE routine. If the BRANCH register is other than a 0, indicating that a call already is in process, the program proceeds to the operation CHKAT.

Once it has been determined that a self-check call can be made, as discussed hereinabove, it is possible to initiate a self-check data transmission sequence between the terminal 137 and the tip and ring terminals T, R. This data transmission sequence is the same as in the case of an alarm sequence with the exception that the telephone TL must be in an on/hook condition for a self-check data transmission sequence. As previously noted, an alarm data transmission sequence will take place irrespective of the particular condition of the telephone TL. Other differences, such as the type and use of data incorporated in an alarm message as opposed to a self-check message and differences in the use of primary and secondary telephone numbers have been discussed previously in detail.

The manner in which the data transmission circuit 30 of FIG. 56 is employed in a data transmission sequence, either a self-check sequence or an alarm sequence, is as follows. At such time as a data transmission sequence is to take place, control signals as previously discussed in connection with the TELEPHONE routine are produced at bit positions 0 and 1 of port 0 of the central processing unit CPU and inverted by the inverting amplifiers I2 and I3 to produce control signals having waveforms as shown in FIGS. 62(C) and 62(E). The control signal of FIG. 62(C) is used to control the energization state of the short relay K1 and the control signal of FIG. 62(E) is used to control the energization state of the line relay K3. The short relay K1 operates in response to the control signal of FIG. 62(C) to be energized and cause the switch SW1 and another similar switch SW3 to be actuated from their first positions to their second positions. The line relay K3 operates in response to the control signal of FIG. 62(E) to be energized and cause the aforementioned switch LS to be actuated from its first position to its second position.

The actuation of the switch SW1 from its first position to its second position serves to disconnect or uncouple the resistance R30 and the capacitance C16 from across the tip and ring terminals T, R, and the actuation of the switches SW3 and LS from their first positions to their second positions serves to establish a continuous dc loop between the tip and ring terminals T, R. This loop extends from the tip terminal T, through the switch SW3 in its second position, a switch SW4 in its first position (as shown in FIG. 56), and the switch LS in its second position, back to the ring terminal R. The actuation of the switch LS from its first position to its second position also serves to disconnect or uncouple the telephone TL from across the tip and ring terminals T, R. In this latter instance, a subscriber attempting to use the telephone TL will be met only with silence, that is, the subscriber will not even get a dial tone, thereby informing the subscriber that a data transmission sequence is in process and that he or she should wait a short period before initiating the call.

Upon the establishment of the dc loop between the tip and ring terminals T, R as discussed above, a standard dial tone is received from the telephone central office over the telephone line and applied to the dc loop. This dial tone, which occurs within a predetermined period, for example, within five seconds of the energization of the short relay K1, (see FIG. 62(C), is part of a normal telephoning sequence. However, in the present situation this dial tone is effectively ignored by the system. After the abovementioned five second dial tone period, and for a period of about 6–12 seconds thereafter, dialing pulses as produced by the central processing unit CPU at bit positions 2 of port 0 and inverted by the inverting amplifier I4 to the form shown in FIG. 62(D) are used to control energization of the dial relay K2. As previously discussed, these dialing pulses correspond to either the primary or secondary telephone number in the case of an alarm sequence or the primary telephone number in the case of a self-check sequence. The dialing pulses, which are typically at a rate of 10 pulses/sec., cause the dial relay K2 to be energized and de-energized at the dialing pulse rate and the associated switch SW4, which is in series with the aforedescribed dc loop to the central office, to be actuated between its first and second positions at the dialing pulse rate. The switch SW2 is actuated in the same manner as the switch SW4 but does not have any effect on a data transmission sequence. The actuation of the switch SW4 at the dialing pulse rate serves to make and break the aforedescribed dc loop to the central office at the dialing pulse rate so that the central office can ascertain the telephone number being dialed and make the necessary connections to the centralized communications center CCC. Any arcing of the switch SW4 during operation of the dial relay K2 is minimized by a resistance R34 and a capacitance C18 connected in parallel with the switch SW4 in its first position.

After the dialing operation has been concluded, the dialing pulses (FIG. 62(D)) used to control the dial relay K2 and the control signal (FIG. 62(C)) used to control the short relay K1 are discontinued thereby causing the relays K1 and K2 to return to their de-energized states and the switches SW1-SW4 to return to their first positions as shown in FIG. 56. At this time, data from the central processing unit CPU, at bit position 3 of port 0, may be applied to the terminal 135 for application to the tip and ring terminals T, R and subsequent transmission over the telephone line to the centralized communications center CCC.

The data applied to the terminal 135 is coupled via a coupling transformer TC and a pair of coupling capacitances C19 and C20 to the tip and ring terminals T, R, the capacitance C19 being coupled directly to the tip terminal T and the capacitance C20 being coupled to the ring terminal R via the switch SW4 in its first position and the switch LS in its second position. Since the discontinuation of the control signal of FIG. 62(C) and the consequential deenergization of the short relay K1 causes the dc loop to the central office to be broken, a choke L1, which acts as a short circuit to dc and a high impedance to ac, is connected across the tip and ring terminals T, R (with the switch SW4 in its first position and the switch LS in its second position) and serves to maintain the dc loop to the central office upon the de-energization of the relay K1. Thus, the data at the terminal 135 is able to pass to the tip and ring terminals T, R and to be applied over the telephone line to the central office and, ultimately, to the centralized communications center CCC. The data transmission between the terminal 135 and the tip and ring terminals T, R is followed by a corresponding data transmission from the centralized communications center CCC, as earlier described. This data is able to pass from the telephone line to the tip and ring terminals T, R and from the tip and ring terminals T, R back to the terminal 135 using the same ac data path as used in the passage of data in the forward direction from the terminal 135 to the tip and ring terminals T, R. A suitable total transmission time for the bidirectional transmission of data as discussed above is about 16 seconds, as indicated in FIG. 62(C). At the end of this 16 second period, the control signal used to control the line relay K3 is discontinued, causing the relay K3 to be de-energized and the switch LS to return to its first position. At this time, the subscriber is once again able to use the telephone TL for normal telephone calls.

The data transmission circuit 30 and the monitor circuit 140 as discussed hereinabove and shown in FIG. 56 are also disclosed, and claimed as to single (as opposed to double) sampling operations, in the aforementioned applications in the names of Robert J. Fahey and Martin L. Resnick, Ser. No. 965,808, now U.S. Pat. No.

4,224,478, and Robert J. Fahey, Ser. No. 965,809, now U.S. Pat. No. 4,220,825, respectively.

DC Power Supply Circuit 28;

Detector Circuit 54 (FIG. 64)

Referring now to FIG. 64, there is shown a suitable implementation of the dc power supply circuit 28 and the detector circuit 54 as employed in the system of the invention. The dc power supply circuit 28 is arranged to simultaneously supply dc voltage to various components in the system, shown collectively in FIG. 64 as a "dc load", and to the aforementioned standby battery SB. The dc load as indicated in FIG. 64 is a variable-current load and includes the aforedescribed central processing unit CPU, the relays K1-K3 in the data transmission circuit 30, the audible alarm unit 27, and various other circuit components employing integrated circuits or otherwise requiring a dc supply voltage of 5 volts or less. The dc load, due to its varying power demands and/or duty cycles, draws current from the dc power supply circuit 28 which varies over a wide range of values, for example, between a minimum of 450 milliamperes and a maximum of 900 milliamperes.

The standby battery SB is of a rechargeable type and is adapted to be charged to a desired maximum value and, as will be described in detail hereinafter, to be automatically coupled to the dc load by the detector circuit 54 upon the loss or reduction of dc voltage to the dc load. In addition to connecting the standby battery SB with the dc load upon the loss or reduction of dc voltage to the load, the detector circuit 54 also serves to monitor continuously the value of dc voltage coupled from the battery SB to the load and, when the value of this voltage declines to a predetermined critical level, to disconnect the battery SB from the load. This latter operation is considered necessary to prevent permanent damage to the battery SB and also to insure desirable operation of critical components of the dc load such as the central processing unit CPU which typically is of the MOS type and has critical operating voltages below which it cannot function in a desired, efficient, error-free fashion. In this latter instance it is preferred to completely deny operating voltage to the central processing unit CPU rather than risk improper operation thereof.

The dc voltages produced by the power supply circuit 28 for operating the dc load and for charging the standby battery SB are derived from the system ac input voltage as applied across a primary winding T3 of a stepdown transformer ST. The ac voltage, which is a 110-volt line voltage, is stepped down by the transformer ST and presented across a secondary winding T4. The stepped-down ac voltage is then converted to a dc voltage by a full-wave bridge rectifier circuit 150, comprising four diodes D15-D18, and filtered by a capacitance C22. The dc voltage established across the capacitance C22 is employed both to derive a fixed dc supply voltage for the dc load, for example, 5 volts dc, and also to derive dc voltages for charging the standby battery SB to a desired voltage, for example, about 6.5 volts.

The fixed dc voltage for the dc load is derived from the voltage across the capacitance C22 by means including a voltage regulator circuit 152. The voltage regulator circuit 152 supplies an initial fixed dc voltage to the dc load, specifically, 5 volts dc, and, as the load draws varying amounts of current over its operating range, for example, between the aforementioned minimum of 450 ma and maximum of 900 ma, the current variations are sensed by a current-sensing resistance R40, causing variations in the value of dc voltage applied to an input terminal 152a of the voltage regulator circuit 152. The voltage regulator circuit 152, which is of a so-called fixed type by virtue of a control input terminal 152b thereof being placed at a fixed potential, for example, ground potential, regulates the varying voltage at its input terminal 152a to a fixed value of 5 volts dc at an output terminal 152c thereof.

As the regulated fixed dc voltage (5 volts) is supplied to the dc load, a dc battery-charging voltage is also supplied to the standby battery SB by an adjustable voltage regulator circuit 153. The adjustable voltage regulator circuit 153 receives a dc voltage from the capacitance C22 at an input terminal 153a and operates in conjunction with a pair of transistors Q4 and Q5, a capacitance C24, and a plurality of resistances R41-R45 to control the dc voltage supplied to, and the current drawn by, the battery SB. More particularly, as the dc load and the battery SB draw current, the aforementioned components operate to increase or decrease the value of voltage at a control input terminal 153b of the voltage regulator circuit 153 in accordance with the variations in the current drawn by the dc load and the battery SB. As a result, corresponding variations are produced in the value of the voltage at an output terminal 153c of the voltage regulator circuit 153 and, thus, the value of the current supplied to the battery SB. The transistors Q4 and Q5 and the resistances R41-R45 further operate, in conjunction with the current-sensing resistance R40 and the voltage regulator circuit 153, to limit the current to the battery SB so that the maximum combined value of current drawn by the dc load and the battery SB does not exceed some prescribed value, for example, one ampere. The one ampere limitation serves to protect components such as the transformer ST from being damaged or destroyed. This maximum value of current of one ampere is further apportioned between the dc load and the battery SB with the load being supplied first and at all times with its particular current needs and the remainder, that is, the difference between the current drawn by the dc load and one ampere, being made available to the battery SB for charging purposes. This preferential situation arises since the needs of the dc load are of a shortterm nature, that is, more or less immediate, while the charging of the battery SB to its desired value is a comparatively long-term consideration, for example, 24 hours, and to be utilized upon a loss or reduction of dc power supplied to the dc load.

Figure 63:
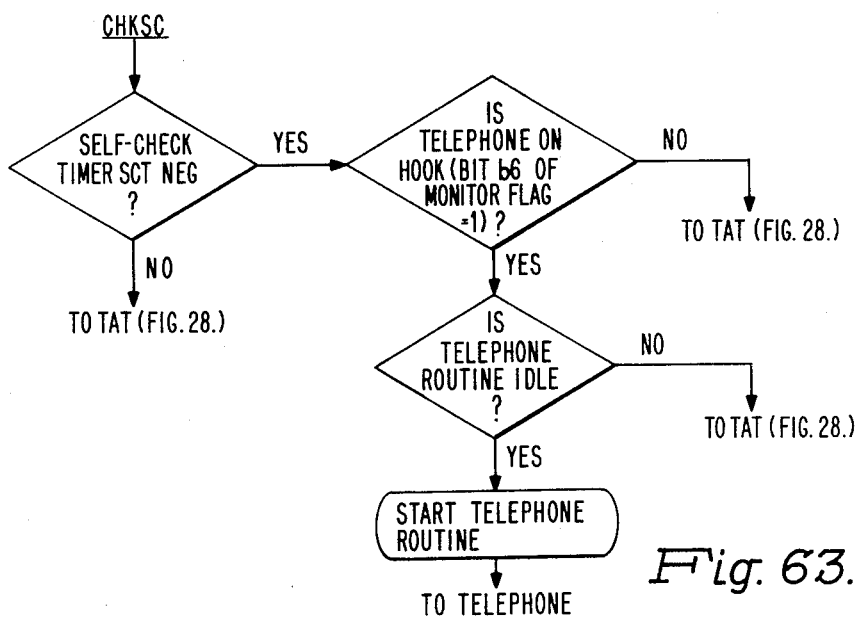

The transfer of the voltage developed across the battery SB to the dc load upon the loss or reduction of power to the dc load is accomplished by a first voltage monitoring circuit 154 included in the aforementioned detector circuit 54. The voltage monitoring circuit 154 includes a voltage detector 155 of a form as shown in detail in FIG. 65. As shown in FIGS. 64 and 65, the voltage detector 155 has a voltage input terminal 156, a hysteresis output terminal 157, a threshold input terminal 158, a reference terminal 159, and an output terminal 160. The voltage input terminal 156 is connected to the top end of the capacitance C22 of the dc power supply circuit 28 and is adapted to receive the dc voltage developed across the capacitance C22. The hysteresis output terminal 157 is coupled via a feedback resistance R47 to the juncture of a pair of resistances R48 and R49, and the threshold input terminal 158 is connected directly to the juncture of the resistances R48 and R49. The resistances R48 and R49 constitute a voltage divider and, as shown in FIG. 63, are coupled between the top end of the capacitance C22 and ground potential. These resistances are arranged to receive the voltage across the capacitance C22 and, when the voltage across the capacitance C22 and, thus, at the input terminal 156, is of a predetermined critical value, for example +9.5 volts dc, to establish a voltage at the threshold terminal 158 which is equal to an internal threshold voltage of the voltage detector 155, for example, 1.15 volts dc. To this end, the resistances R48 and R49 are selected to have values such that the ratio of these values (R48/R49) is essentially equal to the ratio of 9.5 volts to 1.15 volts.

The reference terminal 159 of the voltage detector 155 is connected directly to a source of reference potential, such as ground potential, and the output terminal 160 is connected via a switch 162, for example, a Darlington switch circuit, to one end of a relay winding RW. The opposite end of the relay winding RW is coupled to the input of the dc load. The output terminal 160 of the voltage detector 155 is also connected via a resistance R50 to the input of the dc load so that the dc voltage received by the load is applied to one end of the resistance R50.

The voltage monitoring circuit 154 as described above operates in the following manner. When the dc voltage established across the capacitance C22 is of a sufficiently high value for use by the dc load and the battery SB, for example, above +9.5 volts dc, this voltage is coupled directly to the input terminal 156 of the voltage detector 155 and also reduced in value by the resistances R48 and R49 and applied to the threshold input terminal 158. Since the value of the reduced voltage at the threshold input terminal 158 is greater at this time than the value of the internal threshold voltage (1.15 volts dc) of the voltage detector 155, an output transistor Q21 connected between the output terminal 160 and the reference terminal 159 as shown in FIG. 65 is caused to conduct and thereby connect the output terminal 160 to ground potential. As a result, the 5-volt signal produced by the voltage regulator circuit 152 and applied to the dc load is also coupled to the resistance R50 and causes current to flow through the resistance R50 and through the conducting transistor Q21 (between terminals 159 and 160) to ground potential. The flow of current through the resistance R50 to ground potential serves to rob, or deny, the switch 162 of input current as a result of which the switch 162 acts as an open circuit and prevents the relay winding RW, which controls a switch SW5 in the dc power supply circuit 28, from being energized by the 5-volt signal present at the input of the dc load. With the relay winding RW in its de-energized state, the switch SW5 remains in a first position as shown in FIG. 64 and there is no transfer or coupling of the voltage developed across the battery SB to the dc load.

If the value of the dc voltage developed across the capacitance C22 should drop below the abovementioned 9.5 volts, for example, due to a loss of the input ac voltage or failure of some circuit component, this voltage condition, which leads to a loss or reduction in the power to the dc load, is detected by the voltage monitoring circuit 154. Specifically, when the dc voltage across the capacitance C22 is below 9.5 volts, this voltage is applied to the input terminal 156 of the voltage detector 155 and the voltage-divider resistances R48 and R49 serve to establish a dc voltage at the threshold input terminal 158 of the voltage detector 155 which is of a value less than the value of the internal threshold voltage (1.15 volts) of the voltage detector 155. As a result, the aforementioned transistor Q21 connected between the terminals 159 and 160 is caused to operate in its non-conducting state, thereby causing the output terminal 160 to be placed above ground potential.

With the output terminal 160 of the voltage detector 155 above ground potential, the aforedescribed current path through the resistance R50 to ground potential is no longer present and, instead, a new current path is established through the resistance R50 to the input of the switch 162 by means of the dc voltage present at the input of the dc load (and applied to the resistance R50). The switch 162 operates in response to the current received at its input to be placed in a "closed" state, thereby allowing the relay winding RW to be energized. The energization of the relay winding RW causes the aforementioned switch SW5 to move from its first position as shown in FIG. 64 to a second position. With the switch SW5 in its second position, the battery SB is coupled to a simple voltage regulator circuit 165 (comprising an npn transistor Q7, resistances R52 and R53 and a capacitance C26) and the dc voltage across the battery SB is regulated by the voltage regulator circuit 165 to a fixed value of +5 volts and applied to the input of the dc load. This regulated dc voltage then serves to maintain the relay winding RW in its energized state. It is to be appreciated that the energization of the relay winding RW as discussed hereinabove occurs rapidly and, in any event, occurs before the dc voltage supplied to the dc load by the voltage regulator circuit 152 has dropped, as a result of the discharge of the capacitance C22, to a value of voltage which would prevent sufficient current from being applied to the switch 162.

The output of the voltage detector 155, in addition to being used to control the switch 162 and the energization of the relay winding RW, is used by the central processing unit CPU, specifically, at bit position 7 of port 5, for informing the central processing unit CPU of the occurrence of power failures. The restoration of power following a power failure will also be noted by the central processing unit CPU by virtue of changes in the state of the output of the voltage detector 155. The manner in which the central processing unit CPU functions during power failures and subsequent restorations of power, especially in the processing of coded rf signals produced by ac-based sensors, has been described in detail hereinbefore (see FIGS. 19-21).

Once the battery SB has been coupled to the input of the dc load as described hereinabove, it may be used to power the dc load over a period of time as determined by the value of the dc voltage developed across the battery SB. A fully charged battery SB might be used, for example, for a period of up to 6 hours. However, should the value of the dc voltage across the battery SB decline over a period of time so that the battery voltage coupled to the dc load via the voltage regulator circuit 165 reaches a critical level, for example, below +4.5 volts dc, it may become necessary, in order to prevent damage to the battery SB or improper operation of components of the dc load (e.g., MOS integrated circuits), to disconnect the battery SB from the dc load. This disconnect operation is achieved by means of a second voltage monitoring circuit 170. The voltage monitoring circuit 170 serves to continuously monitor the value of the dc battery voltage coupled to the dc load and, when the value of this voltage drops to a critical level, specifically, below 4.5 volts, to disconnect the battery SB from the dc load.

The voltage monitoring circuit 170 includes a voltage detector 172 of a form as shown in detail in FIG. 66. As shown in FIGS. 64 and 66, the voltage detector 172 has a voltage input terminal 173, a hysteresis output terminal 174, a threshold input terminal 175, a reference terminal 176, and an output terminal 177. The voltage input terminal 173 is connected to the input of the dc load and is adapted to receive the regulated dc battery voltage applied to the input of the load. The hysteresis output terminal 174 is coupled via a feedback resistance R55 to the juncture of a pair of resistances R56 and R57, and the threshold input terminal 175 is connected directly to the juncture of the resistances R56 and R57. The resistances 56 and 57 constitute a voltage divider and, as shown in FIG. 64, are coupled between the input of the dc load and ground potential. These resistances are arranged to receive the regulated battery voltage as applied to the dc load and, when the value of this voltage is below a predetermined critical level, for example, 4.5 volts dc, to establish a voltage at the threshold terminal 175 which is equal to an internal threshold voltage of the voltage detector 172, for example, 1.15 volts dc. As in the case of the voltage-divider resistances R48 and R49 associated with the voltage detector 155, the resistances R56 and R57 are selected to have values such that the ratio of these values (R56/R57) is essentially equal to the ratio of 4.5 volts to 1.15 volts.

The reference terminal 176 of the voltage detector 172 is connected directly to ground potential, and the output terminal 177 is connected via the aforementioned switch 162 and relay winding RW, and also via the aforementioned resistance R50, to the input of the dc load.

The voltage monitoring circuit 170 as described above operates in the following manner. When the regulated battery voltage applied to the dc load is above 4.5 volts, indicating that the voltage across the battery SB is of sufficient value for use by the dc load, this regulated dc voltage is coupled directly to the input terminal 173 of the voltage detector 172 and also reduced in value by the resistances R56 and R57 and applied to the threshold input terminal 175. Since the value of the reduced voltage at the threshold input terminal 175 is greater at this time than the value of the internal threshold voltage (1.15 volts dc) of the voltage detector 172, an output transistor Q21[1] connected between the output terminal 177 and the reference terminal 176 as shown in FIG. 66 is caused to operate in its non-conducting state. As a result, the regulated battery voltage at the input of the dc load causes a current path to be established via the resistance R50 to the input of the switch 162. This current flow into the switch 162 serves to maintain the switch 162 in its "closed" state, thereby maintaining the relay winding RW in its energized state and the switch SW5 in its second position.

If the value of the regulated battery voltage applied to the dc load drops below the abovementioned 4.5 volts, for example, due to prolonged use of the battery SB resulting in a reduction of the voltage thereacross, this voltage condition is detected by the voltage monitoring circuit 170. Specifically, when the regulated battery voltage applied to the dc load is below 4.5 volts, this voltage is applied to the input terminal 174 of the voltage detector 172 and the voltage-divider resistances R56 and R57 serve to establish a dc voltage at the threshold input terminal 175 of the voltage detector 172 which is of a value less than the value of the internal threshold voltage (1.15 volts) of the voltage detector 172. As a result, the aforementioned transistor Q21[1] is caused to operate in its conducting state thereby causing the output terminal 177 to be placed at ground potential and establishing a current path via the resistance R50 and the terminals 177 and 176 to ground potential. This current path through the resistance R50 to ground potential serves to rob, or deny, the switch 162 of current at its input as a result of which the relay winding RW is caused to change from its energized state to its previous de-energized state. The de-energization of the relay winding RW in turn causes the switch SW5 to move from its second position back to its original, first position as shown in FIG. 64. With the switch SW5 back in its first position, the battery SB is disconnected from the dc load and once again restored to its place within the power supply circuit 28 in readiness to be recharged upon the restoration of ac power or correction of any malfunction component responsible for the original loss or reduction of dc power to the dc load.

The dc power supply circuit 28 and the detector circuit 54 as shown in FIGS. 64–66 are described in detail, and claimed, in the aforementioned applications of Robert J. Fahey, Ser. No. 973,201, now U.S. Pat. No. 4,220,872, and Ser. No. 973,218, now U.S. Pat. No. 4,225,792, respectively.

While there has been described what is considered to be a preferred embodiment of the invention, it will be apparent to those skilled in the art that various changes and modification may be made therein without departing from the invention as called for in the appended claims.

What is claimed is:

1. In a monitoring and signalling system, apparatus comprising:
   sensor means arranged to monitor the occurrence of an associated activity and operative in response to monitoring the occurrence of the activity to produce a signal indicative of the occurrence of the activity;
   sensor activity recording means for recording sensor activity data representing a count of the number of times the sensor means has monitored its associated activity and produced signals, said data having a first value when the sensor means has not monitored its associated activity and has not produced signals and a different value when the sensor means has monitored its associated activity and produced signals;
   processing means operative when signals are produced by the sensor means to receive and process said signals and in response to processing each signal to change the value of the sensor activity data in the sensor activity recording means to record the occurrence of the activity monitored by the sensor means, whereby the sensor activity recording means maintains a continuing tally of the number of times the sensor means has monitored its associated activity and produced signals;
   timing means operative on a regular basis to cause the existing sensor activity data recorded by the sensor activity recording means to be read out therefrom; and
   sensor data processing means arranged to receive and process sensor activity data read out from the sensor activity recording means and operative whenever the sensor activity data has its first value indicating that the sensor means has not monitored its associated activity and produced signals since the last readout of sensor activity data from the sensor activity recording means to produce an output condition indicative of this fact.

2. Apparatus in accordance with claim 1 wherein: the timing means is operative at or following a predetermined time of day, each day, to cause the existing sensor activity data recorded in the sensor activity recording means to be read out therefrom.

3. Apparatus in accordance with claim 2 further comprising:
termination control means operative following the processing of sensor activity data by the sensor data processing means to produce control data; and
means operative after each readout of sensor activity data from the sensor activity recording means and in response to the control data from the termination control means to cause the sensor activity recording means to be reset to contain data therein having the first value in preparation for recording new occurrences of the activity monitored by the sensor means.

4. A monitoring and signalling system, comprising:
first and second apparatus at first and second locations, respectively, and interconnected by a transmission medium for allowing communication between the first and second apparatus;
said first apparatus at the first location comprising:
sensor means arranged to monitor the occurrence of an associated activity and operative in response to monitoring the occurrence of the activity to produce a signal indicative of the occurrence of the activity;
sensor activity recording means for recording sensor activity data representing a count of the number of times the sensor means has monitored its associated activity and produced signals, said data having a first value when the sensor means has not monitored its associated activity and has not produced signals and a different value when the sensor means has monitored its associated activity and produced signals;
processing means arranged to receive and process signals produced by the sensor means, said processing means being operative if a signal is not received thereby from the sensor means within a predetermined time period representing an activity-monitoring period to produce an alarm condition, and further operative in response to processing each signal received from the sensor means to change the value of the sensor activity data in the sensor activity recording means to record the occurrence of the activity monitored by the sensor means, whereby the sensor activity recording means maintains a continuing tally of the number of times the sensor means has monitored its associated activity and produced signals;
first means operative following an alarm condition produced by the processing means to initiate an alarm communication with the second apparatus at the second location and to generate an alarm message including alarm data specifying the occurrence of the alarm condition for transmission over the transmission medium to the second apparatus at the second location; and
self-check means operative at or following a specified time of day and in the absence of an alarm condition produced by the processing means at that time to initiate a self-check operation and to cause the existing sensor activity data recorded by the sensor activity recording means to be read out therefrom and to be incorporated into a self-check message for transmission over the transmission medium to the second apparatus at the second location;
said second apparatus at the second location comprising:
alarm processing means operative to receive and process the alarm data in each alarm message generated by the first apparatus for providing a response to said alarm message; and
sensor data processing means arranged to receive and process the sensor activity data in each self-check message initiated by the first apparatus, said sensor data processing means being operative if the sensor activity data has its first value indicating that the sensor means has not monitored its associated activity and produced signals since the last readout of sensor activity data from the sensor activity recording means to produce an output condition indicative of this fact.

5. A monitoring and signalling system in accordance with claim 4 wherein the processing means comprises:
activity means operative in response to each signal produced by the sensor means to be set to a predetermined count;
means operative following each count set into the activity means to alter the count at a predetermined rate so as to have a predetermined value at the expiration of a predetermined time period representing an activity-monitoring period; and
means operative if the count in the activity means has been altered to the predetermined value to produce an alarm condition.

6. A monitoring and signalling system in accordance with claim 4 wherein the first apparatus at the first location further comprises:
alarm means operative for the duration that the first means communicates with the second apparatus to produce a sensible alarm indication for indicating that the first means is communicating with the second apparatus; and
terminating means operative at the conclusion of the communication with the second apparatus to terminate the sensible alarm indication produced by the alarm means thereby to provide a period of silence following the sensible alarm indication indicating that the communication was received by the second apparatus.

7. A monitoring and signalling system in accordance with claim 6 wherein:
the second apparatus further comprises means operative at the conclusion of a communication initiated by the first apparatus to communicate control data to the first apparatus; and
said terminating means includes means arranged to receive the control data and operative in response thereto to terminate the sensible alarm indication.

8. A monitoring and signalling system in accordance with claim 6 wherein:
the transmission medium is a telephone network;

the alarm means of the first apparatus at the first location is operative for the duration that the first means communicates with the second apparatus to provide an audible alarm indication; and the alarm processing means of the second apparatus at the second location comprises:

control means operative under operator control to communicate with the first apparatus at the first location by means of a dialed telephone call over the telephone network to provide an additional audible indication that the communication to the second apparatus was received by the second apparatus.

9. A monitoring and signalling system in accordance with claim 8 wherein:

the first apparatus at the first location includes a telephone;

the alarm means of the first apparatus is operative to produce an audible alarm indication in the form of an intermittent audible tone; and the control means of the second apparatus operates to provide the additional audible indication at the first apparatus in the form of the ringing of the telephone at the first location.

10. A monitoring and signalling system in accordance with claim 9 wherein:

the alarm means of the first apparatus is further operative for the duration that the first means communicates with the second apparatus to produce a visual alarm indication simultaneously with the audible alarm indication.

11. A monitoring and signalling system, comprising:

first and second apparatus at first and second locations, respectively, and interconnected by a transmission medium for allowing communication between the first and second apparatus;

said first apparatus at the first location comprising:

sensor means arranged to monitor the occurrence of an associated activity and operative in response to monitoring the occurrence of the activity to produce a signal indicative of the occurrence of the activity;

sensor activity recording means for recording sensor activity data representing a count of the number of times the sensor means has monitored its associated activity and produced signals, said data having a first value when the sensor means has not monitored its associated activity and has not produced signals and a different value when the sensor means has monitored its associated activity and produced signals;

processing means arranged to receive and process signals produced by the sensor means, said processing means being operative if a signal is not received thereby from the sensor means within a predetermined time period representing an activity-monitoring period to produce an alarm condition, and further operative in response to processing each signal received from the sensor means to change the value of the sensor activity data in the sensor activity recording means to record the occurrence of the activity monitored by the sensor means, whereby the sensor activity recording means maintains a continuing tally of the number of times the sensor means has monitored its associated activity and produced signals;

pre-alarm means operative following an alarm condition produced by the processing means to produce a first sensible alarm indication for a predetermined first interval of time;

first means operative following the predetermined first interval of time to initiate an alarm communication with the second apparatus at the second location and to generate an alarm message including alarm data specifying the occurrence of the alarm condition for transmission over the transmission medium to the second apparatus at the second location;

alarm means operative for the duration that the first means communicates with the second apparatus to produce a second sensible alarm indication distinguishable from the first sensible alarm indication and indicating that the first means is communicating with the second apparatus;

termination means operative at the conclusion of the communication with the second apparatus to terminate the second sensible alarm indication produced by the alarm means thereby to provide a period of silence following the second sensible alarm indicating that the communication was received by the second apparatus; and self-check means operative at or following a specified time of day and in the absence of an alarm condition produced by the processing means at that time to initiate a self-check operation and to cause the existing sensor activity data recorded by the sensor activity recording means to be read out therefrom and to be incorporated into a self-check message for transmission over the transmission medium to the second apparatus at the second location;

said second apparatus at the second location comprising:

alarm processing means arranged to receive and process the alarm data in each alarm message generated by the first apparatus and operative under operator control to communicate with the first apparatus over the transmission medium to provide an additional sensible indication at the first apparatus for indicating that the alarm communication to the second apparatus was received by the second apparatus; and sensor data processing means arranged to receive and process the sensor activity data in each self-check message initiated by the first apparatus, said sensor data processing means being operative if the sensor activity data has its first value indicating that the sensor means has not monitored its associated activity and produced signals since the last readout of sensor activity data from the sensor activity recording means to produce an output condition indicative of this fact.

12. A monitoring and signalling system in accordance with claim 11 wherein:

the first apparatus at the first location includes a telephone;

the transmission medium is a telephone network;

the pre-alarm means of the first apparatus is operative following an alarm condition produced by the processing means to produce a first audible alarm in the form of a continuous tone for the predetermined first interval of time;

the alarm means of the first apparatus is operative for the duration that the first means communicates with the second apparatus to produce a second audible alarm indication in the form of an intermittent tone; and the alarm processing means at the second apparatus is operative to provide the additional audible indication at the first apparatus in the form of the ringing of the telephone at the first location.

13. A monitoring and signalling system in accordance with claim 12 wherein:

the pre-alarm means of the first apparatus is further operative for the predetermined first interval of time to produce a continuous visual alarm indication simultaneously with the continuous first audible alarm indication; and the alarm means of the first apparatus is further operative for the duration that the first means communicates with the second apparatus to produce an intermittent visual alarm indication simultaneously with the intermittent second audible alarm indication.

14. A monitoring and signalling system in accordance with claim 11 wherein the processing means comprises:

activity means operative in response to each signal produced by the sensor means to be set to a predetermined count;

means operative following each count set into the activity means to alter the count at a predetermined rate so as to have a predetermined value at the expiration of a predetermined time period representing an activity-monitoring period; and means operative if the count in the activity means has been altered to the predetermined value to produce an alarm condition.

15. A monitoring and signalling system in accordance with claim 11 wherein the first apparatus at the first location further comprises:

means operable during the first sensible alarm indication produced by the pre-alarm means to terminate the first sensible alarm condition and prevent generation of an alarm message by the first means.

16. A monitoring and signalling system in accordance with claim 11 wherein:

the second apparatus further comprises means operative at the conclusion of a communication initiated by the first apparatus to communicate control data to the first apparatus over the transmission medium; and said termination means includes means arranged to receive the control data and operative in response thereto to terminate the second sensible alarm indication produced by the alarm means.

17. A monitoring and signalling system, comprising:

first and second apparatus at first and second locations, respectively, and interconnected by a transmission medium for allowing communication between the first and second apparatus;

said first apparatus at the first location comprising:

sensor means arranged to monitor the occurrence of an associated activity and operative in response to monitoring the occurrence of the activity to produce a signal indicative of the occurrence of the activity;

sensor activity recording means for recording sensor activity data representing a count of the number of times the sensor means has monitored its associated activity and produced signals, said data having a first value when the sensor means has not monitored its associated activity and has not produced signals and a different value when the sensor means has monitored its associated activity and produced signals;

processing means arranged to receive and process signals produced by the sensor means and operative in response to each signal received from the sensor means to produce an alarm condition, and further operative in response to processing each signal received from the sensor means to change the value of the sensor activity data in the sensor activity recording means to record the occurrence of the activity monitored by the sensor means, whereby the sensor activity recording means maintains a continuing tally of the number of times the sensor means has monitored its associated activity and produced signals;

first means operative following an alarm condition produced by the processing means to initiate an alarm communication with the second apparatus at the second location and to generate an alarm message including alarm data specifying the occurrence of the alarm condition for transmission over the transmission medium to the second apparatus at the second location; and self-check means operative at or following a specified time of day and in the absence of an alarm condition produced by the processing means at that time to initiate a self-check operation and to cause the existing sensor activity data recorded by the sensor activity recording means to be read out therefrom and to be incorporated into a self-check message for transmission over the transmission medium to the second apparatus at the second location;

said second apparatus at the second location comprising:

alarm processing means operative to receive and process the alarm data in each alarm message generated by the first apparatus for providing a response to said alarm message; and sensor data processing means arranged to receive and process the sensor activity data in each self-check message initiated by the first apparatus, said sensor data processing means being operative if the sensor activity data has its first value indicating that the sensor means has not monitored its associated activity and produced signals since the last readout of sensor activity data from the sensor activity recording means to produce an output condition indicative of this fact.

18. A monitoring and signalling system in accordance with claim 17 wherein the sensor means is a portable, user-actuated device and comprises:

a user-actuated switch; and means operable to detect actuation of the switch and in response to produce a signal.

19. A monitoring and signalling system in accordance with claim 18 wherein the first apparatus at the first location further comprises:

alarm means operative for the duration that the first means communicates with the second apparatus to produce an audible alarm indication for indicating that the first means is communicating with the second apparatus; and termination means operative at the conclusion of the communication with the second apparatus to terminate the audible alarm indication produced by the alarm means thereby to provide a period of silence following the audible alarm indication indicating that the communication was received by the second apparatus.

20. A monitoring and signalling system in accordance with claim 19 wherein:
the first apparatuss at the first location includes a telephone;
the transmission medium is a telephone network; and
the second apparatus at the second location includes control means operative under operator control to communicate with the first apparatus at the first location by means of a dialed telephone call over the telephone network to provide an additional audible indication in the form of the ringing of the telephone at the first location thereby to provide an additional audible indication that the communication to the second apparatus was received by the second apparatus.

21. A monitoring and signalling system in accordance with claim 20 wherein:
the second apparatus further comprises means operative at the conclusion of a communication initiated by the first apparatus to communicate control data to the first apparatus over the transmission medium; and
said termination means includes means arranged to receive the control data and operative in response thereto to terminate the audible alarm indication produced by the alarm means.

22. A monitoring and signallying system, comprising:
first and second apparatus at first and second locations, respectively, and interconnected by a transmission medium for allowing communication between the first and second apparatus;
said first apparatus at the first location comprising:
first and second sensor means each arranged to monitor the occurrence of an associated activity and in response to monitoring the occurrence of the associated activity to produce a signal indicative of the occurrence of the activity;
sensor activity recording means for recording sensor activity data correspondong to the first and second sensor means and representing counts of the number of times each of the sensor means has monitored its associated activity and produced signals, the data corresponding to each of the sensor means having a first value when the sensor means has not monitored its associated activity and has not produced signals and a different value when the sensor means has monitored its associated activity and produced signals;
processing means arranged to receive and process signals produced by the first and second sensor means, said processing means being operative if a signal is not received thereby from the first sensor means within a predetermined time period representing an activity-monitoring period associated with the first sensor means to produce an alarm condition and operative in response to each signal received thereby from the second sensor means to produce an alarm condition, said processing means being further operative in response to processing signals received from either the first sensor means or the second sensor means to change the values of the associated sensor activity data in the sensor activity recording means to record the occurrences of the activities monitored by the first and second sensor means, whereby the sensor activity recording means maintains a continuing tally of the number of times each of the first and second sensor means has monitored its associated activity and produced signals;
first means operative following each alarm condition produced by the processing means to initiate and alarm communication with the second apparatus at the second location and to generate an alarm message including alarm data specifying the occurrence of the alarm condition for transmission over the transmission medium to the second apparatus at the second location; and
self-check means operative at or following a specified time of day and in the absence of an alarm condition produced by the processing means at that time to initiate a self-check operation and to cause the existing sensor activity data recorded by the sensor activity recording means to be read out therefrom and to be incorporated into a self-check message for transmission over the transmission medium to the second apparatus at the second location;
said second apparatus at the second location comprising:
alarm processing means operative to receive and process the alarm data in each alarm message produced by the first apparatus for providing a response to said alarm message; and
sensor data processing means arranged to receive and process the sensor activity data in each self-check message initiated by the first apparatus, said sensor data processing means being operative if the sensor activity data corresponding to either of the first and second sensor means has its first value indicating that the sensor means has not monitored its associated activity and produced signals since the last readout of sensor activity data from the sensor activity recording means to produce an output condition indicative of this fact.

23. A monitoring and signalling system in accordance with claim 22 wherein:
the self-check means is operative at or following a predetermined time of day, each day, and in the absence of an alarm condition produced by the processing means at that time to initiate a self-check operation and to cause the existing sensor activity data recorded by the sensor activity recording means to be read out therefrom and to be incorporated into a self-check message for transmission over the transmission medium to the second apparatus at the second location.

24. A monitoring and signalling system in accordance with claim 22 wherein the second apparatus further comprises:
storage means operative to store each output condition corresponding to each of the first and second sensor means which has not monitored its associated activity and produced signals since the last readout of the sensor activity data from the sensor activity readout means; and
output means operative to access the storage means and to provide a visual display of the output conditions stored in the additional storage means and corresponding to the first and second sensor means.

25. A monitoring and signalling system in accordance with claim 24 wherein:

the sensor data processing means is further operative if the sensor activity data corresponding to either of the first and second sensor means has a value different from the first value and indicating that the sensor means has monitored its associated activity and produced signals since the last readout of the sensor activity data from the sensor activity means to refrain from producing an output condition corresponding to the sensor means, whereby the storage means stores output conditions corresponding only to the sensor means which have not monitored their associated activities or produced signals since the last readout of the sensor activity data from the sensor activity means and the output means provides a visual display of only the output conditions corresponding to those sensor means.

26. A monitoring and signalling system in accordance with claim 25 wherein:

the output means includes a hard copy printer.

* * * * *